(12) United States Patent
Aoyama et al.

(10) Patent No.: US 7,346,595 B2
(45) Date of Patent: Mar. 18, 2008

(54) METHOD AND APPARATUS FOR LEARNING DATA, METHOD AND APPARATUS FOR GENERATING DATA, AND COMPUTER PROGRAM

(75) Inventors: Kazumi Aoyama, Saitama (JP); Katsuki Minamino, Tokyo (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/396,836

(22) Filed: Apr. 3, 2006

(65) Prior Publication Data
US 2006/0248026 A1 Nov. 2, 2006

(30) Foreign Application Priority Data
Apr. 5, 2005 (JP) .............................. 2005-108478

(51) Int. Cl.
*G06F 15/18* (2006.01)
*G06F 17/30* (2006.01)
(52) U.S. Cl. ......................... 706/25; 706/12; 706/16; 707/5; 707/6
(58) Field of Classification Search ............... 370/241; 706/26, 20, 25, 12, 16; 704/222; 707/5, 707/6
See application file for complete search history.

(56) References Cited

U.S. PATENT DOCUMENTS

| | | | | | |
|---|---|---|---|---|---|
| 5,307,444 | A | * | 4/1994 | Tsuboka | 706/20 |
| 5,724,487 | A | * | 3/1998 | Streit | 706/25 |
| 5,870,729 | A | * | 2/1999 | Yoda | 706/26 |
| 6,449,591 | B1 | * | 9/2002 | Kondo et al. | 704/222 |
| 2006/0164997 | A1 | * | 7/2006 | Graepel et al. | 370/241 |

* cited by examiner

*Primary Examiner*—Shahid Alam
*Assistant Examiner*—Ann J Chempakaseril
(74) *Attorney, Agent, or Firm*—Frommer Lawrence & Haug LLP; William S. Frommer; Thomas F. Presson

(57) ABSTRACT

A learning apparatus for learning time series data in a link model including a plurality of input time series pattern storage networks and a plurality of output time series pattern storage networks with nodes of the input time series pattern storage networks linked to nodes of the output time series pattern storage networks, includes a learning unit for updating in a self-organizing manner each of the plurality of input time series pattern storage networks and updating in a self-organizing manner each of the plurality of output time series pattern storage networks and a link relationship updating unit for updating a link relationship between each node of the output time series pattern storage network and an input winner node, and updating a link relationship between each node of the input time series pattern storage network and an output winner node.

12 Claims, 45 Drawing Sheets

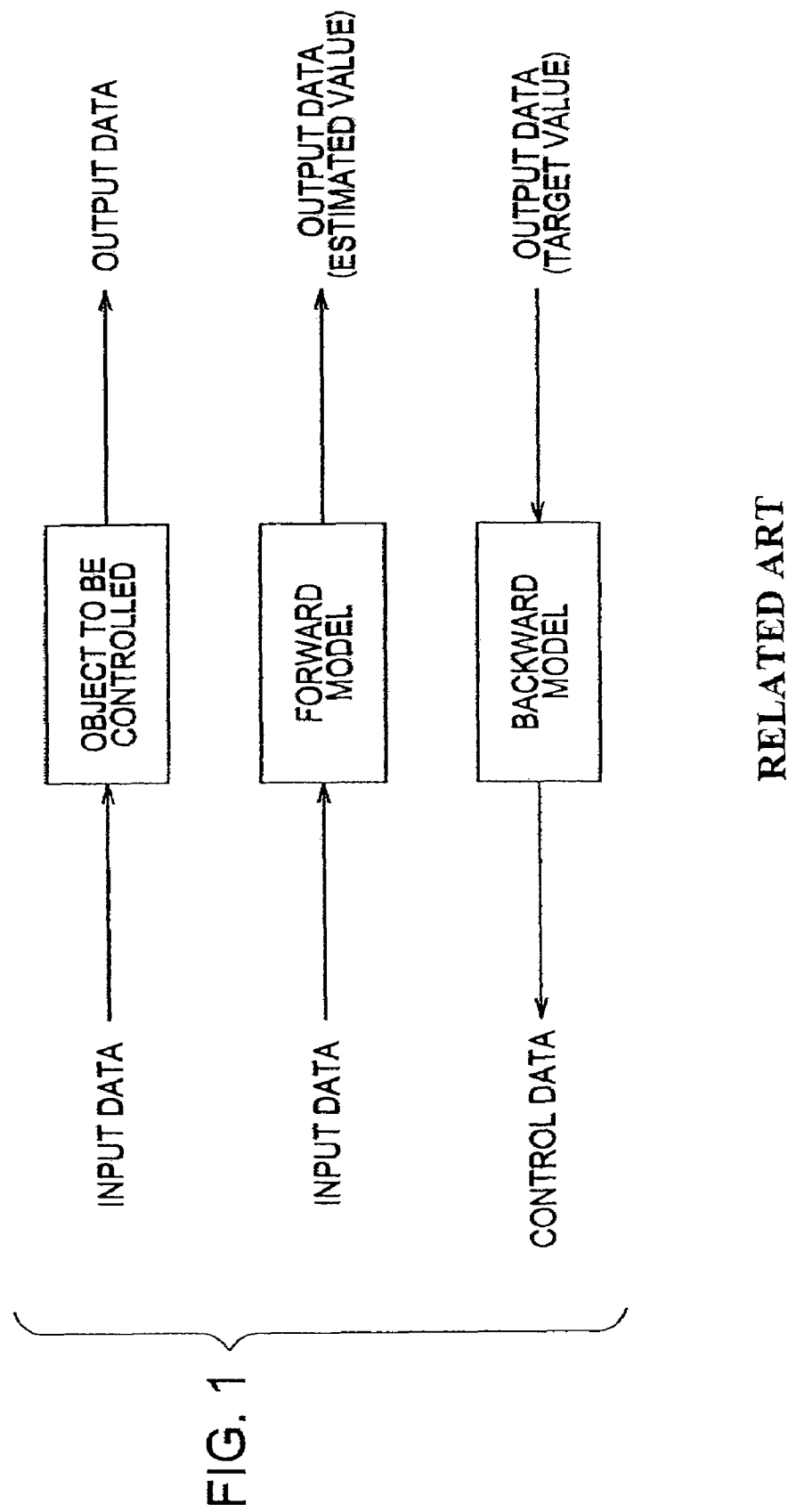

FIG. 3A
FIG. 3B
RELATED ART

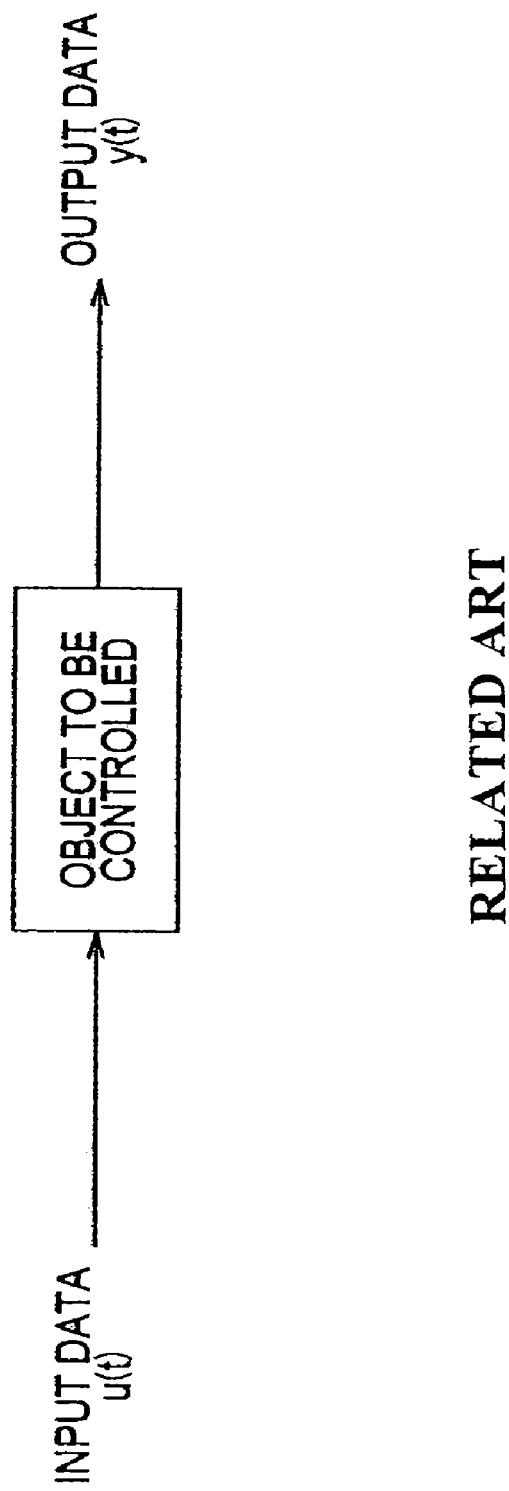

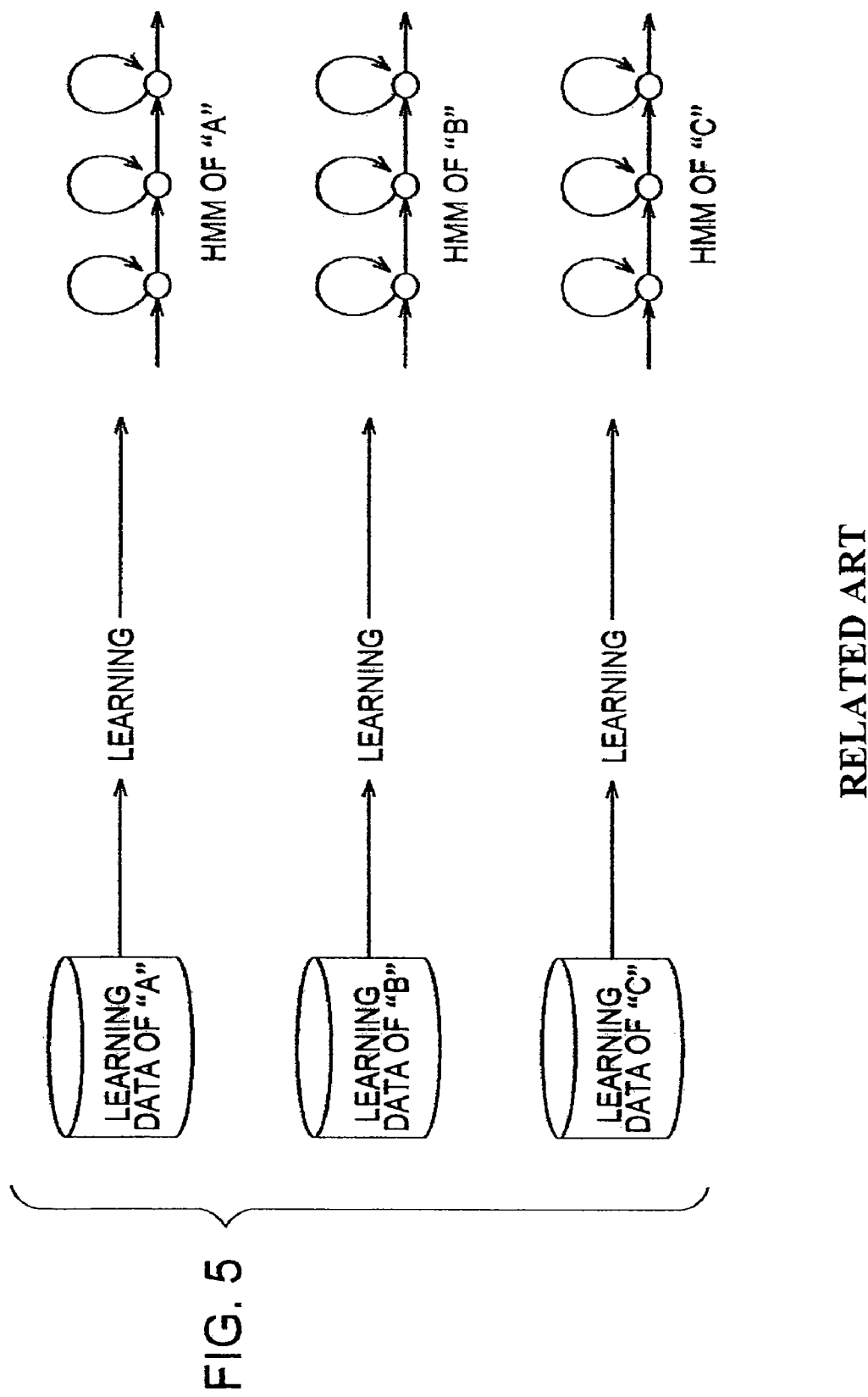

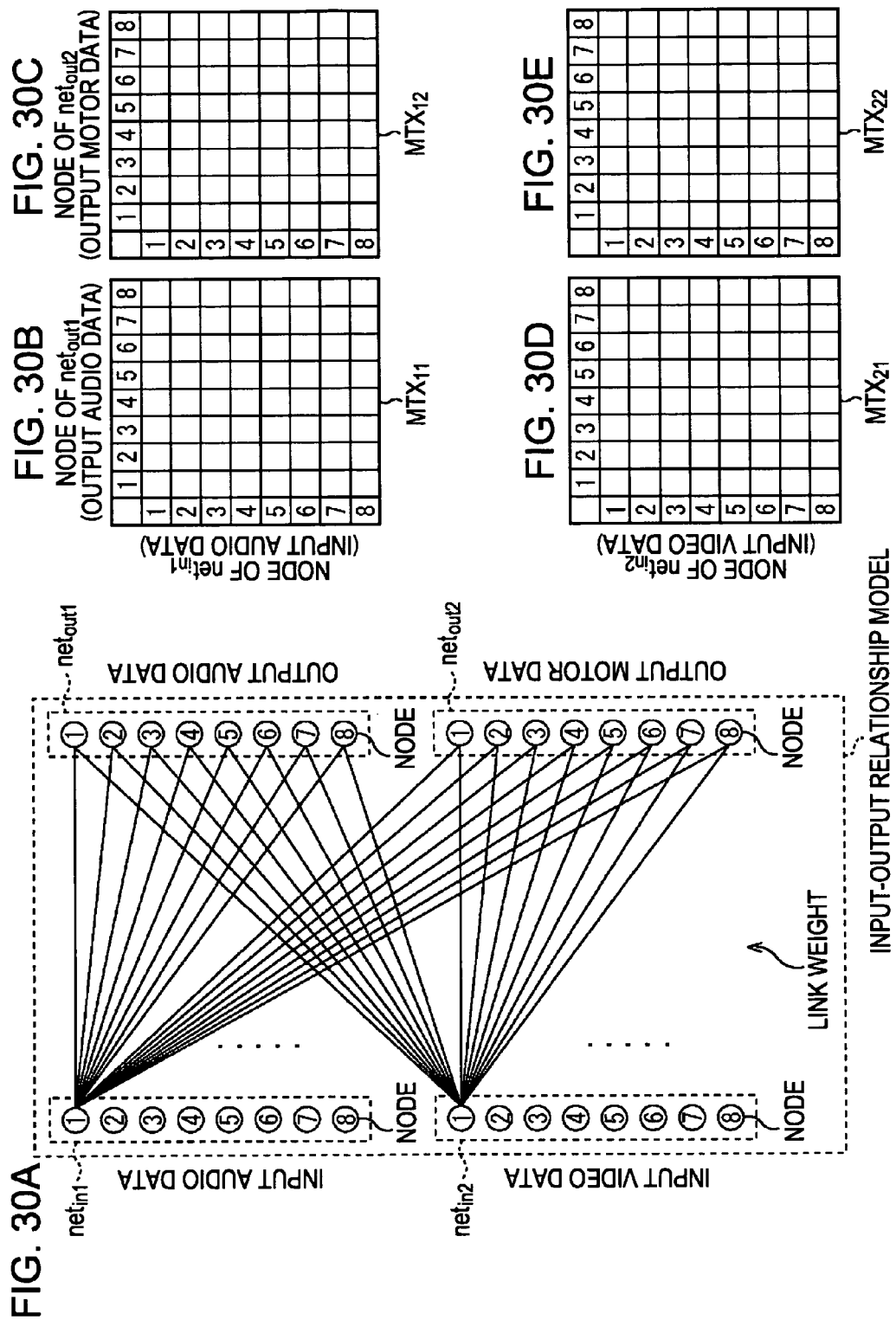

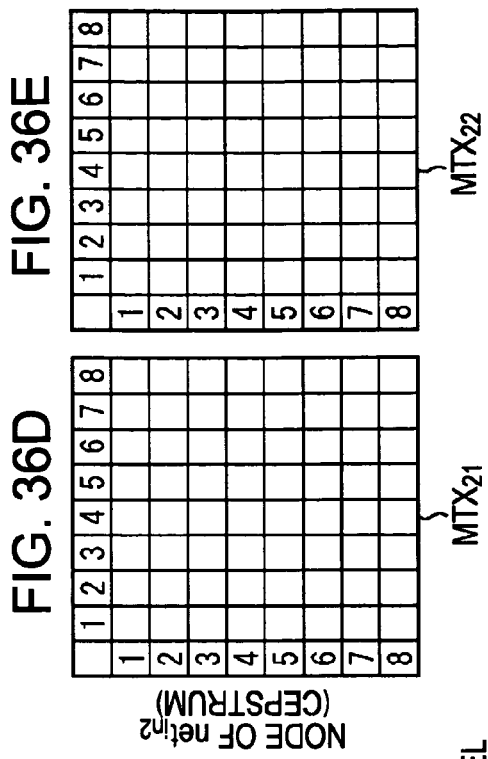
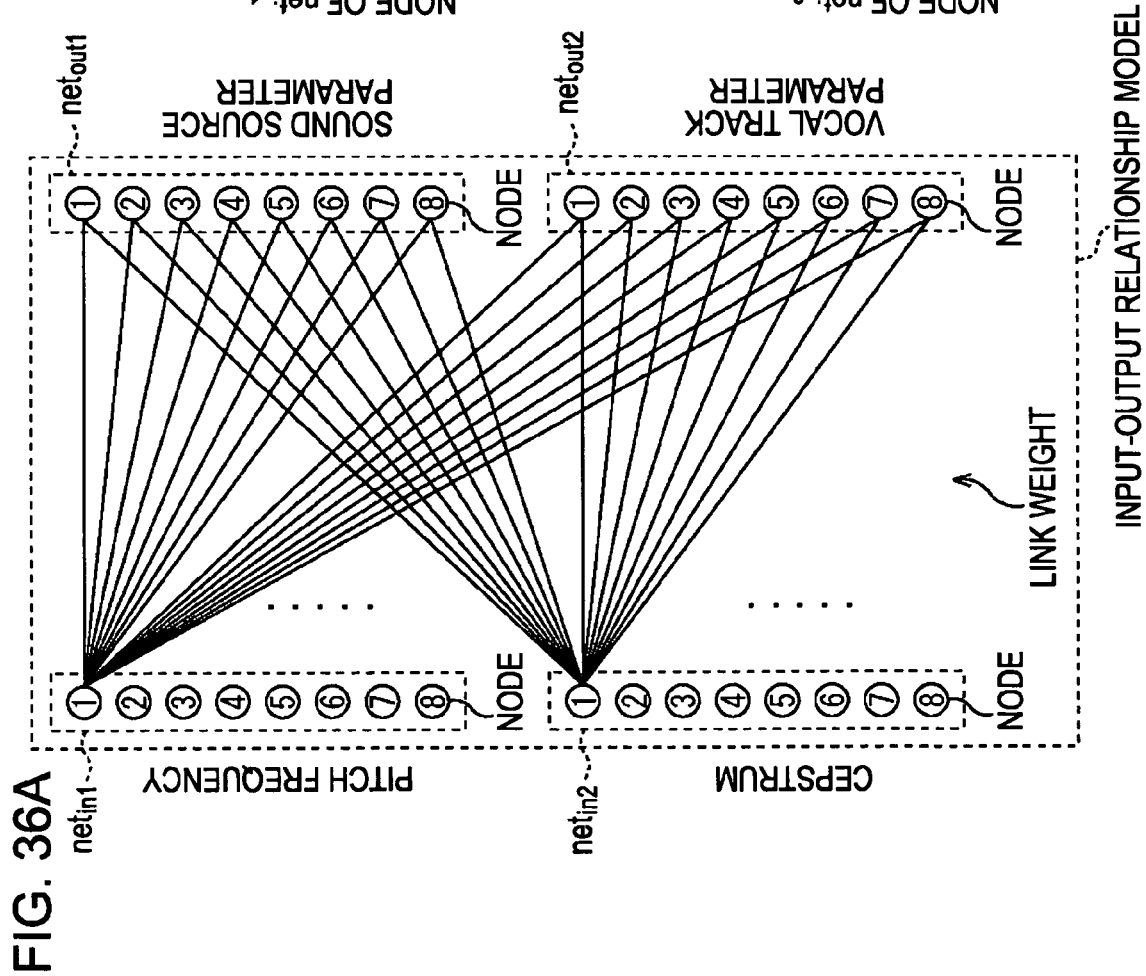

|  | WITHOUT LIMITATION ON LINK | WITH LIMITATION ON LINK |
|---|---|---|
| INTONATION | 80% | 82% |
| PHONEME (CATEGORY) | 70% | 85% |

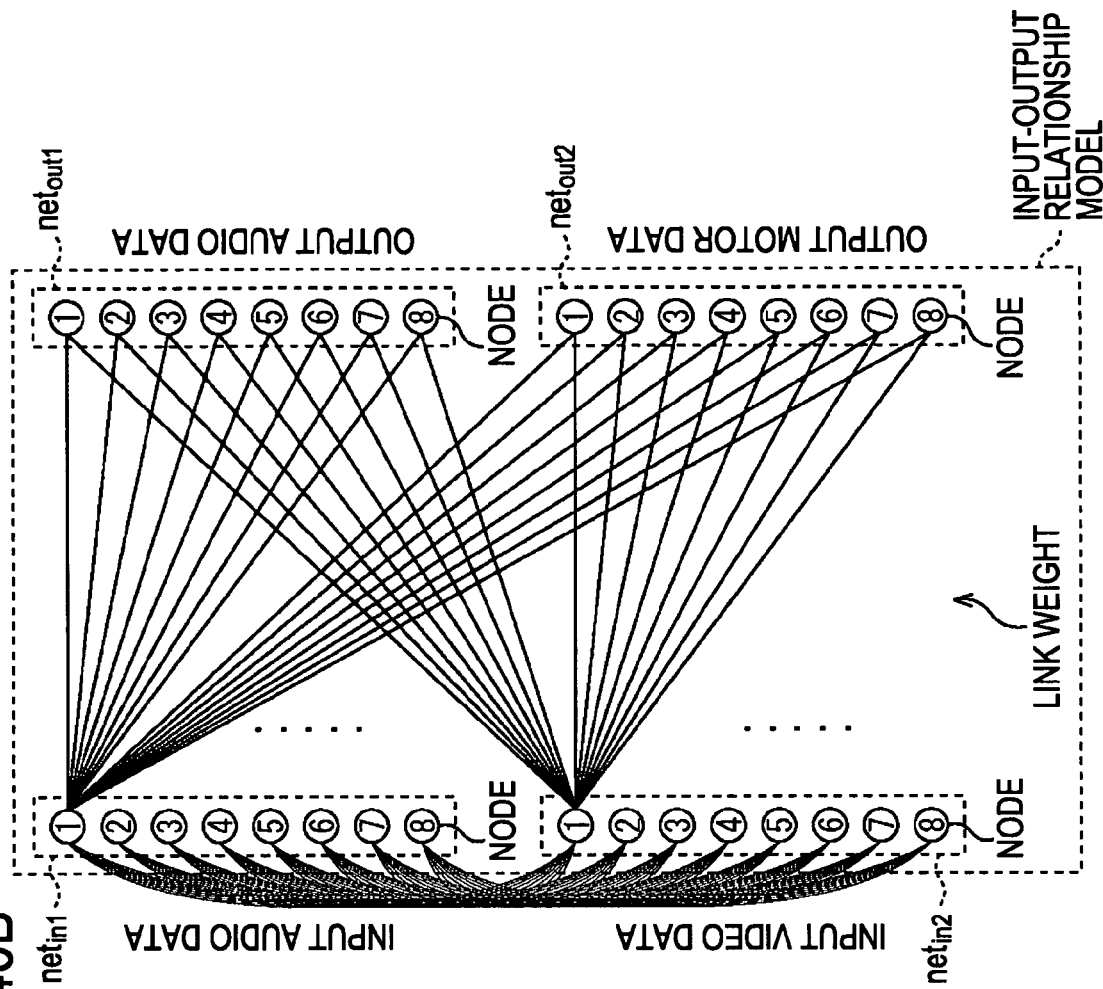

FIG. 41A NODE OF $net_{in2}$ (INPUT VIDEO DATA) / NODE OF $net_{in1}$ (INPUT AUDIO DATA) — $MTX_{in12}$ FIG. 41B NODE OF $net_{out1}$ (OUTPUT AUDIO DATA) / NODE OF $net_{in1}$ (INPUT AUDIO DATA) — $MTX_{11}$ FIG. 41C NODE OF $net_{out2}$ (OUTPUT MOTOR DATA) / NODE OF $net_{in1}$ (INPUT AUDIO DATA) — $MTX_{12}$ FIG. 41D NODE OF $net_{in1}$ (INPUT AUDIO DATA) / NODE OF $net_{in2}$ (INPUT VIDEO DATA) — $MTX_{in21}$ FIG. 41E NODE OF $net_{out1}$ (OUTPUT AUDIO DATA) / NODE OF $net_{in2}$ (INPUT VIDEO DATA) — $MTX_{21}$ FIG. 41F NODE OF $net_{out2}$ (OUTPUT MOTOR DATA) / NODE OF $net_{in2}$ (INPUT VIDEO DATA) — $MTX_{22}$

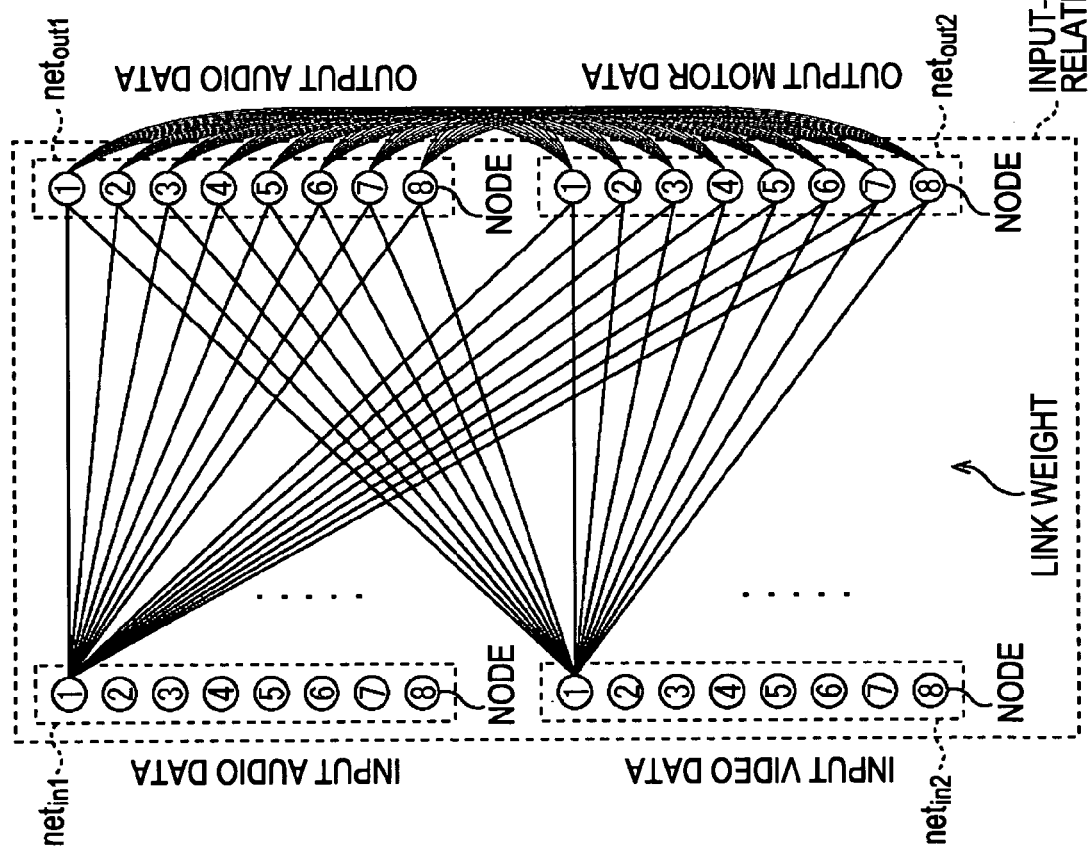

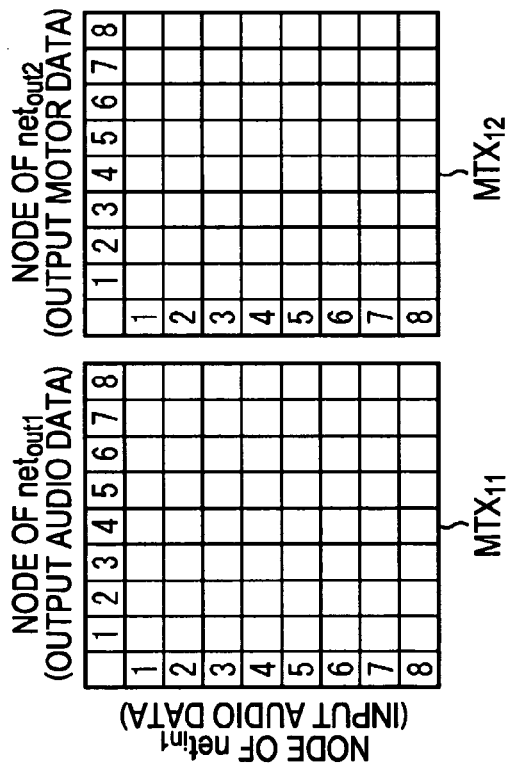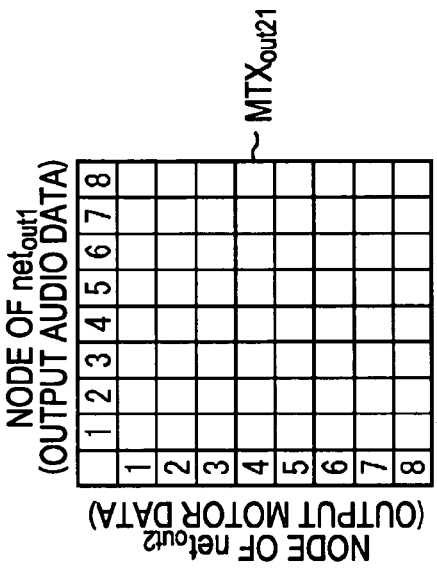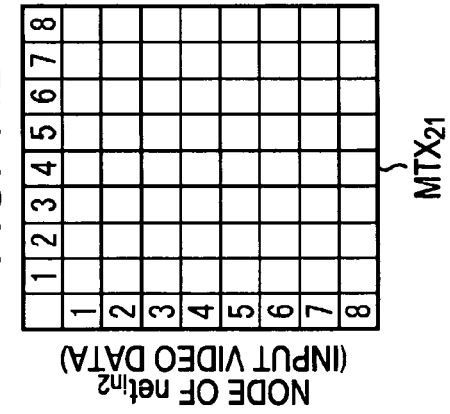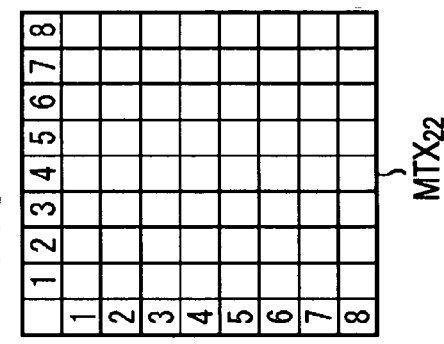

US 7,346,595 B2

METHOD AND APPARATUS FOR LEARNING DATA, METHOD AND APPARATUS FOR GENERATING DATA, AND COMPUTER PROGRAM

CROSS REFERENCES TO RELATED APPLICATIONS

The present invention contains subject matter related to Japanese Patent Application JP 2005-108478 filed in the Japanese Patent Office on Apr. 5, 2005, the entire contents of which are incorporated herein by reference.

BACKGROUND OF THE INVENTION

1. Field of the Invention

The present invention relates to a learning apparatus and learning method, a generation apparatus and generation method, and a computer program. In particular, the present invention relates to a learning apparatus and learning method, a generation apparatus and generation method, and a computer program for easily acquiring one of a high-precision forward model and a high-precision backward model of an object to be controlled, with an input thereto and an output therefrom being observable, the input and the output being time series data such as a sound.

2. Description of the Related Art

FIG. 1 illustrates a forward model and a backward model of an objected to be controlled.

In response to time series data as input data, an object to be controlled provides output data as another time series data. Although details (interior) of the control are unknown, the input data to the object and the output data the output provides in response to the input data are observed.

The input data input to the object and the output data the object provides in response to the input data are observable can be any physical quantity as long as these data units are observable. The object can be anything as long as the object can receive the input data and outputs the output data in response to the input data.

For example, a ball, a musical instrument, an automobile, a gas heater, or the like can be an object to be controlled. With a force, as input data, applied onto a ball, a position and speed of the ball are obtained. For example, when one of a steering wheel, an acceleration pedal, a brake pedal is operated as an input in an automobile, a position and speed of the automobile are obtained as output data. For example, in a gas heater, fire power may be adjusted as input data, and a room temperature is obtained as output data in response to the input data.

If input data is applied to the object to be controlled, and output data is obtained in response, the object is modeled as a forward model.

The forward model outputs an inferred value of output data in response to the input data. In the forward model, the output data that could be obtained from the object can be inferred without applying actual input data to the object.

In a backward model, a target value of the output data to be obtained from the object to be controlled is determined. The input data to be applied to the object is then inferred to obtain the output data having the target value. The forward model can be considered as mirror imaging from the input data to the output data while the backward model is considered as reverse mirror image from the output data to the input data.

The input data to obtain the output data having the target value on the backward model is referred to as control data as necessary.

The forward model and the backward model can be implemented in the configuration of a robot.

For example, a robot may be equipped with a microphone and a camera to receive audio data and video data and may also equipped with a loudspeaker and an actuator (motor) to output a sound (audio data). In response to motor data (motor signal), the motor is operated to move an arm.

In response to the audio data such as the audio data and the video data, such a robot outputs the audio data as the output data, and the motor data as the output data to move the arm. In the known art, the robot including a voice recognition device and an image recognition device recognizes the voice data and the video data input thereto. The robot is preprogrammed (designed) to output what audio data to output and what motor data to output in response to the recognition result.

If the forward model is used as shown in FIGS. 2A and 2B, a robot outputting desired audio data and motor data for a desired arm movement in response to the audio data and the video data is assumed as an object to be controlled. The robot assumed to be the object to be controlled (hereinafter referred to as an assumed robot as necessary) forms a forward model. If the robot is caused to learn the relationship between the input data to the robot and the output data from the robot, the robot becomes an assumed robot as a forward model.

More specifically, a set of the input data, such as the audio data and the video data to be input to the robot, and the output data, such as the audio data and the motor data the robot is to output in response to the input data, is prepared, and then actually applied to the robot. If an assumed robot of backward model providing output data responsive to input is inferred (output) using an externally supplied set of input data and output data (hereinafter referred to as supervising data), output data such as desired audio data and desired motor data can be output in response to the input data such as audio data and the video actually input.

With the backward model, an arm controller controlling an arm as an object to be controlled of a robot is configured as shown in FIGS. 3A and 3B.

More specifically, the robot arm is moved by a motor that runs in response to motor data as input data. As a result, a distal end of the arm moves in position. With the origin placed at the center of gravity of the robot, the forwarding direction of the robot is aligned with the x-axis, the right direction (viewed from the robot) is aligned with the y-axis, and the upward direction is aligned with the z-axis. The position of the distal end of the arm is determined in the three (x,y,z) coordinates. In response to the motor data, the motor runs, and moves the end of the arm in position. As a result, the end of the arm forms a trajectory. A sequence of coordinates of the trajectory the arm end follows is referred to as end position trajectory data.

In order to cause the arm to follow a desired end position trajectory, namely, in order to output desired end position trajectory data as output data, motor data driving the motor to move the arm along the end position trajectory needs to be supplied to the motor as input data.

Using only supervising data as a set of motor data as input data and end position trajectory data as output data responsive to the motor data given to the motor, motor data as input data (control data) achieving end position trajectory data (output data) as a target value is inferred. If a backward model of the arm is determined, the backward model can be used as an arm controller that determines motor data responsive to the end position trajectory data as a target value.

If the end position trajectory data is input as the input data to the robot with the arm controller as the backward model of the arm, the robot determines the corresponding motor data (control data) using the arm controller. With the robot driving the motor in accordance with the motor data, the robot arm moves along the trajectory defined by the end position trajectory data as the input data.

If the forward model and the backward model are determined using only the set of the input data and the output data (supervising data), a robot outputting the output data responsive to the input data is easily configured based on the forward model and the backward model.

A modeling method using a linear system is available as a method of determining a forward model and a backward model of an object to be controlled.

In the modeling based on the linear system, input data u(t) input to the object to be controlled at time t and output data y(t) are respectively represented by equations (1) and (2). In other words, the object to be controlled is approximated as a linear system by equations (1) and (2):

$$x(t+1)=Ax(t)+Bu(t) \quad (1)$$

$$y(t)=Cx(t) \quad (2)$$

wherein x(t) is referred to as a state variable of the linear system at time t, and A, B, and C are coefficients. For simplicity of explanation, let the input data u(t) and the output data y(t) be a one-dimensional vector (scalar quantity), and the state variable x(t) be an n-dimensional vector, and A, B, and C are respectively constants represented by an n×n matrix, an n×1 matrix, and a 1×n matrix (n is 2 or larger integer).

In the modeling based on the linear system, the forward model of the object to be controlled is obtained by determining matrices A, B, and C so that the relationship between the observable input data u(t) and the output data y(t), obtained when the input data u(t) is input to the object to be controlled, satisfies equations (1) and (2).

The linear system modeling technique is not sufficient to model a complex object, such as the one having non-linear characteristics.

Actual objects to be controlled are complex, and have occasionally non-linear characteristics. If such an object is modeled by approximating the object as a simple linear system, output data the forward model infers in response to the input data and input data (control data) the backward model infers in response to the output data are subject to large inference error, and high-accuracy inference cannot be performed.

Methods of obtaining a forward model and a backward model of an object having non-linear characteristics are available. For example, supervising data, namely, a set of input data supplied to an object to be controlled and output data observed with the input data supplied to the object, is learned using a neural network. The neural network is produced by mutually linking artificial elements simulating neurons, and can learn a relationship of supervising data supplied from the outside, namely, a relationship between the input data and the output data.

To model an object using a neural network, the neural network needs to be scaled up in size in accordance with the complexity of the object to be controlled. As the scale of the neural network becomes large, time required for learning is substantially increased. Reliable learning is difficult to perform. The same is true if the number of dimensions of input data and output data is large.

When the forward model and the backward model are determined using only the set of the input data and the output data (supervising data), learning is performed using the supervising data in order to recognize which of several patterns the supervising data matches. More specifically, the pattern of the input data and the output data as the supervising data needs to be learned and recognized.

Techniques recognizing a pattern by learning are generally called pattern recognition. The learning techniques by pattern recognition are divided into supervised learning and unsupervised learning.

In the supervised learning, information concerning class to which learning data of each pattern belongs to is provided. Such information is called correct-answer label. The learning data belonging to a given pattern is learned on a per pattern basis. Numerous learning methods including template matching, neural network, and hidden Markov model (HMM), have been proposed.

FIG. 5 illustrates known a supervised learning process.

In the supervised learning, learning data for use in learning is prepared according to assumed category (class), such as phoneme category, phonological category, or word category. To learn voice data of pronunciations of "A", "B", and "C", a great deal of voice data of pronunciations of "A", "B", and "C" is prepared.

A model used in learning (model learning data of each category) is prepared on a per category basis. The model is defined by parameters. For example, to learn voice data, an HMM is used as a model. The HMM is defined by a state transition probability of transitioning from one state to another state (including an original state) or an output probability density representing the probability density of an observed value output from the HMM.

In the supervised learning, the learning of each category (class) is performed using learning data of that category alone. As shown in FIG. 5, a model of category "A" is learned using learning data of "A" only, and a model of category "B" is learned using learning data of "B" only. Likewise, a model of category "C" is learned using learning data of category "C" only.

In the supervised learning, the learning of the model of a category needs to be performed using the learning data of that category. The learning data is prepared on a category by category basis, and the learning data of that category is provided for learning of the model of that category. The model is thus obtained on a per category basis. More specifically, in the supervised learning, a template (model of a class (category) represented by a correct-answer label) is obtained on a per class basis.

During recognition, a correct-answer label of a template (having the maximum likelihood) most appropriately matching data to be recognized is output.

The unsupervised learning is performed with no correct-answer label provided to the learning data of each pattern. For example, learning methods using template matching and neural net are available in the unsupervised learning. The unsupervised learning is thus substantially different from the supervised learning in that no correct-answer label is provided.

The pattern recognition is considered as a quantization of signal space in which data (signal) to be recognized in the pattern recognition is observed. If the data to be recognized is a vector, the pattern recognition is referred to as a vector quantization.

In the vector quantization learning, a representative vector corresponding to class (referred to as a centroid vector) is arranged in the signal space where the data to be recognized is placed.

K-means clustering method is available as one of typical unsupervised learning vector quantization techniques. In the K-means clustering method, the centroid vector is placed appropriately in the initial state of the process. A vector as the learning data is assigned to the centroid vector closest in distance thereto, and the centroid vector is updated with a mean vector of the learning data assigned to the centroid vector. This process is iterated.

Batch learning is also known. In the batch learning, a large number of learning data units is stored and all learning data units are used. The K-mean clustering method is classified as batch learning. In online learning, as opposed to the batch learning, learning is performed using learning data each time the learning data is observed, and parameters are updated bit by bit. The parameters include a component of the centroid vector and a output probability density function defining HMM.

Self-organization map (SOM), proposed by T. Kohonen, is well defined as the online learning. In the SOM learning, the weight of link between an input layer and an output layer is updated (corrected) bit by bit.

In the SOM, the output layer has a plurality of nodes, and each node of the output layer is provided with a link weight representing the degree of link with the input layer. If the link weight serves as a vector, the vector quantization learning can be performed.

More specifically, a node having the shortest distance between the vector as the link weight and the vector as the learning data is determined as a winner node from among the nodes of the output layer of the SOM. Updating of the vector is performed so that the vector as the link weight of the winner node becomes close to the vector as the learning data. The link weight of a node of the vicinity of the winner node is also updated so that the link weight becomes a bit closer to the learning data. As learning process is in progress, nodes are arranged in the output layer so that nodes having similar vectors as link weights are close to each other while nodes not similar to each other are far apart from each other. A map corresponding to a pattern contained in the learning data is thus organized. As learning is in progress, a map corresponding to the learning data containing similar nodes (namely, nodes having similar vectors as link weights) in close vicinity is produced. This process is referred to as self-organization.

The vector of the link weight obtained as a result of learning is considered as a centroid vector arranged in the signal space. In the K-mean clustering technique, only a vector closest in distance to the learning data is updated, and the method of updating in that way is referred to as winner-take-all (WTA). In contrast, in the SOM learning, not only the node closest to the learning data (winner node) but also the node of the vicinity of the winner node is updated in link weight. The method of updating is referred to as soft-max adaptation (SMA). The learning results of the WTA learning tends to be subject to localized solution while the SMA learning improves the problem of being subject to localized solution.

The SOM learning is described in the paper entitled "Self-Organizing Feature Maps" authored by T. Kohonen, Springer-Verlag Tokyo.

The above SOM and neural gas algorithm provides unsupervised learning applicable to a vector as a static signal pattern, namely, data having a fixed length. The SOM cannot be directly applied to time series data such as voice data because voice data is variable in length and dynamic in signal pattern.

In one proposed technique, a higher dimensional vector is defined by connecting consecutive vector series (with consecutive vector components handled as one vector component), and time series vectors as time series data are thus handled as a static signal pattern. Such a technique cannot be directly applied to variable-length time series data, such as voice data.

An HMM technique is available as one of widely available techniques for pattern recognition of time series data, such as recognizing voice data in voice recognition (as disclosed by Laurence Rabiner, and Biing-Hwang Juang in the book entitled "Fundamentals of Speech Recognition" NTT Advanced Technologies).

HMM is one of state transition probability models having state transitions. As previously discussed, HMM is defined by a state transition probability and an output probability density function at each state. In the HMM technique, statistical characteristics of time series data to be learned are modeled. Mixture of normal distributions is used as the output probability density function defining HMM. Baum-Welch algorithm is widely used to infer parameters of HMM (the parameters are the state transition probability and the output probability density function).

The HMM technique finds applications in a wide range from isolated word recognition, already put to practical use, to large vocabulary recognition. The HMM learning is typically a supervised learning, and as shown in FIG. 1, learning data with a correct-answer label attached thereto is used in learning. The HMM learning for recognizing a word is performed using learning data corresponding to that word (voice data obtained as a result of pronouncement of that word).

The HMM learning is supervised learning, and performing the HMM learning on learning data having no correct-answer label attached thereto is difficult, i.e., unsupervised HMM learning is difficult.

SUMMARY OF THE INVENTION

As described above, unsupervised learning of static pattern, such as SOM, and supervised learning of dynamic time series data, such as HMM, have been proposed. The two types of techniques are not sufficient to perform unsupervised learning of dynamic time series data.

If the input data and the output data are time series data, it is difficult to perform unsupervised learning on each of the input data and the output data. Obtaining a forward model or a backward model by learning the relationship between the input data and the output data is also difficult.

It is thus desirable to perform unsupervised learning of time series data and to easily learning the relationship between the input data and the output data as the time series data.

In accordance with one embodiment of the present invention, a learning apparatus (method and computer program) learns time series data in a link model including a plurality of input time series pattern storage networks and a plurality of output time series pattern storage networks with nodes of the input time series pattern storage networks linked to nodes of the output time series pattern storage networks, each of the plurality of input time series pattern storage networks including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data. The learning apparatus (method and computer program) includes a learning unit (step) for updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner each of the plurality of output time series pattern storage networks based on sub output data of a channel corresponding to the output time series pattern storage network, the output data containing sub output data of channels of the same number as the number of output time series pattern storage networks, and a link relationship updating unit (step) for updating a link relationship between each node of the output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the sub output data of the channel corresponding to the output time series pattern storage network, from among the nodes of the output time series pattern storage network.

Each of the plurality of input time series pattern storage networks is updated in a self-organizing manner based on sub input data of the channel corresponding to the input time series pattern storage network, the input data containing sub input data of channels of the same number as the number of input time series pattern storage networks. Each of the plurality of output time series pattern storage networks is updated based on sub output data of a channel corresponding to the output time series pattern storage network in a self-organizing manner, the output data containing sub output data of channels of the same number as the number of output time series pattern storage networks. The link relationship between each node of the output time series pattern storage network and the node, as the input winner node, most appropriately matching the sub input data of the channel corresponding to the input time series pattern storage network, from among the nodes of the input time series pattern storage network is updated. The link relationship between each node of the input time series pattern storage network and the node, as the output winner node, most appropriately matching the sub output data of the channel corresponding to the output time series pattern storage network, from among the nodes of the output time series pattern storage network is updated.

The link model includes the plurality of input time series pattern storage networks and the plurality of output time series pattern storage networks with nodes of the input time series pattern storage networks linked to nodes of the output time series pattern storage networks. Each of the plurality of input time series pattern storage networks includes a plurality of nodes, each node having a time series pattern model representing a time series pattern of time series data as input data input to a predetermined object to be controlled. Each of the plurality of output time series pattern storage networks includes a plurality of nodes, each node having a time series pattern model representing a time series pattern of time series data as output data output by the predetermined object in response to the input data.

In accordance with another embodiment of the present invention, a learning apparatus (method and computer program) learns time series data in a link model including one input time series pattern storage network and a plurality of output time series pattern storage networks with nodes of the one input time series pattern storage network linked to nodes of the output time series pattern storage networks, the one input time series pattern storage network including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data. The learning apparatus (method and computer program) includes a learning unit (step) for updating in a self-organizing manner the one input time series pattern storage network based on the input data, and updating in a self-organizing manner each of the plurality of output time series pattern storage networks based on sub output data of a channel corresponding to the output time series pattern storage network, the output data containing sub output data of channels of the same number as the number of output time series pattern storage networks, and a link relationship updating unit (step) for updating a link relationship between each node of the output time series pattern storage network and a node, as an input winner node, most appropriately matching the input data, from among the nodes of the one input time series pattern storage network, and updating a link relationship between each node of the one input time series pattern storage network and a node, as an output winner node, most appropriately matching the sub output data of the channel corresponding to the output time series pattern storage network, from among the nodes of the output time series pattern storage network.

The one input time series pattern storage network is updated in a self-organizing manner based on the input data. Each of the plurality of output time series pattern storage networks is updated based on sub output data of the channel corresponding to the output time series pattern storage network in a self-organizing manner, the output data containing sub output data of channels of the same number as the number of output time series pattern storage networks. The link relationship between each node of the output time series pattern storage network and the node, as the input winner node, most appropriately matching the sub input data of the channel corresponding to the input time series pattern storage network, from among the nodes of the input time series pattern storage network is updated. The link relationship between each node of the input time series pattern storage network and the node, as the output winner node, most appropriately matching the sub output data of the channel corresponding to the output time series pattern storage network, from among the nodes of the output time series pattern storage network is updated.

The link model includes the one input time series pattern storage network and the plurality of output time series pattern storage networks with nodes of the one input time series pattern storage network linked to nodes of the output time series pattern storage networks. The one input time series pattern storage network includes a plurality of nodes, each node having a time series pattern model representing a time series pattern of time series data as input data input to a predetermined object to be controlled. Each of the plurality of output time series pattern storage networks includes a plurality of nodes, each node having a time series pattern model representing a time series pattern of time series data as output data output by the predetermined object in response to the input data.

In accordance with another embodiment of the present invention, a learning apparatus (method and computer program) learns time series data in a link model including a plurality of input time series pattern storage networks and one output time series pattern storage network with nodes of the plurality of input time series pattern storage networks linked to nodes of the one output time series pattern storage network, each of the plurality of input time series pattern storage networks including a plurality of nodes, each node having a time series pattern model representing a time series pattern of time series data as input data input to a predetermined object to be controlled, and the one output time series pattern storage network including a plurality of nodes, each node having a time series pattern model representing a time series pattern of time series data as output data output by the predetermined object in response to the input data. The learning apparatus (method and computer program) includes a learning unit (step) for updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner the one output time series pattern storage network based on the output data, and a link relationship updating unit (step) for updating a link relationship between each node of the one output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the output data, from among the nodes of the one output time series pattern storage network.

Each of the plurality of input time series pattern storage networks is updated in a self-organizing manner based on sub input data of the channel corresponding to the input time series storage pattern storage network, the input data containing sub input data of channels of the same number as the number of input time series pattern storage networks. The one output time series pattern storage network is updated based on the output data. The link relationship between each node of the output time series pattern storage network and the node, as the input winner node, most appropriately matching the sub input data of the channel corresponding to the input time series pattern storage network, from among the nodes of the input time series pattern storage network is updated. The link relationship between each node of the input time series pattern storage network and the node, as the output winner node, most appropriately matching the sub output data of the channel corresponding to the output time series pattern storage network, from among the nodes of the output time series pattern storage network is updated.

The link model includes the plurality of input time series pattern storage networks and the one output time series pattern storage network with nodes of the input time series pattern storage networks linked to nodes of the one output time series pattern storage network. Each of the plurality of input time series pattern storage networks includes a plurality of nodes, each node having a time series pattern model representing a time series pattern of time series data as input data input to a predetermined object to be controlled. The one output time series pattern storage network includes a plurality of nodes, each node having a time series pattern model representing a time series pattern of time series data as output data output by the predetermined object in response to the input data.

In accordance with one embodiment of the present invention, a generation apparatus (method and computer program) generates, in response to time series data, another time series data in a link model including a plurality of first time series pattern storage networks and a plurality of second time series pattern storage networks with nodes of the first time series pattern storage networks linked to nodes of the second time series pattern storage networks, each of the plurality of first time series pattern storage networks including a plurality of nodes, each node having a time series pattern model representing a time series pattern of the time series data, and each of the plurality of second time series pattern storage networks including a plurality of nodes, each node having a time series pattern model representing a time series pattern of the other time series data. The generation apparatus (method and computer program) includes a winner node determining unit (step) for determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks, a generation node determining unit (step) for determining, as a generation node for generating the other time series data, a node most heavily linked to the winner node, from among the nodes of the second time series pattern storage network, and a generating unit (step) for generating the other time series data based on the time series pattern model of the generation node.

The node most appropriately matching sub time series data of the channel corresponding to the first time series storage pattern storage network is determined as the winner node for each of the first time series pattern storage networks. The node most heavily linked to the winner node, from among the nodes of the second time series pattern storage network is generated as a generation node for generating the other time series data. The other time series data is generated based on the time series pattern model of the generation node.

The link model includes the plurality of first time series pattern storage networks and the plurality of second time series pattern storage networks with nodes of the first time series pattern storage networks linked to nodes of the second time series pattern storage networks. Each of the plurality of first time series pattern storage networks includes a plurality of nodes, each node having a time series pattern model representing a time series pattern of the time series data. Each of the plurality of second time series pattern storage networks includes a plurality of nodes, each node having a time series pattern model representing a time series pattern of the other time series data.

In accordance with another embodiment of the present invention, a generation apparatus (method and computer program) generates, in response to time series data, another time series data in a link model including one first time series pattern storage network and a plurality of second time series pattern storage networks with nodes of the one first time series pattern storage network linked to nodes of the second time series pattern storage networks, the one first time series pattern storage network including a plurality of nodes, each node having a time series pattern model representing a time series pattern of the time series data, and each of the plurality of second time series pattern storage networks including a plurality of nodes, each node having a time series pattern model representing a time series pattern of the other time series data. The generation apparatus (method and computer program) includes a winner node determining unit (step) for determining, for the one first time series pattern storage network, a node, as a winner node, most appropriately matching the time series data, a generation node determining unit (step) for determining, as a generation node for generating the other time series data, a node most heavily linked to the winner node, from among the nodes of the second time series pattern storage network, and a generating unit (step) for generating the other time series data based on the time series pattern model of the generation node.

The node most appropriately matching sub time series data in the one first time series pattern storage network of the link model is determined as the winner node for the one first time series pattern storage network. The node most heavily linked to the winner node, from among the nodes of the second time series pattern storage network is generated as the generation node for generating the other time series data. The other time series data is generated based on the time series pattern model of the generation node.

The link model includes the one first time series pattern storage network and the plurality of second time series pattern storage networks with nodes of the one first time series pattern storage network linked to nodes of the second time series pattern storage networks. The one first time series pattern storage network includes a plurality of nodes, each node having a time series pattern model representing a time series pattern of the time series data. Each of the plurality of second time series pattern storage networks includes a plurality of nodes, each node having a time series pattern model representing a time series pattern of the other time series data.

In accordance with another embodiment of the present invention, a generation apparatus (method and computer program) generates, in response to time series data, another time series data in a link model including a plurality of first time series pattern storage networks and one second time series pattern storage network with nodes of the first time series pattern storage networks linked to nodes of the one second time series pattern storage network, each of the plurality of first time series pattern storage networks including a plurality of nodes, each node having a time series pattern model representing a time series pattern of the time series data, and the one second time series pattern storage network including a plurality of nodes, each node having a time series pattern model representing a time series pattern of the other time series data. The generation apparatus (method and computer program) includes a winner node determining unit (step) for determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks, a generation node determining unit (step) for determining, as a generation node for generating the other time series data, a node most heavily linked to the winner node, from among the nodes of the second time series pattern storage network, and a generating unit (step) for generating the other time series data based on the time series pattern model of the generation node.

The node most appropriately matching sub time series data of the channel corresponding to the first time series storage pattern storage network is determined as the winner node for each of the first time series pattern storage networks. The node most heavily linked to the winner node, from among the nodes of the one second time series pattern storage network is generated as the generation node for generating the other time series data. The other time series data is generated based on the time series pattern model of the generation node.

The link model includes the plurality of first time series pattern storage networks and the one second time series pattern storage network with nodes of the first time series pattern storage networks linked to nodes of the one second time series pattern storage network. Each of the plurality of first time series pattern storage networks includes a plurality of nodes, each node having a time series pattern model representing a time series pattern of the time series data. The one second time series pattern storage network includes a plurality of nodes, each node having a time series pattern model representing a time series pattern of the other time series data.

In accordance with embodiments of the present invention, time series data is easily learned in unsupervised learning. Furthermore, the relationship between the input data and the output data, as time series data, is easily learned.

BRIEF DESCRIPTION OF THE DRAWINGS

FIG. 1 illustrates a forward model and a backward model of an object to be controlled;

FIGS. 3A-3B illustrate an arm of a robot to be controlled, and a backward model of the arm;

FIG. 4 illustrates modeling of a linear system;

FIG. 5 illustrates known supervised learning;

FIGS. 30A-30E illustrate an input-output relationship model;

FIGS. 36A-36E illustrate an input-output relationship model;

FIGS. 40A and 40B illustrate an input-output relationship model;

FIGS. 41A-41F illustrate link weight matrices;

FIGS. 43A and 43B illustrate an input-output relationship model;

FIGS. 44A-44F illustrate link weight matrices;

DESCRIPTION OF THE PREFERRED EMBODIMENTS

Figure 2A:
FIGS. 2A-2B illustrate an assumed robot as an object to be controlled, and a forward model of the robot.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A learning apparatus of one embodiment of the present invention (for example, a learning section 212 of FIG. 21) learns time series data in a link model including a plurality of input time series pattern storage networks and a plurality of output time series pattern storage networks with nodes of the input time series pattern storage networks linked to nodes of the output time series pattern storage networks, each of the plurality of input time series pattern storage networks including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data. The learning apparatus includes a learning unit (for example, a learning processor 221 of FIG. 21) for updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner each of the plurality of output time series pattern storage networks based on sub output data of a channel corresponding to the output time series pattern storage network, the output data containing sub output data of channels of the same number as the number of output time series pattern storage networks, and a link relationship updating unit (for example, a link weight updating unit 222 of FIG. 21) for updating a link relationship between each node of the output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the sub output data of the channel corresponding to the output time series pattern storage network, from among the nodes of the output time series pattern storage network.

A learning method of one embodiment of the present invention learns time series data in a link model including a plurality of input time series pattern storage networks and a plurality of output time series pattern storage networks with nodes of the input time series pattern storage networks linked to nodes of the output time series pattern storage networks, each of the plurality of input time series pattern storage networks including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data. The learning method includes a learning step (for example, steps S123 and S124 of FIG. 28) of updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner each of the plurality of output time series pattern storage networks based on sub output data of a channel corresponding to the output time series pattern storage network, the output data containing sub output data of channels of the same number as the number of output time series pattern storage networks, and a link relationship updating step (for example, step S126 of FIG. 28) of updating a link relationship between each node of the output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the sub output data of the channel corresponding to the output time series pattern storage network, from among the nodes of the output time series pattern storage network.

A computer program of one embodiment of the present invention includes the same process steps as the above-described learning method.

A learning apparatus of one embodiment of the present invention (for example, the learning section 212 of FIG. 21) learns time series data in a link model including one input time series pattern storage network and a plurality of output time series pattern storage networks with nodes of the one input time series pattern storage network linked to nodes of the output time series pattern storage networks, the one input time series pattern storage network including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data. The learning apparatus includes a learning unit (for example, the learning processor 221 of FIG. 21) for updating in a self-organizing manner the one input time series pattern storage network based on the input data, and updating in a self-organizing manner each of the plurality of output time series pattern storage networks based on sub output data of a channel corresponding to the output time series pattern storage network, the output data containing sub output data of channels of the same number as the number of output time series pattern storage networks, and a link relationship updating unit (for example, the link weight updating unit 222 of FIG. 21) for updating a link relationship between each node of the output time series pattern storage network and a node, as an input winner node, most appropriately matching the input data, from among the nodes of the one input time series pattern storage network, and updating a link relationship between each node of the one input time series pattern storage network and a node, as an output winner node, most appropriately matching the sub output data of the channel corresponding to the output time series pattern storage network, from among the nodes of the output time series pattern storage network.

A learning method of one embodiment of the present invention learns time series data in a link model including one input time series pattern storage network and a plurality of output time series pattern storage networks with nodes of the one input time series pattern storage network linked to nodes of the output time series pattern storage networks, the one input time series pattern storage network including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data. The learning method includes a learning step (for example, steps S123 and S124 of FIG. 28) of updating in a self-organizing manner the one input time series pattern storage network based on the input data, and updating in a self-organizing manner each of the plurality of output time series pattern storage networks based on sub output data of a channel corresponding to the output time series pattern storage network, the output data containing sub output data of channels of the same number as the number of output time series pattern storage networks, and a link relationship updating step (for example, step S126 of FIG. 28) of updating a link relationship between each node of the output time series pattern storage network and a node, as an input winner node, most appropriately matching the input data, from among the nodes of the one input time series pattern storage network, and updating a link relationship between each node of the one input time series pattern storage network and a node, as an output winner node, most appropriately matching the sub output data of the channel corresponding to the output time series pattern storage network, from among the nodes of the output time series pattern storage network.

A computer program of one embodiment of the present invention includes the same process steps as the above-mentioned learning method.

A learning apparatus (for example, the learning section 212 of FIG. 21) of one embodiment of the present invention learns time series data in a link model including a plurality of input time series pattern storage networks and one output time series pattern storage network with nodes of the plurality of input time series pattern storage networks linked to nodes of the one output time series pattern storage network, each of the plurality of input time series pattern storage networks including a plurality of nodes, each node having a time series pattern model representing a time series pattern of time series data as input data input to a predetermined object to be controlled, and the one output time series pattern storage network including a plurality of nodes, each node having a time series pattern model representing a time series pattern of time series data as output data output by the predetermined object in response to the input data. The learning apparatus includes a learning unit (for example, the learning processor 221 of FIG. 21) for updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner the one output time series pattern storage network based on the output data, and a link relationship updating unit (for example, the link weight updating unit

Figure 21:
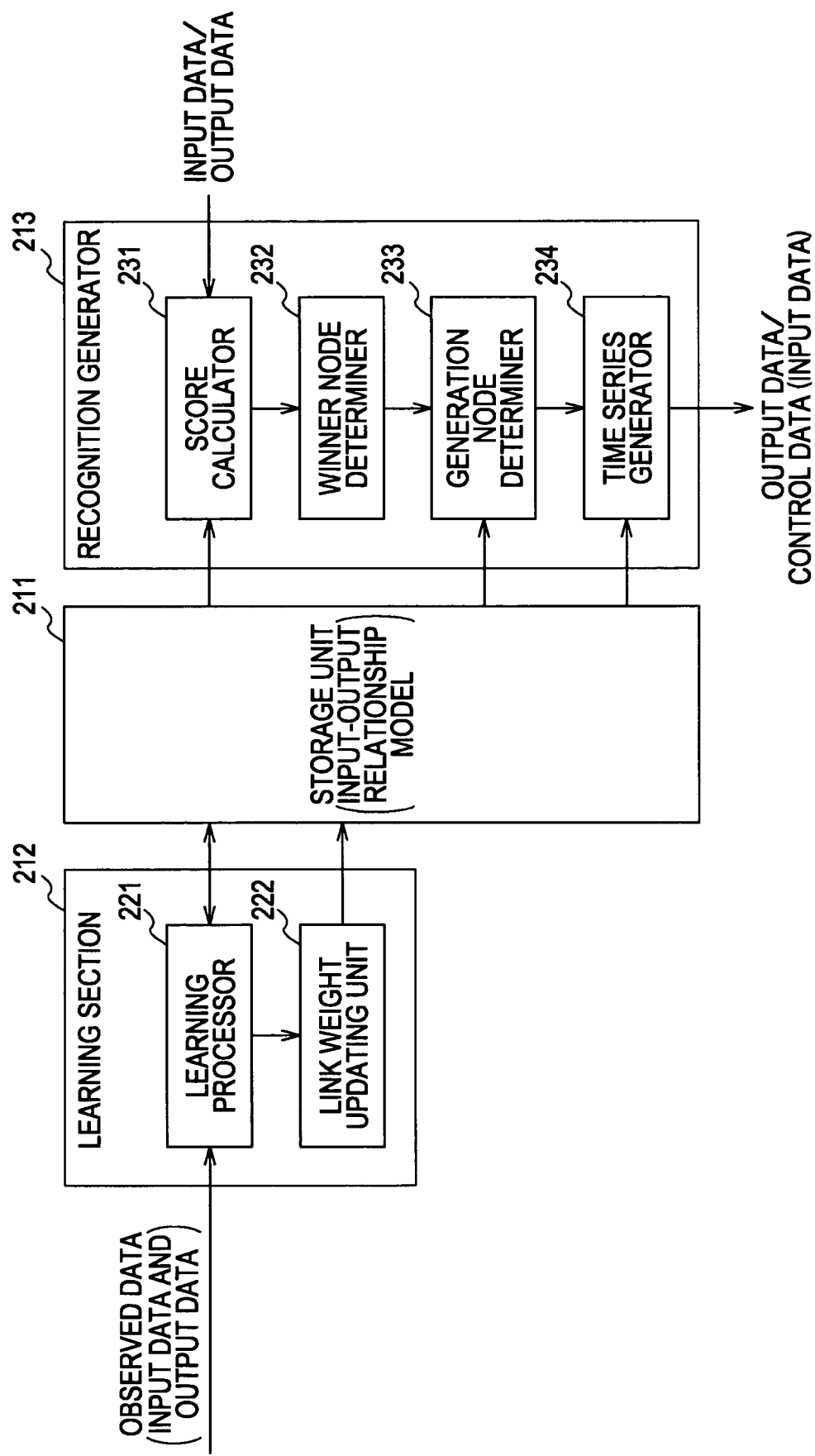
FIG. 21 is a block diagram illustrating a data processing apparatus performing a process using the input-output relationship model.

222 of FIG. 21) for updating a link relationship between each node of the one output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the output data, from among the nodes of the one output time series pattern storage network.

A learning method of one embodiment of the present invention learns time series data in a link model including a plurality of input time series pattern storage networks and one output time series pattern storage network with nodes of the input time series pattern storage networks linked to nodes of the one output time series pattern storage network, each of the plurality of input time series pattern storage networks including a plurality of nodes, each node having a time series pattern model representing a time series pattern of time series data as input data input to a predetermined object to be controlled, and the one output time series pattern storage network including a plurality of nodes, each node having a time series pattern model representing a time series pattern of time series data as output data output by the predetermined object in response to the input data. The learning method includes a learning step (for example, steps S123 and S124 of FIG. 28) of updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner the one output time series pattern storage network based on the output data, and a link relationship updating step (for example, step S126 of FIG. 28) of updating a link relationship between each node of the one output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the output data, from among the nodes of the one output time series pattern storage network.

A computer program of one embodiment of the present invention includes the same process steps as the above-mentioned learning method.

A generation apparatus of one embodiment of the present invention (for example, a recognition generator 213 of FIG. 21) generates, in response to time series data, another time series data in a link model including a plurality of first time series pattern storage networks and a plurality of second time series pattern storage networks with nodes of the first time series pattern storage networks linked to nodes of the second time series pattern storage networks, each of the plurality of first time series pattern storage networks including a plurality of nodes, each node having a time series pattern model representing a time series pattern of the time series data, and each of the plurality of second time series pattern storage networks including a plurality of nodes, each node having a time series pattern model representing a time series pattern of the other time series data. The generation apparatus includes a winner node determining unit (for example, a winner node determiner 232 of FIG. 21) for determining, for each of the first time series pattern storage networks, a node, as a winner node, most appropriately matching sub time series data of a channel corresponding to the first time series pattern storage network, the time series data containing the sub time series data of channels of the same number as the number of the first time series pattern storage networks, a generation node determining unit (for example, a generation node determiner 233 of FIG. 21) for determining, as a generation node for generating the other time series data, a node most heavily linked to the winner node, from among the nodes of the second time series pattern storage network, and a generating unit (for example, a time series generator 234 of FIG. 21) for generating the other time series data based on the time series pattern model of the generation node.

A generation method of one embodiment of the present invention generates, in response to time series data, another time series data in a link model including a plurality of first time series pattern storage networks and a plurality of second time series pattern storage networks with nodes of the first time series pattern storage networks linked to nodes of the second time series pattern storage networks, each of the plurality of first time series pattern storage networks including a plurality of nodes, each node having a time series pattern model representing a time series pattern of the time series data, and each of the plurality of second time series pattern storage networks including a plurality of nodes, each node having a time series pattern model representing a time series pattern of the other time series data. The generation method includes a winner node determining step (for example, step S134 of FIG. 29) of determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks, a generation node determining step (for example, step S136 of FIG. 29) of determining, as a generation node for generating the other time series data, a node most heavily linked to the winner node, from among the nodes of the second time series pattern storage network, and a generating step (for example, step S137 of FIG. 29) of generating the other time series data based on the time series pattern model of the generation node.

A computer program of one embodiment of the present invention includes the same process steps as the above-mentioned generation method.

A generation apparatus (for example, the recognition generator 213 of FIG. 21) of one embodiment of the present invention generates, in response to time series data, another time series data in a link model including one first time series pattern storage network and a plurality of second time series pattern storage networks with nodes of the one first time series pattern storage network linked to nodes of the second time series pattern storage networks, the one first time series pattern storage network including a plurality of nodes, each node having a time series pattern model representing a time series pattern of the time series data, and each of the plurality of second time series pattern storage networks including a plurality of nodes, each node having a time series pattern model representing a time series pattern of the other time series data. The generation apparatus includes a winner node determining unit (for example, the winner node determiner 232 of FIG. 12) for determining, for the one first time series pattern storage network, a node, as a winner node, most appropriately matching the time series data, a generation node determining unit (for example, the generation node determiner 233 of FIG. 21) for determining, as a generation node for generating the other time series data, a node most heavily linked to the winner node, from among the nodes of the second time series pattern storage network, and a generating unit (for example, the time series generator 234 of FIG. 21) for generating the other time series data based on the time series pattern model of the generation node.

A generation method of one embodiment of the present invention generates, in response to time series data, another time series data in a link model including one first time series pattern storage network and a plurality of second time series pattern storage networks with nodes of the one first time series pattern storage network linked to nodes of the second time series pattern storage networks, the one first time series pattern storage network including a plurality of nodes, each node having a time series pattern model representing a time series pattern of the time series data, and each of the plurality of second time series pattern storage networks including a plurality of nodes, each node having a time series pattern model representing a time series pattern of the other time series data. The generation method includes a winner node determining step (for example, step S134 of FIG. 29) of determining, for the one first time series pattern storage network, a node, as a winner node, most appropriately matching the time series data, a generation node determining step (for example, step S136 of FIG. 29) of determining, as a generation node for generating the other time series data, a node most heavily linked to the winner node, from among the nodes of the second time series pattern storage network, and a generating step (for example, step S137 of FIG. 29) of generating the other time series data based on the time series pattern model of the generation node.

A computer program of one embodiment of the present invention includes the same process steps as the above-mentioned generation method.

A generation apparatus (for example, the recognition generator 213 of FIG. 21) of one embodiment of the present invention generates, in response to time series data, another time series data in a link model including a plurality of first time series pattern storage networks and one second time series pattern storage network with nodes of the first time series pattern storage networks linked to nodes of the one second time series pattern storage network, each of the plurality of first time series pattern storage networks including a plurality of nodes, each node having a time series pattern model representing a time series pattern of the time series data, and the one second time series pattern storage network including a plurality of nodes, each node having a time series pattern model representing a time series pattern of the other time series data. The generation apparatus includes a winner node determining unit (for example, the winner node determiner 232 of FIG. 21) for determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks, a generation node determining unit (for example, the generation node determiner 233 of FIG. 21) for determining, as a generation node for generating the other time series data, a node most heavily linked to the winner node, from among the nodes of the second time series pattern storage network, and a generating unit (for example, the time series generator 234 of FIG. 21) for generating the other time series data based on the time series pattern model of the generation node.

A generation method of one embodiment of the present invention generates, in response to time series data, another time series data in a link model including a plurality of first time series pattern storage networks and one second time series pattern storage network with nodes of the first time series pattern storage networks linked to nodes of the one second time series pattern storage network, each of the plurality of first time series pattern storage networks including a plurality of nodes, each node having a time series pattern model representing a time series pattern of the time series data, and the one second time series pattern storage network including a plurality of nodes, each node having a time series pattern model representing a time series pattern of the other time series data. The generation method includes a winner node determining step (for example, step S134 of FIG. 29) of determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks, a generation node determining step (for example, step S136 of FIG. 29) of determining, as a generation node for generating the other time series data, a node most heavily linked to the winner node, from among the nodes of the second time series pattern storage network, and a generating step (for example, step S137 of FIG. 29) of generating the other time series data based on the time series pattern model of the generation node.

A computer program of one embodiment of the present invention includes the same steps as the generation method as described above.

The time series pattern storage network is described first in the description of the embodiments of the present invention.

Figure 6:
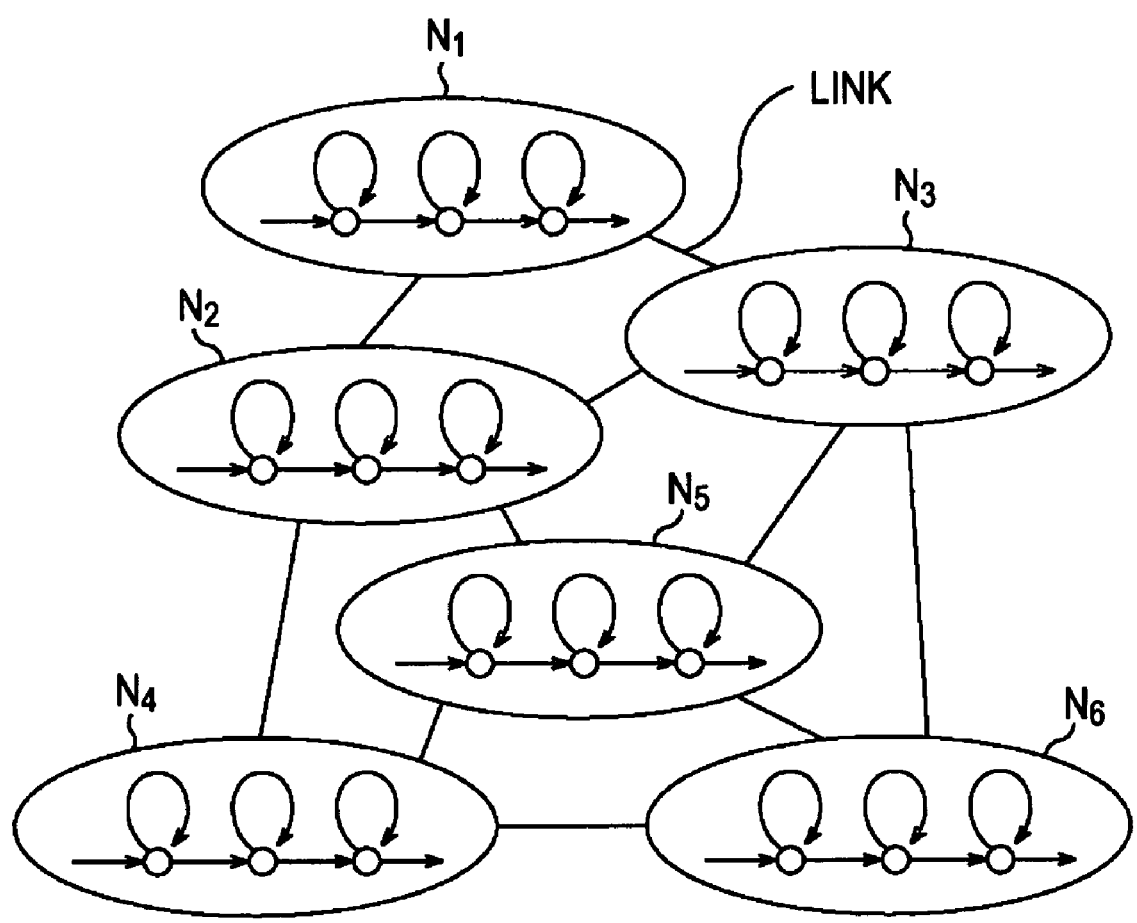
FIG. 6 illustrates a first configuration of a time series pattern storage network.

FIG. 6 diagrammatically illustrates the time series pattern storage network.

The time series pattern storage network is composed of a plurality of nodes, each node holding a time series pattern model representing a time series pattern of the time series data. The whole network stores the time series patterns (for classification) of the number equal to the number of nodes.

As shown in FIG. 6, the time series pattern storage network includes six nodes $N_1$ through $N_6$.

Node $N_i$ (i=1, 2, . . . , 6 in FIG. 6) forming the time series pattern storage network holds a time sequence pattern model representing a time series pattern of the time series data. Node $N_i$ has a link relation with another node $N_j$ (j=1, 2, . . . , 6 in FIG. 6). The link relation is also referred to as a link. As shown in FIG. 6, for example, node $N_3$ has a direct connection with each of nodes $N_1$, $N_2$, $N_5$, and $N_6$. Each of nodes $N_5$ and $N_6$ has an indirect link relation with node $N_1$ via node $N_3$. The link relation between two nodes $N_i$ and $N_j$ means the shortest link relation between the two nodes $N_i$ and $N_j$.

The learning of the time series pattern storage network (learning for causing the time series pattern storage network to store a time series pattern) is performed with time series data used as learning data. The type of category and the number of categories of the learning data are not known. The time series pattern storage network is substantially different from supervised learning discussed with reference to FIG. 5. The learning data for use in learning the time series pattern storage network has no correct-answer label attached thereto. For this reason, the supervised learning discussed with reference to FIG. 5 cannot apply to the learning of the time series pattern storage network.

The supervised learning cannot apply to the learning of the time series pattern storage network and the type of each category and the number of categories of the learning data are unknown. The time series pattern storage network is learned in a self-organizing manner so that the feature (time series pattern) of the learning data is appropriately represented by the nodes of the time series pattern storage network.

The learning of the time series pattern storage network is of the type of unsupervised learning. In the learning of the time series pattern storage network, any given single node does not necessarily correspond to one category. More specifically, learning may be performed in the time series pattern storage network with one node corresponding to one category, or with one node corresponding to a plurality of categories. Even if the learning data is not clearly categorized, learning is performed using the time series pattern storage network.

Figure 7:
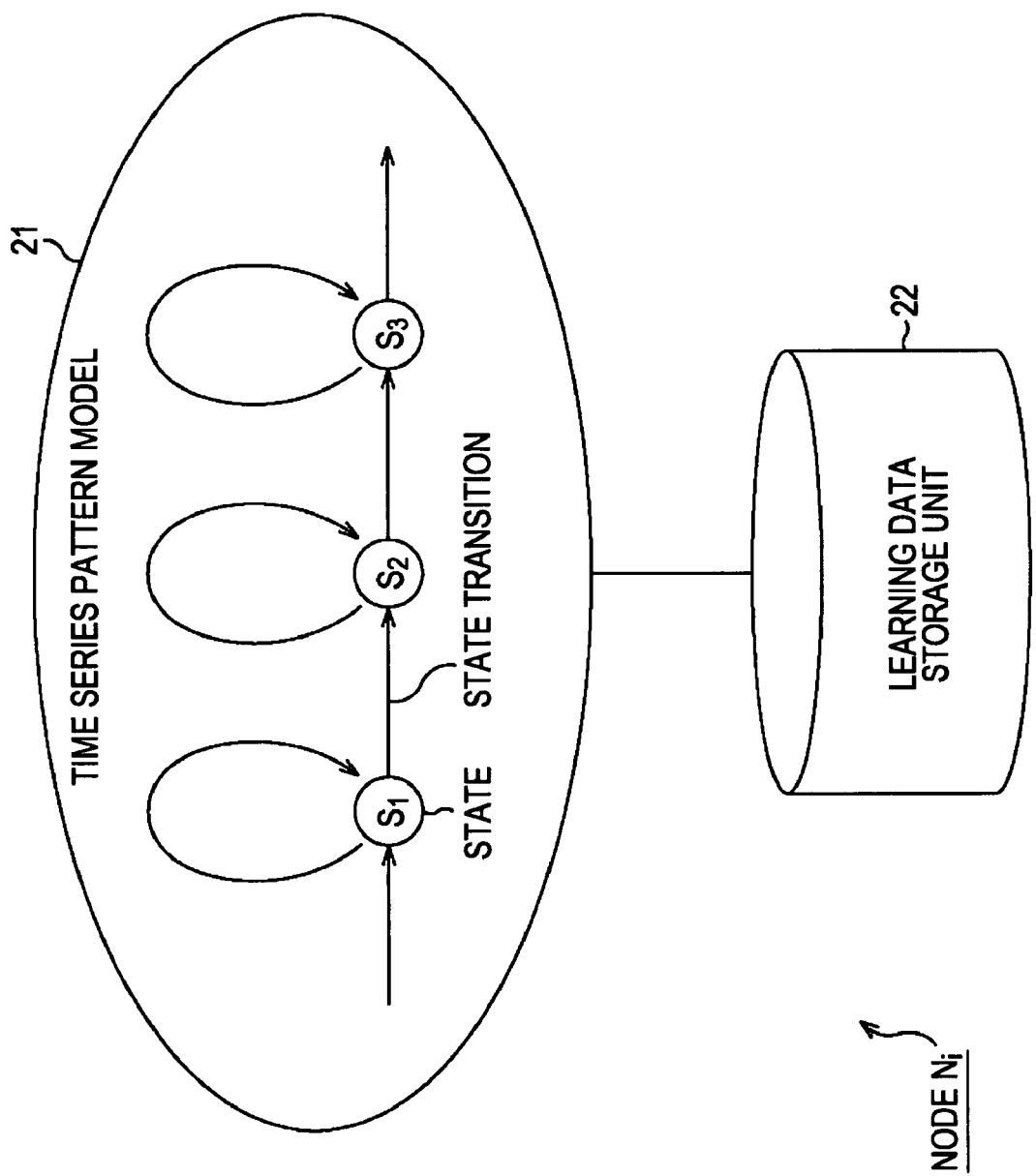
FIG. 7 illustrates the structure of nodes.

FIG. 7 illustrates the structure of a node $N_i$ of the time series pattern storage network.

The node $N_i$ is composed of a time series pattern model 21 representing a time series pattern of the time series data and a learning data storage unit 22 storing the learning data for use in the learning of the time series pattern model 21.

As shown in FIG. 7, HMM (continuous HMM) as a state probability transition model is employed for the time series pattern model 21. As shown in FIG. 7, HMM includes three left-to-right states $S_1$, $S_2$, and $S_3$, each having own loop and a state transition to a next state (right adjacent state). Each circle enclosing each of $S_1$ through $S_3$ in the time series pattern model 21 of FIG. 7 represents a state, and each arrow-headed line or loop represents a state transition. HMM as the time series pattern model 21 is not limited to one of left-to-right type and three-state type.

If the time series pattern model 21 is HMM of FIG. 7, the HMM as the time series pattern model 21 is defined by state transition probability and output probability density function (in the case of discrete HMM, a probability that a discrete symbol as a scalar quantity is output).

The state transition probability of HMM is a probability of state transition and is provided to each state transition indicated by an arrow-headed line as shown in FIG. 7. The output probability density function represents a probability density of a value observed from HMM. A normal-distribution mixture is usually used for the output probability density function. The parameters of HMM (the state transition probability and the output probability density function) are learned (inferred) using Baum-Welch technique.

In the node $N_i$, statistic characteristics of the learning data stored in the learning data storage unit 22, namely, the time series pattern of the learning data stored in the learning data storage unit 22, is learned in the time series pattern model 21, and the time series pattern model 21 is thus associated with the learning data stored in the learning data storage unit 22.

The learning of the time series pattern storage network, namely, the learning of the time series pattern model 21 in the node $N_i$ is performed in online learning. The online learning is performed each time the time series data (of one period) is supplied from the feature extractor 2 to the learning section 4. The parameters of the time series pattern storage network, namely, the parameters of the time series pattern model 21 of the node $N_i$ (the state transition probability and the output probability density function as described above if the time series pattern model 21 is HMM) are updated bit by bit each time the data (of one period) to be processed is supplied to the time series pattern storage network.

As will be discussed later, as the learning of the time series pattern storage network is progressed, the learning data stored on the learning data storage unit 22 is updated with the time series data supplied to the time series pattern storage network, and thus changes bit by bit. The learning of the time series pattern model 21 is performed based on the learning data changing bit by bit, and parameters of the time series pattern model 21 are also changing accordingly.

Figure 8:
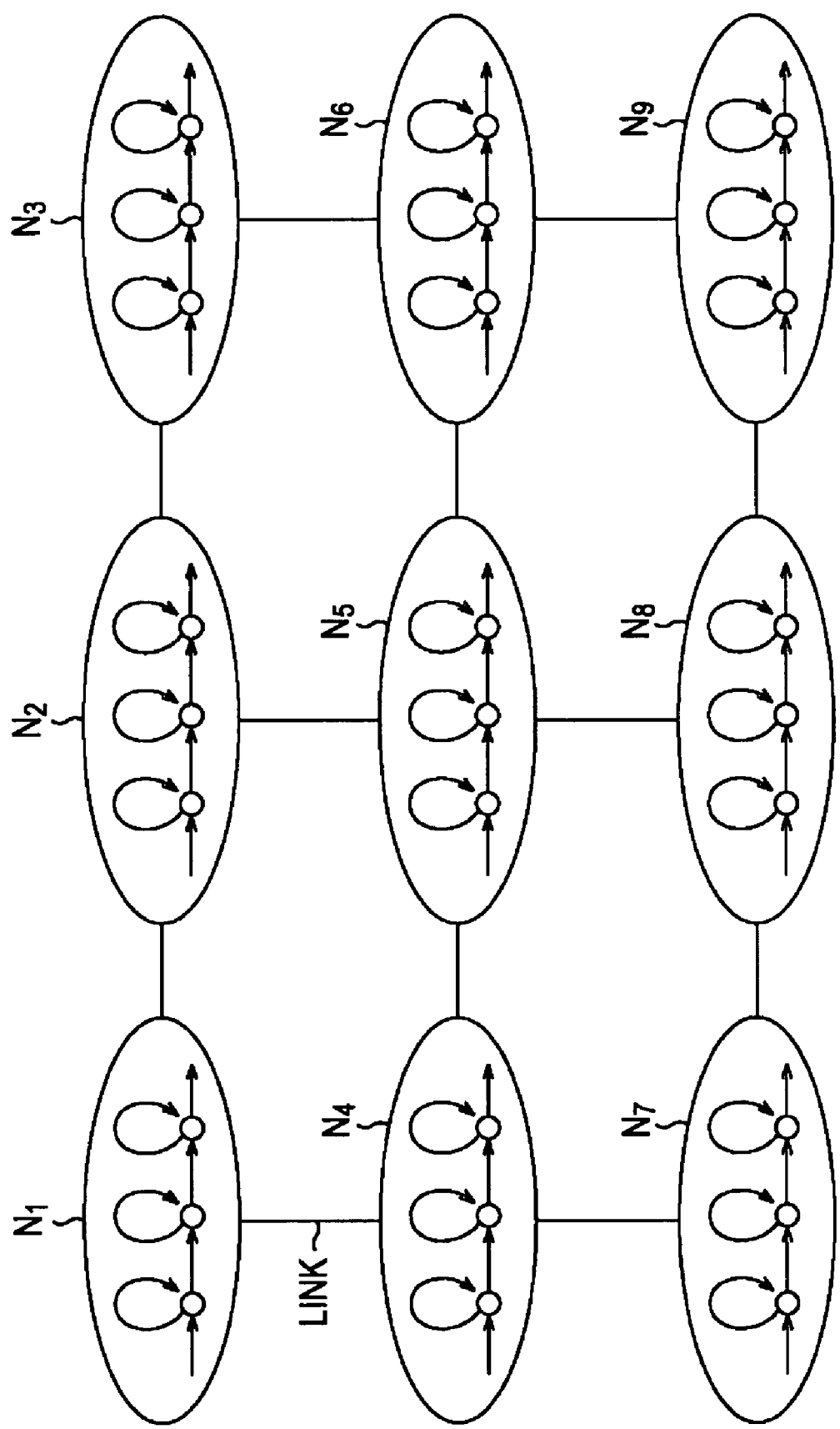
FIG. 8 illustrates a second configuration of the time series pattern storage network.

FIG. 8 diagrammatically illustrates another time series pattern storage network.

The time series pattern storage network of FIG. 8 is composed of nine nodes $N_1$ through $N_9$, which are two-dimensionally arranged. More specifically, the nine nodes $N_1$ through $N_9$ are arranged in a matrix of three rows and three columns in a two-dimensional plane.

As shown in FIG. 8, nodes mutually adjacent to each other in row and nodes mutually adjacent to each other in column, out of two-dimensionally arranged nine nodes $N_1$ through $N_9$, are linked (in link relation). By linking, the nodes forming the time series pattern storage network are considered as having a two-dimensionally arrangement structure in space.

The distance between any two nodes present in a given space is defined based on the spatial node arrangement structure provided by the link in the time series pattern storage network. The distance between the two nodes is used as an inter-pattern distance of the time series patterns (similarity between time series patterns) represented by the time series pattern model 21 of each of the two nodes.

The inter-pattern distance of the time series patterns represented by the distance between the two nodes is thus based on a link relation (link) of the two nodes.

The number of links forming the shortest path between the two nodes can be used for the distance of the two nodes. A node having a direct link to a node of interest (a node vertically or horizontally adjacent to the node of interest in FIG. 8) has the closet distance to the node of interest. As for a node traced beyond the node having the direct link to the node of interest, the more the number of links along the path to that node, the farther the distance to the node of interest becomes.

The link given to the node is not limited to the ones shown in FIGS. 6 and 8. The links of FIGS. 6 and 8 provide a two-dimensional arrangement structure to the node. Link can provide a one-dimensional arrangement structure or a three-dimensional arrangement structure. Link is not necessarily provided to the node.

Figure 9:
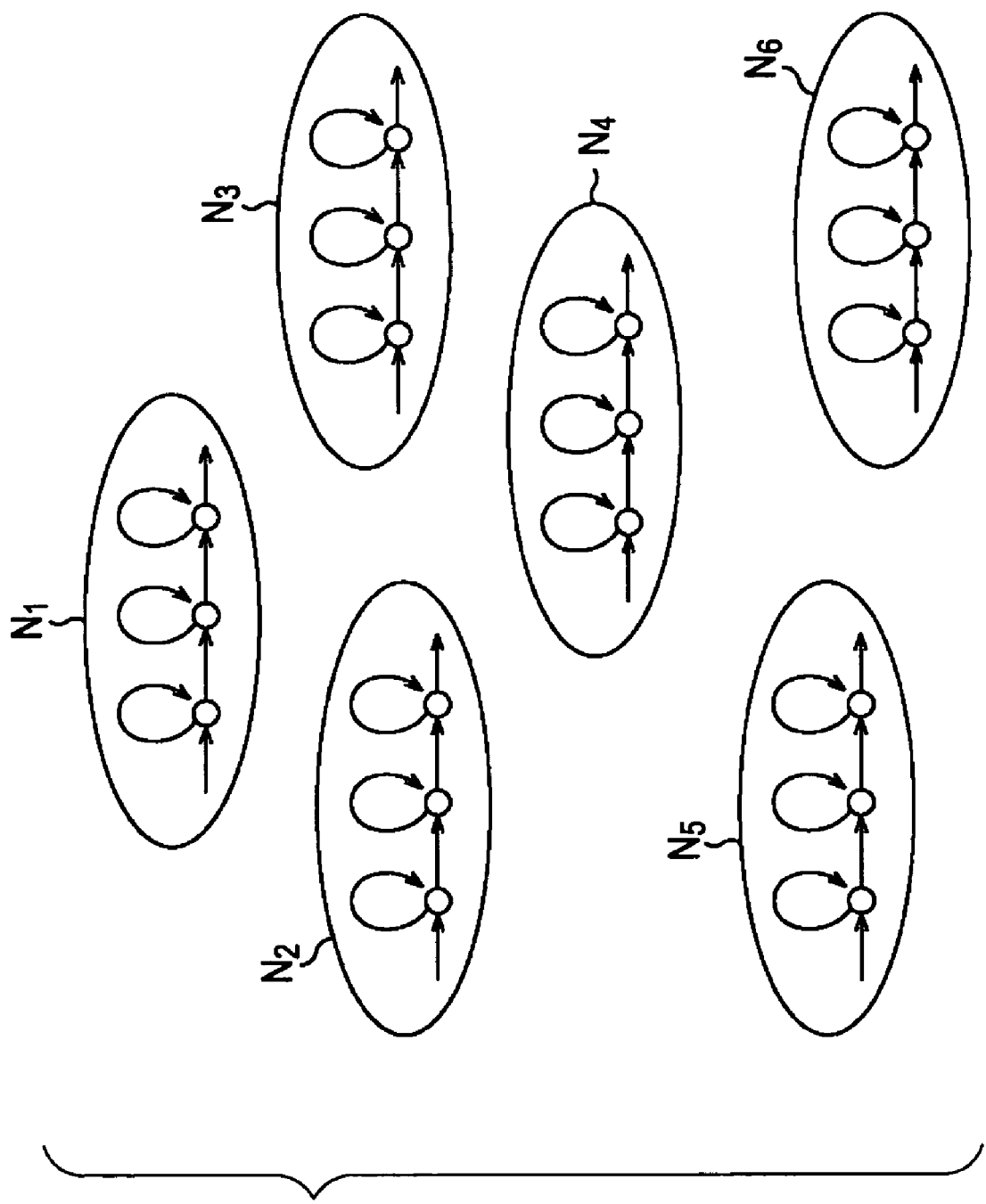
FIG. 9 illustrates a third configuration of the time series pattern storage network.

FIG. 9 illustrates another time series pattern storage network.

As shown in FIG. 9, the time series pattern storage network is composed of six nodes $N_1$ through $N_6$ in the same way as in FIG. 6, but none of the six nodes $N_1$ through $N_6$ has link. The six nodes $N_1$ through $N_6$ forming the time series pattern storage network of FIG. 9 has no spatial arrangement structure given by link. The nodes having no spatial arrangement structure are considered as being free from any spatial restrictions associated with arrangement structure.

If any two nodes have no link, no distance in space between the two nodes can be defined. The inter-pattern distance based on the link relation (link) cannot be used as the inter-pattern distance of the time series patterns represented by the time series pattern model 21 of each of the two nodes. In that case, an order based on the degree of match of a node to the observed value of the time series data (hereinafter referred to as match order as appropriate) is used as the inter-pattern distance.

If the time series data is given, the similarity of a time series pattern expressed by a node with that time series data can be determined as the degree of match of the node. The node most appropriately matching given time series data, from among nodes forming the time series pattern storage network, is handled as a winner node. A value of the match order of any node can be used as the inter-pattern distance of the time series pattern, represented by the node in the time series pattern storage network, with respect to the winner node.

More specifically, the match order of a node, as a winner node, from among the nodes forming the time series pattern storage network is first. The inter-pattern distance of the time series patterns between the node (namely the winner node) and the winner node is determined by subtracting 1 from the match order, becoming zero.

The inter-pattern distance between the winner node and a second node in the match order, from among the nodes forming the time series pattern storage network, is determined by subtracting 1 from the match order, thereby becoming 1. Similarly, the value that is obtained by subtracting 1 from the match order of the node is considered as the inter-pattern distance between the winner node and another node.

The inter-pattern distance represented by the value corresponding to the match order determined based on the degree of match of the node to the given time series data is thus considered as an inter-pattern distance.

Figure 2B:

FIG. 2 illustrates a data processing apparatus performing a variety of processes using the time series pattern storage network.

A signal input section 1 receives data to be learned in a learning process and recognized in a recognition process (the data hereinafter is also referred to as data to be processed). The data to be processed includes a sound, an image, luminance of a light emitting diode (LED), and an observed value of an angle of rotation or an angular velocity of a motor (i.e., a signal observed from the outside world). The data to be processed may also include data output from an input device of a system incorporating the data processing apparatus of FIG. 10 (i.e., input data), and data provided to an output device of the system (i.e., output data).

Figure 10:
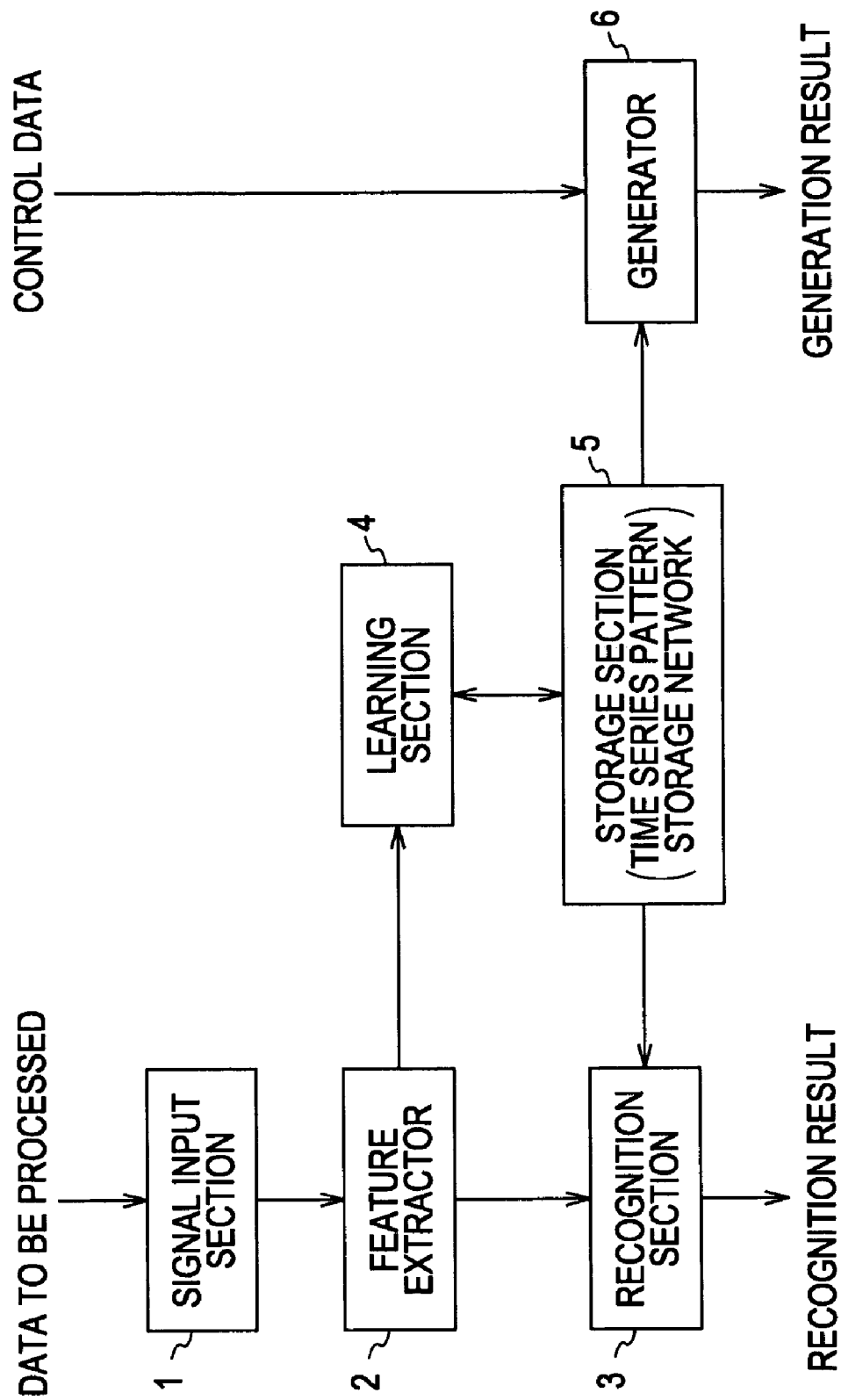
FIG. 10 is a block diagram illustrating the structure of a data processing apparatus performing a process using the time series pattern storage network.

The data processing apparatus of FIG. 10 can be incorporated in robots including biped robots. If a biped robot performs a process in response to a change in an environmental situation, the signal input section 1 may include a sensor for sensing a change in the environmental situation. More specifically, the signal input section 1 may include a microphone and a camera.

If the signal input section 1 is composed of a microphone, the biped robot (a system incorporating the data processing apparatus) receives sounds generated in the outside (including all sounds such human voices, sounds of crying of animals, and other naturally generated sounds), and audio data corresponding to the input sounds is supplied to a feature extractor 2. If the signal input section 1 is composed of a camera, the camera receives light entering from the outside world, as the input data to the biped robot, and video data corresponding to the input light is supplied to the feature extractor 2.

If the biped robot has four limbs that can be manipulated by a motor of an actuator, the signal input section 1 may include a measuring device measuring the angle of rotation or a rotational speed of the motor (a sensor sensing the angle of rotation or the rotational speed). The motor driving the limbs of the biped robot rotates in response to not only a drive signal as an electrical signal but also an external force applied to the four limbs. The measuring device can measure any of the angle of rotation and the rotation speed caused in response to any of the input signals applied to the biped robot.

If the signal input section 1 includes the measuring device, a signal representing one of the angle of rotation and the rotational speed of the motor is input to and measured by the measuring device, and the measuring result is supplied to the feature extractor 2.

The data input to the signal input section 1 can be steady-state data invariable with time (steady-state signal) or nonsteady-state data variable with time (nonsteady-state signal).

It is assumed in the following discussion that the signal input section 1 receives a sound as one of time series data, and that voice data of a voiced sound period is supplied from the signal input section 1 to the feature extractor 2. The detection method of the voice sound period is not limited to any particular one. It is not a requirement that the voice data supplied from the signal input section 1 to the feature extractor 2 have the length of the voiced sound period. The voice data can be delimited by a proper length. More specifically, the voice data supplied from the signal input section 1 to the feature extractor 2 can have the length of a phoneme unit, a phonological unit, a word, a sentence, or the length of one punctuation mark to the next punctuation mark.

The data supplied from the signal input section 1 to the feature extractor 2 is not limited to voice data, and the audio period is not limited to any particular one. More specifically, the data to be supplied from the signal input section 1 to the feature extractor 2 may be delimited by a proper length using any appropriate method. The audio period of the data supplied from the signal input section 1 to the feature extractor 2 may or may not be invariable in length.

The feature extractor 2 extracts a feature from the voice data as time series data from the signal input section 1, and supplies the feature of the time series data obtained as a result to each of a recognition section 3 and a learning section 4. The feature extractor 2 performs a frequency analysis process on the voice data from the signal input section 1 at constant time intervals, thereby extracting a feature such as a Mel frequency cepstrum coefficient (MFCC). The feature extractor 2 then supplies time series data of MFCC to each of the recognition section 3 and the learning section 4. The time series data supplied from the feature extractor 2 to each of the recognition section 3 and the learning section 4 is a value that has been observed from the outside world.

The recognition section 3 recognizes the time series data supplied from the feature extractor 2 based on a time series pattern storage network, to be discussed later, stored in the storage section 5, and outputs the recognition result.

The learning section 4 updates, in a self-organizing manner, the time series pattern storage network stored in a storage section 5 in accordance with (the observed value of) the time series data supplied from the feature extractor 2. The learning section 4 updates a parameter of the time series pattern storage network stored in the storage section 5 in accordance with the time series data supplied from the feature extractor 2. Occasionally, the updating of the parameter is also referred to as learning.

When repeatedly supplied with time series data having no correct-answer label attached thereto, the learning section 4 executes unsupervised learning to acquire, in a self-organizing manner, a pattern unique to the time series data (a time series pattern). The storage section 5 thus stores efficiently a typical time series pattern in the time series pattern storage network. More specifically, the time series data supplied from the feature extractor 2 to each of the recognition section 3 and the learning section 4 is classified into several time series patterns, and the learning section 4 performs a learning process to store a typical time series pattern of the time series data in the time series pattern storage network.

The storage section 5 stores the time series pattern storage network, and the parameters of the time series pattern storage network are updated by the learning section 4 as appropriate.

The generator 6 is supplied with control data. The control data supplied to the generator 6 represents any of time series patterns (node label to be discussed later) stored in the time series pattern storage network in the storage section 5. In accordance with the time series pattern storage network of the storage section 5, the generator 6 generates and outputs time series data of a time series pattern represented by the control data.

Figure 11:
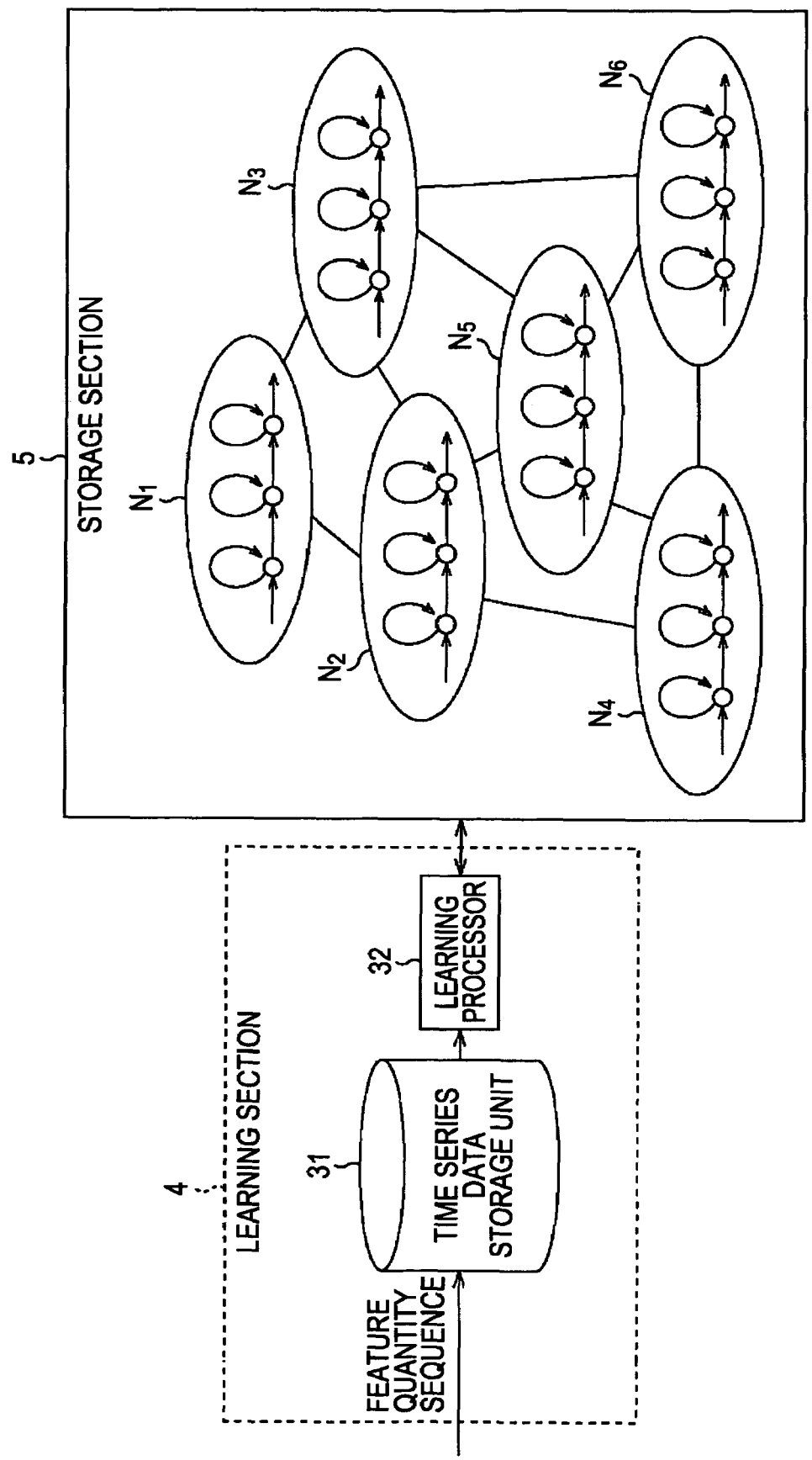
FIG. 11 is a block diagram illustrating a learning section.

FIG. 11 illustrates the structure of the learning section 4 of FIG. 10.

The learning section 4 includes a learning data storage unit 31 and a learning processor 32.

The learning data storage unit 31 is supplied with a series of features as new time series data of one period by the feature extractor 2. The learning data storage unit 31 temporarily stores the new time series data supplied from the feature extractor 2 (until a process of the learning processor 32 based on the new time series data is completed).

The learning processor 32 updates, in a self-organizing manner, the time series pattern storage network stored in the storage section 5 in accordance with the observed value of the new time series data stored in the learning data storage unit 31.

Figure 12:
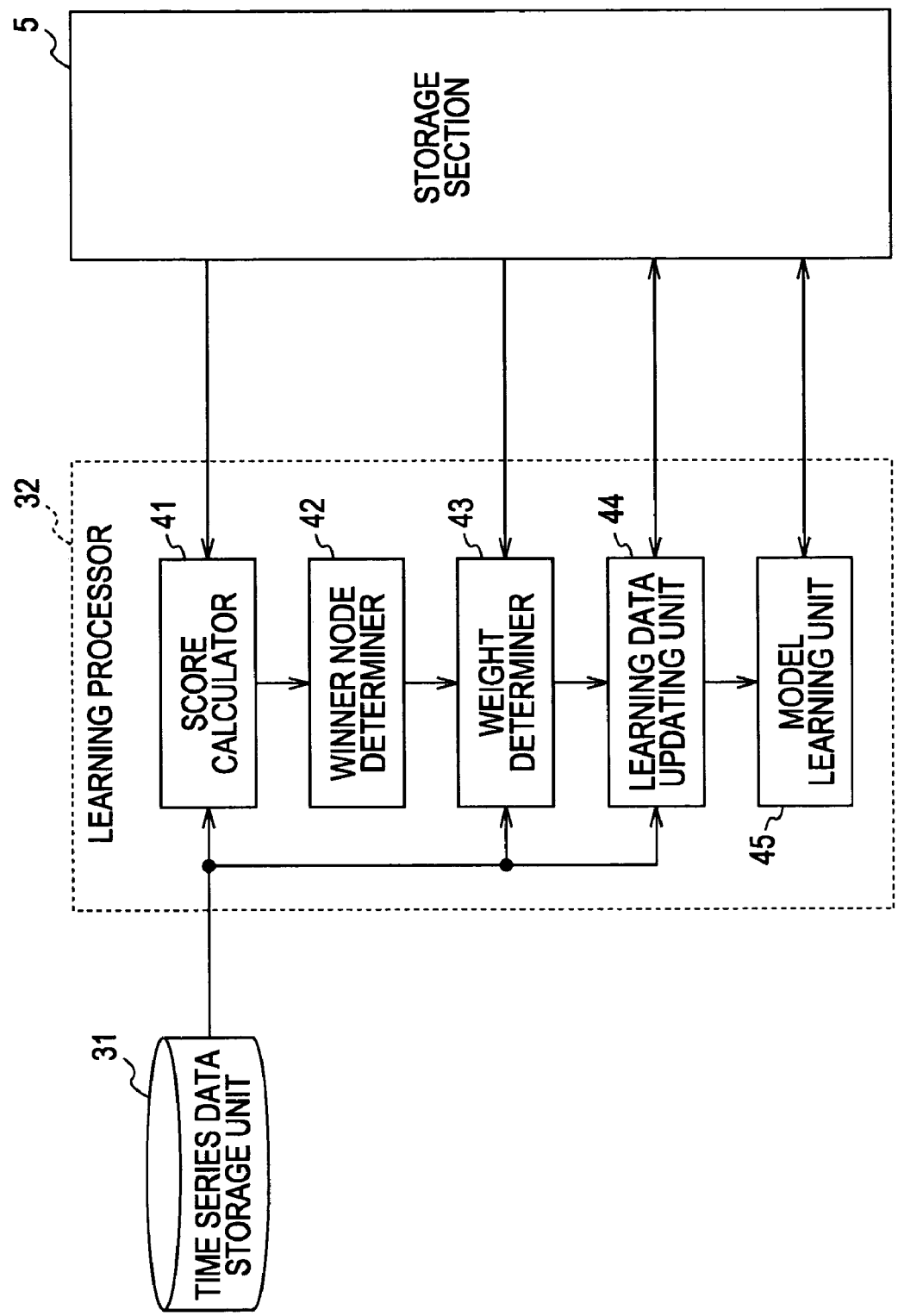
FIG. 12 is a block diagram illustrating a learning processor.

FIG. 12 illustrates the structure of the learning processor 32 of FIG. 11.

A score calculator 41 determines, as a score, the degree of match of each of the nodes forming the time series pattern storage network stored in the storage section 5, the degree of match indicating how well the node matches the observed value of the time series data stored in the learning data storage unit 31, and supplies a winner node determiner 42 with the resulting score. If the time series pattern model 21 of the node is HMM of FIG. 7, the score calculator 41 determines the likelihood of observation of the time series data stored in the learning data storage unit 31, from the HMM as the learning data storage unit 31 of the node, and supplies the winner node determiner 42 with the resulting likelihood as the score of the node.

The winner node determiner 42 determines the node most appropriately matching the time series data stored in the learning data storage unit 31 in the time series pattern storage network stored in the storage section 5, and determines that node as a winner node.

More specifically, the winner node determiner 42 determines, as a winner node, the node having the highest score from the score calculator 41, from among the nodes forming the time series pattern storage network stored in the storage section 5. The winner node determiner 42 supplies a weight determiner 43 with information representing the winner node.

Each node forming the time series pattern storage network is tagged with a node label identifying the node. The node label is thus used as information identifying the winner node and the other nodes. The node label identifies each node itself, and is unrelated to a correct-answer label identifying which is correct.

The weight determiner 43 determines an updating weight of each of the nodes forming the time series pattern storage network stored in the storage section 5, based on the winner node identified by the node label supplied by the winner node determiner 42, and supplies a learning data updating unit 44 with the updating weight.

More specifically, the weight determiner 43 determines the updating weights of the nodes (including the winner node) forming the time series pattern storage network stored in the storage section 5, based on the node and the node's inter-pattern distance to the winner node, and supplies the learning data updating unit 44 with the updating weights.

The time series pattern model 21 (FIG. 7) of the node is updated using the new time series data stored in the learning data storage unit 31 (FIG. 11). The updating weight of the node represents the degree of influence of the new time series data on the time series pattern model 21 when the time series pattern model 21 of the node is updated. If the updating weight of the node is zero, the time series pattern model 21 of the node is not influenced by the new time series data, in other words, is not updated.

The inter-pattern distance is used when the weight determiner 43 determines the updating weight of each node forming the time series pattern storage network stored in the storage section 5. If the nodes of the time series pattern storage network has the links as shown in FIGS. 6 and 8, the inter-pattern distance to be adopted is based on the link relation between the node and the winner node. If the nodes of the time series pattern storage network are not linked as shown in FIG. 9, the inter-pattern distance to be adopted is based on the degree of match of the node to the time series data stored in the learning data storage unit 31 (FIG. 11).

The weight determiner 43 references the time series pattern storage network stored in the storage section 5, determines the inter-pattern distance based on the link relation between each of the nodes forming the time series pattern storage network and the winner node represented by the node label from the winner node determiner 42, and then determines the updating weight of each node of the time series pattern storage network based on the inter-pattern distance.

Alternatively, the weight determiner 43 references the time series pattern storage network stored in the storage section 5, and determines the score of each of the nodes of the time series pattern storage network, like the score determined by the score calculator 41, as the degree of match of the node to the time series data stored in the learning data storage unit 31. The weight determiner 43 further determines the value corresponding to the match order based on the score of each of the nodes of the time series pattern storage network, as the inter-pattern distance based on the degree of match of the node matching new time series data. The weight determiner 43 determines the updating weight of each node of the time series pattern storage network.

The score of the node can be determined by the weight determiner 43. Alternatively, the score of the node can be transferred from the score calculator 41 to the weight determiner 43.

The learning data updating unit 44 updates the learning data stored in the learning data storage unit 22 (FIG. 7) of each node of the time series pattern storage network stored in the storage section 5.

The learning data updating unit 44 mixes the learning data already stored in the learning data storage unit 22 of each node with the time series data stored in the learning data storage unit 31 in accordance with the updating weight of the corresponding node supplied from the weight determiner 43 and causes the learning data storage unit 22 to store the mixing result as new learning data. The storage content of the learning data storage unit 22 is thus updated.

The learning data updating unit 44 updates the learning data stored in the learning data storage unit 22 (FIG. 7) in accordance with the updating weight, and notifies the model learning unit 45 of the end of updating.

Upon receiving the end notice from the learning data updating unit 44, the model learning unit 45 learns the time series pattern model 21 of each node in the storage network in the time series pattern, using the learning data stored in the learning data storage unit 22 (FIG. 4) subsequent to the updating process of the learning data updating unit 44. The model learning unit 45 thus updates the time series pattern model 21.

The model learning unit 45 performs the updating process of the time series pattern model 21 of the node based on (a portion of) the learning data stored in the learning data storage unit 22 (FIG. 7) of the node, and the new time series data stored in the learning data storage unit 31. The storage content of the learning data storage unit 22 is updated in accordance with the updating weight. The updating of the time series pattern model 21 by the model learning unit 45 is thus based on the updating weight.

Figure 13:
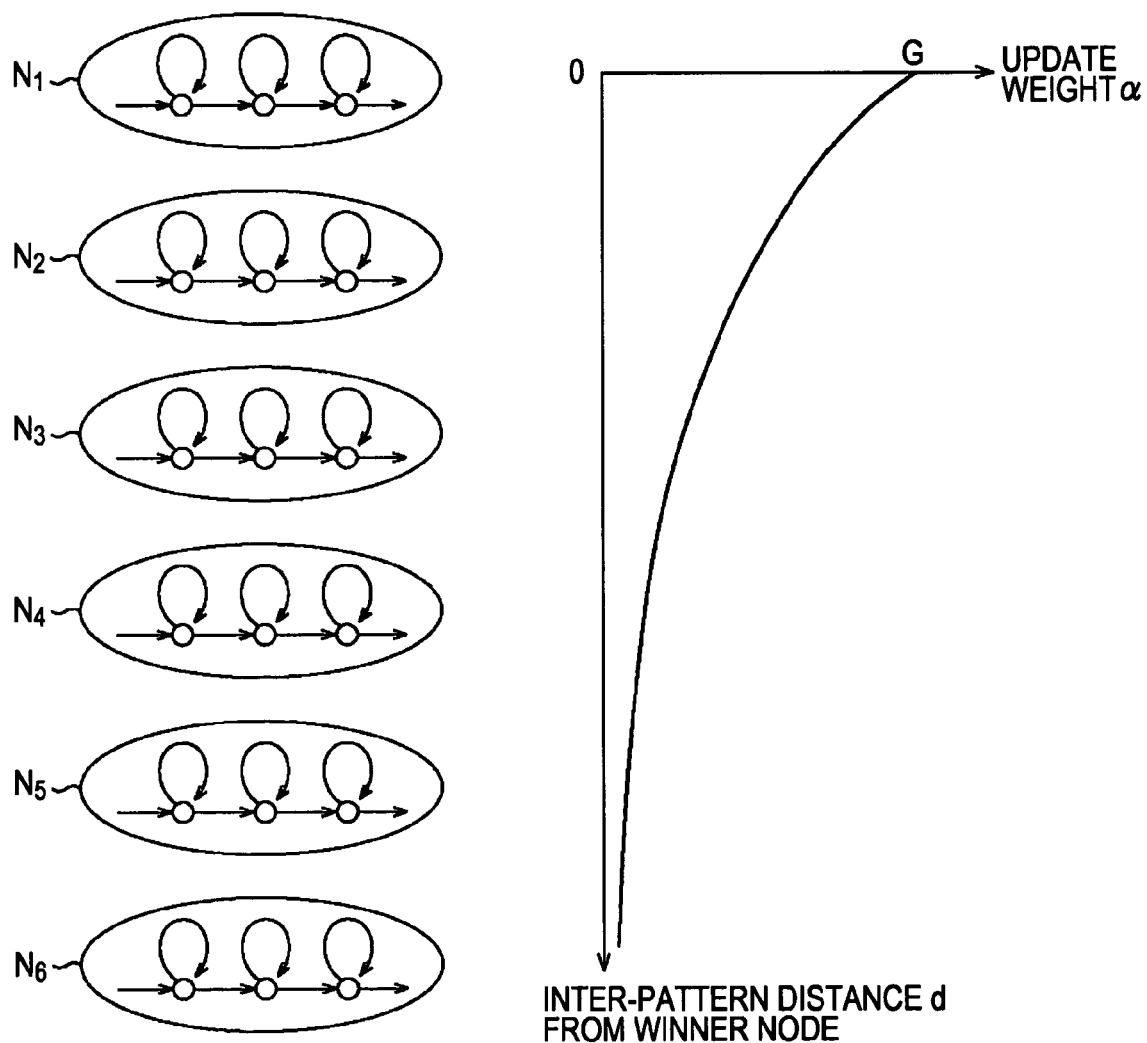
FIG. 13 illustrates a determination method of determining an update weight.

FIG. 13 illustrates a determination method performed by the weight determiner 43 of FIG. 12 in the determination of the updating weight.

The weight determiner 43 determines the updating weight of the node in accordance with a distance/weight curve of FIG. 13. The distance/weight curve represents the relationship that an updating weight .alpha. decreases as an inter-pattern distance d to the winner node increases. In accordance with the distance/weight curve, the closer the inter-pattern distance d to the winner node, the larger the updating weight .alpha. results, and the farther the inter-pattern distance d to the winner node, the smaller the updating weight .alpha. results.

In the distance/weight curve of FIG. 13, the abscissa represents the updating weight .alpha. in a direction from left to right, and the ordinate represents the inter-pattern distance d in a direction from up to down.

As shown in FIG. 13, the inter-pattern distance based on the link relation of the node, namely, the distance to the winner node is adopted as the inter-pattern distance d. Along the ordinate, the six nodes $N_1$ through $N_6$ forming the time series pattern storage network are arranged at positions corresponding to the distance of each node $N_i$ to the winner node.

The six nodes $N_1$ through $N_6$ forming the time series pattern storage network are arranged in the order of distance from near to far to the winner node as shown in FIG. 13. From among the six nodes $N_1$ through $N_6$ forming the time series pattern storage network, a node closest in distance to the winner node, namely, the node $N_1$ having distance zero to the winner node, is the winner node.

If the time series pattern storage network has a two-dimensional arrangement structure of FIG. 8, and if the winner node is the node $N_6$, the distance between the winner node and the node $N_6$ is closest, namely, zero, and the inter-pattern distance d between the node $N_6$ and the winner node $N_6$ is also zero. The distance between the winner node $N_6$ and each of the nodes $N_3$, $N_5$, and $N_9$ is second closest, namely, 1, and the inter-pattern distance d between the winner node $N_6$ and each of the nodes $N_3$, $N_5$, and $N_9$ is also 1. The distance between the winner node $N_6$ and each of nodes $N_2$, $N_4$, and $N_8$ is third closest, namely, 2, and the inter-pattern distance d of each of nodes $N_2$, $N_4$, and $N_8$ to the winner node $N_6$ is also 2. The distance between the winner node $N_6$ and each of node $N_1$ and $N_7$ is the farthest (fourth closest), namely, 3, and the inter-pattern distance d of each of node $N_1$ and $N_7$ and the winner node $N_6$ is also 3.

In the time series pattern storage network having no link as shown in FIG. 9, the inter-pattern distance based on the degree of match of the node matching the new time series data, namely, the value corresponding to the match order based on the degree of match of the node to the new time series data is determined as the inter-pattern distance d between that node and the winner node. In this case, the inter-pattern distance d between the node having the highest score (namely, the winner node) and the winner node is zero, and the inter-pattern distance d between the node having the second highest score and the winner node is 1. Similarly, the inter-pattern distance d between the node having the k-th highest score and the winner node is k-1.

The distance/weight curve of FIG. 13, representing the relationship between the updating weight .alpha. and the inter-pattern distance d, is expressed in equation (3): .alpha.=G.gamma..sup.d/.DELTA. (3) where G is a constant representing the updating weight of the winner node, .gamma. represents an attenuation coefficient falling within a range of 0<.gamma.<1, and .DELTA. is a variable for adjusting the updating weight .alpha. of a node in the vicinity of the winner node (the node having the close inter-pattern distance d to the winner node) when SMA is employed as the update method of updating the time series pattern storage network.

The inter-pattern distance d of the node as the winner node is zero, and the inter-pattern distances d of other nodes are 1, 2, . . . in accordance with the distance to the winner node or the match order. If $G=8$, $\gamma=0.5$, and $\Delta=1$ in equation (3), the updating weight $\alpha$ of the node serving as the winner node is 8 ($=G$). As the distance to the winner node or the match order increases, the updating weight $\alpha$ of the node decreases as 4, 2, 1, . . .

If the variable $\Delta$ in equation (3) is large, the rate of change of the updating weight $\alpha$ with respect the inter-pattern distance d becomes mild. Conversely, if the attenuation coefficient $\Delta$ is small, the rate of change of the updating weight $\alpha$ with respect to the inter-pattern distance d becomes sharp.

If the variable $\Delta$ is adjusted to be closer from 1 to zero bit by bit, the rate of change of the updating weight $\alpha$ with respect to the inter-pattern distance d becomes sharp, and the larger the inter-pattern distance d, the smaller the updating weight $\alpha$. If the variable $\Delta$ is close to zero, the updating weight $\alpha$ of the nodes other than the winner node becomes almost zero. In this case, the results are almost equivalent to the results provided by the WTA as the updating process of the time series pattern storage network.

If SMA is used as the updating process of updating the time series pattern storage network, the updating weight $\alpha$ of a node in the vicinity of the winner node is adjusted by adjusting the variable $\Delta$.

The variable Δ is set to be large at the time of the start of the updating (learning) of the time series pattern storage network. With time elapsing, in other words, with the number of updates increasing, the variable Δ is set to be small. When the updating of the time series pattern storage network starts, the updating weight α of each node of the time series pattern storage network is determined in accordance with the distance/weight curve having a mild rate of change of the updating weight α to the inter-pattern distance d. With the updating (learning) in progress, the updating weight α of each node of the time series pattern storage network is determined in accordance with the distance/weight curve having a sharp rate of change of the updating weight α to the inter-pattern distance d.

Regardless of the process of the learning, the updating of the winner node is strongly influenced by the effect of the new time series data stored in the learning data storage unit 31 of FIG. 12. The updating of (the time series pattern model 21 of) the nodes other than the winner node, namely, the nodes falling within a relatively wide area (i.e., from a node having a small inter-pattern distance d to the winner node to a node having a modestly large inter-pattern distance d to the winner node) is influenced by the effect of the new time series pattern storage network. With the learning of the nodes other than the winner node in progress, only the nodes falling within a range becoming gradually narrower are influenced by the effect of the new time series pattern storage network.

As described above, the weight determiner 43 of FIG. 12 determines the updating weight α of each of the time series pattern storage network and the learning data updating unit 44 updates the learning data stored in the learning data storage unit 22 of each node in accordance with the updating weight α of the node.

The updating method of updating the learning data stored in the learning data storage unit 22 of the node is described below with reference to FIG. 14.

The learning data storage unit 22 of the node $N_i$ has already stored the learning data, and the time series pattern model 21 of the node $N_i$ has undergone the learning process using the learning data stored in the learning data storage unit 22.

As previously discussed, the learning data updating unit 44 mixes, in accordance with the updating weight α of the node $N_i$ from the weight determiner 43, the learning data already stored in the learning data storage unit 22 of the node $N_i$ (hereinafter referred to as old time series data as appropriate) and new time series data stored in the learning data storage unit 31 (FIG. 12), and causes the learning data storage unit 22 to store the mixing results as new learning data. The storage content of the learning data storage unit 22 is thus updated to the new learning data.

More specifically, the learning data updating unit 44 generates the new learning data by adding, to the old learning data, the new time series data. The addition of the new time series data to the old learning data is performed at a ratio determined by the updating weight α of the node $N_i$.

If the new time series data is added to the old learning data at a ratio of 1:0, the resulting new learning data obtained as a result contains only the new time series data. If the new time series data is added to the old learning data at a ratio of 0:1, the resulting learning data obtained as a result contains only the old learning data. The updating of the time series pattern model 21 (FIG. 7) of the node $N_i$ is performed using the new learning data. By changing a mixture ratio of the new time series data to the old learning data, the degree of influence (strength) of the new time series data on the time series pattern model 21 during updating is varied.

The updating weight α of the node $N_i$ is adopted as a ratio of the new time series data to the old learning data at the node $N_i$. The larger the updating weight α, the larger the ratio of the new time series data gets (with a smaller ratio of the old learning data).

More specifically, the learning data storage unit 22 of the node $N_i$ stores a predetermined number of pieces of time series data (learning data). If the predetermined number is H, the learning of the time series pattern model 21 of the node $N_i$ is always learned using H pieces of learning data (time series data).

If the learning data storage unit 22 stores H pieces of learning data, the number of pieces of new learning data obtained as a result of the mixing of the new time series data and the old learning data also needs to be H. Available as a method of mixing the new time series data with the old learning data at a ratio corresponding to the updating weight α of the node $N_i$ is that the new time series data and the old learning data are mixed at a ratio of α:(H-α).

Figure 14:
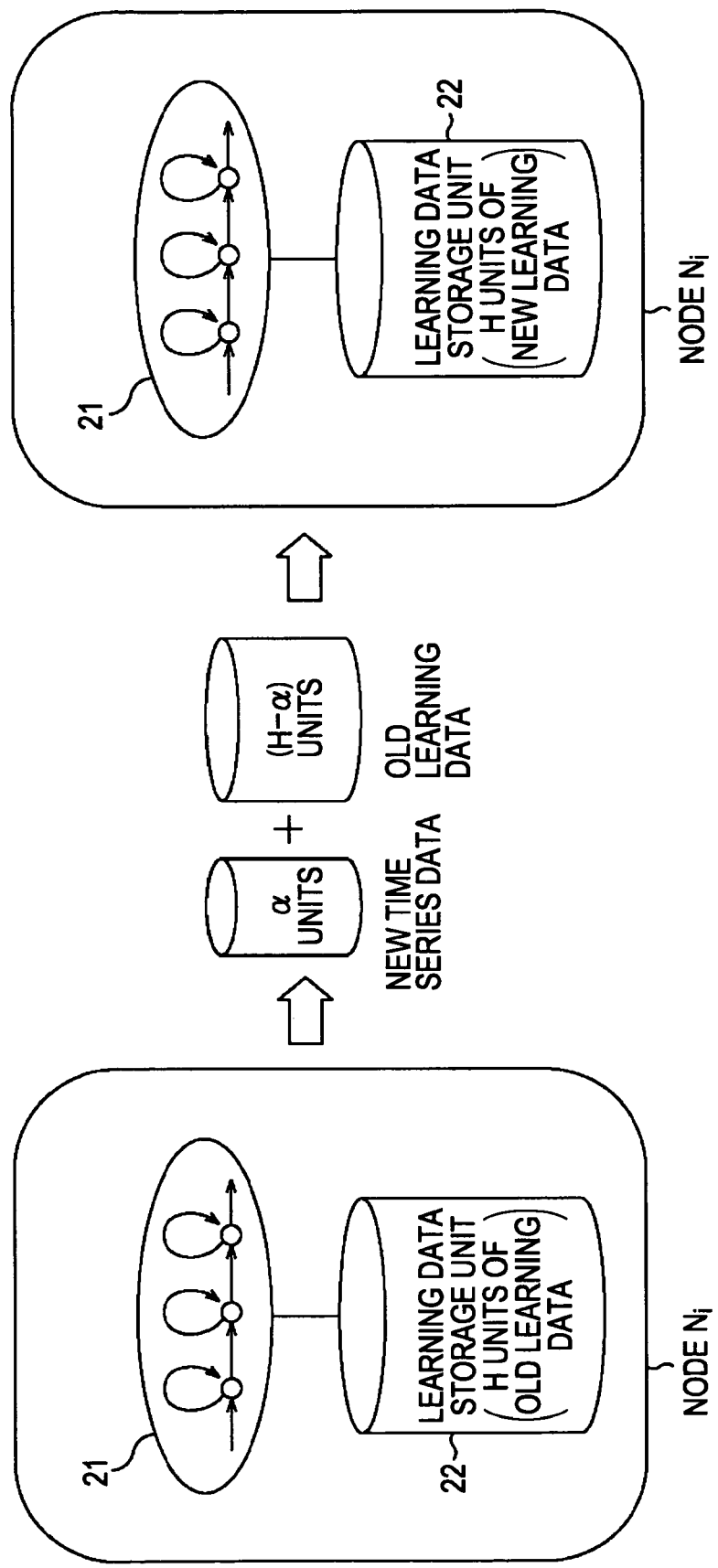
FIG. 14 illustrates an updating method of updating learning data to be stored on a learning data storage unit.

FIG. 14 shows a specific method of mixing the new time series data with the old learning data at a ratio of α:(H-α). As shown, H pieces of learning data are obtained by adding α pieces of time series data to (H-α) pieces of old learning data out of H pieces of old learning data.

If the H pieces of time series data stored in the learning data storage unit 22 is 100 with the updating weight α of the node $N_i$ being 8, the storage content of the learning data storage unit 22 is updated to 100 pieces of new learning data by adding 8 pieces of new time series data to 92 pieces of old learning data out of the 100 pieces of old learning data.

The α pieces of time series data may be added to (H-α) pieces of old learning data out of the H pieces of old learning data by waiting until the α pieces of new time series data has been obtained. However, this method does not permit the storage content of the learning data storage unit 22 to be updated each time one new piece of time series data is obtained.

Each time one new piece of time series data is obtained, the storage content of the learning data storage unit 22 is updated by adding α pieces of the new time series data to the (H-α) pieces of old time series data. More specifically, the one piece of new time series data is copied to form α pieces of new time series data, and the α pieces of new time series data are added to the (H-α) pieces of old learning data that are obtained by eliminating α pieces out of H pieces of old learning data in oldest first manner. In this way, each time one new piece of time series data is obtained, and the storage content of the learning data storage unit 22 is updated.

The learning data storage unit 22 continuously stores only H pieces of new time series data as the learning data thereof by updating the storage content thereof in this way. The ratio of the new time series data in the learning data is adjusted by the updating weight α alone.

The learning process of the data processing apparatus of FIG. 10 for learning the time series pattern storage network is described below with reference to a flowchart of FIG. 15.

In step S1, the learning processor 32 in the learning section 4 (FIG. 11) initializes the parameters of the time series pattern storage network stored in the storage section 5, namely, the parameters of HMM as the time series pattern model 21 (FIG. 7) of each node of the time series pattern storage network. In this initialization process, appropriate initial values are imparted to the parameters of HMM (the state transition probability and the output probability density function). The present invention is not limited to any particular initial value as the parameters of HMM in the initialization process.

In step S2, upon receiving one piece of data to be processed, namely, voice data of one audio period, the signal input section 1 supplies the received data to the feature extractor 2. The feature extractor 2 extracts a feature from the received data, and supplies time series data of the feature (new one piece of time series data) to the learning section 4.

The learning section 4 (FIG. 11) causes the learning data storage unit 31 to temporarily store the new time series data from the feature extractor 2, and then updates (learns), in a self-organizing manner, the time series pattern storage network, stored in the storage section 5 in steps S3 through S7, based on the observed value of the time series data stored in the learning data storage unit 31.

In step S3, the score calculator 41 of the learning processor 32 (FIG. 12) in the learning section 4 reads the new time series data stored in the learning data storage unit 31, and determines a score of each node of the time series pattern storage network stored in the storage section 5, the score representing the degree of match of the node to the new time series data.

More specifically, if the time series pattern model 21 of FIG. 7 of the node is HMM, a logarithmic likelihood at which the new time series data is observed is determined as the score from HMM. The logarithmic likelihood is calculated using Viterbi algorithm, for example.

The score calculator 41 calculates the score of the new time series data of all nodes of the time series pattern storage network, and supplies the score of each node to the winner node determiner 42.

In step S4, the winner node determiner 42 acquires the score having the highest score from the score calculator 41, from among the nodes forming the time series pattern storage network, and determines that node as a winner node. The winner node determiner 42 supplies the weight determiner 43 with a node label as information representing the winner node.

In step S5, the weight determiner 43 determines the updating weight of each node of the time series pattern storage network with respect to the winner node, as a reference, represented by the node label from the winner node determiner 42.

As previously discussed with reference to FIG. 13, the weight determiner 43 determines the updating weight α of each node of the time series pattern storage network in accordance with the distance/weight curve expressed by equation (3). With the distance/weight curve, the rate of change of the updating weight α to the inter-pattern distance d becomes sharp with the updating (learning) of the time series pattern storage network in progress. The updating weight α is then supplied to the learning data updating unit 44.

In step S6, the learning data updating unit 44 updates the learning data, stored in the learning data storage unit 22 of FIG. 7 of each node of the time series pattern storage network, in accordance with the updating weight of that node from the weight determiner 43. As previously discussed with reference to FIG. 14, the learning data updating unit 44 mixes the new time series data stored in the learning data storage unit 31 with the old learning data stored in the learning data storage unit 22 of the node at a ratio of α:(H-α) corresponding to the updating weight α of that node. The learning data updating unit 44 thus obtains H pieces of new learning data, and updates the storage content of the learning data storage unit 22 in accordance with the H pieces of new learning data.

Upon updating the storage content of the learning data storage units 22 (FIG. 7) of all nodes forming the time series pattern storage network, the learning data updating unit 44 notifies the model learning unit 45 of the end of updating.

Upon receiving the update end notice from the learning data updating unit 44, the model learning unit 45 updates the parameters of the time series pattern storage network in step S7.

The model learning unit 45 learns the time series pattern model 21 using the new learning data stored in the learning data storage unit 22 of each node of the time series pattern storage network subsequent to the updating process of the learning data updating unit 44. The model learning unit 45 thus updates the time series pattern model 21.

More specifically, if the time series pattern model 21 of the node is HMM, HMM learning is performed using the new learning data stored in the learning data storage unit 22 of the node. In this learning process, the current state transition probability and output probability density function of HMM are set to initial values, and a new state transition probability and a new output probability density function are respectively determined using the new learning data through the Baum-Welch technique. The state transition probability and output probability density function of HMM are updated with the new state transition probability and output probability density function.

Processing returns from step S7 to step S2. The data processing apparatus waits until next data to be processed is input to the signal input section 1. When the next data is input, the data processing apparatus iterates the above-described process.

Figure 15:
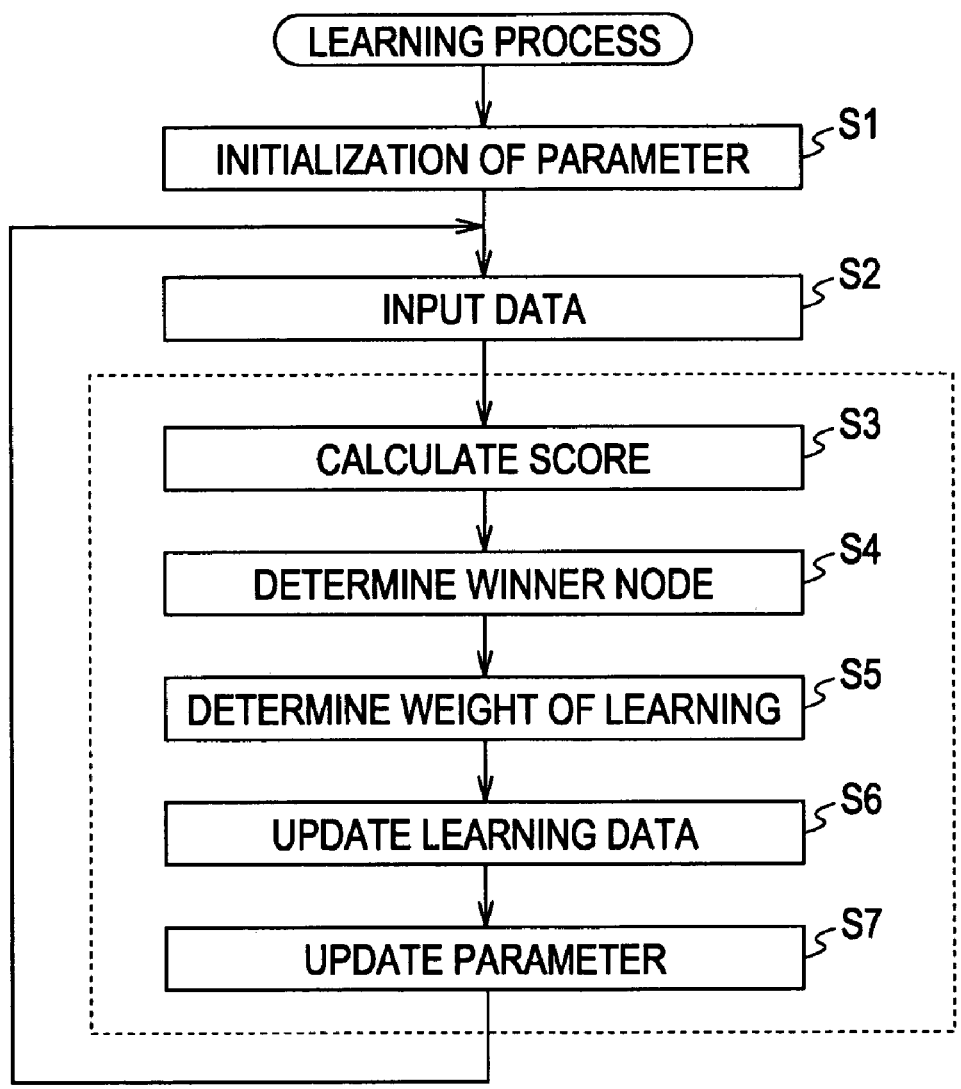
FIG. 15 is a flowchart illustrating a learning process.

When a single piece of new time series data is obtained in the learning process of FIG. 15, a winner node is determined in response to the new time series data from among the nodes forming the time series pattern storage network (step S4). The updating weight of each node forming the time series pattern storage network is determined with respect to the winner node (step S5). Based on the updating weight, the parameters of the time series pattern model 21 (FIG. 7) of each node of the time series pattern storage network are then determined.

Updating of the parameters of the node of the time series pattern storage network is performed once for one piece of new time series data in the learning process of FIG. 15. Similarly, each time new time series data is obtained, the updating of the parameters of each node is iterated. The learning process is thus performed in a self-organizing manner.

When sufficient learning is performed, the time series pattern model 21 of the node of the time series pattern storage network learns (acquires) a certain time series pattern. The number of (types) of time series patterns learned in the entire time series pattern storage network equals the number of nodes contained in the time series pattern storage network. For example, if the number of nodes contained in the time series pattern storage network is 100, 100 types of time series patterns are learned. Based on the time series pattern, the recognition section 3 (FIG. 10) performs a recognition process on the time series data (data to be processed). The generator 6 (FIG. 10) performs a generation process to generate the time series data.

In the learning process of FIG. 15, the new time series data stored in the learning data storage unit 31 is mixed with the old learning data stored in the learning data storage unit 22 of the node at a ratio of α:(H-α) corresponding to the updating weight α of that node. H pieces of new learning data are thus obtained. The learning of the time series pattern model 21 of the node is thus performed using H pieces of new learning data. The parameters of the time series pattern model 21 of the node are thus updated. Besides the above-described updating method of the parameters of the node, any other method can be used as long as the method permits new time series data to be reflected in the parameters of the node in response to the updating weight α.

The method of updating the parameters of (the time series pattern model 21 of) only the winner node corresponds to WTA, while the method of updating the parameters of (the time series pattern model 21) of the winner node and the other nodes corresponds to SMA. In the learning process of FIG. 15, the parameters of the node is updated using the SMA. The parameters of the node can also be updated using the WTA.

When new time series data is provided in the learning process of FIG. 15, online learning of the node is performed using the new time series data. Batch learning can also be adopted as the node learning method. In the batch learning method, learning is performed using new time series data only after a substantial number of pieces of time series data have been obtained.

Figure 16:
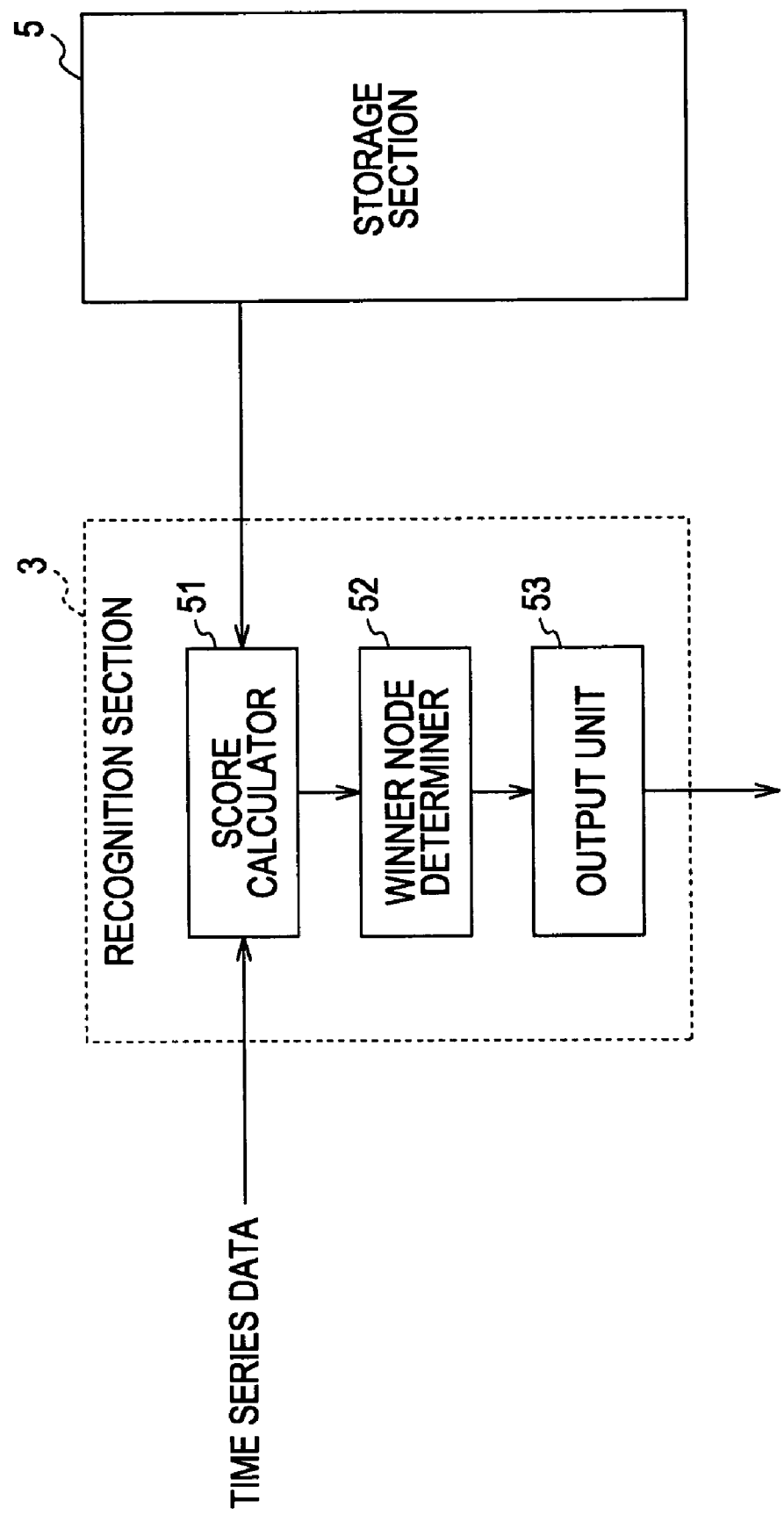
FIG. 16 is a block diagram illustrating a recognition section.

FIG. 16 illustrates the structure of the recognition section 3 of FIG. 10.

As previously discussed with reference to FIG. 10, the feature extractor 2 supplies one piece of time series data to the recognition section 3. The time series data is supplied to a score calculator 51.

As the score calculator 41 in the learning processor 32 (FIG. 12), a score calculator 51 determines a score representing the degree of match of each node of the time series pattern storage network stored in the storage section 5, with the observed value of the time series data from the feature extractor 2, and supplies a score to a winner node determiner 52. If the time series pattern model 21 of the node is HMM as shown in FIG. 7, the score calculator 51 determines a logarithmic likelihood at which the time series data from the feature extractor 2 is observed, from the time series pattern model 21 of the node as HMM, and supplies the determined logarithmic likelihood as the score of the node to the winner node determiner 52.

As the winner node determiner 42 in the learning processor 32 (FIG. 12), the winner node determiner 52 determines the node most appropriately matching the time series data from the feature extractor 2 in the time series pattern storage network stored in the storage section 5, and determines that node as a winner node.

More specifically, the winner node determiner 52 determines, as a winner node, the node having the highest score from the score calculator 51, from among the nodes forming the time series pattern storage network stored in the storage section 5. The winner node determiner 52 outputs information representing the winner node to an output unit 53.

The output unit 53 outputs the node label representing the winner node from the winner node determiner 52 as the time series data of the feature from the feature extractor 2, thus as the recognition results of the data input to the signal input section 1 responsive to the feature.

The score calculator 51 in the recognition section 3 can serve as the score calculator 41 in the learning processor 32 (FIG. 12) with the score calculator 41 eliminated entirely, or the score calculator 41 can serve as the score calculator 51 with the score calculator 51 eliminated entirely. The same is true of the winner node determiner 52 in the recognition section 3 and the winner node determiner 42 in the learning processor 32 (FIG. 12).

Figure 17:
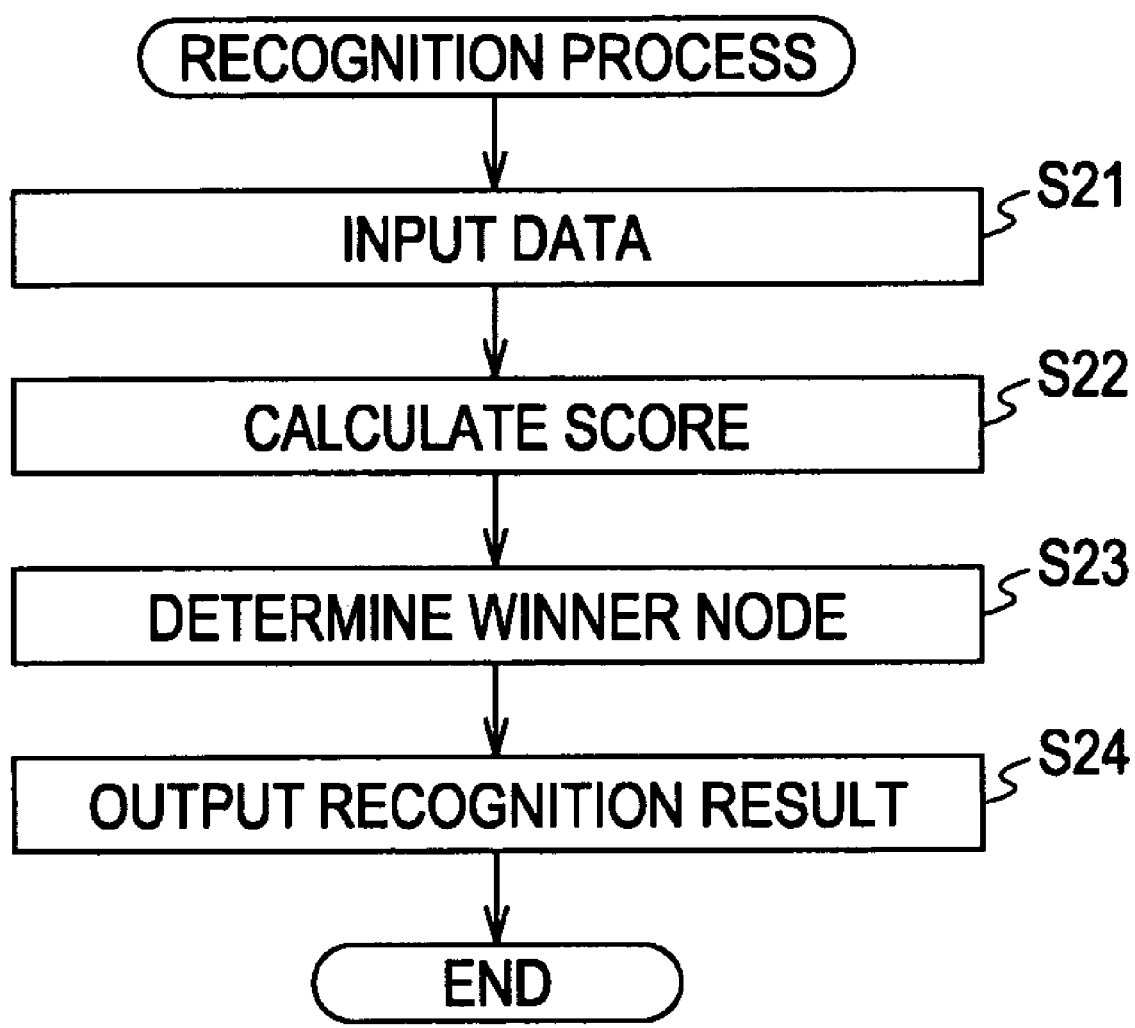
FIG. 17 is a flowchart illustrating a recognition process.

A recognition process of the data processing apparatus of FIG. 10 for recognizing the time series data is described below with reference to a flowchart of FIG. 17.

In step S21, one piece of data to be process, namely, voice data of one audio period (time series data) is input to the signal input section 1. The signal input section 1 supplies the input data to the feature extractor 2. The feature extractor 2 extracts a feature from the time series data as the data to be processed, and supplies the time series data of feature to the recognition section 3.

In step S22, the score calculator 51 in the recognition section 3 (FIG. 16) determines a score representing the degree of match of each node of the time series pattern storage network stored in the storage section 5 to the time series data from the feature extractor 2.

More specifically, if the time series pattern model 21 (FIG. 7) of the node is HMM, a logarithmic likelihood at which the time series data from the feature extractor 2 is observed is determined from HMM using the Viterbi algorithm. The score calculator 51 calculates the scores of all nodes contained in the time series pattern storage network in response to the time series data from the feature extractor 2, and supplies the score of each node to the winner node determiner 52.

In step S23, the winner node determiner 52 determines the node having the highest score from the score calculator 51, from among the nodes forming the time series pattern storage network, and determines that node as a winner node. The winner node determiner 52 outputs a node label representing the winner node to the output unit 53.

The output unit 53 outputs the node label from the winner node determiner 52 as the recognition result of the feature extractor 2 responsive to the time series data (the data to be processed input to the signal input section 1). Processing thus ends.

The node label output from the output unit 53 (node label of the winner node) can be supplied to the generator 6 as control data.

In the recognition process using the time series pattern storage network, the recognition result having a fineness responsive to the number of nodes of the time series pattern storage network is thus obtained.

For example, the learning of the time series pattern storage network is now performed using voice data resulting from pronunciation of three categories "A", "B", and "C".

If the voice data of the three categories "A", "B", and "C" used in the learning of the time series pattern storage network contains pronunciations of a large number of speakers, even the voice data of the category "A" includes a variety of voice data different in pronunciation speed, intonation, sex and age of speaker, etc.

In the supervised learning, the learning of the voice data of the categories "A", "B", and "C" is performed using only the voice data of "A", the voice data of "B", or the voice data of "C". Variations due to difference in the pronunciation speed do not take place in the learning results of each category.

In the learning of the time series pattern storage network, the voice data of the categories "A", "B", and "C" is used without distinction (classification). As previously discussed, the time series patterns of the number equal to the number of nodes contained in the time series pattern storage network are learned.

For example, if the number of nodes of the time series pattern storage network is larger than 3, a time series pattern of one variation of the voice data of the category "A" is learned in one node while a time series pattern of another variation is learned in another node.

A variety of time series patterns of the voice data of the category "A" are learned in a plurality of nodes in this way. If the voice data of the category "A" is input in the recognition process, the node most appropriately matching the data to be processed is determined as a winner node from among the plurality of nodes leaned from the voice data of the category "A", and the node label of the winner node is output as the recognition result.

In the recognition process of using the time series pattern storage network, it is not determined which voice data of categories "A", "B", and "C" the data to be processed falls within. It is also determined which of the time series patterns of the number equal to the number of nodes is most appropriate as a result of the learning of the time series pattern storage network.

In the learning of the time series pattern storage network, the time series patterns are acquired at fineness depending on the number of nodes contained in the time series pattern storage network. In the recognition process using the time series pattern storage network, the time series data is classified at fineness depending on the number of nodes contained in the time series pattern storage network.

Each node of the time series pattern storage network sufficiently learned can be appropriately tagged with a correct-answer label of the categories "A", "B", and "C" in accordance with the time series pattern acquired by that node, and if so, it is determined in the recognition process of the time series pattern storage network which voice data of the categories "A", "B", and "C" the time series data (the data to be processed) falls within.

Figure 18:
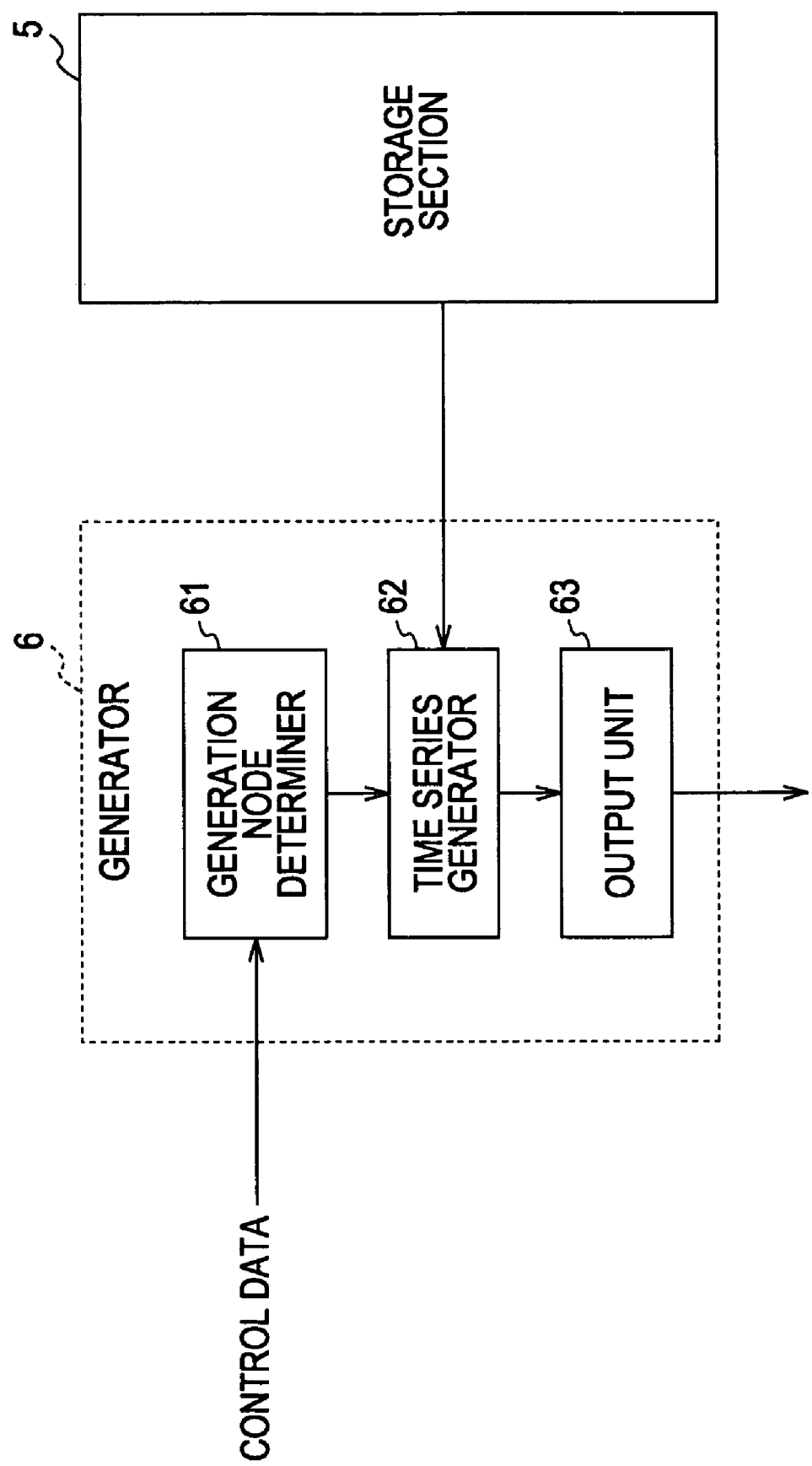
FIG. 18 is a block diagram illustrating a generator.

FIG. 18 illustrates the structure of the generator 6 of FIG. 10.

As previously discussed with reference to FIG. 10, the generator 6 receives the control data. The control data supplied to the generator 6 represents one of the time series patterns stored in the time series pattern storage network of the storage section 5 and any node forming the time series pattern storage network. The control data is a node label, for example.

The control data input to the generator 6 is supplied to a generation node determiner 61. The generation node determiner 61 determines, as a node for use in generating the time series data (hereinafter referred to as a generation node), a node represented by the control data supplied thereto, in the time series pattern storage network stored in the storage section 5. The generation node determiner 61 then supplies the determination result to a time series generator 62.

More specifically, the generation node determiner 61 determines, as the generation node, the node represented by the node label as the control data supplied thereto, and supplies the determination result to the time series generator 62.

In accordance with the determination result of the generation node determiner 61, the time series generator 62 generates the time series data based on the time series pattern model 21 (FIG. 7) of the generation node, and outputs the generated time series data to the output unit 63.

For example, if the time series pattern model 21 is HMM, the time series generator 62 generates the time series data that maximizes the output probability representing the likelihood at which the time series data of HMM as the time series pattern model 21 is observed. A method of generating time series data that mildly changes using a dynamic feature is available as the method of generating the time series data using HMM. The time series generator 62 generates the time series data using such a method for example, the method of generating the time series data is described by K. Tokuda, T. Yoshimura, T. Masuki, T. Kobayashi, and T. Kitamura in the paper entitled "SPEECH PARAMETER GENERATION ALGORITHMS FORM HMM-BASED SPEECH SYNTHESIS", Proc. of ICASSP 2000, vol. 3, pp. 1315-1318, June 2000.

Other methods have been also proposed. For example, in one proposed method, time series data is repeatedly generated based on probabilistic trials using HMM parameters. This method is described by T. Inamura, H. Tanie, and Y. Nakamura in the paper entitled "Key Frame Extraction and Decompression for Time Series Data Based on Continuous Hidden Markov Models" Proceedings of Japan Society of Mechanical Engineers Robotics and Mechatronics Conference 2P1-3F-C6, 2003.

The output unit 63 converts the time series data from the time series generator 62 into time series data corresponding to the data to be processed, and then outputs the resulting time series data. More specifically, the time series data generated in the time series generator 62 is the time series data of the feature used in the learning of the time series pattern model 21 of the node. The output unit 63 converts the time series data of feature into the time series data of the data to be processed.

More specifically, the data to be processed is voice data. The time series pattern model 21 may be HMM. The feature extractor 2 extracts cepstrum from the voice data as a feature. Since the time series data of cepstrum is learned by the time series pattern model 21 (FIG. 7), the time series data generated by the time series generator 62 is the time series data of cepstrum. The output unit 63 converts the time series data of cepstrum generated by the time series generator 62 into voice data as the time series data to be processed.

A filtering method is available to convert the time series data of cepstrum into the voice data (audio in time domain). In this method, the time series data of cepstrum is filtered by a synthesis filter called MLSA (Mel log spectrum approximation) filter. For example, the MLSA filter is described in detail by S. Imai, K. Sumita, and C. Furuichi in the paper entitled "Mel Log Spectral Approximation (MLSA) Filter for Speech Synthesis", Transactions (A) of the Institute of Electronics, Information, and Communication Engineers (IECE), J66-A, 2, pp. 122-129, and by K. Tokuda, T. Kobayashi, H. Saitoh, T. Fukada, and S. Imai in the paper entitled "Speech Spectral Inference Using Mel Cepstrum As Parameters", Transactions (A) of the IECE, J74-A, 8, pp. 1240-1248, 1991.

Figure 19:
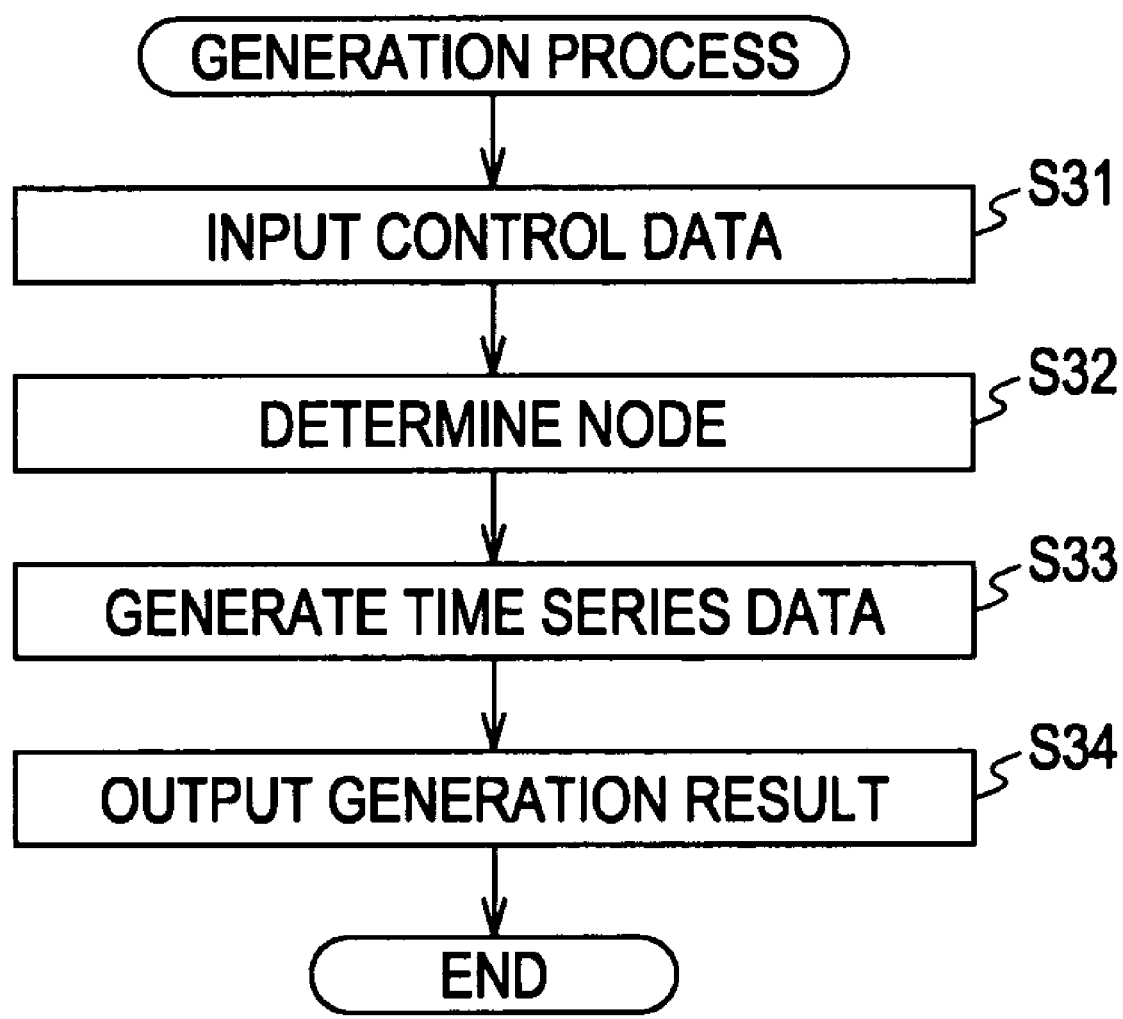
FIG. 19 is a flowchart illustrating a generation process.

The generation process of the data processing apparatus of FIG. 10 for generating time series data (data to be processed) is described below with reference to a flowchart of FIG. 19.

In step S31, the control data is input to the generator 6 (FIG. 18). The control data input to the generator 6 is fed to the generation node determiner 61. In step S32, the generation node determiner 61 determines, as the generation node, the node represented by the node label as the control data, from among the nodes forming the time series pattern storage network stored in the storage section 5. The generation node determiner 61 supplies the determination result to the time series generator 62.

In step S33, in response to the determination result of the generation node determiner 61, the time series generator 62 generates time series data based on the parameters of the time series pattern model 21 of the generation node from among the nodes forming the time series pattern storage network stored in the storage section 5, and supplies the generated time series data to the output unit 63. In step S34, the output unit 63 converts the time series data from the time series generator 62 into time series data corresponding to the data to be processed.

In the generation process using the time series pattern storage network, the time series data of the time series patterns of the number corresponding to the number of nodes forming the time series pattern storage network is generated.

As previously discussed in connection with the recognition process, the learning of the time series pattern storage network is now performed using the voice data of each pronunciation of three categories "A", "B", and "C".

If the voice data of the three categories "A", "B", and "C" used in the learning of the time series pattern storage network contains pronunciations of a large number of speakers, a large number of variations of voice data is present even in the category "A" because of difference in pronunciation speed, intonation, sex and age of speaker, etc. In the voice data of the category "A" a time series pattern of one variation may be learned in one node while a time series pattern of another variation may be learned in another node.

A variety of time series patterns of the voice data of the category "A" are learned in a plurality of nodes in this way. A node label representing one of the plurality of nodes is provided as the control data. The voice data of the category "A" of the variation learned in the node represented by the node label is output. Even in the voice data of the same category, a large number of variations of voice data is thus output.

The time series pattern storage network formed of the plurality of nodes having the time series pattern models 21 is updated in a self-organizing manner based on the time series data. The unsupervised learning is thus easily performed on not only time series data having a constant length but also time series data having a variable length. In other words, autonomous learning is easily performed on the time series data.

Since each node of the time series pattern storage network has a time series pattern model 21, the updating of each node in the learning of the time series pattern storage network does not affect the other nodes forming the time series pattern storage network. If one node is added in the time series pattern storage network, the amount of computation required to learn the time series pattern storage network is simply increased by an amount of calculation for the updating of one node. Even if the scale of the time series pattern storage network is enlarged, in other words, the number of nodes forming the time series pattern storage network increases, the amount of computation required to learn the time series pattern storage network is not greatly increased. Even a large-scale time series pattern storage network can be learned in a self-organizing manner.

Since each node stores a time series pattern representing statistic characteristics of the time series data in the learning of the time series pattern storage network, the recognition and generation of the time series data are easily performed using the time series pattern. In accordance with the time series pattern storage network, classification and analysis of the time series data are easily performed.

The learning process, the recognition process, and the generation process are performed on any time series data, such as voice data, image data, a signal driving a motor, etc. For example, the data processing apparatus of FIG. 10 can be applied to an autonomous system such as an autonomous robot. The time series data can include signals output by sensors corresponding to visual sense, auditory sense, and tactile sense of the robot, signals for controlling actuators driving the limbs of the robot, and signals supplied to a device synthesizing voice, and an light-emitting diode (LED) corresponding to the eyes of the robot. These signals can be applied as the time series data to be processed in the learning process, the recognition process, and the generation process.

In the present embodiment, HMM (one of state transition probability models) is used for the time series pattern model 21 (FIG. 7) of the node. Another state transition probability model can be used for the time series pattern model 21.

For example, a Bayesian network is available as the time series pattern model 21.

In the Bayesian network, dependency relationship between variables is expressed by a graph structure, and is modeled by assigning conditional probability to each node. By constructing a state transition model along time axis, time series data can be modeled.

The determination of the graph structure of the Bayesian network is performed by selecting a model reflecting the likelihood of the learning data and the complexity of the graph structure. The conditional probability is inferred using maximum likelihood inference or expectation maximization (EM) algorithm. The Bayesian network is described in detail by Y. Kimura in the paper entitled "Information Representation for Uncertainty Modeling: Bayesian Network", Bayesian Net Tutorial, 2001.

In addition to the state transition probability model, such as HMM and the Bayesian network, a function approximating model can be used for the time series pattern model 21 (FIG. 7).

In the function approximating model, a time series pattern is represented by one of a differential equation $\{x(t)\}'=f(x(t))$ and a difference equation $x(t+1)=f(x(t))$ using function $f(\ )$. The function $f(\ )$ is characteristic of the time series pattern. Herein, t represents time (sampling point), $x(t)$ represents a sample value of the time series data at time t, or the time series data observed from time 0 to time t, and $\{x(t)\}'$ represents a first derivative of the time series data $x(t)$ at time t.

Determining, from the learning data (time series data), the function $f(\ )$ representing a given time series pattern is referred to as function approximation. In the function approximation, the function $f(\ )$ is expressed using a polynomial, and coefficients of the polynomial are determined from the learning data in one method. In another method, a function $f(\ )$ is expressed using a neural network, and a parameter of the neural network is determined from the learning data.

In the function approximation of the function $f(\ )$ expressed in a polynomial, the coefficients of the polynomial are determined (inferred) using steepest descent method. In the function approximation of the function $f(\ )$ expressed in a neural network, the parameter of the neural network is determined using back propagation algorithm. In the back propagation algorithm, data input to and output from a neural network are provided, and the parameter of the neural network is learned to satisfy the relationship of the input data and the output data.

When the function approximation mode representing the time series pattern with the differential equation $x(t+1)=f(x(t))$ using the function $f(\ )$ is used, a weight connecting an input layer $x(t)$ to an output layer $x(t+1)$ (intermediate layer) is a parameter of a neural network. That parameter is learned using the learning data (time series data). The parameter of the neural network is learned using the back propagation with an appropriate initial value provided. A recurrent neural network can be used for the neural network.

When the time series pattern storage network formed of the nodes having the time series pattern model 21 with the function f( ) expressed by the neural network is learned, the winner mode needs to be determined as in the case in which the HMM is used for the time series pattern model 21. To determine the winner node, the score of new time series data of each node of the time series pattern storage network needs to be calculated.

The score can be the sum of squares of differences, each difference between the observed value of the new time series data and a theoretical value of the new time series data determined from the time series pattern model 21 with the function ( ) expressed in the neural network. In this case, the node having the minimum score value is determined as the winner node most appropriately matching the new time series data.

The updating weight of each node is determined after the determination of the winner node. In the same way as in the time series pattern model 21 being HMM, the parameter of the neural network of each node is determined.

The forward model and the backward model with the time above-described series pattern storage network applied thereto are described below.

Figure 20:
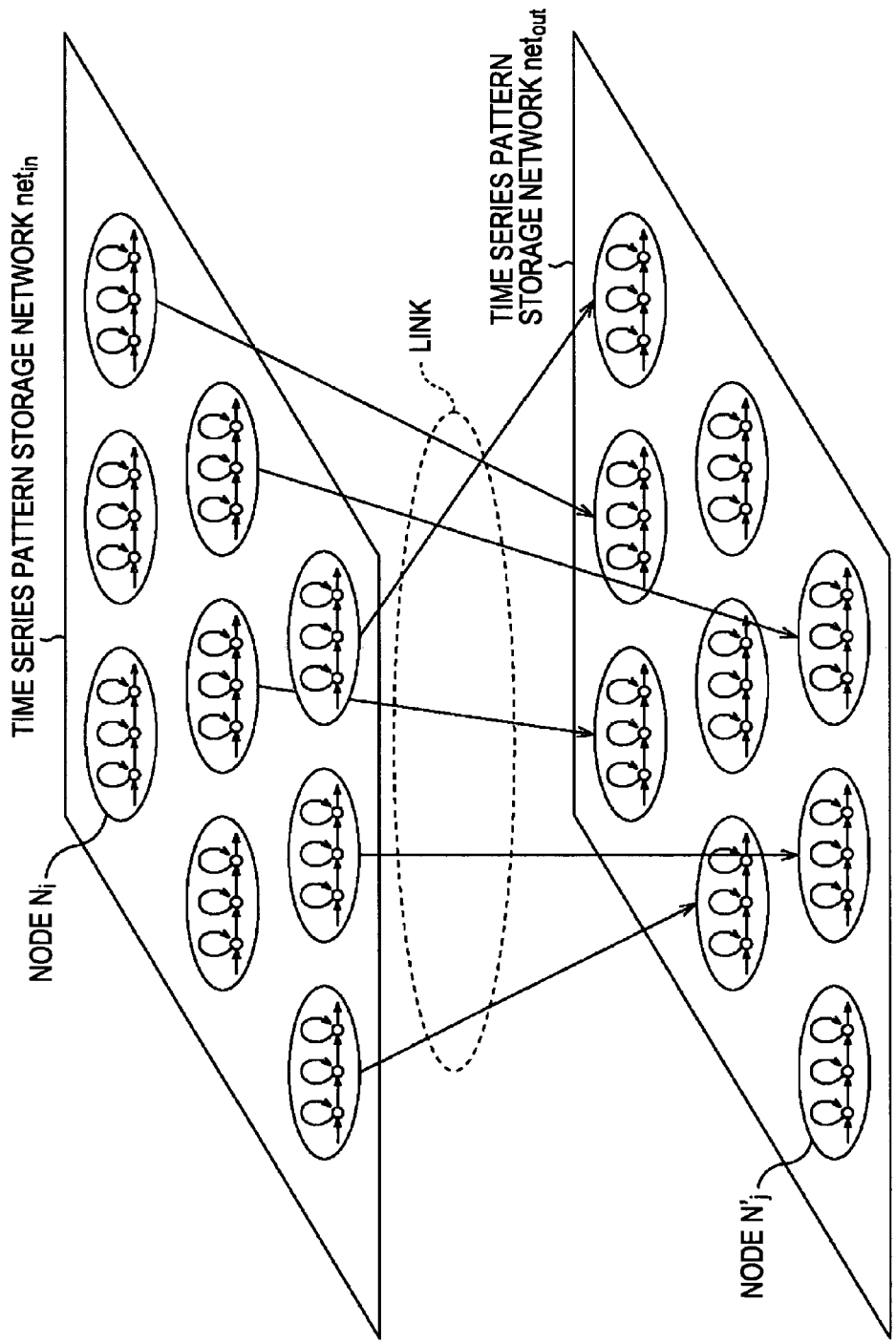
FIG. 20 illustrates an input-output relationship model.

FIG. 20 diagrammatically illustrates the configuration of an input-output relationship of each of the forward model and the backward model with the time series pattern storage network applied thereto.

As shown in FIG. 20, the input-output relationship model includes two time series pattern storage networks $net_{in}$ and $net_{out}$. The input-output relationship model is also a link model in which each node $N_i$ (i=1, 2, . . . , the total number of nodes) of the time series pattern storage networks netin and each node $N'_j$ (j=1, 2, . . . , the total number of nodes) of the time series pattern storage networks $net_{out}$.

An arrow-headed line drawn between the $N_i$ of the time series pattern storage networks $net_{in}$ and the node $N'_j$ of the time series pattern storage networks $net_{out}$ represents a link between the node $N_i$ and the node $N'_j$.

The time series pattern storage networks $net_{in}$ and $net_{out}$ may or may not have links of the same number and may have links between corresponding nodes (or may not have no links at all). The time series pattern model 21 (FIG. 7) of the node $N_i$ in the time series pattern storage network $net_{in}$ and the time series pattern model 21 of the node $N'_j$ in the time series pattern storage network $net_{out}$ may or may not be the same model.

FIG. 21 is a block diagram of a data processing apparatus performing a variety of processes.

The data processing apparatus of FIG. 21 models an object to be controlled as a forward model and a backward model using the input-output relationship model FIG. 20. The data processing apparatus further infers the output data from the object to be controlled and the control data (input data) to be input to the object, using the input-output relationship model as one of the forward model and the backward model.

As shown in FIG. 21, the data processing apparatus includes a storage section 211, a learning section 212, and a recognition generator 213.

The storage section 211 stores the input-output relationship model of FIG. 20.

The learning section 212 is supplied with a set of observed data (supervising data) including the input data given to the object to be modeled, and the output data output from the object in response to the input data. The supervising data is the set of the input data as time series data of a predetermined period (time series data throughout a predetermined period of time), and the output data as time series data of a predetermined period output from the object in response to the input data.

The learning section 212 learns the input-output relationship model as one of the forward model and the backward model to be controlled, using the supplied supervising data.

The learning section 212 is composed of a learning processor 221 and a link weight updating unit 222.

The learning processor 221 has the same structure as the learning processor 32 of FIG. 12. As in the data processing apparatus of FIG. 10, the learning processor 221 updates, in a self-organizing manner, the time series pattern storage network $net_{in}$ of the input-output relationship model (FIG. 20), stored in the storage section 211, in response to the input data of the supervising data supplied to the learning section 212. As in the data processing apparatus of FIG. 10, the learning processor 221 updates, in a self-organizing manner, the time series pattern storage network $net_{out}$ of the input-output relationship model (FIG. 20), stored in the storage section 211, in response to the output data of the supervising data supplied to the learning section 212 (the output data paired with the input data in the supervising data).

The learning processor 221 supplies, to the link weight updating unit 222, a label set of a node label of the node $N_i$ of the time series pattern storage network $net_{in}$ (also referred to as an input label as appropriate), the node $N_i$ having become a winner node when the time series pattern storage network $net_{in}$ is updated, and a node label of the node $N'_j$ of the time series pattern storage network $net_{out}$ (also referred to as an output label as appropriate), the node $N'_j$ having become an winner node when the time series pattern storage network $net_{out}$ is updated.

In response to the label set supplied from the learning processor 221, the link weight updating unit 222 updates the link relation between the node $N_i$ of the time series pattern storage network $net_{in}$ and the node $N'_j$ of the time series pattern storage network $net_{out}$ in the input-output relationship model (FIG. 28) stored in the storage section 211.

The label set supplied from the learning processor 221 to the link weight updating unit 222 is a set of the input label and the output label. The input label is the node label of the node $N_i$ of the time series pattern storage network $net_{in}$. The node $N_i$ becomes the winner node when the time series pattern storage network $net_{in}$ is updated in response to the input data of the supervising data. The input label thus matches most appropriately the input data in the time series pattern storage network $net_{in}$.

Similarly, the output label is the node label of the node $N'_j$ of the time series pattern storage network $net_{out}$. The node $N'_j$ becomes the winner node when the time series pattern storage network $net_{out}$ is updated in response to the output data of the supervising data. The output label thus matches most appropriately the output data in the time series pattern storage network $net_{out}$.

The link weight updating unit 222 updates the link relation between the winner node $N_i$ most appropriately matching the input data of the supervising data and each node of the time series pattern storage networks $net_{out}$, and the link relationship between the winner node $N'_j$ most appropriately matching the output data of the supervising data and each node of the time series pattern storage networks $net_{in}$.

As the link relationship between the node $N_i$ of the time series pattern storage network $net_{in}$ and the node $N'_j$ of the time series pattern storage network $net_{out}$ becomes stronger in the input-output relationship model, the link weight becomes larger. The updating of the link relationship between nodes means to update the link weight. The method of the link weight updating unit 222 of updating the link relationship between the nodes will be described later.

The recognition generator 213 receives the input data for use in inferring the output data obtained from the object to be controlled, or the output data for use in inferring the input data (control data) to be supplied to the object so that the output data from the object is obtained as a target value.

In response to the input data, the recognition generator 213 determines the winner node $N_i$ most appropriately matching the input data in the time series pattern storage network $net_{in}$ of the input-output relationship model stored in the storage section 211. The recognition generator 213 determines, as a generation node $N'_j$ for generating the time series data as an inferred value of the output data responsive to the input data, the node of the time series pattern storage network $net_{out}$ having the highest link weight with the winner node $N_i$. The recognition generator 213 generates an inferred value of the output data based on the time series pattern model 21 (FIG. 7) of the generation node $N'_j$.

In response to the output data, the recognition generator 213 determines the winner node $N'_j$ most appropriately matching the output data in the time series pattern storage network $net_{out}$ of the input-output relationship model stored in the storage section 211. The recognition generator 213 determines the node of the time series pattern storage network $net_{in}$ having the highest link weight with the winner node $N'_j$, as a generation node $N_i$ for use in generating the time series data as an inferred value of the control data (input data) that is supplied to the control model when the output is obtained. The recognition generator 213 generates an inferred value of the control data in accordance with the time series pattern model 21 (FIG. 7) of the generation node $N_i$.

The recognition generator 213 includes a score calculator 231, a winner node determiner 232, a generation node determiner 233, and a time series generator 234.

The score calculator 231, the winner node determiner 232, the generation node determiner 233, and the time series generator 234 are designed to recognize whether the data supplied to the recognition generator 213 is the input data or the output data. The recognition generator 213 receives, together with or separately from the supplied data, information that identifies whether the supplied data is the input data or the output data. In this way, each of the score calculator 231, the winner node determiner 232, the generation node determiner 233, and the time series generator 234 recognizes whether the data supplied to the recognition generator 213 is the input data or the output data.

In response to the data supplied to the recognition generator 213, the score calculator 231 calculates the score the degree of match of each node $N_i$ of the time series pattern storage network $net_{in}$ or the degree of match of each node $N'_j$ of the time series pattern storage network $net_{out}$, forming the input-output relationship model stored in the storage section 211, in the same way as the score calculator 51 of FIG. 16. The score calculator 231 outputs the score to the winner node determiner 232.

If the data supplied to the recognition generator 213 is the input data, the score calculator 231 calculates, in response to the input data, the score of each node $N_i$ of the time series pattern storage network $net_{in}$ forming the input-output relationship model stored in the storage section 211, and supplies the score to the winner node determiner 232. If the data supplied to the recognition generator 213 is the output data, the score calculator 231 calculates, in response to the output data, the scores of each node $N'_j$ of the time series pattern storage network $net_{out}$ forming the input-output relationship model stored in the storage section 211, and outputs the score to the winner node determiner 232.

As the winner node determiner 52 in the recognition section 3 of FIG. 16, the winner node determiner 232 determines, as a winner node, the node having the highest score supplied from the score calculator 231, and supplies the node label representing the winner node to the generation node determiner 233.

If the data supplied to the recognition generator 213 is the input data, the winner node determiner 232 determines, as the winner node $N_i$, the node having the highest score to the input data, supplied from the score calculator 231, from among the nodes of the time series pattern storage network $net_{in}$ forming the input-output relationship model stored in the storage section 211, and supplies the input label representing the winner node $N_i$ to the generation node determiner 233. If the data supplied to the recognition generator 213 is the output data, the winner node determiner 232 determines, as the winner node $N'_j$, the node having the highest score to the output data, supplied from the score calculator 231, from among the nodes of the time series pattern storage network $net_{out}$ forming the input-output relationship model stored in the storage section 211, and supplies the output label representing the winner node $N'_j$ to the generation node determiner 233.

If the input label from the winner node determiner 232 is supplied, the generation node determiner 233 receives the input label from the winner node determiner 232. The generation node determiner 233 then determines, as the generation node, the node $N'_j$ having the highest link weight with the node $N_i$ represented by the input label from the winner node determiner 232, from among the nodes of the time series pattern storage network $net_{out}$ forming the input-output relationship model stored in the storage section 211, and supplies the output label representing the generation node $N'_j$ to the time series generator 234. If the data supplied to the recognition generator 213 is the output data, the generation node determiner 233 receives the output label from the winner node determiner 232. The generation node determiner 233 then determines, as the generation node, the node $N_i$ having the highest link weight with the node $N'_j$ represented by the output label from the winner node determiner 232, from among the nodes of the time series pattern storage network $net_{in}$ forming the input-output relationship model stored in the storage section 211. The generation node determiner 233 then outputs the input label representing the generation node $N_i$ to the time series generator 234.

In response to the output label from the generation node determiner 233, in other words, if the data supplied to the recognition generator 213 is the input data, the time series generator 234 receives the output label from the generation node determiner 233. As the time series generator 62 in the generator 6 of FIG. 18, the time series generator 234 then generates time series data as an inferred value of the output data responsive to the input data supplied to the recognition generator 213, based on the time series pattern model 21 (FIG. 7) of the node $N'_j$, represented by the output label from the generation node determiner 233, from among the nodes of the time series pattern storage network $net_{out}$ forming the input-output relationship model stored in the storage section 211.

In response to the input label from the generation node determiner 233, in other words, if the data supplied to the recognition generator 213 is the output data, the time series generator 234 receives the input label from the generation node determiner 233. As the time series generator 62 in the generator 6 of FIG. 18, the time series generator 234 then generates time series data as an inferred value of the control data (input data) responsive to the output data supplied to the recognition generator 213, based on the time series pattern model 21 of the node $N_i$, represented by the input label from the generation node determiner 233, from among the nodes of the time series pattern storage network $net_{in}$ forming the input-output relationship model stored in the storage section 211.

Figure 22:
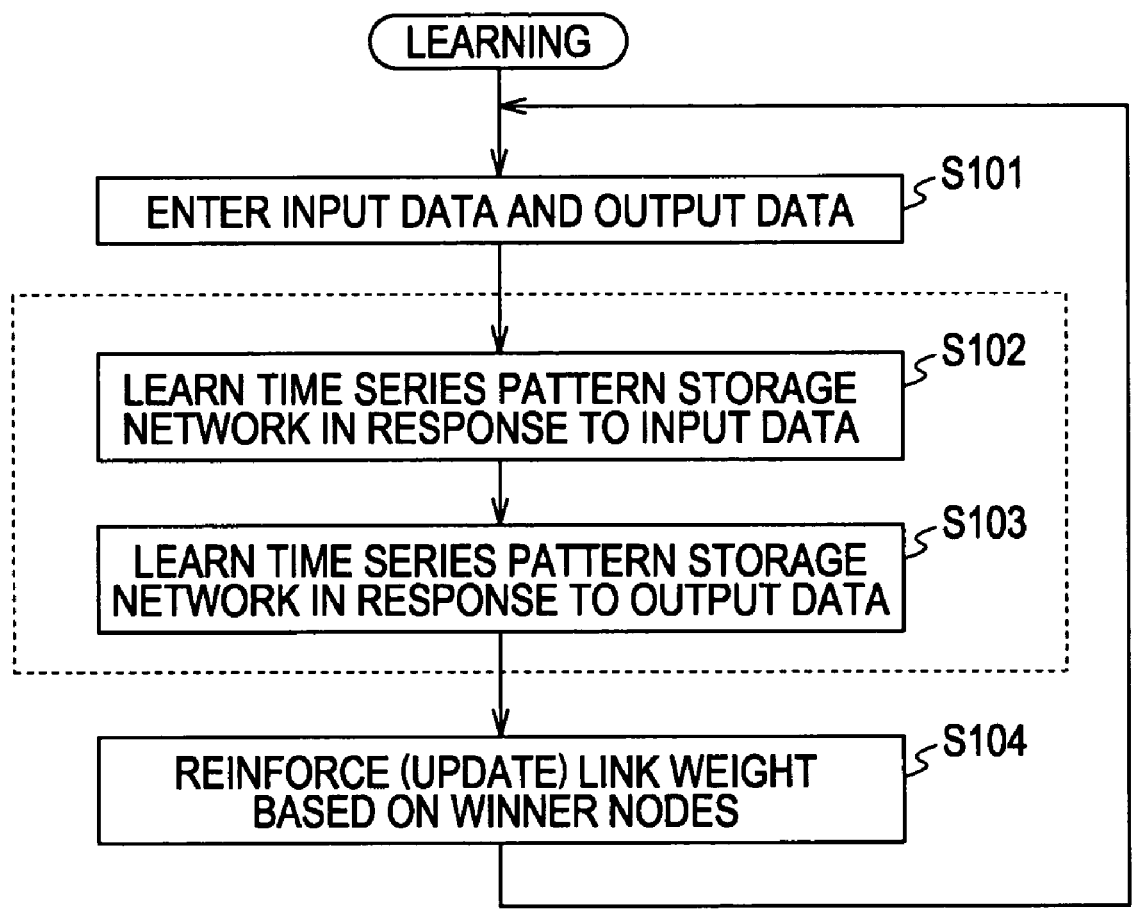
FIG. 22 is a flowchart illustrating a learning process of the input-output relationship model.

FIG. 22 is a flowchart of the learning of the input-output relationship model performed by the data processing apparatus of FIG. 21. In the learning process, the data processing apparatus models the object to be controlled through the input-output relationship model.

In step S101, the supervising data, namely, the set of the input data and the output data, is input to the data processing apparatus of FIG. 21. The supervising data is then fed to the learning section 212.

In step S102, the learning processor 221 updates in a self-organizing manner the time series pattern storage network $net_{in}$ of the input-output relationship model (FIG. 20) stored in the storage section 211 in response to the input data of the supervising data. In step S103, the learning processor 221 updates in a self-organizing manner the time series pattern storage network $net_{out}$ of the input-output relationship model stored in the storage section 211 in response to the output data of the supervising data.

The learning processor 221 supplies, to the link weight updating unit 222, the label set of the input label of the node $N_i$ of the time series pattern storage network $net_{in}$, the node $N_i$ having become the winner node when the time series pattern storage network $net_{in}$ is updated, and the output label of the node $N'_j$ of the time series pattern storage network $net_{out}$, the node $N'_j$ having become an winner node when the time series pattern storage network $net_{out}$ is updated.

In step S104, the link weight updating unit 222 updates the link weight between each node $N_i$ of the time series pattern storage network $net_{in}$ and each node $N'_j$ of the time series pattern storage network $net_{out}$ in the input-output relationship model (FIG. 20) in response to the label set supplied from the learning processor 221. Processing returns to step S101 and iterates the above-mentioned process again in response to inputting of supervising data.

As steps S101 through S104 are iterated with a large number of pieces of observed data input, the input-output relationship model stored in the storage section 211 becomes one of the forward model and the backward model corresponding to the object to be controlled.

The updating process of the link weight (link relationship between nodes) performed by the link weight updating unit 222 (FIG. 21) in step S104 of FIG. 22 is described below with reference to FIGS. 23A and 23B.

In the input-output relationship model, a time series pattern storage network (such as the time series pattern storage networks $net_{in}$) supplied with the input data for learning, i.e., a time series pattern storage network including a plurality of nodes, each node having a time series pattern model 21 of the input data, is referred to as an input network. In the input-output relationship model, a time series pattern storage network (such as the time series pattern storage networks $net_{out}$) supplied with the output data for learning, i.e., a time series pattern storage network including a plurality of nodes, each node having a time series pattern model 21 of the output data, is referred to as an output network.

Each node of the input network is referred to as an input node, and each node of the output network is referred to as an output node.

In the following discussion, the input-output relationship model is a forward model with output data being inferred in response to given input data. The discussion of the input-output relationship model as a backward model with input data (control data) being inferred in response to given output data (target value) is omitted herein.

Figure 23B:
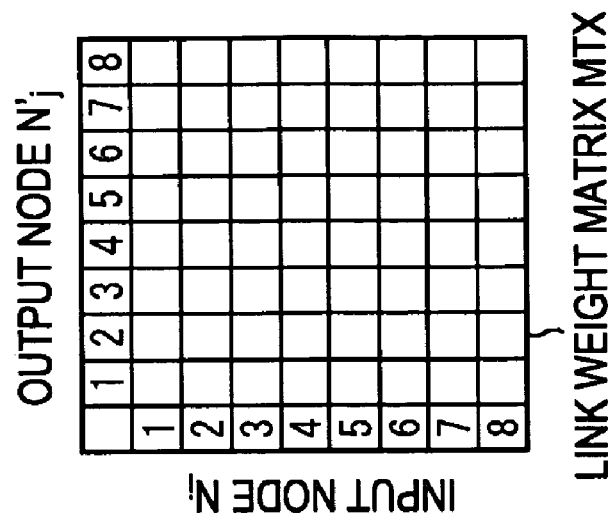
FIGS. 23A and 23B illustrate link weight matrices.
Figure 23A:
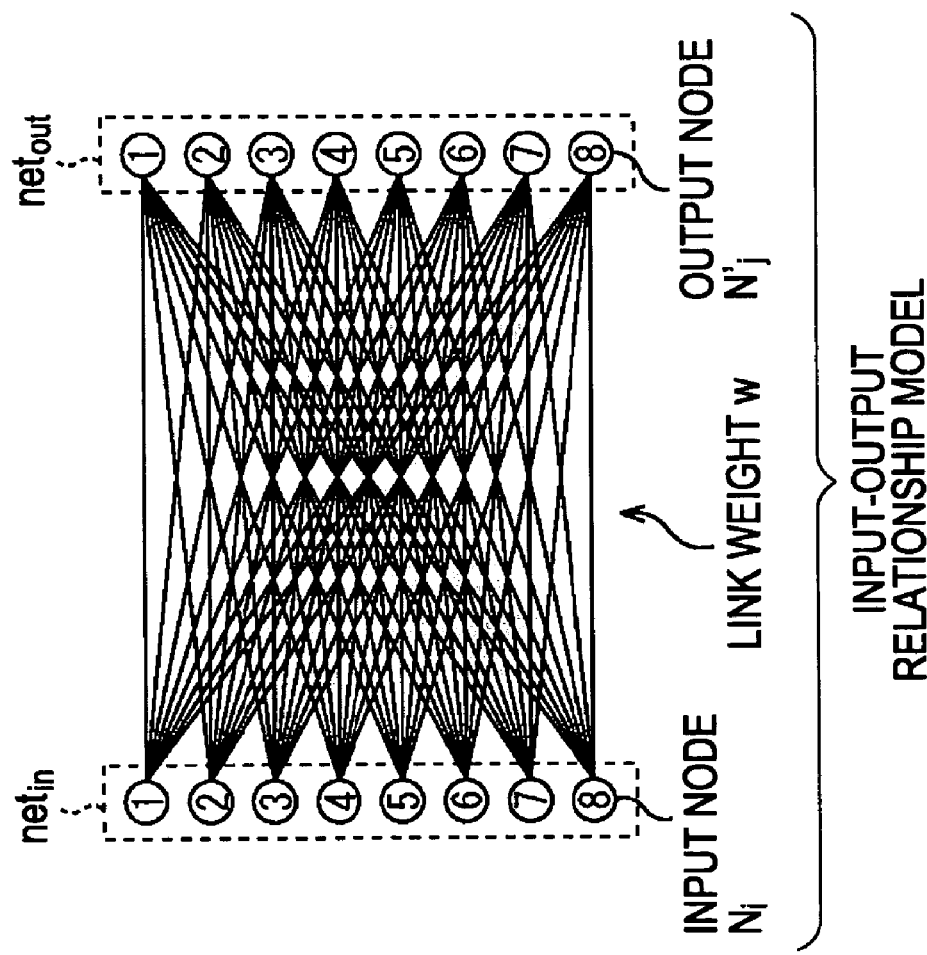

FIG. 23A illustrates an input-output relationship model.

The input-output relationship model of FIG. 23A includes one time series pattern storage networks $net_{in}$ and one time series pattern storage networks $net_{out}$ with the input nodes of the time series pattern storage network $net_{in}$ linked to the output nodes of the time series pattern storage network $net_{out}$. As shown in FIG. 23A, each of the time series pattern storage network $net_{in}$ and the time series pattern storage network $net_{out}$ includes eight nodes.

As shown in FIG. 23A, each of the input nodes of the time series pattern storage network $net_{in}$ is linked to all output nodes of the time series pattern storage network $net_{out}$ (therefore, each of the output nodes of the time series pattern storage network $net_{out}$ is also linked to all input nodes of the time series pattern storage networks $net_{in}$). There exist link weights w for all combinations of the input nodes of the time series pattern storage network $net_{in}$ and the output nodes of the time series pattern storage network $net_{out}$.

Two time series pattern storage networks with nodes thereof linked to each other are now considered. Each row is mapped to a respective node of one time series pattern storage network and each column now is mapped to a respective node of the other time series pattern storage network. FIG. 23B illustrates a link weight matrix MTX. Each element has at an i-th row and a j-th column a link weight w between an i-th node of the one time series pattern storage network and a j-th node of the other time series pattern storage network. The link weight updating unit 222 (FIG. 21) updates each link weight w of the link weight matrix MTX.

FIG. 23B illustrates the link weight matrix MTX of the input-output relationship model of FIG. 23A.

In the link weight matrix MTX of FIG. 23B, the input nodes are respectively mapped to the rows while the output nodes are respectively mapped to the columns. The link weight w between the i-th input node and the j-th output node is arranged as the element at the i-th row and the j-th column. The link weight updating unit 222 (FIG. 21) updates each link weight w in the link weight matrix MTX.

Upon power on, the link weight updating unit 222 initializes all link weights w in the link weight matrix MTX to zero as initial values. The supervising data, namely, the set of the input data and the output data, is input to the data processing apparatus of FIG. 21. The link weight updating unit 222 updates the link weight w with respect to the link between the winner nodes each time the label set is provided by the learning processor 221. The label set includes the input label representing the winner node in the input network $net_{in}$ and the output label representing the winner node in the output network $net_{out}$.

More specifically, the link weight updating unit 222 updates the link weight w in the link weight matrix MTX in accordance with the following equation (4):

$$W = (1-\beta)w + \beta \Delta w \qquad (4)$$

where β represents a learning rate representing the degree of updating of the link weight w, falling within a range from 0 to 1. The smaller the learning rate β, the less link weight w changes. If the learning rate β is zero, the link weight w does not change at all. The larger the learning rate β, the more the link weight w changes. If the learning rate β is 1, the link weight w is updated to an update reference value Δw.

The update reference value Δw is expressed by the following equation (5):

$$\Delta w = 1/(d+1) \qquad (5)$$

where d represents a inter-pattern distance to the winner node as in equation (3). A node serving a winner node has d=0. The update reference value Δw of a node serving as a winner node is 1. The larger the pattern distance d from the winner node, the closer the update reference value Δω approaches zero.

Let the input node $N_i$ represent the input node represented by the input label supplied from the learning processor 221 (FIG. 21) to the link weight updating unit 222, namely, the winner node in the input network $net_{in}$, and let the output node $N'_j$ represent the output node represented by the output label supplied from the learning processor 221 (FIG. 21) to the link weight updating unit 222, namely, the winner node in the output network $net_{out}$, and the link weight updating unit 222 updates the link weight w in the link weight matrix MTX in accordance with equations (4) and (5).

More specifically, the link weight updating unit 222 determines the update reference value Δw using the inter-pattern distance d between each output node of the output network $net_{out}$ and the output node $N'_j$ as the winner node of the output network $net_{out}$ in accordance with equation (5). Furthermore, the link weight updating unit 222 updates the link weight w to the i-th input node $N_i$ as the winner node of the input network $net_{in}$ using the update reference value Δw in accordance with equation (4).

The link weight updating unit 222 thus updates the link weight w at each column at the i-th row in the link weight matrix MTX corresponding to the input node $N_i$ as the winner node of the input network $net_{in}$.

Furthermore, the link weight updating unit 222 determines the update reference value Δw using the inter-pattern distance d between each input node of the input network $net_{in}$ and the input node $N_i$ as the winner node of the input network $net_{in}$ in accordance with equation (5). Furthermore, the link weight updating unit 222 updates the link weight w to the j-th output node $N'_j$ as the winner node of the output network $net_{out}$ using the update reference value Δw in accordance with equation (4).

The link weight updating unit 222 thus updates the link weight w at each row at the j-th column in the link weight matrix MTX corresponding to the output node $N'_j$ as the winner node of the output network $net_{out}$.

The link weight w between the input node $N_i$ as the winner node of the input network $net_{in}$ and the output node $N'_j$ as the winner node of the output network $net_{out}$ is updated when the link weight w between each output node of the output network $net_{out}$ and the input node $N_i$ as the winner node is updated or when the link weight w between each input node of the input network $net_{in}$ and the output node $N'_j$ of the winner node is updated.

The updating of the link weight w (link weight matrix MTX) is performed each time the supervising data, namely, the set of the input data and the output data, is input to the data processing apparatus of FIG. 21.

The learning process based on the input data to the input network $net_{in}$ in the input-output relationship model and the learning process based on the output data to the output network $net_{out}$ are performed each time the supervising data, namely, the set of the input data and the output data, is input to the data processing apparatus of FIG. 21.

As the learning of the input network $net_{in}$ and the output network $net_{out}$ is in progress, the time series pattern model 21 of a given input node represents a particular time series pattern. As the learning of the input network $net_{in}$ and the output network $net_{out}$ is in progress, the time series pattern model 21 of a given output node represents a particular time series pattern.

There might be a relationship between the input data having a particular time series pattern and the output data having a particular time series pattern. In response to the set of the input data and the output data (supervising data), an input node having the time series pattern model 21 representing the particular time series pattern in the input network $net_{in}$ becomes a winner node, and an output node having the time series pattern model 21 representing the other particular time series pattern in the output network $net_{out}$ becomes a winner node.

As previously discussed, the link weight between each input node of the input network $net_{in}$ and the winner node of the output network $net_{out}$ is updated with respect to the winner node of the input network $net_{in}$. The link weight between each output node of the output network $net_{out}$ and the winner node of the input network $net_{in}$ is updated with respect to the winner node of the output network $net_{out}$.

The link weight between each input node of the input network $net_{in}$ and the winner node of the output network $net_{out}$ is updated to be heavier as the input node has a smaller inter-pattern distance d to the winner node of the input node $N_i$. The link weight between each output node of the output network $net_{out}$ and the winner node of the input network $net_{in}$ is updated to be heavier as the output node has a smaller inter-patter distance d to the winner node of the output network $net_{out}$.

Conversely, the link weight between each input node of the input network $net_{in}$ and the winner node of the output network $net_{out}$ is updated to be lighter as the input node has a larger inter-pattern distance d to the winner node of the input node $N_i$. The link weight between each output node of the output network $net_{out}$ and the winner node of the input network $net_{in}$ is updated to be lighter as the output node has a larger inter-patter distance d to the winner node of the output network $net_{out}$.

A large number of units of supervising data may be provided, the learning of the input network $net_{in}$ and the output network $net_{out}$ may be in progress, and the updating of the link weight may be in progress. With the link weight, an input-output relationship model is acquired as a forward model or a backward model that relates the input data (time series pattern) to the output data (time series pattern).

Given the input-output relationship model as a forward model, a winner node most appropriately matching the input data in the input network $net_{in}$ is determined in response to input data, and an output node of the output network $net_{out}$ having heaviest link weight with the winner node is determined. Time series data is generated based on the output node (time series pattern model 21 of that output mode), and output data responsive to the given input data is thus inferred.

Given the input-output relationship model as a backward model, a winner node most appropriately matching the output data in the output network $net_{out}$ is determined in response to output data (target value), and an input node of the input network $net_{in}$ having heaviest link weight with the winner node is determined. Time series data is generated based on the input node (time series pattern model 21 of that input mode), and control data (input data) responsive to the given output data is thus inferred.

The link weight matrix MTX is stored in the storage unit 211 (FIG. 21) as part of the input-output relationship model.

Figure 24:
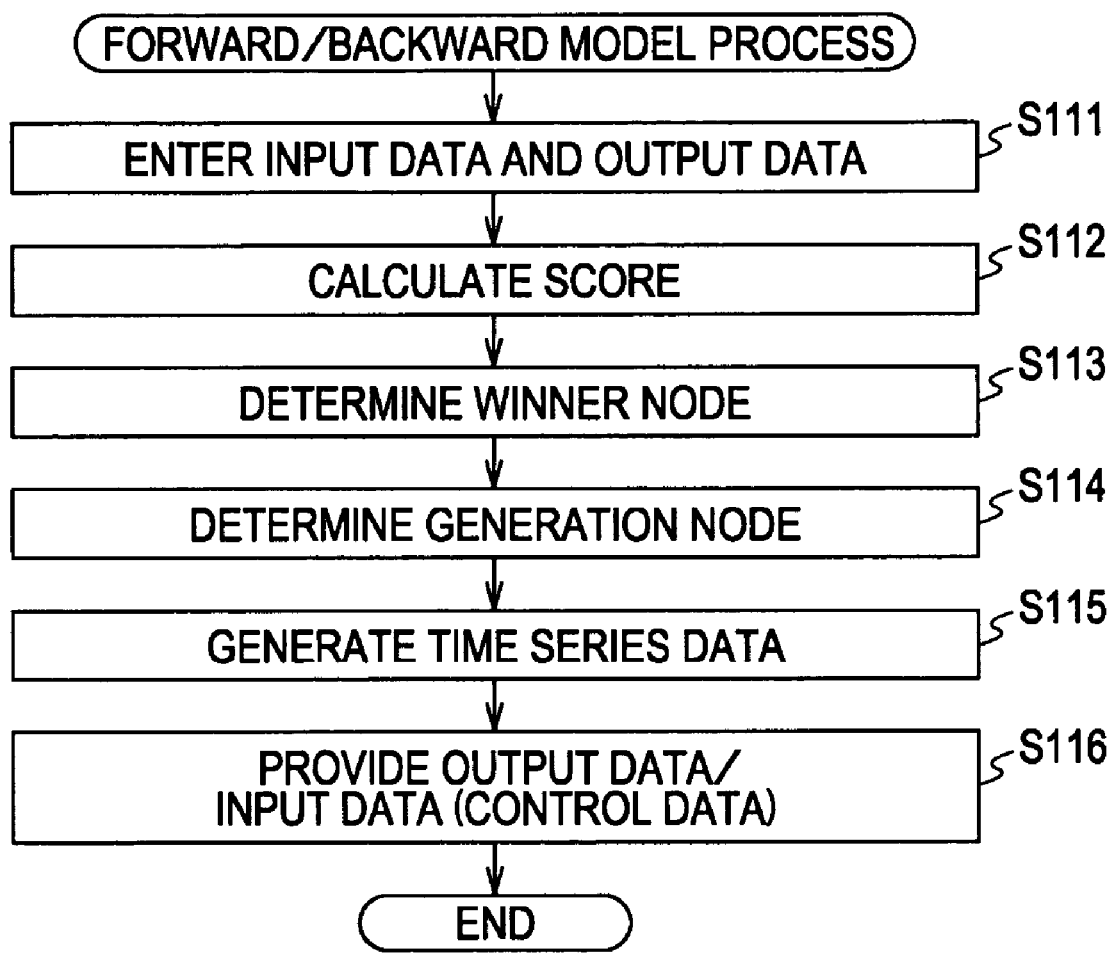
FIG. 24 is a flowchart illustrating a process of inferring output data or control data using the input-output relationship model.

A process of inferring the output data responsive to the input data and the control data (input data) responsive to the output data is described below with reference to a flowchart of FIG. 24. In the inference process, the input-output relationship model as one of the forward model and the backward model is used.

In step S111, the input data is input to the data processing apparatus of FIG. 21 to infer the output data responsive to the input data.

The input data input to the data processing apparatus is supplied to the score calculator 231 in the recognition generator 213.

In step S112, in response to the supplied input data, the score calculator 231 calculates the score of each node $N_i$ of the time series pattern storage network $net_{in}$ forming the input-output relationship model stored in the storage unit 211 and supplies the score to the winner node determiner 232.

In step S113, the winner node determiner 232 determines, as a winner node Ni, a node having the highest score provided by the score calculator 231, from among the nodes of the time series pattern storage network $net_{in}$ forming the input-output relationship model stored in the storage unit 211, and then supplies an input label representing the winner node $N_i$ to the generation node determiner 233.

In step S114, the generation node determiner 233 determines, as a generation node, a node $N'_j$ having the heaviest link weight with the node $N_i$ represented by the input label from the winner node determiner 232, from among the nodes of the time series pattern storage network $net_{out}$ forming the input-output relationship model stored in the storage unit 211, and supplies an output label representing the generation node $N'_j$ to the time series generator 234.

In step S115, the time series generator 234 generates time series data, as an inferred value of the output data responsive to the input data supplied to the recognition generator 213, based on the time series pattern model 21 (FIG. 7) of the node $N'_j$, represented by the output label from the generation node determiner 233, from among the nodes of the time series pattern storage network $net_{out}$ forming the input-output relationship model stored in the storage unit 211. In step S116, the time series generator 234 outputs the generated time series data.

To infer the control data (input data) responsive to the output data, the output data is input to the data processing apparatus of FIG. 21 in step S111.

The output data input to the data processing apparatus is supplied to the score calculator 231 in the recognition generator 213.

In step S112, in response to the supplied output data, the score calculator 231 calculates a score of each node $N'_j$ of the time series pattern storage network $net_{out}$ forming the input-output relationship model stored in the storage unit 211, and supplies the score to the winner node determiner 232.

In step S113, the winner node determiner 232 determines, as a winner node $N'_j$, a node having the highest score from the score calculator 231, among the nodes of the time series pattern storage network $net_{out}$ forming the input-output relationship model stored in the storage unit 211, and supplies an output label representing the winner node $N'_j$ to the generation node determiner 233.

In step S114, the generation node determiner 233 determines, as a generation node, a node $N_i$ having the heaviest link weight with the node $N'_j$ represented by the output label from the winner node determiner 232, from among the nodes of the time series pattern storage network $net_{in}$ forming the input-output relationship model stored in the storage unit 211. The generation node determiner 233 then supplies an input label representing the generation node $N_i$ to the time series generator 234.

In step S115, the time series generator 234 generates time series data as an inferred value of the control data (input data) responsive to the output data supplied to the recognition generator 213, based on the time series pattern model 21 of the node $N_i$, represented by the input label from the generation node determiner 233, from among the nodes of the time series pattern storage network $net_{in}$ forming the input-output relationship model stored in the storage unit 211. In step S116, the generated time series data is output.

Using the set of the input data and the output data, the input-output relationship model is learned, the object to be controlled is modeled into a forward model or a backward model, the object to be controlled is accurately represented, and the output data and the control data (input data) are inferred at a high accuracy level.

The above discussion implicitly assumes that both the input data and the output data are one-channel time series data. However, one of the input data and the output data can be multiple-channel time series data.

Figure 25A:
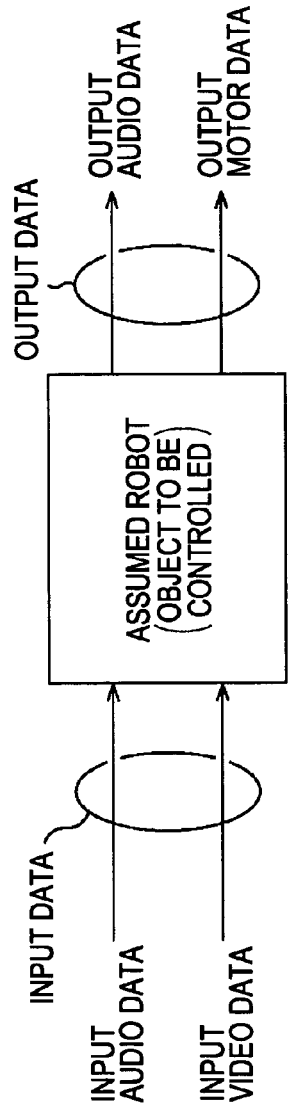
FIGS. 25A and 25B illustrate a robot as an object to be controlled and an input-output relationship model of the robot as a forward model.

FIG. 25A illustrates an assumed robot as an object to be controlled. The assumed robot may be modeled into a forward model using an input-output relationship model.

Upon receiving audio data or video data, the assumed robot of FIG. 25 outputs audio data (as a synthesized sound), or outputs motor data to move an arm with a motor running in response to the motor data.

Discriminated unit of data is now referred to as a channel. The robot of FIG. 25A receives two-channel time series data, i.e., audio data and video data. The robot of FIG. 25A also provides two-channel output data, i.e., audio data and motor data.

Time series data contained in each channel in the input data is hereinafter referred to as sub input data. The input data input to the robot of FIG. 25A contains, as sub input data, audio data and video data. Where appropriate, the audio data and the video data contained as the sub input data in the input data are respectively referred to as input audio data and input video data.

Time series data contained in each channel of the output data is referred to as sub output data. The output data output from the robot of FIG. 25A contains as sub output data the audio data and the motor data. The audio data and the motor data contained as the sub output data in the output data are respectively referred to as output audio data and output motor data.

A feature quantity is extracted from the input audio data on a per frame unit basis. A frame unit has a predetermined period of time. The feature quantity is a feature vector containing, as an element thereof, power of each of a plurality of bandwidths. The feature quantity is input to the robot as the sub input data. A feature quantity is extracted from the input video data at the same moment as the feature quantity of the input audio data or at a different moment of the feature quantity of the input audio data. The feature quantity of the input video data is a vector containing, as an element thereof, coordinates (x,y,z) of a position of an object shown in the input video data (image). The feature quantity of the input video data is input to the robot of FIG. 25A as the sub input data. The (x,y,z) coordinates of the position of the object is a three-dimensional system with the origin thereof placed at the center of gravity of the robot. The frontward direction of the robot is aligned with the x-axis, the rightward direction of the robot is aligned with the y-axis and the upward direction of the robot is aligned with the z-axis.

The output audio data output from the robot contains, as the sub output data, a time series vector containing, as an element thereof, at least one parameter specifying a frequency component of the output audio data.

The output motor data output from the robot contains, as the sub output data, a time series vector containing, as an element thereof, an angle of rotation or a rotational speed of the motor driving the arm.

As mentioned above, the input audio data and the input video data are concurrently input to the robot as the sub input data contained in the input data. The feature quantities of the input audio data and the input video data might be extracted at different time intervals. Even if the two quantities are extracted at the same time intervals, the timings of extraction might be different from each other. The feature quantity of the input video data cannot be acquired at the time at which the feature quantity of the input audio data is acquired. Conversely, the feature quantity of the input audio data cannot be acquired at the timing at which the feature quantity of the input video data is acquired. In other words, although a feature quantity of the sub input data of one channel may be present, a feature quantity of the sub input data of another channel may not be present. If sub input data has no feature quantity, the input data contains data indicating that no feature quantity is present therewithin.

As described above, the robot concurrently outputs the output audio data and the output motor data as the sub output data contained in the output data. Concurrently outputting audio (sound) and moving the arm may not be necessary. For example, outputting a sound may be needed while moving the arm may not be needed. Moving the arm may be needed while outputting a sound may not be needed. If outputting a sound is needed while moving the arm is not needed, the output data contains data indicating that the arm is not to be moved. If moving the arm is needed while outputting a sound is not needed, the output data contains data indicating that no sound is output.

As described above, for the sub input data having no feature quantity, the input data contains data indicating that no feature quantity is contained. Optionally, the input data may exclude sub input data if that sub input data has no feature quantity.

If outputting a sound is needed while moving the arm is not needed, data indicating that the arm is not to be moved is contained as the output motor data in the output data. Optionally, the corresponding output motor data may be entirely excluded from the output data. If moving the arm is needed while outputting a sound is not needed, the output audio data may be excluded from the output data.

In accordance with the input-output relationship model, the forward model of the robot is acquired even if one of the input data and the output data contains multiple-channel time series data (such as the sub input data and the sub output data).

Figure 25B:
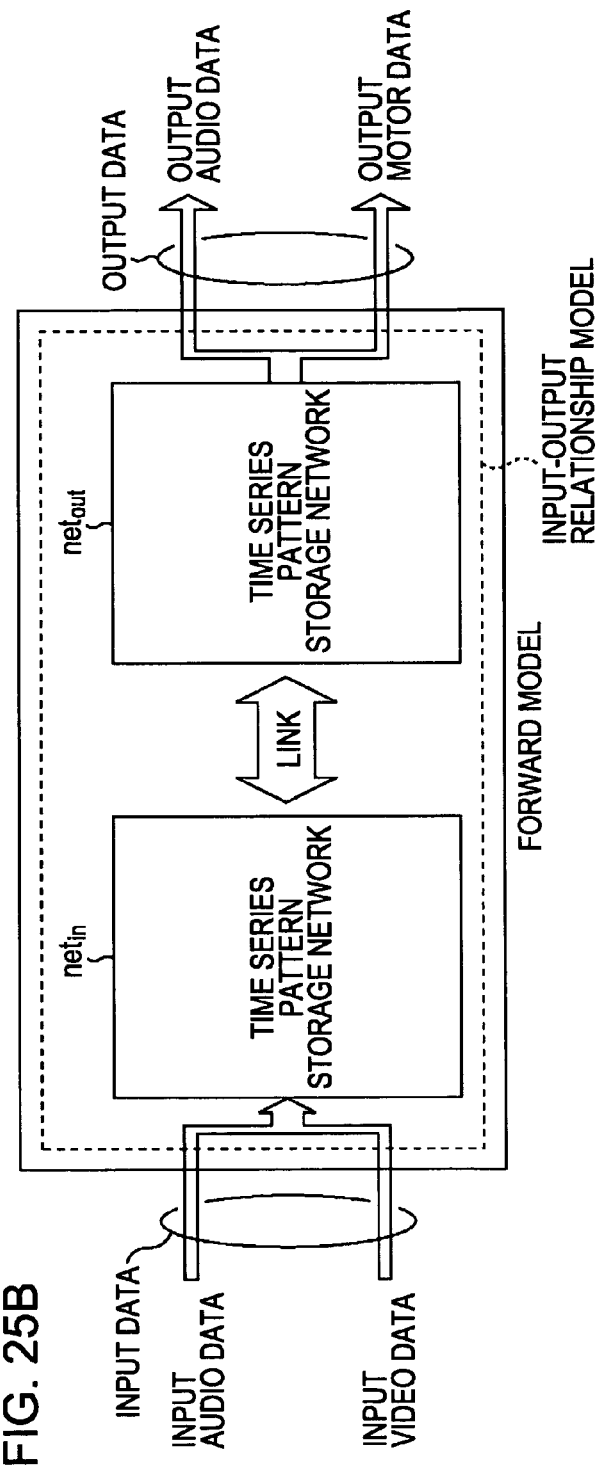

As shown in FIG. 25B, the input-output relationship model is supplied with a set of many units of input data input to the robot, and many units of output data output by the robot in response to the input data (supervising data). Using the supervising data, the learning of the input-output relationship model is performed, and then the forward model of the robot is obtained.

More specifically, the input network $net_{in}$ (time series pattern storage network) is learned in a self-organizing manner based on the input data of the supervising data while the output network $net_{out}$ (time series pattern storage network) is learned in a self-organizing manner based on the output data of the supervising data. The link weight between the input network $net_{in}$ and the output network $net_{out}$ is updated. The forward model (also the backward model) is thus obtained.

Each of the input network $net_{in}$ and the output network $net_{out}$ is a time series pattern storage network. The time series pattern storage network stores time series patterns of the same number as the number of nodes of the time series pattern storage network. The time series pattern storage network can thus classify (cluster) the time series data in classes (clusters) of the same number as the number of nodes held by the time series pattern storage network.

Since the time series pattern storage network classifies the time series data in each of the classes of the same number as the number of nodes, the number of nodes is preferably equal to or larger than the number of patterns of the time series data to be classified.

As described above, the input data contains the two-channel sub input data, namely, the input audio data and the input video data. For example, each of the input audio data and the input video data has 100 patterns, 10000 (100×100) patterns are expected as all combinations of the 100 patterns of the input audio data and the 100 patterns of the input video data.

The input network $net_{in}$ needs to be organized with a large number of nodes as many as 10000 nodes. As a result, the storage unit 211 (FIG. 21) storing the input-output relationship model including the input network $net_{in}$ needs a large memory size. Furthermore, the input network $net_{in}$ must learn time series patterns as many as 10000 in a self-organizing manner.

As described above, the output data contains the two-channel sub output data, namely, the output audio data and the output motor data. For example, each of the output audio data and the output motor data has 100 patterns, 10000 (100×100) patterns are expected as all combinations of the 100 patterns of the output audio data and the 100 patterns of the output motor data.

The output network $net_{out}$ needs to be organized with a large number of nodes as many as 10000 nodes. As a result, the storage unit 211 (FIG. 21) storing the input-output relationship model including the output network $net_{out}$ needs a large memory size. Furthermore, the output network $net_{out}$ must learn time series patterns as many as 10000 in a self-organizing manner.

If the input data contains multiple-channel sub input data, the input-output relationship model can be composed of input networks of the same number as the number of channels. Similarly, if the output data contains multiple-channel sub output data, the input-output relationship model can be composed of output networks of the same number as the number of channels.

As previously described with reference to FIGS. 25A and 25B, the input data contains the two-channel sub input data, namely, the input audio data and the input video data, and the output data contains the two-channel sub output data, namely, the output audio data and the motor video data. In such a case, the input-output relationship model may be composed of two input networks $net_{in1}$ and $net_{in2}$ corresponding to the two-channel sub input data contained in the input data, and two output networks $net_{out1}$ and $net_{out2}$ corresponding to the two-channel sub output data contained in the output data as shown in FIG. 26.

Figure 26:
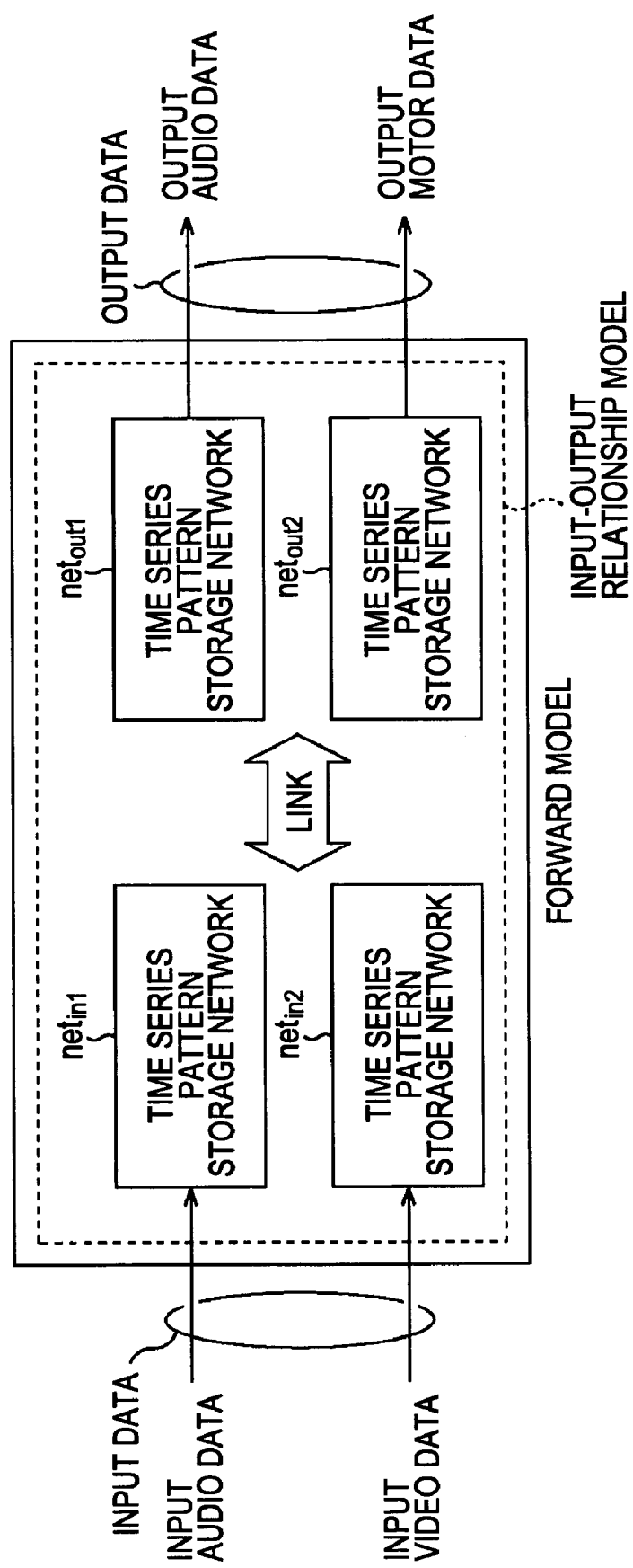
FIG. 26 illustrates an input-output relationship model as a forward model of an assumed robot.

The input-output relationship model of FIG. 26 includes the input network $net_{in1}$ corresponding to the input audio data of one channel of the two-channel sub input data contained in the input data, the input network $net_{in2}$ corresponding to the input video data of the other channel of the two-channel sub input data contained in the input data, the output network $net_{out1}$ corresponding to the output audio data of one channel of the two-channel sub output data contained in the output data, and the output network $net_{out2}$ corresponding to the output motor data of the other channel of the two-channel sub output data contained in the output data.

In the learning of the input-output relationship model using the supervising data, the input audio data of the input data in the supervising data is input to the input network $net_{in1}$ corresponding to the channel of the input audio data. The input video data is input to the input network $net_{in2}$ corresponding to the channel of the input video data. The output audio data of the output data in the supervising data is input to the output network $net_{out1}$ corresponding to the channel of the output audio data. The output motor data is input to the output network $net_{out2}$ corresponding to the channel of the output motor data.

The input network $net_{in1}$ is learned based on the input audio data, the input network $net_{in2}$ is learned based on the input video data, the output network $net_{out1}$ is learned based on the output audio data, and the output network $net_{out2}$ is learned based on the output motor data.

The sub input data contained the input data input to the assumed robot needs to be identified by channel. The above-described input data contains the input audio data and the input video data, and the input audio data and the input video data are identified from each other. Similarly, the sub output data contained in the output data output from the assumed robot needs to be identified by channel.

The input network corresponding to the sub input data contained in the input data may be known. In the learning of the input-output relationship model, the sub input data may be provided to the channel of that sub input data. Similarly, the input network corresponding to the sub output data contained in the output data may be known. In the learning of the input-output relationship model, the sub output data may be provided to the channel of that sub output data.

The learning of the input network $net_{in1}$ is performed in a self-organizing manner based on the input audio data as the sub input data of the channel corresponding to that input network $net_{in1}$, and the learning of the input network $net_{in2}$ is performed in a self-organizing manner based on the input video data as the sub input data of the channel corresponding to that input network $net_{in2}$. Similarly, the learning of the output network $net_{out1}$ is performed in a self-organizing manner based on the output audio data as the sub input data of the channel corresponding to that output network $net_{out1}$, and the learning of the output network $net_{out2}$ is performed in a self-organizing manner based on the output motor data as the sub output data of the channel corresponding to that output network $net_{out2}$.

As described above, if the input data contains the sub input data of a plurality of channels, the input-output relationship model is constructed of input networks of the same number as the number of the channels of the sub input data contained in the input data, and if the output data contains the sub output data of a plurality of channels, the input-output relationship model is constructed of output channels of the same number as the number of channels of the sub output data contained in the output data. With the output networks of the same number as the number of channels of the sub output data contained in the output data, each of the input network and the output network can be constructed of a smaller number of nodes than the case in which the input-output relationship model is constructed of a single input network or a single output network. The number of time series patterns to be learned in a self-organizing manner becomes smaller in each of the input network and the output network.

The input data might contain two-channel sub input data, namely, input audio data and input video data, and the input audio data might have 100 patterns and the input video data might have 100 patterns. The input network $net_{in1}$ responsive to the input audio data is simply constructed of 100 nodes or so, and the input network $net_{in2}$ responsive to the input video data is simply constructed of 100 nodes or so. The number of time series patterns to be learned in each of the input network $net_{in1}$ and the input network $net_{in2}$ is 100 or so.

The output data might contain two-channel sub output data, namely, output audio data and output motor data, and the output audio data might have 100 patterns and the output motor data might have 100 patterns. The output network $net_{out1}$ responsive to the output audio data is simply constructed of 100 nodes or so, and the output network $net_{out2}$ responsive to the output motor data is simply constructed of 100 nodes or so. The number of time series patterns to be learned in each of the output network $net_{out1}$ and the output network $net_{out2}$ is 100 or so.

The storage unit 211 storing the input-output relationship model with a smaller memory size works, and the learning of the input-output relationship model is efficiently performed.

The input data might contain sub input data of m channels (m is a positive integer), and the output data might contain sub output data of n channels (n is a positive integer). As previously described with reference to FIG. 26, an input-output relationship model might contain m input networks equaling in number the m channels of sub input data contained in the input data, and n output networks equaling in number the n channels of sub output data contained in the output data. How the nodes of the input networks and the output networks are linked becomes a concern. Furthermore, how the link weight of the nodes is updated in the learning of the input-output relationship model also becomes a concern.

The relationship between the sub input data of one channel and the sub output data of another channel may be known. For example, the sub output data of one channel may be output in response to sub input data of another channel. Link between the nodes of the input network and the output network in such a case is described below.

The relationship between the sub input data of one channel and the sub output data of another channel may be known in the cases discussed below. In a first case, an object to be controlled is known to output sub output data of one channel in response to sub input data of another channel. In a second case, the sub output data of one channel to be output in response to the sub input data of another channel is predetermined. In the second case, for example, the robot as the object to be controlled is designed to output the sub output data of one channel in response to the sub input data of another channel.

As previously discussed with reference to FIGS. 25A and 25B, the input data might contain the two-channel sub input data, namely, input audio data and input video data, and the output data might contain the two-channel sub output data, namely, output audio data and output motor data. As previously discussed with reference to FIG. 26, the input-output relationship model contains the two input networks $net_{in1}$ and $net_{in2}$ corresponding to the two channels of the input audio data and the input video data in the input data, and the two output networks $net_{out1}$ and $net_{out2}$ corresponding to the two channels of the output audio data and the output motor data in the output data.

Figure 27A:
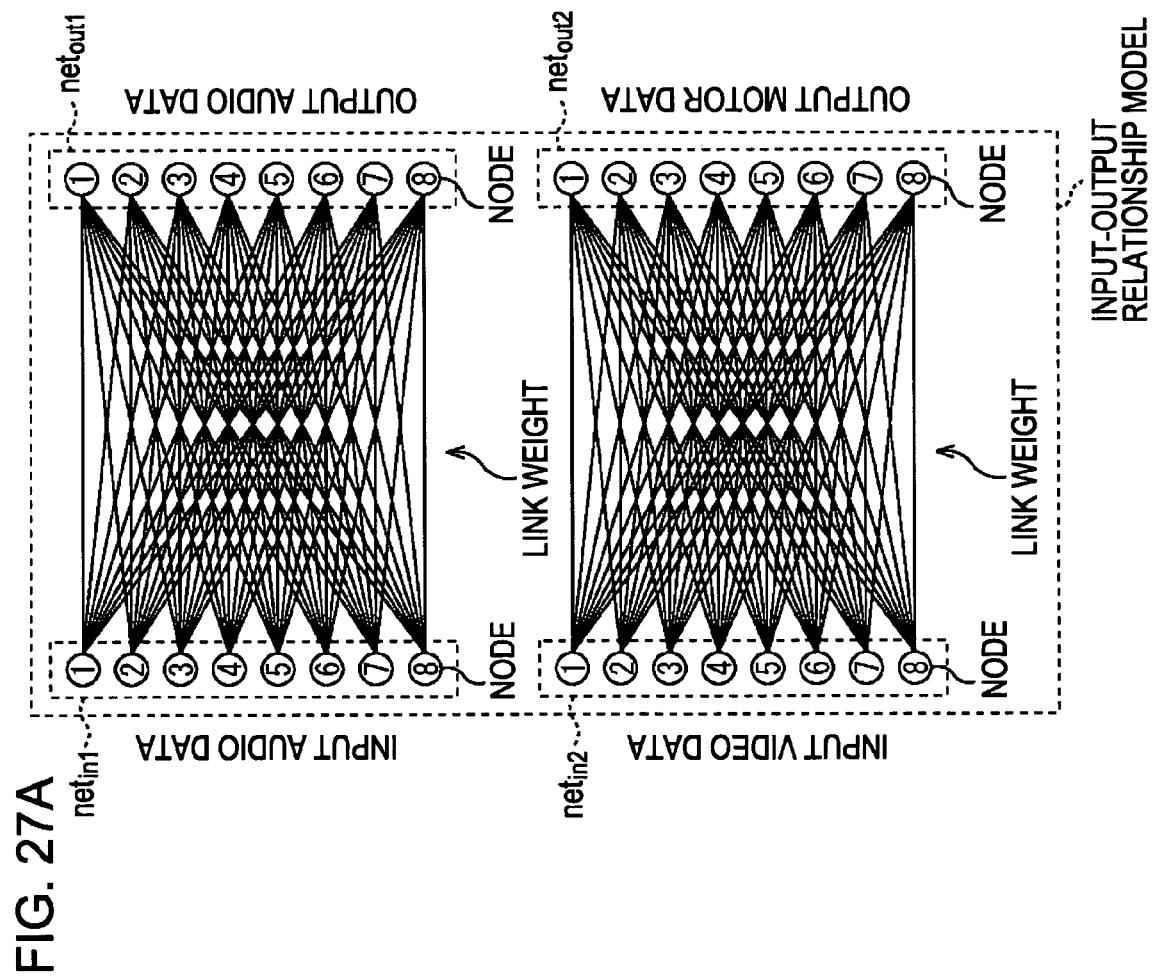
FIGS. 27A-27C illustrate an input-output relationship model.
Figure 27B:
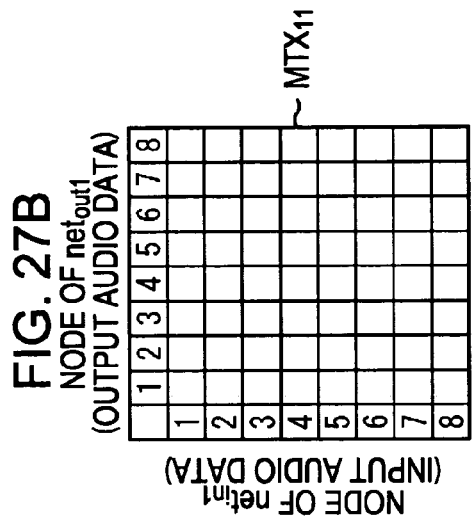
Figure 27C:
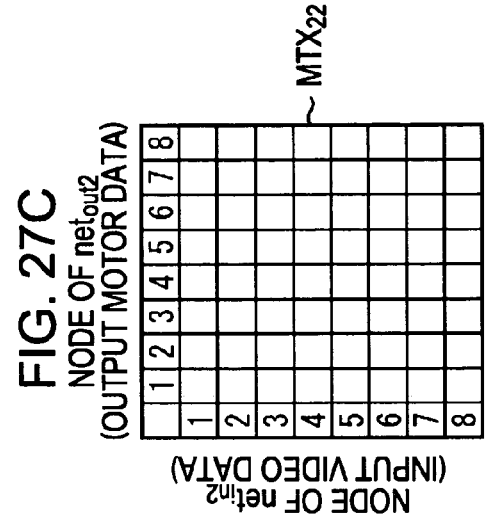

FIGS. 27A-27C illustrate an input-output relationship model and link weight matrices thereof. It is known herein that there is a relationship between input video data and output motor data (i.e., no relationship between input audio data and the output motor data and no relationship between input video data and output audio data).

FIG. 27A illustrates the input-output relationship model in which it is known beforehand that there is a relationship between the input audio data and the output audio data and that there is a relationship between the input video data and the output motor data.

In this input-output relationship model, the nodes of the time series pattern storage networks of the sub input data and the sub output data linked to the sub input data are mutually linked.

As shown in FIG. 27A, each of the input nodes of the input network $net_{in1}$ corresponding to the input audio data is linked to each of the output nodes of the output network $net_{out1}$ corresponding to the output audio data. Each of the input nodes of the input network $net_{in2}$ corresponding to the input video data is linked to each of the output nodes of the output network $net_{out2}$ corresponding to the output motor data.

Referring to FIGS. 27A-27C (also FIGS. 30A-30E, FIGS. 36A-36E, FIGS. 40A and 40B, FIGS. 41A-41F, and FIGS. 43A and 43B), the number of nodes of each of the input network $net_{in1}$, the input network $net_{in2}$, the output network $net_{out1}$ and the output network $net_{out2}$ is eight. The number of nodes of each of the input network $net_{in1}$, the input network $net_{in2}$, the output network $net_{out1}$ and the output network $net_{out2}$ is not limited to eight. The input network $net_{in1}$, the input network $net_{in2}$, the output network $net_{out1}$ and the output network $net_{out2}$ do not necessarily have the same number of nodes.

FIGS. 27B and 27C illustrate the link weight matrices of the input-output relationship model of FIG. 27A.

In the input-output relationship model of FIG. 27A, each of the input nodes of the input network $net_{in1}$ is linked to each of the output nodes of the output network $net_{out1}$ corresponding to the output audio data, and each of the input nodes of the input network $net_{in2}$ corresponding to the input video data is linked to each of the output nodes of the output network $net_{out2}$ corresponding to the output motor data.

The number of link weight matrices equals the number of sets of time series pattern storage networks with the nodes thereof linked.

FIG. 27B illustrates a link weight matrix $MTX_{11}$. In the link weight matrix $MTX_{11}$, the rows are respectively mapped the input nodes of the input network $net_{in1}$ while the columns are respectively mapped the output nodes of the output network $net_{out1}$. The link weight w between an i-th input node of the input network $net_{in}$ and a j-th output node of the output network $net_{out1}$ is arranged as an element at an i-th row and a j-th column of the link weight matrix $MTX_{11}$.

FIG. 27C illustrates a link weight matrix $MTX_{22}$. In the link weight matrix $MTX_{22}$, the rows are respectively mapped to the input nodes of the input network $net_{in2}$ while the columns are respectively mapped to the output nodes of the output network $net_{out2}$. The link weight w between an i-th input node of the input network $net_{in2}$ and a j-th output node of the output network $net_{out2}$ is arranged as an element at an i-th row and a j-th column in the link weight matrix $MTX_{22}$.

The link weight updating unit 222 (FIG. 21) updates the link weights w as the elements of the two link weight matrices $MTX_{11}$ and MTX22 shown in FIGS. 27B and 27C in the learning of the input-output relationship model of FIG. 27A.

The learning process of the input-output relationship model is described below with reference to a flowchart of FIG. 28. The storage unit 211 in the data processing apparatus of FIG. 21 stores the input-output relationship model of FIG. 27A. The input-output relationship model is composed of m-channel input networks and n-channel output networks.

In step S121, the supervising data, namely, a set of input data and output data, is input to the data processing apparatus of FIG. 21, and then fed to the learning processor 221 in the learning section 212.

In step S122, the learning processor 221 divides the m-channel sub input data, contained in the input data of the supervising data, into sub input data by channel while also dividing the n-channel sub output data, contained in the output data of the supervising data, into sub output data by channel.

In step S123, the learning processor 221 updates in a self-organizing manner each of m input networks in the input-output relationship model stored in the storage unit 211 based on the sub input data of the channel corresponding to the input network in the input data.

As shown in FIG. 27A, the input-output relationship model might contain the input network $net_{in1}$ corresponding to the input audio data, and the input network $net_{in2}$ corresponding to the input video data, and the input data might contain the input audio data and the input video data. In step S123, then, the input network $net_{in1}$ of the input-output relationship model is updated in a self-organizing manner based on the input audio data as the corresponding sub input data, and the input network $net_{in2}$ of the input-output relationship model is updated in a self-organizing manner based on the input video data as the corresponding sub input data.

In step S124, the learning processor 221 updates in a self-organizing manner each of n output networks in the input-output relationship model stored in the storage unit 211 based on the sub output data of the channel corresponding to the output network in the output data.

As shown in FIG. 27A, the input-output relationship model might contain the output network $net_{out1}$ corresponding to the output audio data, and the output network $net_{out2}$ corresponding to the output motor data, and the output data might contain the output audio data and the output motor data. In step S124, then, the output network $net_{out1}$ of the input-output relationship model is updated in a self-organizing manner based on the output audio data as the corresponding sub output data, and the output network $net_{out2}$ of the input-output relationship model is updated in a self-organizing manner based on the output motor data as the corresponding sub output data.

The learning processor 221 supplies the link weight updating unit 222 with node labels of the nodes that have become winner nodes when the m-channel input networks and the n-channel output networks are updated.

The link weight updating unit 222 receives the node labels from the learning processor 221. The received node labels include the node label of the node that has become the winner node of each of the m-channel input networks, and the node label of the node that has become the winner node of each of the n-channel output networks. In step S125, one of mxn sets of the m-channel input networks and the n-channel output networks with nodes linked to each other is selected as a set of interest. Processing proceeds to step S126.

In step S126, the link weight updating unit 222 updates the link weight in the link weight matrix of the set of interest, namely, the element in the link weight matrix having the input node of the input network forming the set of interest mapped to a corresponding row and the output node of the output network forming the set of interest mapped to a respective column. More specifically, the link weight updating unit 222 updates the link weight as each element in the link weight matrix based on the winner node represented by the node labels supplied from the learning processor 221 as discussed with reference to FIG. 23.

The link weight updating unit 222 recognizes the winner node of the input network forming the set of interest and the winner node of the output network forming the set of interest based on the node labels supplied from the learning processor 221. The link weight updating unit 222 further updates the link weight between each node of the input network with respect to the winner node of the input network and the winner node of the output network in accordance with equation (4). The link weight updating unit 222 also updates the link weight between each node of the output network with respect to the winner node of the output network and the winner node of the input network in accordance with equation (4).

In the input-output relationship model of FIG. 27A, a set of the input network $net_{in1}$ and the output network $net_{out1}$ with the nodes thereof linked to each other is selected as a set of interest, and a set of the input network $net_{in2}$ and the output network $net_{out2}$ with the nodes thereof linked to each other is selected as a set of interest.

If the set of the input network $net_{in1}$ and the output network $net_{out1}$ is selected as a set of interest, the link weights forming the elements of the link weight matrix $MTX_{11}$ of FIG. 27B are updated in step S126. If the set of the input network $net_{in2}$ and the output network $net_{out2}$ is selected as a set of interest, the link weights forming the elements of the link weight matrix $MTX_{22}$ of FIG. 27C are updated in step S126.

Subsequent to step S126, processing proceeds to step S127. The link weight updating unit 222 determines whether updating of link weight matrices of all sets networks with nodes thereof linked to each other, out of the mxn sets of the m-channel input networks and the n-channel output networks (link weights as the elements in the link weight matrix) has been completed.

If it is determined in step S126 that updating of the link weight matrices of all sets of networks with nodes linked to each other, out of the mxn sets of the m-channel input networks and the n-channel output networks has not been completed, in other words, if it is determined in step S126 that any set of networks with nodes linked to each other remains to be selected as a set of interest, processing returns to step S125. The link weight updating unit 222 selects, as a set of interest, one of the unselected sets of networks with nodes linked to each other, out of the mxn sets of the m-channel input networks and the n-channel output networks, and then repeats the same process as described above.

If it is determined in step S126 that updating of the link weight matrices of all sets with nodes linked to each other, out of the mxn sets of the m-channel input networks and the n-channel output networks has been completed, processing returns to step S121. When new supervising data is received, the same process as described above is repeated.

In response to the reception of a large number of units of supervising data, and steps S121 through S127 are repeated. The input-output relationship model stored in the storage unit 211 thus becomes a forward model or a backward model responsive to the object to be controlled.

In the input-output relationship model of FIG. 27A, each of the nodes of the single input network $net_{in1}$ is linked to each of the nodes of the single output network $net_{out1}$, and each of the nodes of the single input network $net_{in2}$ is linked to each of the nodes of the single output network $net_{out2}$. Furthermore, each of the nodes of the single output network $net_{out1}$ is linked to each of the nodes of the single input network $net_{in1}$ and each of the nodes of the output network $net_{out2}$ is linked to each of the nodes of the input network $net_{in2}$.

The self-organizing learning of each of the input network $net_{in1}$ and the output network $net_{out1}$ with the nodes thereof linked to each other and the updating of the link weight matrix $MTX_{11}$ of the set of the input network $net_{in1}$ and the output network $net_{out1}$ are performed separately from the self-organizing learning of each of the self-organizing learning of each of the input network $net_{in2}$ and the output network $net_{out2}$ with the nodes thereof linked to each other and the updating of the link weight matrix $MTX_{22}$ of the set of the input network $net_{in2}$ and the output network $net_{out2}$.

More specifically, the self-organizing learning of each of the input network $net_{in1}$ and the output network $net_{out1}$ with the nodes thereof linked to each other and the updating of the link weight matrix $MTX_{11}$ of the set of the input network $net_{in1}$ and the output network $net_{out1}$ are performed by providing only a set of the input audio data contained in the input data and the output audio data contained in the output data. Separately from this operation, the self-organizing learning of each of the self-organizing learning of each of the input network $net_{in2}$ and the output network $net_{out2}$ with the nodes thereof linked to each other and the updating of the link weight matrix $MTX_{22}$ of the set of the input network $net_{in2}$ and the output network $net_{out2}$ are performed by providing only a set of the input video data contained in the input data and the output motor data contained in the output data.

Figure 28:
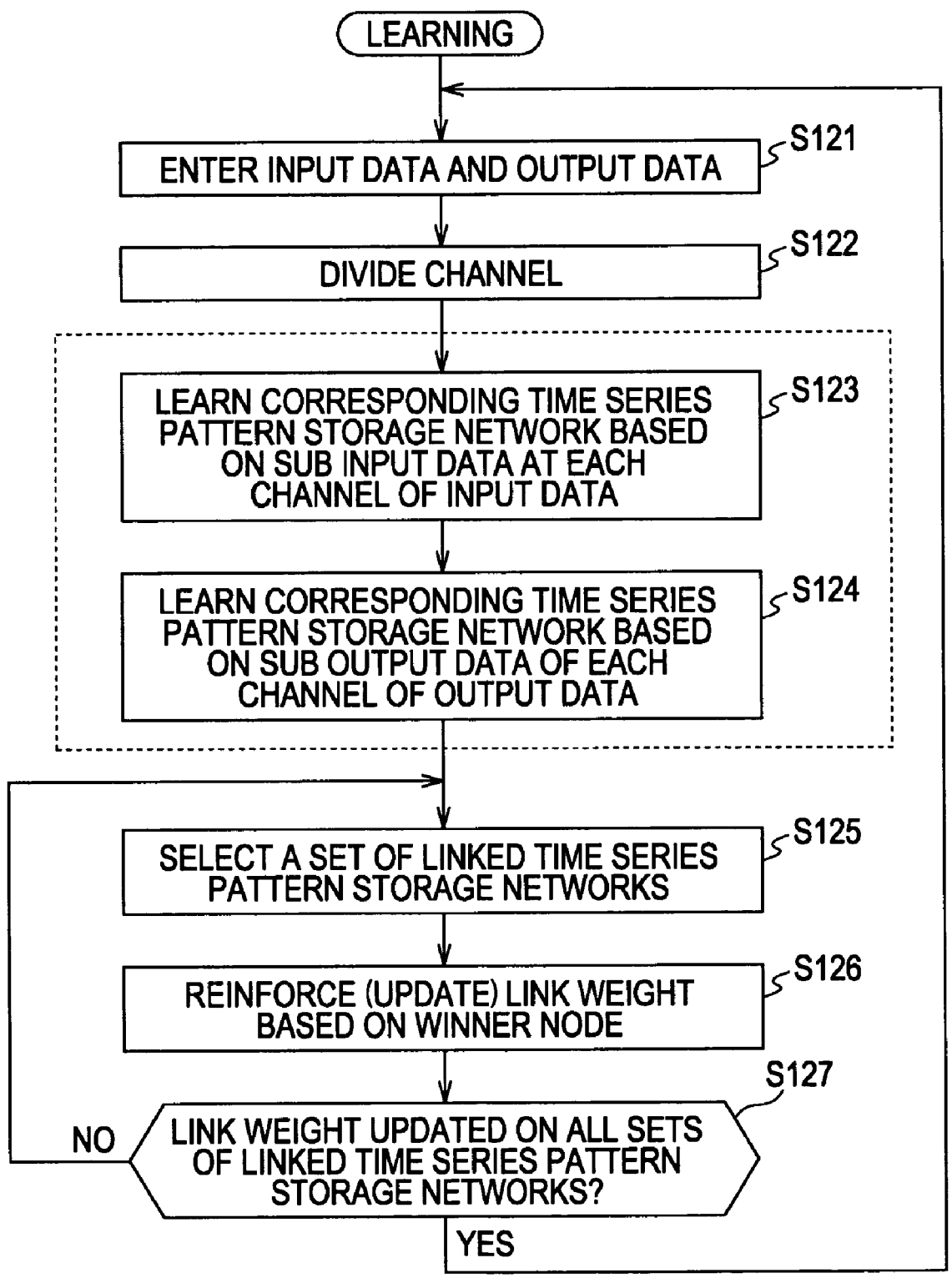
FIG. 28 is a flowchart illustrating a learning process of the input-output relationship model.
Figure 29:
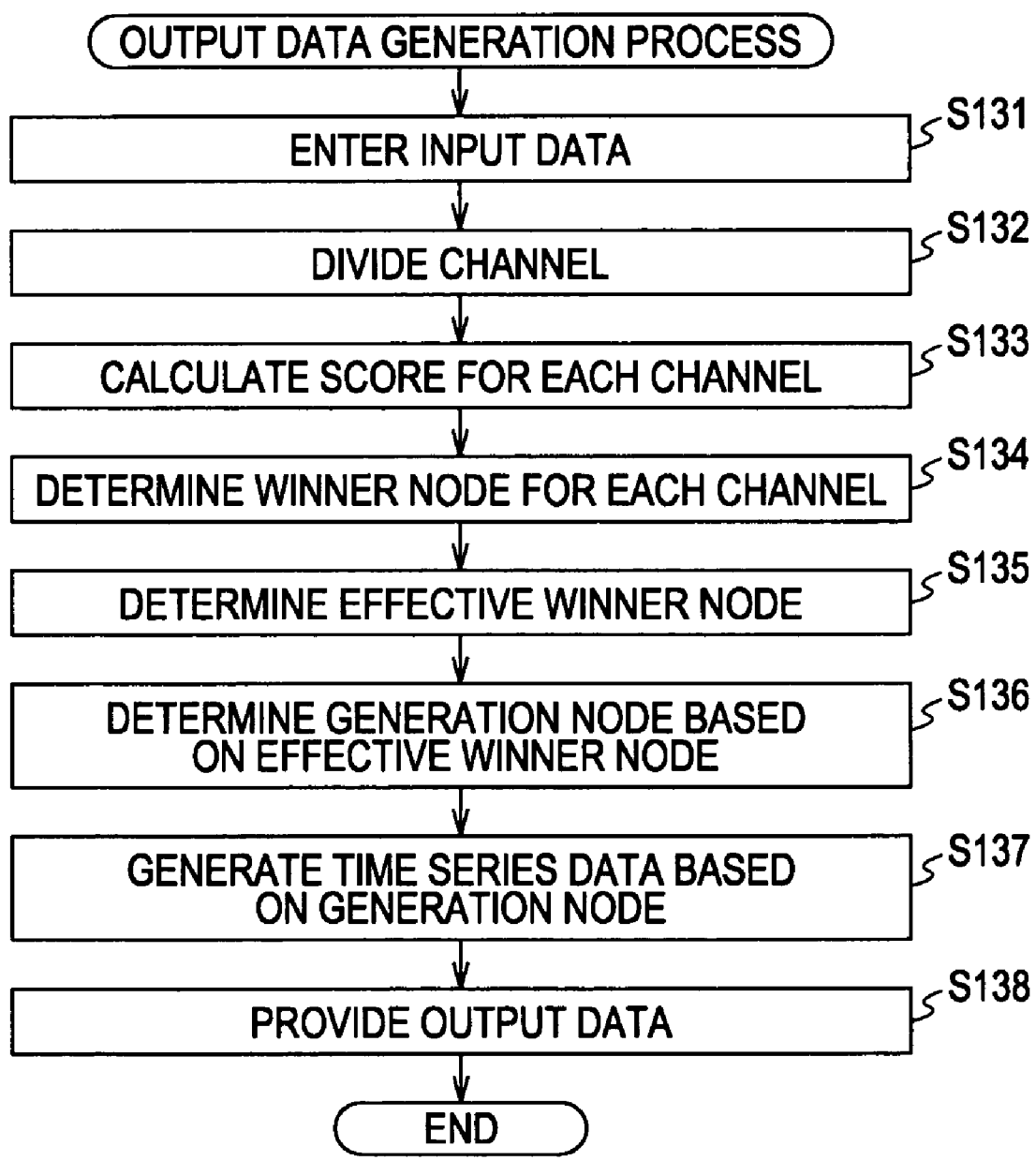
FIG. 29 is a flowchart illustrating a process of inferring output data using the input-output relationship model.

With reference to a flowchart of FIG. 29, a process of the data processing apparatus of FIG. 21 for inferring output data responsive to input data is described. The data processing apparatus uses as the forward model the input-output relationship model, the learning of which has been discussed with reference to FIG. 28.

For simplicity of explanation, in the input-output relationship model including the m-channel input networks and the n-channel output networks, each node of one output network is linked to each node of only one input network rather than a plurality of input networks. If one input node is determined as a winner node in the input network and a output node having the heaviest link weight with the winner node is determined in the output network, that output node is only one in each output network.

In step S131, the input data for use in inference of the output data is input to the data processing apparatus of FIG. 21.

The input data input to the data processing apparatus is supplied to the score calculator 231 in the recognition generator 213 (FIG. 21).

In step S132, the score calculator 231 divides the m-channel sub input data, contained in the input data, into input data by channel, and proceeds to step S133.

In step S133, the score calculator 231 calculates the sub input data contained in the input data on a per channel basis.

In step S133, the score calculator 231 calculates the score of each input node of the input network, corresponding to sub input data of one channel into which the input data is divided, from among the m input networks in the input-output relationship model stored in the storage unit 211, and supplies the calculated score to the winner node determiner 232.

In step S133, the score calculator 231 calculates the score of each input node of the input network, corresponding to sub input data of another channel and supplies the calculated score to the winner node determiner 232. Processing proceeds to step S134.

In step S134, the winner node determiner 232 determines, as a winner node most appropriately matching the sub input data of one channel, an input node having the highest score from the score calculator 231, from among the input nodes of the input network of the sub input data of the corresponding channel.

In step S134, the winner node determiner 232 also determines, as a winner node most appropriately matching the sub input data of another channel, an input node having the highest score from the score calculator 231, from among the input nodes of the input network of the sub input data of the other channel. When the winner node determiner 232 determines the winner nodes for all m input networks, processing proceeds to step S135.

In step S135, the winner node determiner 232 determines an effective winner from among the winner nodes of the m input networks.

For example, the winner node determiner 232 compares the scores of the winner nodes of the m input networks with an appropriate threshold value, and determines a winner having a score higher than the threshold value as an effective winner node.

The score of the winner node represents similarity of the time series pattern model 21 of that winner node to the sub input data that is used in score calculation. Selecting as an effective winner node a winner node having a score higher than a predetermined threshold value means selecting, as an effective winner node, only a winner node having a time series pattern model 21 having a predetermined similarity level or higher with the sub input data.

The determination method of determining the effective winner node is not limited to the above-mentioned comparison method of comparing the winner node score with the predetermined threshold value.

For example, the sub input data corresponding to the input network is determined in a pre-process as to whether the sub input data is effective or not. The winner node of the input network corresponding to the sub input data determined to be effective is determined as an effective winner node.

If the sub input data is audio, an audio period is detected based on power of audio data and the pre-process of determining whether the sub input data is effective or not is performed based on the audio period. For example, sub input data (audio data) within the audio period is determined to be effective, and sub input data outside the audio period is determined to be ineffective.

If the sub input data is video data, a color and motion of an object in the sub input data are detected and the effective determination is performed based on the color and motion of the object. For example, if the color of the object is a particular one, or if the object is moving, the sub input data is determined to be effective. If the object has a color other than the particular color, or if the object is stationary, the sub input data is determined to be ineffective.

If the sub input data is audio data, the determination that the sub input data (audio data) is effective within the audio period means the determination that the sub input data indicates not mute sound but significant sound. The winner node of the input network corresponding to the sub input data determined to be effective is determined to be an effective node. The determination of the effective winner node means the determination that the sub input data of the channel corresponding to the input network having the effective winner node as the winner node is effective.

In step S135, the winner node determiner 232 determines the effective winner nodes of the number falling within a range from a minimum of 0 to a maximum of m. If the number of effective winner nodes is zero, the recognition generator 213 (FIG. 21) ends the process.

If the number of effective winner nodes is at least one, the winner node determiner 232 supplies a node label representing at least one effective winner node to the generation node determiner 233 and proceeds to step S136.

In step S136, the generation node determiner 233 determines, as a generation node, an output node having the heaviest link weight with at least one effective winner node represented by the node label from the winner node determiner 232, from among the output nodes of the n output networks forming the input-output relationship model stored in the storage unit 211. The output nodes of the same number as the number of at least one effective winner node are thus determined as the generation nodes.

The generation node determiner 233 supplies the time series generator 234 with the node label representing at least one generation node, and then proceeds from step S136 to S137.

In step S137, the time series generator 234 generates time series data as an inferred value of the output data responsive to the input data supplied to the recognition generator 213, based on the time series pattern model 21 (FIG. 7) held by at least one generation node, represented by the node label from the generation node determiner 233, from among the output nodes of the output network forming the input-output relationship model stored in the storage unit 211. In step S138, the generated time series data is output.

As described above, at least one output node having the heaviest link weight with at least one effective winner node, from among the output nodes of the n output networks, is determined as the generation node. Time series data of at least one channel is generated as the output data based on the time series pattern model 21 held by at least one generation node.

As previously discussed with reference to FIGS. 27B and 27C, the input-output relationship model contains the input network $net_{in1}$ corresponding to the input audio data, the input network $net_{in2}$ corresponding to the input video data, the output network $net_{out1}$ corresponding to the output audio data, and the output network $net_{out2}$ corresponding to the output motor data. The input network $net_{in1}$ (nodes) is mutually linked to the output network $net_{out1}$ while the input network $net_{in2}$ is mutually linked to the output network $net_{out2}$. If the winner node of the input network $net_{in1}$ only is determined as the effective winner node, the output node of the output network $net_{out1}$ having the heaviest link weight with the winner node is determined to be the generation node. The output audio data is generated based on the time series pattern model 21 held by the generation node, and the output data containing sub output data of one channel as the output audio data is output. As previously discussed, the output motor data as the sub output data of the other channel contained in the output data is time series data indicating that the arm is not to be moved.

If the winner node of the input network $net_{in2}$ only is determined to be the effective winner node, an output node of the output network $net_{out2}$ having the heaviest link weight with the effective winner node is determined to be the generation node. The output motor data is generated based on the time series pattern model 21 held by the generation node, and the output motor data containing sub output data of one channel as the output motor data is output. As previously discussed, the output audio data as the sub output data of the other channel contained in the output data is time series data indicating that no sound is output.

If input nodes of the input networks $net_{in1}$ and $net_{in2}$ are determined as the effective winner nodes, an output node of the output network $net_{out1}$ having the heaviest link weight with the effective winner node of the input network $net_{in1}$ is determined to be the generation node, and an output node of the output network $net_{out2}$ having the heaviest link weight with the effective winner node of the input network $net_{in2}$ is determined to be the generation node. The output audio data is generated based on the time series pattern model 21 of the generation node of the output network $net_{out1}$, and the output motor data is generated based on the time series pattern model 21 of the generation node of the output network $net_{out2}$. The output data containing the output audio data and the output motor data as the sub output data is output.

In the robot having the input-output relationship model of FIG. 27A as a forward model, a sound is output, or the arm is moved, or a sound is output with the arm moving at the same time.

The above-referenced input-output relationship model can be used as a backward model. In this case, a process of inferring input data (control data) responsive to output data is performed. The process of inferring the input data responsive to the output data is identical to the process discussed with reference to FIG. 29 except that the word "output" is substituted for the word "input" and the word "input" is substituted for the word "output." The discussion of the inference process of the backward model is thus omitted herein.

The relationship between the sub input data of the input data and the sub output data of the output data might be unknown, in other words, it might be unknown whether there is a relationship between the sub input data of one channel in the input data and the sub output data of another channel in the output data. The link between the nodes of the input network and the output network in such a case will be described below.

As previously discussed with reference to FIGS. 25A and 25B, the input data contains the two-channel sub input data, namely, the input audio data and the input video data, and the output data contains the two-channel sub output data, namely, the output audio data and the output motor data. With reference to FIG. 26, the input-output relationship model contains the two input networks $net_{in1}$ and $net_{in2}$ corresponding to the input audio data and the input video data, as the two-channel sub input data, contained in the input data, and the two output networks $net_{out1}$ and $net_{out2}$ corresponding to the output audio data and the output motor data, as the two-channel sub output data, contained in the input data.

FIGS. 30A-30C illustrate an input-output relationship model and link weight matrices thereof. In the input-output relationship model, it is unknown whether there is a relationship between the input audio data and one of the output audio data and the output motor data, or it is unknown whether there is a relationship between the input video data and one of the output audio data and the output motor data.

FIG. 30A illustrates the input-output relationship model in which it is unknown whether there is a relationship between the input audio data and one of the output audio data and the output motor data, or it is unknown whether there is a relationship between the input video data and one of the output audio data and the output motor data.

In the input-output relationship model, each of all nodes of the input network is linked to each of all nodes of the output network and each of all nodes of the output network is linked to each of all nodes of the input network.

As shown in FIG. 30A, in the input-output relationship model, each of the input nodes of the input network $net_{in1}$ corresponding to the input audio data is linked to each of the output nodes of the output network $net_{out1}$ corresponding to the output audio data and each of the input nodes of the input network $net_{in1}$ corresponding to the input audio data is linked to each of the output nodes of the output network $net_{out2}$ corresponding to the output motor data. Furthermore, each of the input nodes of the input network $net_{in2}$ corresponding to the input video data is linked to each of the output nodes of the output network $net_{out1}$ corresponding to the output audio data and each of the input nodes of the input network $net_{in2}$ corresponding to the input video data is linked to each of the output nodes of the output network $net_{out2}$ corresponding to the output motor data.

FIGS. 30B and 30C illustrate link weight matrices of the input-output relationship model shown in FIG. 30A.

In the input-output relationship model of FIG. 30A, each of the input nodes of the input network $net_{in1}$ is linked to each of the output nodes of the output network $net_{out1}$ and each of the input nodes of the input network $net_{in2}$ is linked to each of the output nodes of the output network $net_{out2}$. Furthermore, each of the input nodes of the input network $net_{in1}$ is linked to each of the output nodes of the output network $net_{out2}$ and each of the input nodes of the input network $net_{in2}$ is linked to each of the output nodes of the output network $net_{out1}$.

The number of link weight matrices equals the number of sets of time series pattern storage networks having nodes thereof linked to each other.

FIG. 30B illustrates a link weight matrix $MTX_{11}$ in which the input nodes of the input network $net_{in1}$ are mapped to respective rows, and the output nodes of the output network $net_{out1}$ are mapped to respective columns. A link weight w between an i-th input node of the input network $net_{in1}$ and a j-th output node of the output network $net_{out1}$ is arranged as an element at an i-th row and j-th column in the link weight matrix $MTX_{11}$.

FIG. 30C illustrates a link weight matrix $MTX_{12}$ in which the input nodes of the input network $net_{in1}$ are mapped to respective rows, and the output nodes of the output network $net_{out2}$ are mapped to respective columns. A link weight w between an i-th input node of the input network $net_{in1}$ and a j-th output node of the output network $net_{out2}$ is arranged as an element at an i-th row and j-th column in the link weight matrix $MTX_{12}$.

FIG. 30D illustrates a link weight matrix $MTX_{21}$ in which the input nodes of the input network $net_{in2}$ are mapped to respective rows, and the output nodes of the output network $net_{out1}$ are mapped to respective columns. A link weight w between an i-th input node of the input network $net_{in2}$ and a j-th output node of the output network $net_{out1}$ is arranged as an element at an i-th row and j-th column in the link weight matrix $MTX_{21}$.

FIG. 30E illustrates a link weight matrix $MTX_{22}$ in which the input nodes of the input network $net_{in2}$ are mapped to respective rows, and the output nodes of the output network $net_{out2}$ are mapped to respective columns. A link weight w between an i-th input node of the input network $net_{in2}$ and a j-th output node of the output network $net_{out2}$ is arranged as an element at an i-th row and j-th column in the link weight matrix $MTX_{22}$.

During the learning of the input-output relationship model of FIG. 30A, the link weight updating unit 222 (FIG. 21) updates each element as a link weight W in the four link weight matrices $MTX_{11}$ of FIG. 30B, $MTX_{12}$ of FIG. 30C, $MTX_{21}$ of FIG. 30D, and $MTX_{22}$ of FIG. 30E.

As previously discussed with reference to FIGS. 27A-27C through 29, it might be known beforehand that there is a relationship between the input audio data and the output audio data and between the input video data and the output motor data. In other words, it might be known beforehand that the object to be controlled outputs the output audio data (rather than the output motor data) in response to the input audio data, and that the object outputs the output motor data (rather than the output audio data) in response to the input video data. In such a case, the link weight matrices of the same number as the number of sets of the sub input data and the sub output data related to the sub input data are simply updated in the link weights thereof in the learning of the input-output relationship model.

More specifically, as previously discussed with reference to FIGS. 27A-27C through 29, if it is known beforehand that there are a relationship between the input audio data and the output audio data, and a relationship between the input video data and the output motor data, the two link weight matrices $MTX_{11}$ and $MTX_{22}$ are arranged. The link weight matrix $MTX_{11}$ represents a combination of the input audio data and the output audio data related to the input audio data and the link weight matrix $MTX_{22}$ represents a combination of the input video data and the output motor data related to the input video data. In other words, in the link weight matrix $MTX_{11}$ (FIG. 27B), the input nodes of the input network $net_{in1}$ corresponding to the input audio data are mapped to the respective rows while the output nodes of the output network $net_{out1}$ corresponding to the output audio data are mapped to the respective columns. The link weight w between an i-th input node of the input network $net_{in1}$ and a j-th output node of the output network $net_{out1}$ is arranged as an element at an i-th row and j-th column in the link weight matrix $MTX_{11}$. In the link weight matrix $MTX_{22}$ (FIG. 27C), the input nodes of the input network $net_{in2}$ corresponding to the input vide data are mapped to the respective rows while the output nodes of the output network $net_{out2}$ corresponding to the output motor data are mapped to the respective columns. The link weight w between an i-th input node of the input network $net_{in2}$ and a j-th output node of the output network $net_{out2}$ is arranged as an element at an i-th row and j-th column in the link weight matrix $MTX_{22}$. The link weights of the link weight matrix $MTX_{11}$ and the link weight matrix $MTX_{22}$ are simply updated.

It might be unknown beforehand whether there are a relationship between the input audio data and the output audio data and a relationship between the input video data and the output motor data. In other words, it might be unknown beforehand whether the output audio data and/or the output motor data is output in response to the input audio data and whether the output audio data and/or the output motor data is output in response to the input video data. In such a case, the link weight matrices of all combinations of each sub input data contained in the input data and each sub output data contained in the output data need to be updated in link weight.

During the learning of the input-output relationship model of FIG. 30A, the link weight updating unit 222 (FIG. 21) updates each element as a link weight W in the four link weight matrices $MTX_{11}$ of FIG. 30B, $MTX_{12}$ of FIG. 30C, $MTX_{21}$ of FIG. 30D, and $MTX_{22}$ of FIG. 30E.

As the learning of the input networks and the output networks forming the input-output relationship model is in progress, the time series pattern model 21 of the input node represents a particular time series pattern and the time series pattern model 21 of the output node represents a particular time series pattern.

There may be a relationship between the input data of one particular time series pattern and the output data of another particular time series pattern. If a set of the input data and the output data (supervising data) is provided in such a case, an input node having the time series pattern model 21 describing the particular time series pattern in the input network becomes a winner node while an output node having the time series pattern model 21 describing the other particular time series pattern becomes a winner node.

As described above, the link weight between each node of the input network with respect to the winner node of the input network and the winner node of the output network is updated while each output node of the output network with respect to the winner node of the output network and the winner node of the input network is updated.

The link weight between each input node of the input network and the winner node of the output network is updated to be heavier as the inter-pattern distance d of each input node is closer to the winner node of the input network. The link weight between each output node of the output network and the winner node of the input network is updated to be heavier as the inter-pattern distance d of each output node is closer to the winner node of the output network.

The link weight between each input node of the input network and the winner node of the output network is updated be lighter as the inter-pattern distance d of the input node is farther from the winner node of the input network. The link weight between each output node of the output network and the winner node of the input network is updated be lighter as the inter-pattern distance d of the output node is farther from the winner node of the output network.

Figure 31A:
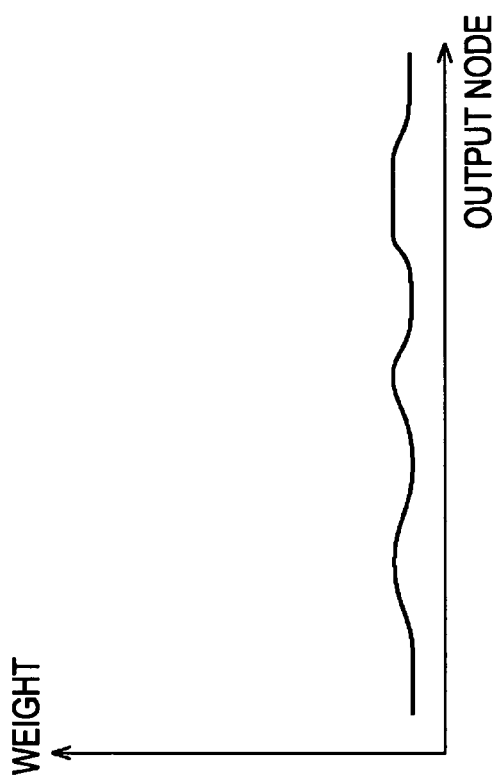
FIGS. 31A and 31B illustrate a link weight of a node of the time series pattern storage network in the input-output relationship model.
Figure 31B:
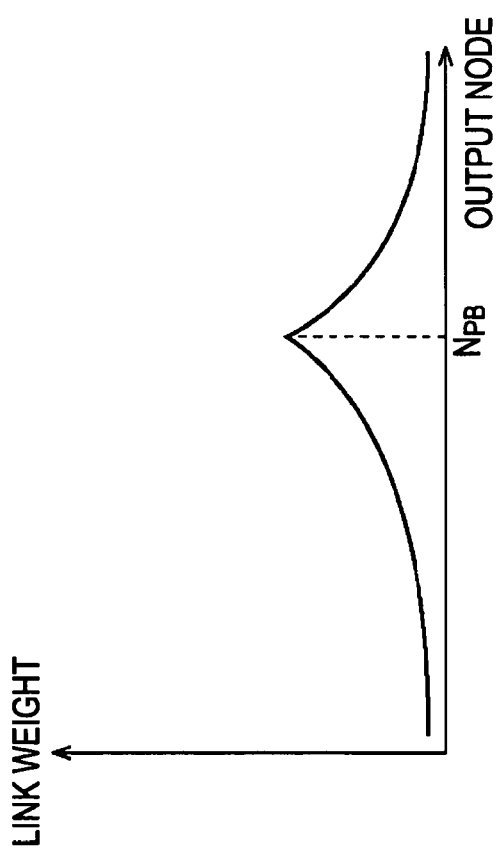

FIGS. 31A and 31B illustrate link weights of nodes in one time series pattern storage network in an input-output relationship model.

An input network and an output network, with nodes thereof linked to each other, forming an input-output relationship model are now considered. The input network and the output network are respectively referred to as an input network of interest and an output network of interest. One time series pattern is referred to as a time series pattern PA and another time series pattern is referred to as a time series pattern PB.

FIGS. 31A and 31B focus on an input node of interest in the input network $net_{in}$ of interest, and a link weight between the input node of interest and each output node of the output network of interest.

In FIGS. 31A and 31B, the abscissa represents each output node (node label) of the output network of interest, and the ordinate represents the link weight of each output node with the node of interest. Output nodes close to each other in the inter-pattern distance d along the abscissa are placed close to each other accordingly.

PA represents the time series pattern model 21 (FIG. 7) of the node of interest and PB represents the time series pattern model 21 of one output node of the output network of interest.

Sub input data $S_{in}$ contained in the input data of the supervising data corresponds to the input network of interest and sub output data $S_{out}$ contained in the output data of the supervising data corresponds to the output network of interest.

A large number of units of supervising data is provided in the learning of the input-output relationship model. The supervising data contains, as the sub input data $S_{in}$, the time series data belonging to the time series pattern PA and, as the sub output data $S_{out}$, the time series data belonging to the time series pattern PB. In response to the large number of units of supervising data, a node of interest having the time series pattern model 21 describing the time series pattern PA becomes a winner node in the input network of interest, and a node of interest having the time series pattern model 21 describing the time series pattern PB becomes a winner node in the output network of interest. The link weight between the output network and the node of interest is increased.

Let $N_{PB}$ represent the output node having the time series pattern model 21 describing the time series pattern PB. The link weight of each output node of the output network of interest becomes lighter as the inter-pattern distance d of the output node becomes farther from the output node $N_{PB}$.

As shown in FIG. 31A, the link weight of each output node of the output network of interest is maximized in response to the output node $N_{PB}$. The link weight of each output node of the output network of interest becomes smaller as the inter-pattern distance d from the output node $N_{PB}$ increases.

The sub output data $S_{out}$ in the large number of units of supervising data can be time series data belonging to a variety of time series patterns, for example, time series data belonging to the time series pattern PB or time series data belonging to any other pattern. In response to the large number of units of supervising data, the node of interest having the time series pattern model 21 describing the time series pattern PA becomes a winner in the input network of interest, and further a variety of output nodes besides the output node $N_{PB}$ becomes winner nodes in the output network of interest.

The link weight between each node of the output network of interest and the node of interest is not increased with respect to any particular output node. As a result, the link weight of each output node of the output network of interest decreases as shown in FIG. 31B.

The same is true of one output node of the output network of interest. The link weight between the output node and each input node of the input network of interest also decreases.

The relationship between the sub input data $S_{in}$ and the sub output data $S_{out}$ in the supervising data is reflected in the link weight between the node of the input network of interest and the node of the output network of interest.

A large number of units of supervising data may be provided in the learning of the input-output relationship model. The supervising data may contain, as the sub input data $S_{in}$, the time series data belonging to the time series pattern PA and, as the sub output data $S_{out}$, the time series data belonging to the time series pattern PB. When the time series data belonging to the time series pattern PA is input as the sub input data $S_{in}$ to the object to be controlled, the frequency of occurrence that the time series data belonging to the time series pattern PB is observed as the sub output data $S_{out}$ is high. If there is a relationship (any correlation) between the sub input data $S_{in}$ and the sub output data $S_{out}$, the link weight between each output node of the output network of interest and a particular input node (node of interest) of the input network of interest changes as shown in FIG. 31A. More specifically, the link weight of each output node is maximized at the particular output node $N_{PB}$ of the output network of interest, and decreases as the inter-pattern distance d of the output node increases. Similarly, the link weight between each input node of the input network of interest and a particular output node (node of interest) of the output network of interest changes as shown in FIG. 31A. More specifically, the link weight of each input node is maximized at the particular input node of the input network of interest, and decreases as the inter-pattern distance d of the input node increases.

A large number of units of supervising data may be provided in the learning of the input-output relationship model. The supervising data may contain, as the sub input data $S_{in}$, the time series data belonging to the time series pattern PA and, as the sub output data $S_{out}$, the time series data belonging to a variety of time series patterns. When the time series data belonging to the time series pattern PA is input as the sub input data $S_{in}$ to the object to be controlled, a variety of time series patterns is observed as the sub output data $S_{out}$. If there is be no relationship (no correlation or little correlation) between the sub input data $S_{in}$ and the sub output data $S_{out}$, the link weight between each output node of the output network of interest and the particular input node of the input network of interest becomes generally small for all output nodes of the output network of interest as shown in FIG. 31B. Similarly, the link weight between each input node of the input network of interest and the particular output node of the output network of interest is generally small for all input nodes of the input network of interest.

A large number of units of supervising data may be provided in the learning of the input-output relationship model. There may be a correlation between the input audio data and the output audio data and a correlation between the input video data and the output motor data, but there is neither correlation between the input audio data and the output motor data nor correlation between the input video data and the output audio data. In the link weight matrix $MTX_{11}$ (FIG. 30B), the input nodes of the input network $net_{in1}$ corresponding to the input audio data are mapped to the respective rows and the output nodes of the output network $net_{out1}$ corresponding to the output audio data correlated with the input audio data are mapped to the respective columns. Since the correlation between the input audio data and the output audio data is reflected in the link weight matrix $MTX_{11}$, the link weight of each input node of the input network $net_{in1}$ with a particular output node of the output network $net_{out1}$ is heavier than with the other output nodes in the link weight matrix $MTX_{11}$. The link weight of each output node of the output network $net_{out1}$ with a particular input node of the input network $net_{in1}$ is heavier than with the other input nodes in the link weight matrix $MTX_{11}$.

Similarly, in the link weight matrix $MTX_{22}$ (FIG. 30E), the input nodes of the input network $net_{in2}$ corresponding to the input video data are mapped to the respective rows and the output nodes of the output network $net_{out2}$ corresponding to the output motor data correlated with the input video data are mapped to the respective columns. Since the correlation between the input video data and the output motor data is reflected in the link weight matrix $MTX_{22}$, the link weight of each input node of the input network $net_{in2}$ with a particular output node of the output network $net_{out2}$ is heavier than with the other output nodes in the link weight matrix $MTX_{22}$. The link weight of each output node of the output network $net_{out2}$ with a particular input node of the input network $net_{in2}$ is heavier than with the other input nodes in the link weight matrix $MTX_{22}$.

In the link weight matrix $MTX_{12}$ (FIG. 30C), the input nodes of the input network $net_{in1}$ corresponding to the input audio data are mapped to the respective rows while the output nodes of the output network $net_{out2}$ corresponding to the output motor data not correlated with the input audio data are mapped to the respective columns. Since a small correlation between the input audio data and the output motor data is reflected in the link weight matrix $MTX_{12}$, the link weight of each input node of the input network $net_{in1}$ with any output node of the output network $net_{out2}$ is generally light. The link weight of each output node of the output network $net_{out2}$ with any input node of the input network $net_{in1}$ is generally light.

In the link weight matrix $MTX_{21}$ (FIG. 30D), the input nodes of the input network $net_{in2}$ corresponding to the input video data are mapped to the respective rows while the output nodes of the output network $net_{out1}$ corresponding to the output audio data not correlated with the input video data are mapped to the respective columns. Since a small correlation between the input video data and the output audio data is reflected in the link weight matrix $MTX_{21}$, the link weight of each input node of the input network $net_{in2}$ with any output node of the output network $net_{out1}$ is generally light. The link weight of each output node of the output network $net_{out1}$ with any input node of the input network $net_{in2}$ is generally light.

A large number of units of supervising data may be provided during the learning of the input-output relationship model. In the supervising data, there may be a correlation between the input audio data and the output audio data, a correlation between the input audio data and the output motor data, a correlation between the input video data and the output audio data, and a correlation between the input video data and the output motor data. In such a case, respective correlations are reflected in the link weight matrices $MTX_{11}$, $MTX_{12}$, $MTX_{21}$, and $MTX_{22}$ (FIGS. 30B-30E).

In the link weight matrix $MTX_{11}$ (FIG. 30B), the link weight of each input node of the input network $net_{in1}$ with a particular output node of the output network $net_{out1}$ becomes heavier than with the other output nodes, and the link weight of each output node of the output network $net_{out1}$ with a particular input node of the input network $net_{in1}$ becomes heavier than with the other input nodes. The same is true of the remaining link weight matrices $MTX_{12}$, $MTX_{21}$, and $MTX_{22}$.

The link weight matrix is flexibly updated so that the correlation between the sub input data and the sub output data of the supervising data is reflected therein.

The sub input data and the sub output data are hereinafter referred to as sub data without distinction. In the link weight matrix, the nodes of the time series pattern storage network $net_1$ corresponding to one sub data are mapped to the respective rows while the nodes of the time series pattern storage network $net_2$ corresponding to another sub data are mapped to the respective columns. Such a link weight matrix is referred to as a link weight matrix between the time series pattern storage network $net_1$ and the time series pattern storage network $net_2$.

The learning process of an input-output relationship model is described below with reference to a flowchart of FIG. 32. The input-output relationship model shown in FIG. 30A is stored in the storage unit 211 in the data processing apparatus of FIG. 21. The input-output relationship model is composed of m-channel input networks and n-channel output networks.

Steps S141 through S144, respectively identical to steps S121 through S124 of FIG. 28, are performed.

In step S141, the supervising data, namely, a set of input data and output data, is input to the data processing apparatus of FIG. 21, and then fed to the learning processor 221 in the learning section 212.

In step S142, the learning processor 221 divides the m-channel sub input data, contained in the input data of the supervising data, into sub input data by channel while also dividing the n-channel sub output data, contained in the output data of the supervising data, into sub output data by channel.

In step S143, the learning processor 221 updates in a self-organizing manner each of m input networks in the input-output relationship model stored in the storage unit 211 based on the sub input data of the channel corresponding to the input network in the input data.

As shown in FIG. 30A, the input-output relationship model might contain the input network $net_{in1}$ corresponding to the input audio data, and the input network $net_{in2}$ corresponding to the input video data, and the input data might contain the input audio data and the input video data. In step S143, then, the input network $net_{in1}$ of the input-output relationship model is updated in a self-organizing manner based on the input audio data as the corresponding sub input data, and the input network $net_{in2}$ of the input-output relationship model is updated in a self-organizing manner based on the input video data as the corresponding sub input data.

In step S144, the learning processor 221 updates in a self-organizing manner each of n output networks in the input-output relationship model stored in the storage unit 211 based on the sub output data of the channel corresponding to the output network in the output data.

As shown in FIG. 30A, the input-output relationship model might contain the output network $net_{out1}$ corresponding to the output audio data, and the output network $net_{out2}$ corresponding to the output motor data, and the output data might contain the output audio data and the output motor data. In step S144, then, the output network $net_{out1}$ of the input-output relationship model is updated in a self-organizing manner based on the output audio data as the corresponding sub output data, and the output network $net_{out2}$ of the input-output relationship model is updated in a self-organizing manner based on the output motor data as the corresponding sub output data.

The learning processor 221 supplies the link weight updating unit 222 with node labels of the nodes that have become winner nodes when the m-channel input networks and the n-channel output networks are updated.

The link weight updating unit 222 receives the node labels from the learning processor 221. The received node labels include the node label of the node that has become the winner node of each of the m-channel input networks, and the node label of the node that has become the winner node of each of the n-channel output networks. In step S145, one of mxn sets of the m-channel input networks and the n-channel output networks with nodes thereof linked to each other is selected as a set of interest. Processing proceeds to step S146.

As shown in FIG. 30A, all nodes of the mxn sets of the m-channel input networks and the n-channel output networks are linked to each other. In step S145, the mxn sets are successively selected the sets of interest.

In step S146, the link weight updating unit 222 updates each link weight in the link weight matrix of the set of interest, namely, each element in the link weight matrix having the input node of the input network forming the set of interest and the output node of the output network forming the set of interest. More specifically, the link weight updating unit 222 updates the link weight as each element in the link weight matrix based on the winner node represented by the node labels supplied from the learning processor 221 as discussed with reference to FIGS. 23A and 23B.

The link weight updating unit 222 recognizes the winner node of the input network forming the set of interest and the winner node of the output network forming the set of interest based on the node labels supplied from the learning processor 221. The link weight updating unit 222 further updates the link weight between each node of the input network with respect to the winner node of the input network and the winner node of the output network in accordance with equation (4). The link weight updating unit 222 also updates the link weight between each node of the output network with respect to the winner node of the output network and the winner node of the input network in accordance with equation (4).

In the input-output relationship model of FIG. 30A, the four sets are selected. More specifically, selected are a set of the input network $net_{in1}$ and the output network $net_{out1}$, a set of the input network $net_{in1}$ and the output network $net_{out2}$, a set of the input network $net_{in2}$ and the output network $net_{out1}$, and a set of the input network $net_{in2}$ and the output network $net_{out2}$.

If the set of the input network $net_{in1}$ and the output network $net_{out1}$ is selected as a set of interest, the elements as the link weights in the link weight matrix $MTX_{11}$ shown in FIG. 30B are updated in step S146. If the set of the input network $net_{in1}$ and the output network $net_{out2}$ is selected as a set of interest, the elements as the link weights in the link weight matrix $MTX_{12}$ shown in FIG. 30C are updated in step S146. If the set of the input network $net_{in2}$ and the output network $net_{out1}$ is selected as a set of interest, the elements as the link weights in the link weight matrix $MTX_{21}$ shown in FIG. 30D are updated in step S146. If the set of the input network $net_{in2}$ and the output network $net_{out2}$ is selected as a set of interest, the elements as the link weights in the link weight matrix $MTX_{22}$ shown in FIG. 30E are updated in step S146.

Subsequent to step S146, processing proceeds to step S147. The link weight updating unit 222 determines whether updating of all link weight matrices with nodes thereof linked to each other, namely, all mxn sets of the m-channel input networks and the n-channel output networks (link weights as the elements in the link weight matrices) has been completed.

If it is determined in step S147 that updating of all mxn link weight matrices of sets of the m-channel input networks and the n-channel output networks has not been completed, in other words, if it is determined in step S147 that any of mxn sets remains to be selected as a set of interest, processing returns to step S145. The link weight updating unit 222 selects, as a set of interest, one of the unselected sets out of the mxn sets of the m-channel input networks and the n-channel output networks, and then repeats the same process as described above.

If it is determined in step S147 that updating of the link weight matrices of all mxn sets of the m-channel input networks and the n-channel output networks has been completed, processing returns to step S141. When new supervising data is received, the same process as described above is repeated.

As described above, each node of each of the m-channel input networks forming the input-output relationship model and each node of each of the n-channel output networks are linked to each other, and the link weight matrices of all mxn sets of input networks and output networks are updated. In this way, the learning of the input-output relationship model is performed at a high degree of freedom.

As a result, a variety of input-output relationship models is obtained. For example, in one input-output relationship model, audio data is output in response to one input audio data, motor data is output in response to another input audio data, and both audio data and motor data are output in response to yet another input audio data. In another input-output relationship model, audio data is output in response to input video data, motor data is output in response to input another video data, and both audio data and motor data are output in response to yet another video data.

During the learning of the input-output relationship model, in the supervising data, there might be a correlation between the input audio data and the output audio data, and a correlation between the input video data and the output motor data but there is neither correlation between the input audio data and the output motor data nor correlation between the input video data and the output audio data. The supervising data is the provided to the input-output relationship model of FIG. 27A and the input-output relationship model of FIG. 30A during learning. The link weight matrix $MTX_{11}$ of FIG. 27B obtained from the input-output relationship model of FIG. 27A, and the link weight matrix $MTX_{11}$ of FIG. 30B obtained from the input-output relationship model of FIG. 30A become the same link weight matrix. The link weight matrix $MTX_{22}$ of FIG. 27C obtained from the input-output relationship model of FIG. 27A and the link weight matrix $MTX_{22}$ of FIG. 30E obtained from the input-output relationship model of FIG. 30A become the same link weight matrix.

A process of the data processing apparatus of FIG. 21 for inferring output data responsive to input data is described below with reference to a flowchart of FIG. 33. The data processing apparatus uses the input-output relationship model of FIG. 30A that is learned with reference to FIG. 32. The input-output relationship model is composed of the m-channel input networks and the n-channel output networks again.

Steps S151 through S155, respectively identical to steps S131 through S135 of FIG. 29, are performed.

In step S155, the winner node determiner 232 in the recognition generator 213 (FIG. 21) determines an effective node from among the winner nodes of the m-channel input networks in the same way as in step S135 of FIG. 29. If the number of effective winner nodes is zero, the recognition generator 213 (FIG. 21) ends the process.

If the number of effective winner nodes is at least one, the winner node determiner 232 supplies a node label representing at least one effective winner node to the generation node determiner 233, and then proceeds from step S155 to step S156.

In step S156, the generation node determiner 233 determines a candidate node becoming a candidate generation node based on the node label representing at least one effective winner node from the winner node determiner 232.

The generation node determiner 233 selects, as a node label of interest, one of at least one node label from the winner node determiner 232, and selects, as an output network of interest, one of the n-channel output networks of the input-output relationship model. The generation node determiner 233 determines, as a candidate node, an output node, from among the nodes of the output network of interest, having the heaviest link weight with the effective winner node represented by the node label of interest.

The generation node determiner 233 successively selects the n-channel output networks as a output network and then determines a candidate node.

The generation node determiner 233 selects, as a node label of interest, from at least one node label from the winner node determiner 232, and determines a candidate node for each of at least one node label from the winner node determiner 232 as previously discussed.

At least one candidate node is determined for one effective winner node.

If one input node $N_i$ of the input network $net_{in1}$ corresponding to the input audio data in the input-output relationship model of FIG. 30A is an effective winner node, an output node having the heaviest link weight with the effective winner node Ni from among the nodes of the output network $net_{out1}$ corresponding to the output audio data is selected as a candidate node for the effective winner node $N_i$ and an output node, from among the nodes of the output network $net_{out2}$, having the heaviest link weight with the effective winner node $N_i$ is selected as a candidate node.

If one input node $N_i$ of the input network $net_{in2}$ corresponding to the input video data in the input-output relationship model of FIG. 30A is an effective winner node, an output node having the heaviest link weight with the effective winner node Ni from among the nodes of the output network $net_{out1}$ corresponding to the output audio data is selected as a candidate node for the effective winner node $N_i$ and an output node, from among the nodes of the output network $net_{out2}$, having the heaviest link weight with the effective winner node $N_i$ is selected as a candidate node.

Given one output network of interest, a plurality of output nodes of that output network can be determined to be candidate nodes.

The generation node determiner 233 determines at most one generation node for each of the output network. Processing proceeds to step S157 after the candidate node is determined in step S156. One of a plurality of candidate nodes in the output network is tentatively determined to be a generation node.

The candidate node tentatively determined to be the generation node is referred to as a tentative generation node. For example, the generation node determiner 233 determines, as a tentative generation node, one of the plurality of candidate nodes present in one output network as described below.

The generation node determiner 233 compares the link weights of the plurality of candidate nodes present in the one output network, the link weights of the candidate nodes with the effective winner node having been used in the determination of the output node as the candidate node. A candidate node having the heaviest link weight is determined as the tentative generation node.

Alternatively, the score of the effective winner node may be considered in the determination of the tentative generation node.

Let w represent the link weight with the effective winner node corresponding to the candidate node (the effective winner node used in the determination of the candidate node), and S represent the score of the effective winner node. A candidate node having a maximum of w+σS, from among the plurality of candidate nodes present in the one output network, can be determined as a tentative generation node. Here, σ represents a constant for adjusting the scale of the score S to the scale of the link weight w (namely, a constant for normalizing the score S).

Subsequent to step S157, at most one output node becomes the tentative generation node in each output network of the input-output relationship model. If a single candidate node is present in the output network, that candidate node becomes the tentative generation node. The output network having no candidate node is not processed in step S157 and subsequent steps.

In step S158, the generation node determiner 233 finally determines, as a generation node, an effective tentative generation node (output node) from among the tentative generation nodes determined in step S157.

More specifically, the generation node determiner 233 compares, with a threshold value, the link weight w of the tentative generation node with the effective winner node, the light weight having been used in the determination of the candidate node. If the link weight w is equal to or higher the threshold value, the generation node determiner 233 determines that tentative generation node as an effective tentative generation node. If the link weight w is lower than the threshold value, the generation node determiner 233 determines the tentative generation node as an ineffective tentative generation node.

Alternatively, the generation node determiner 233 calculates the above-described value w+σS for the tentative generation node, and compares the calculated value with a threshold value. If the value w+σS is equal to or higher than the threshold value, the generation node determiner 233 determines the tentative generation node to be an effective tentative generation node. If the value w+σS is lower than the threshold value, the generation node determiner 233 determines the tentative generation node to be an ineffective tentative generation node.

Finally, the generation node determiner 233 determines only the effective tentative generation node to be the generation node, and supplies a node label representing at least one generation node to the time series generator 234. Processing proceeds from step S158 to step S159.

If it is determined in step S158 that no effective tentative generation node is present, the recognition generator 213 (FIG. 21) ends the process.

As in step S137 of FIG. 29, in step S159, the time series generator 234 generates at least one unit of time series data as an inferred value of the output data responsive to the input data supplied to the recognition generator 213, based on the time series pattern model 21 (FIG. 7) held by at least one generation node, represented by the node label from the generation node determiner 233, from among the output nodes of the output network forming the input-output relationship model stored in the storage unit 211. In step S160, the time series generator 234 outputs each of at least one unit of time series data as the output data containing the sub output data of the channel corresponding to the output network having the generation node.

The effective tentative generation node means that the sub output data of the channel corresponding to the output network having the tentative generation node is significant. If the sub output data of the channel corresponding to the output network having the effective tentative generation node is the output audio data, the output audio data is not mute sound but significant sound. The winner node of the input network corresponding to the sub input data determined to be effective is determined to be an effective node. The determination of the effective tentative generation node means the determination that the sub output data of the channel corresponding to the input network having the tentative generation node is effective.

The effective tentative generation node is determined, and the time series data as the sub output data of the channel corresponding to the output network having the generation node is generated and output based the time series pattern model 21 (FIG. 7) of that generation node.

As shown in FIG. 30A, the input-output relationship model includes the input network $net_{in1}$ corresponding to the input audio data, the input network $net_{in2}$ corresponding to the input video data, the output network $net_{out1}$ corresponding to the output audio data, and the output network $net_{out2}$ corresponding to the output motor data. The input network $net_{in1}$ is linked to each of the output network $net_{out1}$ and the output network $net_{out2}$. The input network $net_{in2}$ is also linked to each of the output network $net_{out1}$ and the output network $net_{out2}$. If only an output node of the output network $net_{out1}$ is determined to be an effective tentative generation node, the output audio data is generated based on the time series pattern model 21 of the generation node with the effective tentative generation node being the generation node. The output data containing the output audio data as the sub output data of one channel is output. The output motor data as the sub output data of another channel contained in the output data is time series data indicating that the arm is not to be moved.

If only an output node of the output network $net_{out2}$ is determined to be an effective tentative generation node, the output motor data is generated based on the time series pattern model 21 of the generation node with the effective tentative generation node being the generation node. The output data containing the output motor data as the sub output data of one channel is output. The output audio data as the sub output data of another channel contained in the output data is time series data indicating that no sound is output.

If an output node of the output network $net_{out1}$ and an output node of the output network $net_{out2}$ are determined to be effective tentative generation nodes, both output audio data and output motor data are generated based on the time series pattern model 21 of the generation nodes with the effective tentative generation nodes being the generation nodes. The output data containing as sub output data both the output audio data and the output motor data is thus output.

As a result, the robot as the forward model of the input-output relationship model of FIG. 30A outputs a sound, or moves the arm, or outputs a sound and moves the arm in response to the input data.

What type of output data is obtained in response to what type of input data depends on the supervising data used in the learning of the input-output relationship model of FIG. 30A. To provide one type of output audio data in response to another type of input audio data, a large number of units of supervising data containing sets of input audio data and output audio data is used in the learning of the input-output relationship model. To provide one type of output motor data in response to another type of input audio data, a large number of units of supervising data containing sets of input audio data the output motor data is used in the learning of the input-output relationship model.

In the above discussion, the input audio data and the input video data from separate media are used as the sub input data contained in the input data, and the output audio data and the output motor data from separate media are used as the sub output data contained in the output data. The sub input data contained in the input data and the sub output data contained in the output data may be the data from the same medium.

Figure 34:
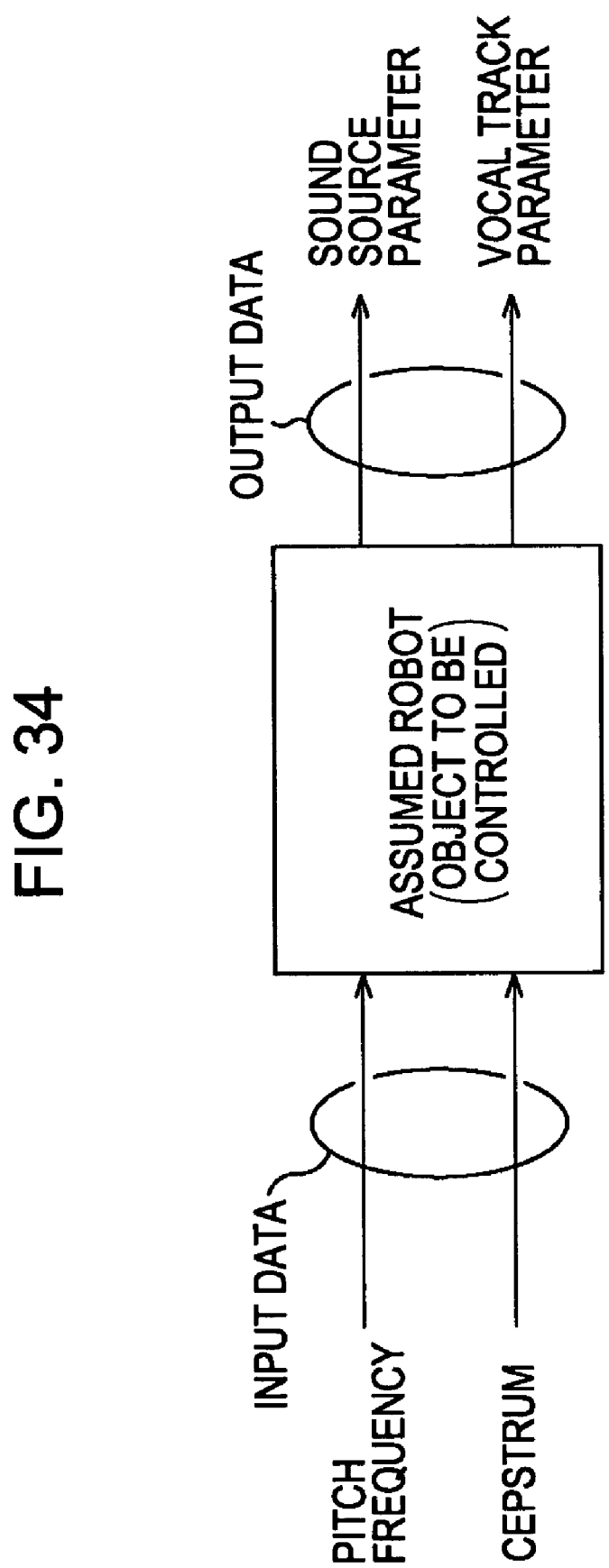
FIG. 34 illustrates an assumed robot as an object to be controlled.

An assumed robot of FIG. 34 might be an object to be controlled, and might be modeled into a forward model or a backward model through an input-output relationship model.

If audio data is input as input data to the robot of FIG. 34, audio data (synthesized sound) is output as output data.

The input data contains two-channel sub input data, namely, pitch data and cepstrum data of audio data, and the output data contains two-channel sub output data, namely, a sound source parameter and a vocal tract parameter of the audio data.

A pitch frequency (pitch data) is extracted in a time series sequence from the audio data on a frame unit basis and input to the robot as sub input data of one channel. A cepstrum coefficient of a predetermined order (cepstrum data) is extracted in a time series sequence from the audio data on a frame unit basis, and input to the robot as sub input data of another channel. The extraction method of the pitch frequency and the extraction method of the cepstrum coefficient are not limited to any particular methods.

The robot of FIG. 34 may include an audio output device that outputs a synthesized sound in accordance with the sound source parameter and the vocal track parameter. The audio output device generates a sound of one frequency from a physical sound source in response to a first drive signal for driving an actuator that outputs a sound from the physical sound source, and changes the shape of a tube as a filter in response to a second drive signal for driving an actuator that changes the shape of the tube. The audio output device allows the sound from the sound source to pass through the tube, thereby outputting a sound having predetermined frequency characteristics. The first time series drive signal corresponds to the sound source parameter, and the second time series drive signal corresponds to the vocal tract parameter.

A sound having a predetermined period is output from a sound source, and that sound is allowed to pass through a shape-changed tube in a filtering operation to provide a sound having predetermined characteristics. Such a process can be performed by causing a computer to execute a simulation program.

In response to the sound source parameter and the vocal tract parameter, the audio output device outputs a sound (data), namely, time series data.

The robot provides, to the audio output device, output data, containing the sound source parameter as sub output data of one channel, and the vocal tract parameter as sub output data of another channel. The robot thus outputs a sound.

The robot of FIG. 34 might output a sound imitating a sound input thereto. The sound input to the robot and the sound output from the robot may include five voices "a", "i", "u", "e", and "o" as five phoneme categories and three types of voices in terms of intonation as one of prosodemes, namely, an intonation with pitch frequency largely stabilized with time (called flat intonation), an intonation with pitch frequency gradually rising with time (called up intonation), and an intonation with pitch frequency gradually falling with time (called down intonation).

Since the sound input to the robot includes five types of voices in terms of phoneme, and three types of voices in terms of intonation, a total of 15 (5×3) types of voices is available. In response to an input voice of one type, the robot outputs a voice of the same type.

Figure 35:
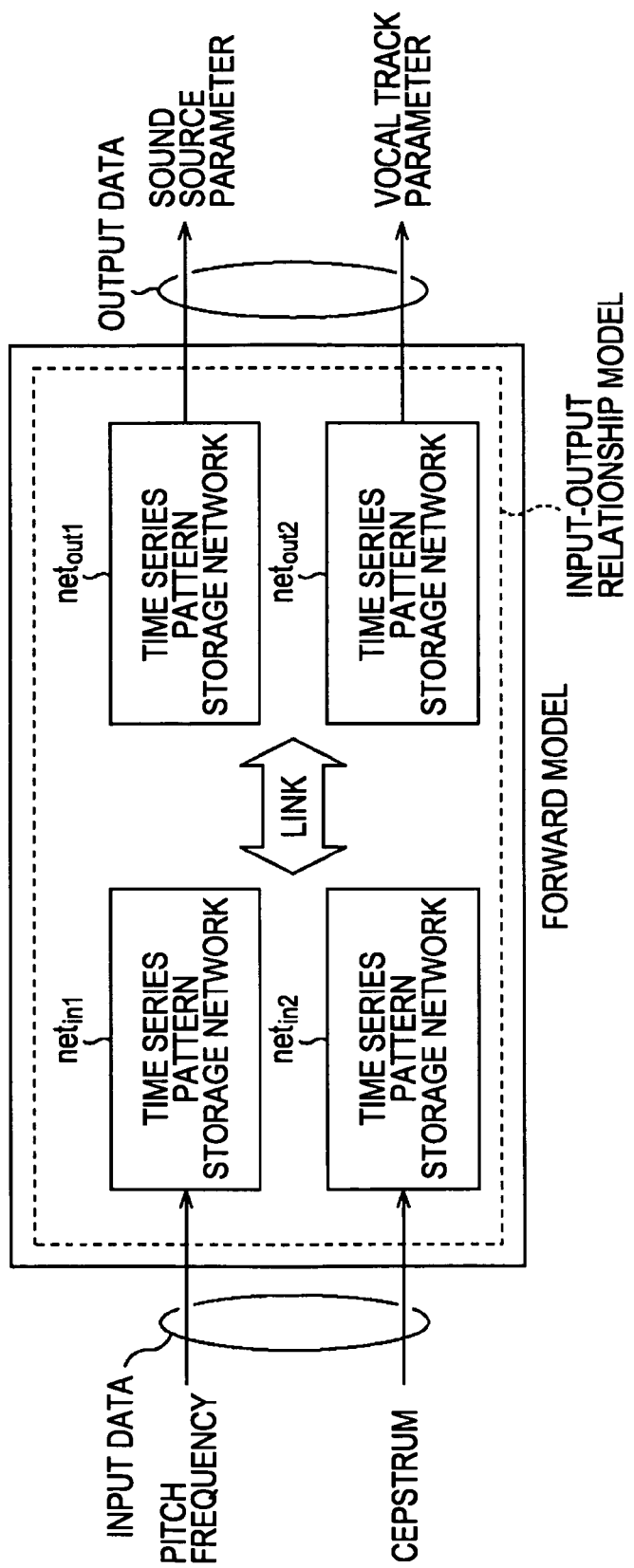
FIG. 35 illustrates an input-output relationship model as a forward model of the assumed robot.

FIG. 35 illustrates such an input-output relationship model as a forward model of the robot of FIG. 34.

As the input-output relationship model of FIG. 26, the input-output relationship model of FIG. 35 includes two input networks $net_{in1}$ and $net_{in2}$ corresponding to two-channel sub input data contained in the input data, and two output networks $net_{out1}$ and $net_{out2}$ corresponding to two-channel sub output data contained in the output data.

In the input-output relationship model of FIG. 35, the input network $net_{in1}$ corresponds to the channel of the pitch data as the sub input data in the input data, the input network $net_{in2}$ corresponds to the channel of the cepstrum data as the sub input data in the input data, the output network $net_{out1}$ corresponds to the channel of the sound source parameter as the sub output data in the output data, and the output network $net_{out2}$ corresponds to the channel of the vocal tract parameter as the sub output data in the output data.

FIGS. 36A-36E illustrate a link relationship between time series pattern storage networks in the input-output relationship model of FIG. 35 and link weight matrices thereof.

In the robot of FIG. 34, the input-output relationship model can be constructed based on the premise that there are a relationship between the pitch data and the sound source parameter, and a relationship between the cepstrum data and the vocal tract parameter (with neither relationship between the pitch data and the vocal tract parameter and nor relationship between the cepstrum data and the sound source parameter). However, the input-output relationship model of FIG. 36A is constructed based on the premise that it is unknown whether there is a relationship between the pitch data and one of the sound source parameter and the vocal tract parameter and whether there is a relationship between the cepstrum data and one of the sound source parameter and the vocal tract parameter.

FIGS. 36B-36E illustrate the link relationship between the time series pattern storage networks in the input-output relationship model of FIG. 35.

As in the input-output relationship model of FIG. 30A, in the input-output relationship model of FIG. 36A, each of the node of the input network is linked to each of the nodes of the output network and each of the nodes of the output network is linked to each of the node of the input network.

More specifically, in the input-output relationship model of FIG. 36A, each of the input nodes of the input network $net_{in1}$ corresponding to the pitch data is linked to each of the output nodes of the output network $net_{out1}$ corresponding to the sound source parameter, and each of the input nodes of the input network $net_{in1}$ is linked to each of the output nodes of the output network $net_{out2}$ corresponding to the vocal tract parameter. Furthermore, each of the input nodes of the input network $net_{in2}$ corresponding to the cepstrum data is linked to each of the output nodes of the output network $net_{out1}$ corresponding to the sound source parameter, and each of the input nodes of the input network $net_{in2}$ is linked to each of the output nodes of the output network $net_{out2}$ corresponding to the vocal tract parameter.

FIGS. 36B-36E illustrate the link weight matrices of the input-output relationship model of FIG. 36A.

As previously discussed, in the input-output relationship model of FIG. 36A, each of the input nodes of the input network $net_{in1}$ corresponding to the pitch data is linked to each of the output nodes of the output network $net_{out1}$ corresponding to the sound source parameter, and each of the input nodes of the input network $net_{in2}$ corresponding to the cepstrum data is linked to each of the output nodes of the output network $net_{out2}$ corresponding to the vocal tract parameter. Furthermore, each of the input nodes of the input network $net_{in1}$ corresponding to the pitch data is linked to each of the output nodes of the output network $net_{out2}$ corresponding to the vocal tract parameter, and each of the input nodes of the input network $net_{in2}$ corresponding to the cepstrum data is linked to each of the output nodes of the output network $net_{out1}$ corresponding to the sound source parameter.

Four link weight matrices $MTX_{11}$, $MTX_{12}$, $MTX_{21}$, and $MTX_{22}$ are arranged. The link weight matrix $MTX_{11}$ of FIG. 36B indicates link weights between the input network $net_{in1}$ and the output network $net_{out1}$. The link weight matrix $MTX_{12}$ of FIG. 36C indicates link weights between the input network $net_{in1}$ and the output network $net_{out2}$. The link weight matrix $MTX_{21}$ indicates link weights between the input network $net_{in2}$ and the output network $net_{out1}$. The link weight matrix $MTX_{22}$ indicates link weights between the input network $net_{in2}$ and the output network $net_{out2}$. During the learning of the input-output relationship model of FIG. 36A, the link weight updating unit 222 (FIG. 21) updates the link weights w as elements of the four link weight matrices $MTX_{11}$ of FIG. 36B, $MTX_{12}$ of FIG. 36C, $MTX_{21}$ of FIG. 36D, and $MTX_{22}$ of FIG. 36E.

If the input-output relationship model of FIG. 36A is stored in the storage unit 211 in the data processing apparatus of FIG. 21, the learning of the input-output relationship model is performed in the same way as the learning of the input-output relationship model of FIGS. 30A-30E discussed with reference to the flowchart of FIG. 32.

Figure 32:
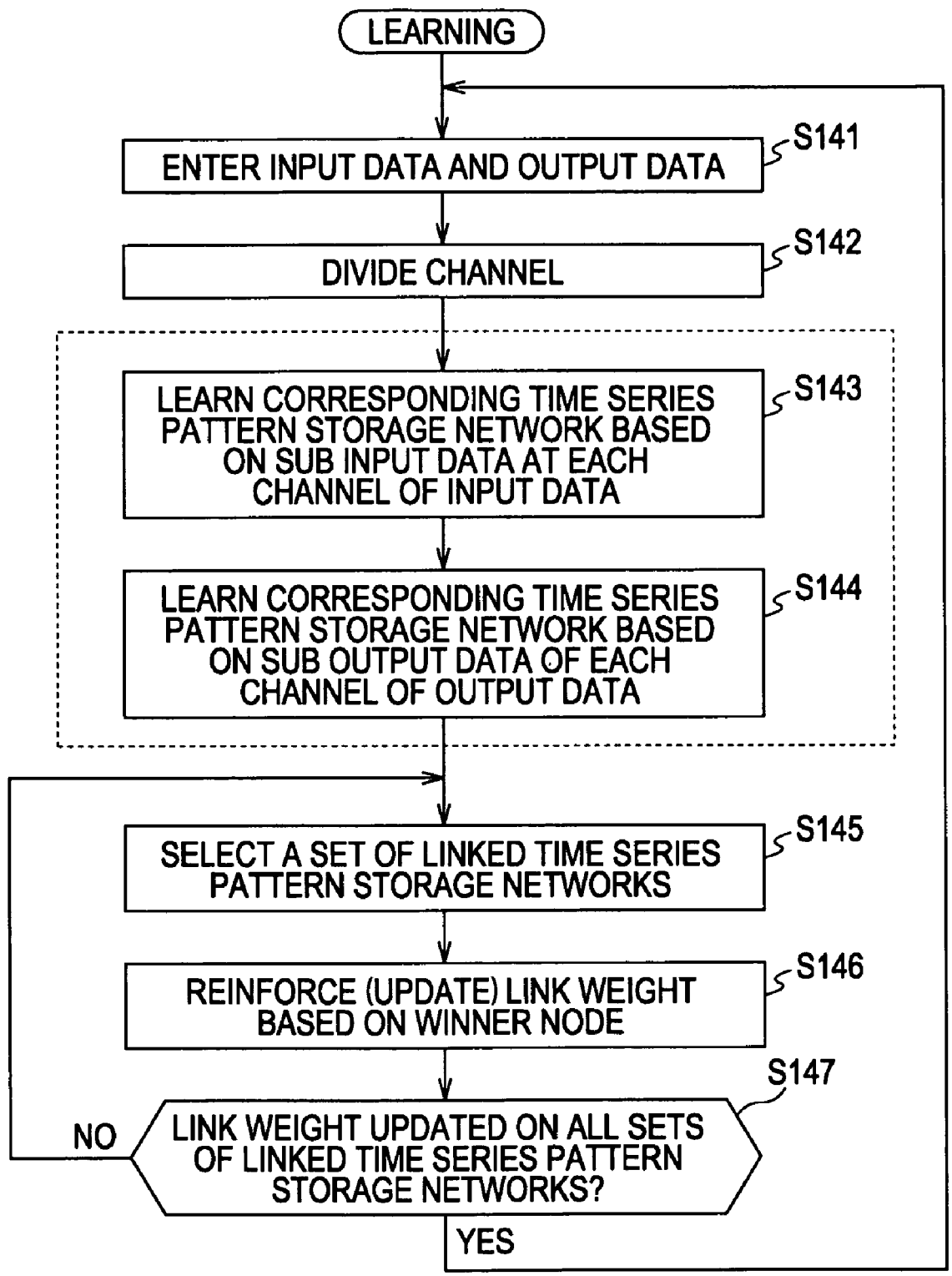
FIG. 32 is a flowchart illustrating a learning process of the input-output relationship model.

The discussion of the learning of the input-output relationship model of FIG. 36 is identical to the discussion of FIG. 32 except that the "pitch data", the "cepstrum data", the "sound source parameter", and the "vocal tract parameter" are substituted for the "input audio data", the "input video data", the "output audio data", and the "output motor data", respectively, and the discussion thereof is omitted herein.

Figure 37:
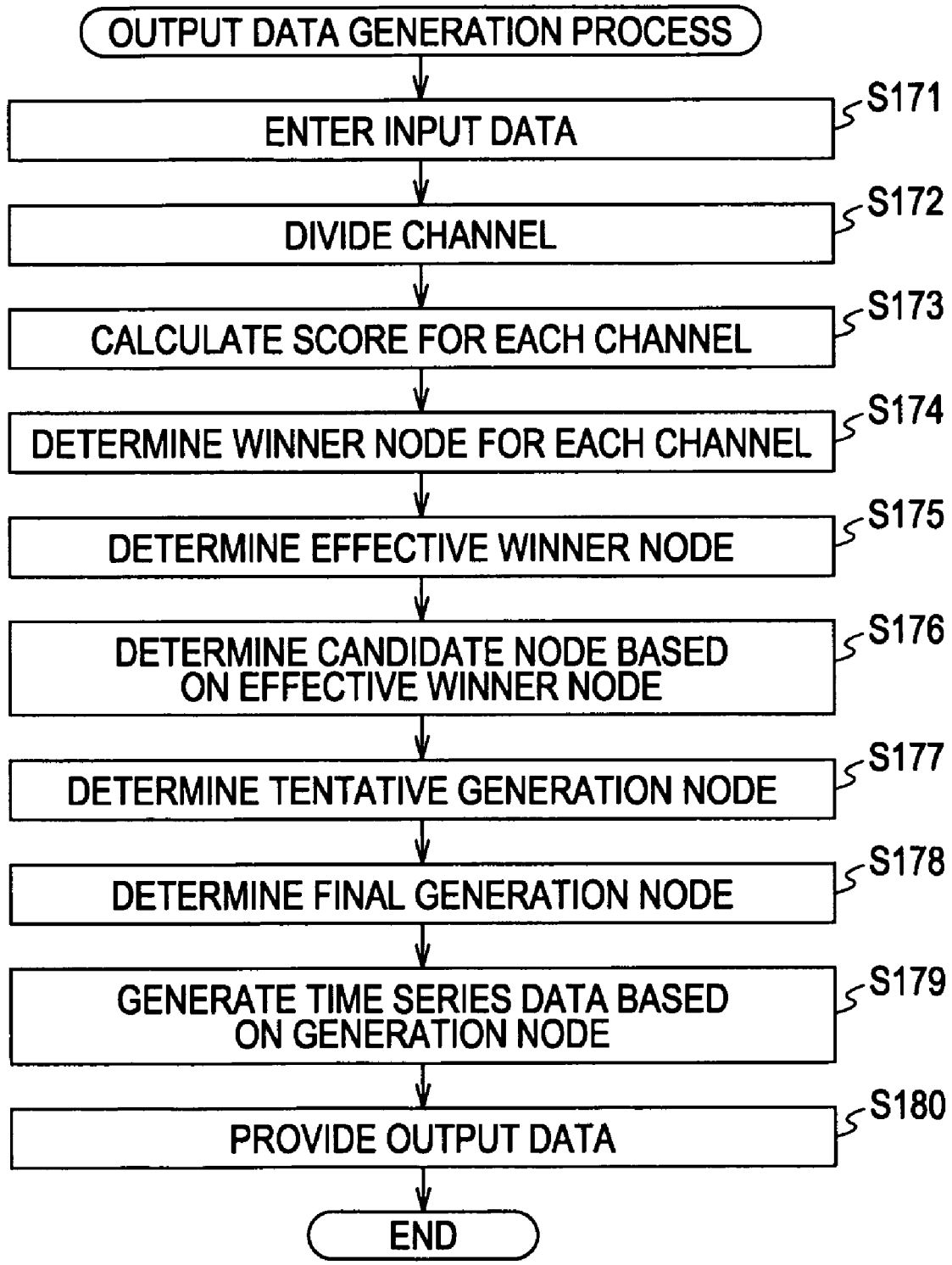
FIG. 37 is a flowchart illustrating a process of inferring output data using the input-output relationship model.

Referring to a flowchart of FIG. 37, a process of the data processing apparatus of FIG. 21 for inferring output data responsive to input data is described. The data processing apparatus uses the input-output relationship model of FIG. 36A as a forward model of the robot of FIG. 34.

The robot of FIG. 34 extracts the pitch frequency and the cepstrum coefficient from the audio data input to the robot. The sound source parameter and the vocal tract parameter are required to output a sound from the robot.

The input-output relationship model of FIG. 36A as the forward model of the robot of FIG. 34 is based on the premise that the input data contains significant pitch data and significant cepstrum data as sub input data and that the output data contains a significant sound source parameter and a significant vocal tract parameter as sub output data.

In step S171, the input data to be used to infer the output data is input to the data processing apparatus of FIG. 21. More specifically, the input data contains the pitch data as sub input data of one channel and the cepstrum data sub input data of another channel, the pitch data and the cepstrum data respectively being the time series pitch frequency and the time series cepstrum coefficient successively extracted from the time series audio data.

The input data entered to the data processing apparatus is supplied to the score calculator 231 in the recognition generator 213 (FIG. 21).

In step S172, the score calculator 231 divides the 2-channel sub input data, contained in the input data, into sub input data by channel, namely, into the pitch data and the cepstrum data and proceeds to step S173.

In step S173, the score calculator 231 calculates scores of the pitch data of one channel and the cepstrum data of another channel, contained in the input data.

In step S173, the score calculator 231 calculates the score of each input node of the input network $net_{in1}$ (FIG. 36A) corresponding to the pitch data in the input-output relationship model stored in the storage unit 211, and supplies the calculated score to the winner node determiner 232.

In step S173, the score calculator 231 also calculates the score of each input node of the input network $net_{in2}$ (FIG. 36A) corresponding to the cepstrum data in the input-output relationship model stored in the storage unit 211, and supplies the calculated score to the winner node determiner 232. Processing proceeds to step S174.

In step S174, the winner node determiner 232 determines, as a winner node most appropriately matching the pitch data, an input node having the highest score from the score calculator 231, from among the input nodes of the input network $net_{in1}$ corresponding to the pitch data.

In step S174, the winner node determiner 232 determines, as a winner node most appropriately matching the cepstrum data, an input node having the highest score from the score calculator 231, from among the input nodes of the input network $net_{in2}$ corresponding to the cepstrum data. Processing proceeds to step S175.

In step S175, the winner node determiner 232 determines an effective winner node from the winner node of the input network $net_{in1}$ corresponding to the pitch data and the winner node of the input network $net_{in2}$ corresponding to the cepstrum data.

Since the input-output relationship model of FIG. 36A is based on the premise that the input data contains the significant pitch data and the significant cepstrum data as the sub input data, the winner node of the input network $net_{in1}$ corresponding to the significant pitch data is reliably determined to be the effective winner node and the winner node of the input network $net_{in2}$ corresponding to the significant cepstrum data is also reliably determined to be the effective winner node.

When the winner node determiner 232 determines the winner node of the input network $net_{in1}$ corresponding to the significant pitch data to be the effective winner node and the winner node of the input network $net_{in2}$ corresponding to the significant cepstrum data to be the effective winner node in step S175, node labels representing the two winner nodes are supplied to the generation node determiner 233. Processing proceeds to step S176.

In step S176, the generation node determiner 233 determines a candidate node as a generation node candidate based on the two node labels from the winner node determiner 232.

The two node labels supplied from the winner node determiner 232 to the generation node determiner 233 respectively represent the effective winner node of the input network $net_{in1}$ corresponding to the pitch data and the effective winner node of the input network $net_{in2}$ corresponding to the cepstrum data. The generation node determiner 233 determines, as a candidate node, an output node having the heaviest link weight with the effective winner node, from among the output nodes of the output network $net_{out1}$ (FIG. 36A) corresponding to the sound source parameter, linked to the effective winner node of the input network $net_{in1}$ corresponding to the pitch data. The generation node determiner 233 also determines, as a candidate node, an output node having the heaviest link weight with the effective winner node, from among the output nodes of the output network $net_{out2}$ (FIG. 36A) corresponding to the vocal tract parameter, linked to the effective winner node of the input network $net_{in1}$ corresponding to the pitch data.

The generation node determiner 233 further determines, as a candidate node, an output node having the heaviest link weight with the effective winner node, from among the output nodes of the output network $net_{out1}$ corresponding to the sound source parameter, linked to the effective winner node of the input network $net_{in2}$ corresponding to the cepstrum data. The generation node determiner 233 determines, as a candidate node, an output node having the heaviest link weight with the effective winner node, from among the output nodes of the output network $net_{out2}$ corresponding to the vocal tract parameter, linked to the effective winner node of the input network $net_{in2}$ corresponding to the cepstrum data.

A total of four output nodes are determined to be candidate nodes, including the two output nodes of the output network $net_{out1}$ corresponding to the sound source parameter and the two output nodes of the output network $net_{out2}$ corresponding to the vocal tract parameter.

Subsequent to the determination of the candidate nodes in step S176, processing proceeds to step S177. To determine one generation node for one output network, the generation node determiner 233 tentatively determines, as a generation node (tentative generation node), one of the two candidate nodes of the output network $net_{out1}$ corresponding to the sound source parameter. The generation node determiner 233 also tentatively determines, as a generation node, one of the two candidate nodes of the output network $net_{out2}$ corresponding to the vocal tract parameter.

The two candidate nodes of the output network $net_{out1}$ corresponding to the sound source parameter include an output node $N_{11}$ of the output network $net_{out1}$, having the heaviest link weight with the effective winner node of the input network $net_{in1}$ corresponding to the pitch data, and an output node $N_{21}$ having the heaviest link weight with the effective winner node of the input network $net_{in2}$ corresponding to the cepstrum data.

The generation node determiner 233 compares the link weights of the two candidate nodes $N_{11}$ and $N_{21}$ present in the output network $net_{out1}$ with the winner nodes, the link weights having been used in the determination of the candidate nodes, namely, compares the link weight between the winner node of the input network $net_{in1}$ and the candidate node $N_{11}$ with the link weight between the winner node of the input network $net_{in2}$ and the candidate node $N_{21}$. The generation node determiner 233 then determines one of the candidate nodes having the heavier link weight to be a tentative generation node.

Similarly, the generation node determiner 233 determines one of the two candidate nodes of the output network $net_{out2}$ corresponding to the vocal tract parameter to be a tentative generation node.

Through the process in step S177, a single output node of the output network $net_{out1}$ corresponding to the sound source parameter is determined to be the tentative generation node, and a single output node of the output network $net_{out2}$ corresponding to the vocal tract parameter is determined to be the tentative generation node.

Processing proceeds to from step S177 to step S178. The generation node determiner 233 finally determines a effective tentative generation node (output node) from among the tentative generation nodes determined in step S177 to be a generation node.

As previously discussed, the input-output relationship model of FIG. 36A is based on the premise that the output data contains as the sub output data the significant sound source parameter and the significant vocal tract parameter. In step S178, the output node, which is a single tentative generation node present in the output network $net_{out1}$ corresponding to the sound source parameter, is determined to be definitely an effective tentative generation node, namely, a generation node. Similarly, the output node, which is a single tentative generation node in the output network $net_{out2}$ corresponding to the vocal tract parameter, is determined to be definitely an effective tentative generation node, namely, a generation node.

The generation node determiner 233 supplies to the time series generator 234 a node label $L_1$ representing a single generation node out of the output nodes of the output network $net_{out1}$ corresponding to the sound source parameter and a node label $L_2$ representing a single generation node out of the output nodes of the output network $net_{out2}$ corresponding to the vocal tract parameter. Processing proceeds from step S178 to step S179.

In step S179, the time series generator 234 generates a sound source parameter as time series data, based on the time series pattern model 21 (FIG. 7) of the generation node represented by the node label $L_1$ from the generation node determiner 233, from among the nodes of the output network $net_{out1}$ corresponding to the sound source parameter. The time series generator 234 generates a vocal tract parameter as time series data, based on the time series pattern model 21 of the generation node represented by the node label $L_2$ from the generation node determiner 233, from among the nodes of the output network $net_{out2}$ corresponding to the vocal tract parameter. Output data containing as time series data the sound source parameter and the vocal tract parameter is thus output.

The output data is supplied to the audio output device that outputs a sound in accordance with the sound source parameter and the vocal tract parameter. The audio output device thus outputs the sound in accordance with the sound source parameter and the vocal tract parameter.

Figures 38, 39:
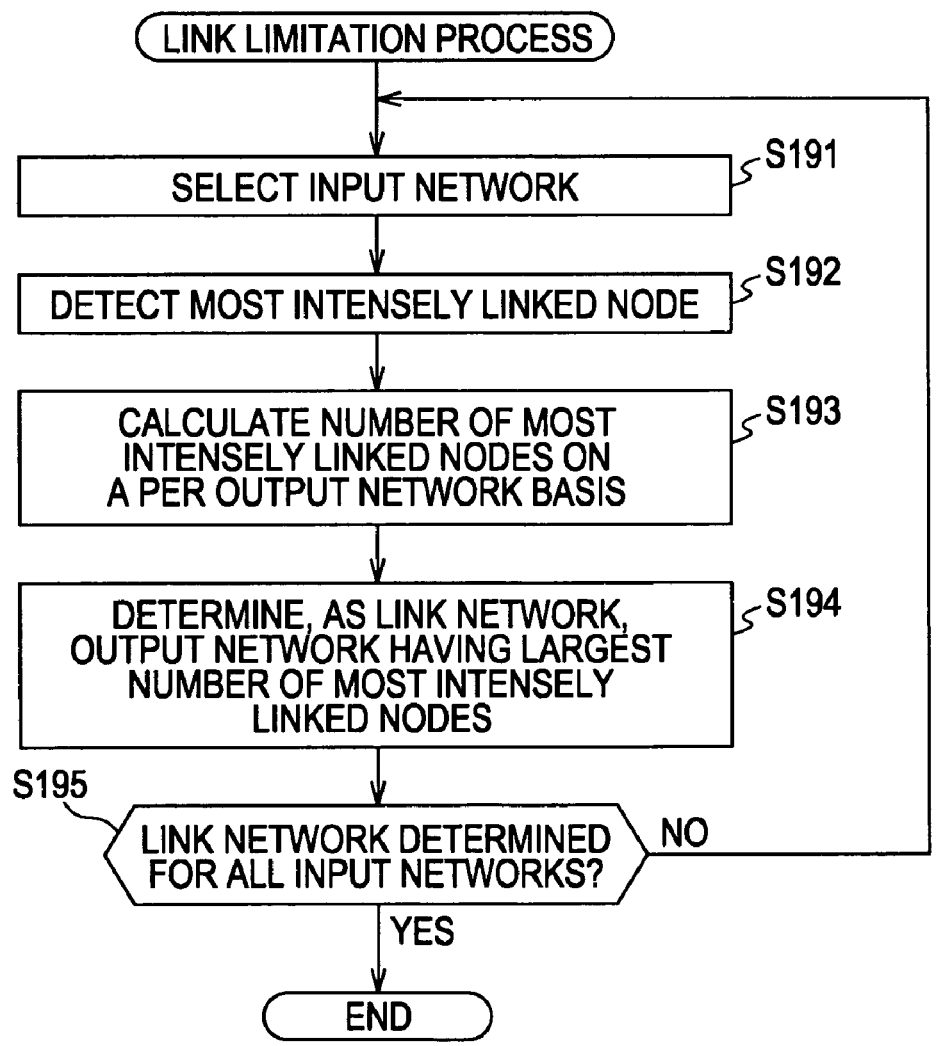
FIG. 38 illustrates simulation results.
FIG. 39 is a flowchart illustrating a link limitation process.

FIG. 38 illustrates simulation results of an inference process of inferring the output data responsive to the input data. The learning of the input-output relationship model as the forward model of the robot of FIG. 34 is performed, and the inference process is performed using the learned input-output relationship model.

As previously discussed with reference to FIG. 34, in a simulation test, the voice input to the robot and the voice output from the robot include five voices "a", "i", "u", "e", and "o" as five phoneme categories and three types of voices in terms of intonation, namely, a flat intonation, an up intonation, and a down intonation. A total of 15 types of voices, namely, five types of phonemes by three types of intonations, are used. The total of 15 types of voices include the phoneme "a" combined with each of the flat, up, and down intonations, the phoneme "i" combined with each of the flat, up, and down intonations, the phoneme "u" combined with each of the flat, up, and down intonations, the phoneme "e" combined with each of the flat, up, and down intonations, and the phoneme "o" combined with each of the flat, up, and down intonations.

In the simulation test, a total of 10 persons (5 men and 5 women) pronounced the 15 types of voices by 10 times. Resulting voice data of 1500 (=15×10×10) samples was used as input data in supervising data for use in the learning of the input-output relationship model.

A time series of one-dimensional pitch frequency and thirteen-dimensional cepstrum coefficient were extracted from each of 1500 samples of audio data. The 1500 samples of data containing, as sub input data, pitch data in the form of the time series pitch frequency and cepstrum data in the form of cepstrum coefficient, were used as the input data in the supervising data for the learning of the input-output relationship model.

In the simulation test, the one-dimensional time series pitch frequency was provided as a sound source parameter, and eight-dimensional time series format frequency was provided as a vocal tract parameter. The audio output device (audio synthesizer) filters a sinusoidal wave having the pitch frequency as the sound source parameter using a filter having frequency characteristics specified by eight format frequencies as the vocal tract parameter, and thereby outputting a voice (sound). The audio output device is implemented by causing a computer to execute a program. Data containing as sub output data the sound source parameter and the vocal tract parameter to be supplied to the audio output device is used as the output data in the supervising data in the learning of the input-output relationship model.

A total of 1500 samples of output data (100 samples for each of the 15 types of voices) was prepared. In the learning of the input-output relationship model, a set of input data and output data for the same type of voice was provided to the input-output relationship model.

In the supervising data, the pitch data of the input data and the sound source parameter of the output data represent a pitch frequency. However, the pitch data of the input data is a time series pitch frequency extracted from a voice actually uttered by a person, and is thus diverse in characteristics. The sound source parameter of the output data is a time series pitch frequency characteristic of a synthesized sound output by the audio output device, and is thus less diverse than the pitch data of the input data.

The input-output relationship model is composed of the input network $net_{in1}$ and the input network $net_{in2}$, respectively corresponding to the pitch data and the cepstrum data contained in the input data, and the output network $net_{out1}$ and the output network $net_{out2}$ respectively corresponding to the sound source parameter and the vocal tract parameter contained in the output data.

In one prepared input-output relationship model, the input network $net_{in1}$ corresponding to the pitch data is linked to the output network $net_{out1}$ corresponding to the sound source parameter, and the input network $net_{in2}$ corresponding to the cepstrum data is linked to the output network $net_{out2}$ corresponding to the vocal tract parameter. In another prepared input-output relationship model (FIG. 36A), the input network $net_{in1}$ is linked to the output network $net_{out1}$, the input network $net_{in1}$ is linked to the output network $net_{out2}$, the input network $net_{in2}$ is linked to the output network $net_{out1}$, and the input network $net_{in2}$ is linked to the output network $net_{out2}$.

Each of the input networks $net_{in1}$ and $net_{in2}$ and the output networks $net_{out1}$ and $net_{out2}$ is composed of 36 nodes. The 36 nodes are arranged in a two-dimensional arrangement of 6 rows by 6 columns as shown in FIG. 8. Any two neighboring nodes in a horizontal direction are linked to each other and any two neighboring nodes in a vertical direction are linked to each other. A link weight matrix of one input network and another output network is a matrix of 36 rows by 36 columns.

The time series pattern model 21 (FIG. 7) of each node is 10-state left-to-right HMM, and the output probability density function of each state obeys the Gaussian distribution.

In the simulation test, 1500 samples of supervising data, each containing a set of the above-mentioned input data and the output data responsive to the input data, are selected by 10000 times in a random fashion, and supplied to the input-output relationship model to perform the learning of the input-output relationship model.

Using the input-output relationship model learned in this way, the output data responsive to the input was inferred.

In the inference of the output data, a total of six persons (three men and three women) different from the persons participated in the preparation of the supervising data were used. Each of the six persons uttered each of the 15 types of pronunciations 10 times, and 900 samples of audio data obtained were used as input data for use in the inference of the output data.

A one-dimensional pitch frequency and a thirteen-dimensional cepstrum coefficient, each as time series data, were extracted from each of the 900 samples of audio data, and 900 samples of data containing as sub input data the pitch data and the cepstrum data in the form of time series pitch frequency and time series cepstrum coefficient were used as input data for use in the inference of the output data.

In the simulation test, the 900 samples of input data were provided to the input-output relationship model. If the output data output from the input-output relationship model in response to the input data provided a voice of the same phoneme and the same intonation, a correct answer was treated as being achieved.

In the simulation test, the sound source parameter as time series data was generated from each output node of the output network $net_{out1}$ of the learned input-output relationship model based on the HMM as the time series pattern model 21 of that output node. Which of the flat, up, and down intonations the sound source parameter had was examined, and an intonation label was attached beforehand to each of the 36 output nodes of the output network $net_{out1}$.

A vocal tract parameter as time series data was generated from each output node of the output network $net_{out2}$ corresponding to the learned input-output relationship model, based on the time series pattern model 21 of that output node. Which of the phonemes "a", "i", "u", "e", and "o" the vocal tract parameter had was examined. A phoneme label representing a phoneme was attached beforehand to each of the 36 output nodes of the output network $net_{out2}$.

The audio output device actually outputted a sound based on the sound source parameter generated from the output node of the output network $net_{out1}$ and the vocal tract parameter generated from the output node of the output network $net_{out2}$, and the intonation label and the phoneme label were attached to the node by actually hearing that sound.

In the simulation test, the output data was determined to be a correct answer in the input-output relationship model with the input data provided, if the intonation label attached to the output node from which the sound source parameter was generated matched the intonation of the input data, and if the phoneme attached to the output node from which the vocal tract parameter was generated matched the phoneme of the input data.

FIG. 38 illustrates a correct answer rate at which the output data output from the input-output relationship model in response to the input data is correct.

In the input-output relationship model of FIG. 36A, there is no limitation on the link between the input network and the output network in the input-output relationship model, in other words, the input network $net_{in1}$ is linked to the output network $net_{out1}$ the input network $net_{in1}$ is linked to the output network $net_{out2}$, the input network $net_{in2}$ is linked to the output network $net_{out1}$ and the input network $net_{in2}$ is linked to the output network $net_{out2}$. In this case, as shown the in no-limitation column in FIG. 38, a correct answer rate of 80% results for the intonation and a correct answer rate of 70% results for the phoneme.

The learning of the input-output relationship model is an unsupervised learning process in which the supervising data explicitly shows the type of intonation and the type of phoneme of the voice. Since the correct answer rate as high as shown in FIG. 38 is obtained based on the input-output relationship model resulting from such unsupervised learning, the learning of the input-output relationship model is effectively performed.

An input-output relationship model might have a link between the input network $net_{in1}$ and the output network $net_{out1}$, and a link between the input network $net_{in2}$ the output network $net_{out2}$, but neither link between the input network $net_{in1}$ and the output network $net_{out2}$, nor link between the input network $net_{in2}$ and the output network $net_{out1}$. If the link between the input network and the output network in the input-output relationship model is limited in this way, a correct answer rate of 82% results for the intonation and a correct answer rate of 85% results for the phoneme as shown in the rightmost column in FIG. 38.

The correct answer rate does not drop so much in the case where there is no limitation on link between the input network and the output network in the input-output relationship model, in other words, in the input-output relationship model, whether the sub input data of one channel in the input data is related to the sub output data of another channel in the output data is unknown with one input network linked to all output networks and one output network linked to all input networks. More specifically, the correct answer rate does not drop so much in comparison with the case where there is limitation on link between the input network and the output network in the input-output relationship model, in other words, in the input-output relationship model, it is known beforehand that the sub input data of one channel in the input data is related to the sub output data of another channel in the output data, and an input network and an output network with sub input data and sub output data thereof related to each other are linked, but an input network and an output network with sub input data and sub output data thereof unrelated to each other are not linked. Regardless of whether it is known that the sub input data of one channel is related to the sub output data of another channel, the learning of the input-output relationship model is effectively performed.

As described above, the learning of the input-output relationship model is effectively performed regardless of whether it is known that the sub input data of one channel is related to the sub output data of another channel. The output data output by the object in response to the input data is accurately inferred using the learned input-output relationship model.

As shown in the simulation result of FIG. 38, the correct answer rate, namely, an inference accuracy of the output data may be slightly more degraded when it is unknown whether there is a relationship between the sub input data of one channel and the sub output data of another channel than when it is known that there is a relationship between the sub input data of one channel and the sub output data of another channel.

If it is known that there is a relationship between the sub input data of one channel and the sub output data of another channel, the input-output relationship model with the limitation imposed on the link between the input network and the output network is used. In other words, as shown in FIGS. 27A-27C, the input network and the output network have the respective sub input data and sub output data known to have a relationship to each other. A generation node determined in response to a winner node of a given input network during the inference of the output data must be the output node of the sub output data linked to the input network. As a result, during the inference of the output data, the sub output data output in response to the input data must be the sub output data having a relationship with the sub input data.

If it is unknown whether there is a relationship between the sub input data of one channel and the sub output data of another channel, the used input-output relationship model has no limitation between the input network and the output network with each of the input network linked to each of the output networks as discussed with reference to FIGS. 30A-30E. A generation node determined in response to the winner node of one input network during the inference of the output data can be any output node of the output network forming the input-output relationship model. During the inference of the output data, sub output data output in response to the input data can be theoretically sub output data unrelated to the sub input data.

When the input-output relationship model with limitation imposed on the link between the input network and the output network is used, only the sub output data related to the sub input data is output during the inference of the output data. When the input-output relationship model with no limitation imposed on the link between the input network and the output network is used, sub output data unrelated to the sub input data can be output during the inference of the output data.

The inference accuracy of the output data can be degraded slightly more when the input-output relationship model with no limitation imposed on the link between the input network and the output network is used than when the input-output relationship model with limitation imposed on the link between the input network and the output network is used.

In the input-output relationship model with no limitation imposed on the link between the input network and the output network, it is examined whether there is any relationship between the sub input data of one channel and the sub output data of another channel. Based on the examination result, the link between the input network and the output network is limited in order to prevent degradation of the inference accuracy of the output data.

FIG. 39 is a flowchart of a link limitation process in the input-output relationship model with no limitation imposed on the link between the input network and the output network. In the link limitation process, it is examined whether there is any relationship between the sub input data of one channel and the sub output data of another channel, and then the link between the input network and the output network is limited depending on the examination result. The input-output relationship model herein is composed of m-channel input networks and n-channel output networks.

The generation node determiner 233 (FIG. 21) performs the link limitation process after an input-output relationship model with no limitation imposed on the link between the input network and the output network has been in progress to some degree (i.e., after the learning of the input-output relationship model has been performed using some units of supervising data).

The storage unit 211 in the data processing apparatus of FIG. 21 stores the input-output relationship model with no limitation imposed on the link between the input network and the output network, and the learning section 212 has learned the input-output relationship model to some degree. In step S191, the generation node determiner 233 selects as a network of interest, one input network from among the m-channel input networks in the input-output relationship model stored in the storage unit 211.

Processing proceeds from step S191 to step S192. It is then examined whether there is any relationship between the sub input data of the channel corresponding to the input network of interest and the sub output data corresponding to each of the n-channel output networks in the input-output relationship model.

In step S192, the generation node determiner 233 detects, as the heaviest linked node, an output node having the heaviest link weight with each input node of the input network of interest, and proceeds to step S193.

As shown in FIG. 36A, the input-output relationship model with no limitation imposed on the link between the input network and the output network may include the input network $net_{in1}$ corresponding to the pitch data, the input network $net_{in2}$ corresponding to the cepstrum data, the output network $net_{out1}$ corresponding to the sound source parameter, and the output network $net_{out2}$ corresponding to the vocal tract parameter. If the input network $net_{in1}$ is selected as the input network of interest, an output node having the heaviest link weight with each input node of the input network $net_{in1}$, namely, the heaviest linked node is detected.

In response to the input node of the input network $net_{in1}$, an output node of the output network $net_{out1}$ corresponding to the sound source parameter may be selected as the heaviest linked node, or an output node of the output network $net_{out2}$ corresponding to the vocal tract parameter may be selected as the heaviest linked node.

In step S193, the generation node determiner 233 calculates (counts) the output nodes of the heaviest linked nodes in each of the n-channel output networks in the input-output relationship model stored in the storage unit 211, and proceeds to step S194.

In step S194, the generation node determiner 233 detects an output network having the maximum number of output nodes having become the heaviest linked nodes, from among the n-channel output networks in the input-output relationship model stored in the storage unit 211. The generation node determiner 233 determines that there is a relationship between the sub output data of the channel corresponding to the output network and the sub input data of the channel corresponding to the input network of interest. The generation node determiner 233 thus limits the output network to be linked to the input network of interest to the output network having the maximum number of output nodes having become the heaviest linked nodes.

In other words, the generation node determiner 233 thus determines the output network having the maximum number of output nodes having become the heaviest linked nodes to be a link network as a time series pattern storage network linked to the input network of interest.

Processing proceeds from step S194 to step S195. The generation node determiner 233 determines whether the determination of the link network has been completed on all the m-channel input networks.

If it is determined in step S195 that the determination of the link network has not been completed on all the m-channel input networks, processing returns to step 191. The generation node determiner 233 selects, as a new input network of interest, a still unselected one of the m-channel input networks, and repeats the above-mentioned process.

If it is determined in step S195 that the determination of the link network has been completed on all the m-channel input networks, the link limitation process ends.

Through the link limitation process, it is determined that there is a relationship between the sub output data corresponding to the output network $net_{out}$ having the maximum number of output nodes having become the heaviest linked nodes and the sub input data corresponding to the input network $net_{in}$, and the output network to be linked to the input network $net_{in}$ is limited to the output network $net_{out}$ having the maximum number of output nodes having become the heaviest linked nodes.

Even if the link limitation process limits the link between the input network and the output network in the input-output relationship model, the inference of the output data using the input-output relationship model is performed in a manner basically identical to that discussed with reference to FIG. 33.

As previously discussed with reference to step S157 of FIG. 33, the generation node determiner 233 determines one of a plurality of candidate nodes of the output network to be a tentative generation node. In the determination of the tentative generation node, the generation node determiner 233 takes into consideration whether the output network is the one determined through the link limitation process.

Figure 33:
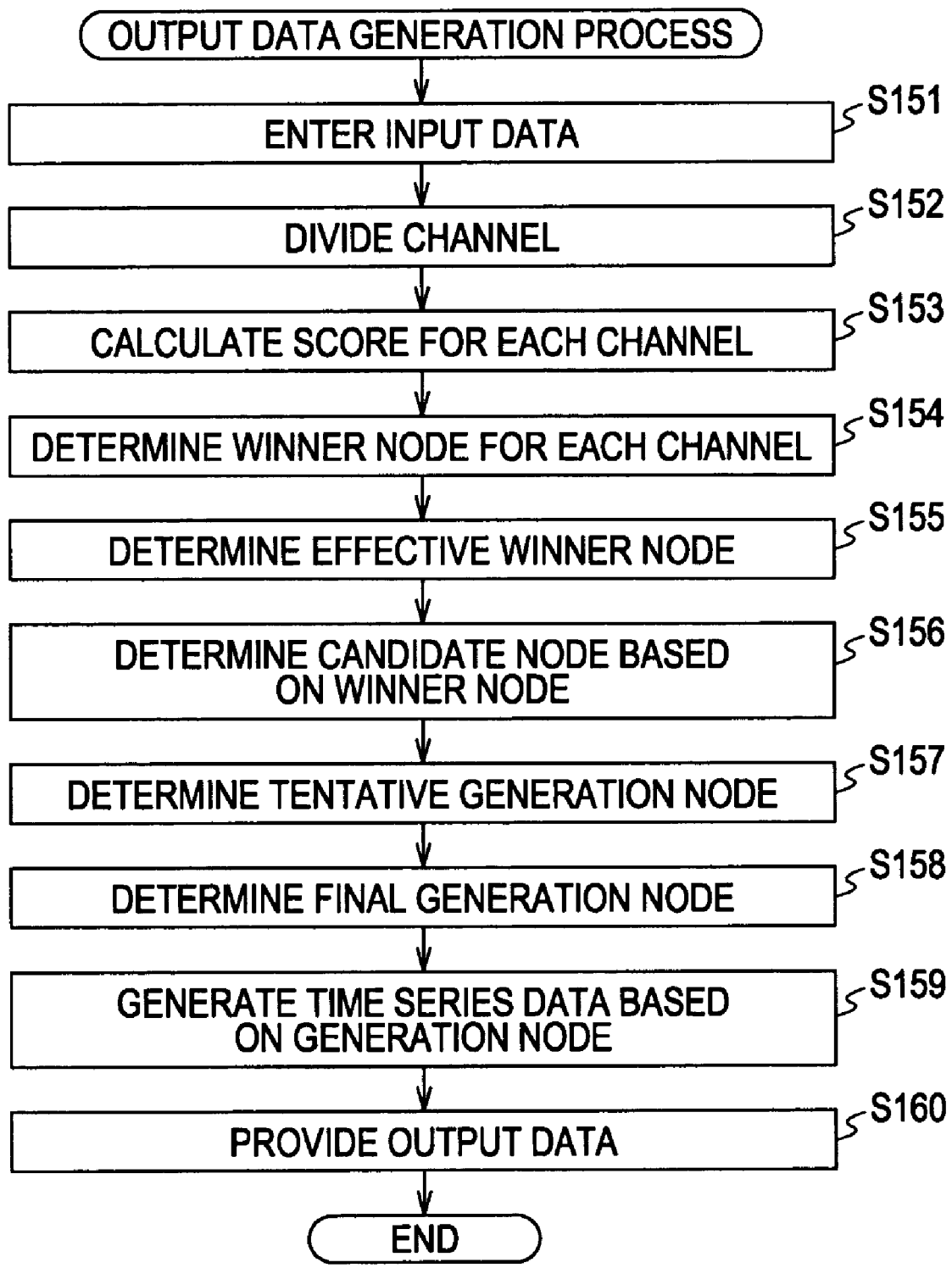
FIG. 33 is a flowchart illustrating a process of inferring output data using the input-output relationship model.

In step S156 of FIG. 33, the generation node determiner 233 determines, to be the candidate node, the output node of each of the n-channel output networks having the heaviest link weight with one effective winner node. For one effective winner node, n candidate nodes are obtained.

If the link network is determined in response to the input network in the link limitation process, the generation node determiner 233 leaves in step S157, as the candidate node, only the output node of the output network serving as the link network responsive to the input network having the effective winner node, from among the n candidate nodes obtained in response to the one effective winner node, and excludes the other n−1 output nodes of the output network from the candidate nodes.

The generation node determiner 233 then determines, to be the tentative generation node, one node of the output network if only that node is the candidate node of that output network. As previously discussed with reference to FIG. 33, if the output network has a plurality of output nodes serving as the candidate nodes, the generation node determiner 233 compares the link weights of candidate nodes with the effective winner node, the link weights used in the determination of the candidate node, and determines one candidate node having the heaviest link weight to be the tentative generation node.

For example, a link limitation process of FIG. 39 may be performed on the input-output relationship model of FIG. 36A, as the input-output relationship model with no limitation imposed on the link between the input network and the output network. As a result, an output network $net_{out2}$ corresponding to the sound source parameter is determined as a link network in response to the input network $net_{in1}$ corresponding to the pitch data. An output network $net_{out2}$ corresponding to the vocal tract parameter is determined as a link network in response to the input network $net_{in2}$ corresponding to the cepstrum data. During the inference of the output data, a sound source parameter as sub output data of the output data is generated from the output node of the output network $net_{out1}$ most heavily linked to the input node of the input network $net_{in1}$ serving as the winner node corresponding to the pitch data contained in the input data. A vocal tract parameter as sub output data of the output data is generated from the output node of the output network $net_{out2}$ most heavily linked to the input node of the input network $net_{in2}$ serving as the winner node corresponding to the cepstrum data contained in the input data.

The sound source parameter is generated as the sub output data in response to the pitch data, and the vocal tract parameter is generated as the sub output data in response to the cepstrum data.

Only the output node of the output network as the link network responsive to the input network having the winner node, from among the n candidate nodes obtained in response to one effective winner node, is left as the candidate node. The remaining n−1 output nodes of the output network are excluded from the candidate nodes in order to perform the inference of the output data. Such an inference process is identical to an inference process of output data that is performed using an input-output relationship model in which an input network having the winner node is linked to only the output network serving as the link network responsive to the input network, from among the n-channel output networks.

By performing the link limitation process on the input node with no limitation imposed on the link between the input network and the output network, that input-output relationship model achieves in the inference of the output data the same accuracy level as an input-output relationship model with limitation imposed on the link between the input network and the output network.

In the above-mentioned input-output relationship model, the input network as a time series pattern storage network storing a time series pattern of the input data (sub input data) is linked to the output network as a time series pattern storage network storing a time series pattern of the output data (sub output data). Optionally, input networks can be linked to each other, or output networks can be linked to each other.

An input-output relationship model with the input networks linked to each other is described below.

For example, the robot of FIG. 25A might be an object to be controlled. The robot is modeled into a forward model using the input-output relationship model with the input networks linked to each other.

In response to the input data containing the sub input data and the sub output data, the robot of FIGS. 25A and 25B outputs output data containing the output audio data and the output motor data.

Referring to FIG. 26, the input-output relationship model includes the two input networks $net_{in1}$ and $net_{in2}$ corresponding to sub input data of the two channels contained in the input data, and the two output networks $net_{out1}$ and $net_{out2}$ corresponding to the sub output data of the two channels contained in the output data.

It may be unknown that there is a relationship between sub input data of one channel in the input data and sub output data of another channel in the output data. In the input-output relationship model, the input network $net_{in1}$ may be linked to each of the output network $net_{out1}$ and the output network $net_{out2}$ and the input network $net_{in2}$ may be linked to each of the output network $net_{out1}$ and the output network $net_{out2}$.

Furthermore in the input-output relationship model, the input network $net_{in1}$ may be linked to the input network $net_{in2}$.

FIG. 40B illustrates such an input-output relationship model.

The input-output relationship model of FIG. 40B includes the input networks $net_{in1}$ and $net_{in2}$ and the output networks $net_{out1}$ and $net_{out2}$. The input network $net_{in1}$ is linked to each of the output networks $net_{out1}$ and $net_{out2}$, and the input network $net_{in2}$ is linked to each of the output networks $net_{out1}$ and $net_{out2}$. Furthermore in the input-output relationship model of FIG. 40B, the input network $net_{in1}$ is linked to the input network $net_{in2}$.

FIGS. 41A-41F illustrate link weight matrices of the input-output relationship model of FIG. 40B.

In the input-output relationship model of FIG. 40B, the input network $net_{in1}$ is linked to each of the output networks $net_{out1}$ and $net_{out2}$, and the input network $net_{in2}$ is linked to each of the output networks $net_{out1}$ and $net_{out2}$. As in the input-output relationship model of FIG. 30A, the link weight matrices of the input-output relationship model include a link weight matrix $MTX_{11}$ (FIG. 41B) between the input network $net_{in1}$ and the output network $net_{out1}$, a link weight matrix $MTX_{12}$ (FIG. 41C) between the input network $net_{in1}$ and the output network $net_{out2}$, a link weight matrix $MTX_{21}$ (FIG. 41E) between the input network $net_{in2}$ and the output network $net_{out1}$, and a link weight matrix $MTX_{22}$ (FIG. 41F) between the input network $net_{in2}$ and the output network $net_{out2}$.

Since the input network $net_{in1}$ is linked to the input network $net_{in2}$ in the input-output relationship model of FIG. 40A, the link weight matrices include a link weight matrix $MTX_{in12}$ (FIG. 41A) between the input networks $net_{in1}$ and $net_{in2}$. In the link weight matrix $MTX_{in12}$, the input nodes of the input network $net_{in1}$ are mapped to the respective rows and the inputs of the output network $net_{out2}$ are mapped to the respective columns. A link weight w between an i-th input node of the input network $net_{in1}$ and a j-th input node of the input network $net_{in2}$ is arranged as an element at an i-th row and a j-th column of the link weight matrix $MTX_{in12}$.

The link weight matrices of the input-output relationship model of FIG. 40A include a link weight matrix $MTX_{in21}$ (FIG. 41D) between the input networks $net_{in2}$ and $net_{in1}$. In the link weight matrix $MTX_{in21}$, the input nodes of the input network $net_{in2}$ are mapped to the respective rows and the inputs of the output network $net_{out1}$ are mapped to the respective columns. A link weight w between an i-th input node of the input network $net_{in2}$ and a j-th input node of the input network $net_{in1}$ is arranged as an element at an i-th row and a j-th column of the link weight matrix $MTX_{in21}$.

The link weight matrix $MTX_{in21}$ is the transpose of the link weight matrix $MTX_{in12}$. One matrix is sufficient because the other matrix can be determined from the one matrix.

The learning of the input-output relationship model of FIG. 40B is basically identical to the learning of the input-output relationship model of FIG. 30A as previously discussed with reference to FIG. 32.

In the loop process from step S145 through step S147 of FIG. 32, the link weight matrix is updated in a set of the input network and the output network with the nodes thereof linked to each other in the input-output relationship model of FIG. 30A. In the input-output relationship model of FIG. 40B, the link weight matrix $MTX_{in12}$ ($MTX_{in21}$) is updated in a set of the input networks $net_{in1}$ and $net_{in2}$ with the nodes thereof linked to each other.

As previously described with reference to the input-output relationship model of FIG. 30A, a large number of pieces of supervising data may be provided to the learning of the input-output relationship model of FIG. 40B. The supervising data may contain a correlation between the input audio data and the output audio data, and a correlation between the input video data and the output motor data, but neither correlation between the input audio data and the output motor data nor correlation between the input video data and the output audio data. The link weight matrix $MTX_{11}$ between the input network $net_{in1}$ corresponding to the input audio data and the output network $net_{out1}$ corresponding to the output audio data correlated with the input audio data reflects the correlation between the input audio data and the output audio data. As a result, each input node of the input network $net_{in1}$ has a heavier link weight with a particular output node of the output network $net_{out1}$ than with the other output nodes, and each output node of the output network $net_{out1}$ has a heavier link weight with a particular input node of the input network $net_{in1}$ than with the other input nodes.

For example, the learning of the input-output relationship model of FIG. 40B is performed using supervising data containing a set of input data as input audio data "circle" (voice pronunciation) and output data as output audio data "circle," for example. One input node $N_{in1}$ (time series pattern model 21) of the input network $net_{in1}$ corresponding to the input audio data describes a time series pattern of audio data "circle," and one input node $N_{out1}$ (time series pattern model 21) of the output network $net_{out1}$ corresponding to the output audio data also describes a time series pattern of audio data "circle."

The link weight matrix $MTX_{11}$ between the input network $net_{in1}$ and the output network $net_{out1}$ reflects the input audio data "circle" and the output audio data "circle". As a result, the input node $N_{in1}$ describing the time series pattern of the audio data "circle" in the input network $net_{in1}$ has a heavier link weight with the output node $N_{in1}$ describing the time series pattern of the audio data "circle" in the output network $net_{out1}$ that with the other output nodes. Furthermore, the $N_{out2}$ in the output network $net_{out1}$ has a heavier link weight with the input node $N_{in1}$ of the input network $net_{in1}$ than the other input nodes.

The link weight matrix $MTX_{22}$ between the input network $net_{in2}$ corresponding to the input video data and the output network $net_{out2}$ corresponding to the output motor data correlated with the input video data reflects the correlation between the input video data and the output motor data. As a result, each input node of the input network $net_{in2}$ has a heavier link weight with a particular output node of the output network $net_{out2}$ than with the other output nodes, and each output node of the output network $net_{out2}$ has a heavier link weight with a particular input node of the input network $net_{in2}$ than with the other input nodes.

A large number of units of supervising data may be used to learn the input-output relationship model of FIG. 40B. The supervising data contains a set of input data and output data. The input data contains, as input video data, video data representing a "circle" trajectory along which an object moves, and the output data contains, as output motor data, a signal driving a motor to cause the end of the arm of the robot to move along the "circle" trajectory. One input node $N_{in2}$ of the input network $net_{in2}$ corresponding to the input video data represents a time series pattern of the video data that shows the "circle" trajectory of the arm of the robot.

One output node $N_{out2}$ of the output network $net_{out2}$ corresponding to the output motor data represents a time series pattern of the motor data driving the motor to cause the end of the arm of the robot to move along the "circle" trajectory.

The link weight matrix $MTX_{22}$ between the input network $net_{in2}$ and the output network $net_{out2}$ reflects a correlation between the input video data that shows the "circle" trajectory of the object and the output motor data driving the motor to cause the end of the arm of the robot to move along the "circle" trajectory. As a result, the input node $N_{in2}$ of the input network $net_{in2}$ corresponding to the input video data representing the time series pattern of the video data that shows the "circle" trajectory has a heavier link weight with the output node $N_{out2}$ of the output network $net_{out2}$ corresponding to the output motor data representing the time series pattern of the motor data driving the motor to cause the end of the arm of the robot to move along the "circle" trajectory, than with the other output nodes. Furthermore, the output node $N_{out2}$ of the output network $net_{out2}$ has a heavier link weight with the input node $N_{in2}$ of the input network $net_{in2}$ than with other input nodes.

The link weight matrix $MTX_{12}$ between the input network $net_{in1}$ corresponding to the input audio data and the output network $net_{out2}$ corresponding to the output motor data uncorrelated with the input audio data reflects a smaller degree of correlation between the input audio data and the output motor data. As a result, each input node of the input network $net_{in1}$ has generally a lighter link weight with each output node of the output network $net_{out2}$, and each output node of the output network $net_{out2}$ has generally a lighter link weight with each input node of the input network $net_{in1}$.

Similarly, the link weight matrix $MTX_{21}$ between the input network $net_{in2}$ corresponding to the input video data and the output network $net_{out1}$ corresponding to the output audio data uncorrelated with the input video data reflects a lighter link weight between the input video data and the output audio data. As a result, each input node of the input network $net_{in2}$ has generally a lighter link weight with each output node of the output network $net_{out1}$ and each output node of the output network $net_{out1}$ has generally a lighter link weight with each input node of the input network $net_{in2}$.

The supervising data provided for the learning of the input-output relationship model of FIG. 40B might have a correlation between the input audio data and the input video data. In such a case, the link weight matrix $MTX_{in12}$ (link weight matrix $MTX_{in21}$) between the input network $net_{in1}$ corresponding to the input audio data and the input network $net_{in2}$ corresponding to the input video data correlated with the input audio data reflects the correlation between the input audio data and the input video data. As a result, each input node of the input network $net_{in1}$ has a heavier link weight with a particular input node of the input network $net_{in2}$ than with the other input nodes of the input network $net_{in2}$. Each input node of the input network $net_{in2}$ has a heavier link weight with a particular input node of the input network $net_{in1}$ than with the other input nodes of the input network $net_{in1}$.

A large number of units of supervising data may be used to learn the input-output relationship model of FIG. 40B. The supervising data contains a set of input data and output data. The input data contains, as input audio data, audio data "circle," and, as input video data, video data that shows a "circle" trajectory of the object. One input node $N_{in1}$ of the input network $net_{in1}$ corresponding to the input audio data represents a time series pattern of the audio data "circle", and one input node $N_{in2}$ of the input network $net_{in2}$ corresponding to the input video data represents a time series pattern of the video data that shows a "circle" trajectory.

The link weight matrix $MTX_{in12}$ between the input network $net_{in1}$ and the input network $net_{in2}$ reflects a correlation between the input audio data "circle" and the input video data that shows the "circle" trajectory of the object. As a result, the input node $N_{in1}$ of the input network $net_{in1}$ representing the audio data "circle" has a heavier link weight with the input node $N_{in2}$ of the input network $net_{in2}$ representing the pattern of the video data that shows the "circle" trajectory than with the other input nodes of the input network $net_{in2}$. Furthermore, the input node $N_{in2}$ of the input network $net_{in2}$ has a heavier link weight with the input node $N_{in1}$ of the input network $net_{in1}$ than with the other input nodes of the input network $net_{in1}$.

An inference process of the data processing apparatus of FIG. 21 for inferring the output data responsive to the input data is described below with reference to a flowchart of FIG. 42. The data processing apparatus uses the input-output relationship model of FIG. 40B that has been learned as described above. The input-output relationship model also includes m-channel input networks and n-channel output networks herein.

Steps S201 through S204, respectively identical to steps S131 through S134 of FIG. 29, are performed. Subsequent to step S204, processing proceeds to step S205.

Through steps S201 through S204, the winner node determiner 232 in the recognition generator 213 (FIG. 21) determines a winner node for each of the m-channel input networks. In step S205, the winner node determiner 232 determines an effective winner node from the winner nodes of the m-channel input networks in the same way as in step S135 of FIG. 29. If the number of effective winner nodes is zero, the recognition generator 213 (FIG. 21) ends the process.

If the number of effective winner nodes is one or more, processing proceeds from step S205 to step S206. The winner node determiner 232 determines, as a quasi winner node, an input node having the heaviest link weight with the effective winner node, from among the input nodes of an input network different from and linked to an input network having the effective winner node.

If the effective winner node is one input node of the input network $net_{in1}$ in the input-output relationship model of FIG. 40B, an input node of the input network $net_{in2}$ having the heaviest link weight with the winner node is determined as a quasi-winner node.

In step S206, the winner node determiner 232 determines the quasi-winner node for each of the effective winner nodes, and processing proceeds to step S207.

The effective winner node and the quasi-winner node are collectively referred to as firing nodes.

In step S207, the winner node determiner 232 determines at least one firing node to be an optimum node.

As previously discussed, an input network having an input node that has been determined to be a quasi-winner node with reference to the effective winner node may have another effective winner node. In such a case, the input network includes two firing nodes, namely, an input node serving as the effective winner node and an input node serving as the quasi-winner node. In step S207, to limit the number of firing nodes in one input network to at most one, at most one firing node is determined to be an optimum node in each input network.

More specifically, in an input network where only a single input node becomes a firing node, that firing node is determined to be an optimum node.

If an effective winner node is present among a plurality of firing nodes in an input network having a plurality of input nodes serving as firing nodes, that effective winner node is determined to be an optimum node.

If no effective winner node is present among the plurality of firing nodes, namely, if the plurality of firing nodes are all quasi-winner nodes, the link weights of the quasi-winner nodes with the effective winner node, used when input nodes are determined to be quasi-winner nodes, are compared with each other, and the quasi-winner node having the heaviest link weight is determined to be an optimum node.

When at most one firing node is determined to be an optimum node in each input network in step S207, processing proceeds to step S208. The winner node determiner 232 determines whether to determine the input node having become the optimum node to be an effective node to be used in the determination of a candidate node in step S209.

If the optimum node is an effective winner node, the winner node determiner 232 determines the optimum node to be an effective node.

If the optimum node is not an effective winner node, namely, if the optimum node is a quasi-winner node, the winner node determiner 232 determines whether to determine the optimum node to be an effective node, based on the link weight with the effective winner node used when the input node is determined to be the quasi-winner node.

More specifically, if the optimum node is a quasi-winner node, the winner node determiner 232 compares, with a threshold value, the link weights with the effective winner node used when the input node is determined to be the quasi-winner node. Only if the link weight is above the threshold value, the optimum node is determined to be an effective node.

The winner node determiner 232 thus determines at least one effective node, and supplies a node label representing the effective node to the generation node determiner 233. Processing proceeds from step S208 to step S209.

As in step S156 of FIG. 33, the generation node determiner 233 determines in step S209 a candidate node as a candidate of a generation node based on the at least one node label supplied from the winner node determiner 232.

The generation node determiner 233 selects one of at least one node label from the winner node determiner 232 as a node label of interest, and selects one of the n-channel output networks as an output network of interest in the input-output relationship model. The generation node determiner 233 further determines an output node having the heaviest link weight with the effective node represented by the node label of interest from among the nodes of the output network of interest.

The generation node determiner 233 successively selects one of the n-channel output networks as an output network of interest to determine a candidate node as discussed above.

The generation node determiner 233 successively selects at least one node label from the winner node determiner 232 as a node label of interest to determine a candidate node as discussed above.

Subsequent to the determination of the candidate node in step S209, processing proceeds to steps S210 to S213. Steps S210 through S213, identical to steps S157 through S160 of FIG. 33, are then performed. The resulting output data is provided.

The input-output relationship model of FIG. 40B is learned using three types of supervising data, including first supervising data, second supervising data, and third supervising data. The first supervising data contains a set of input data and output data. The input data contains, as input audio data, input audio data "circle", and as input video data, any image data, and the output data contains, as output motor data, any motor data. The second supervising data contains a set of input data and output data. The input data contains, as input audio data, any audio data, and as input video data, video data that shows that an object moves along a "circle" trajectory. The output data contains, as output audio data, any audio data and, as output motor data, motor data driving the motor to cause the end of the arm of the robot to move along the "circle" trajectory. The third supervising data contains a set of input data and output data. The input data contains, as input audio data, audio data pronouncing "circle" and, as input video data, video data that shows that the object moves along the "circle" trajectory. The output data contains any data. In response to the first supervising data, one input node $N_{in1}$ of the input network $net_{in1}$ corresponding to the input audio data represents a time series pattern of the audio data "circle", and one output node $N_{out1}$ of the output network $net_{out1}$ corresponding to the output audio data represents a time series pattern of the audio data "circle".

In response to the first supervising data, the link weight of the input node $N_{in1}$ representing the time series pattern of the audio data "circle" with the output node $N_{out1}$ representing the time series pattern of the audio data "circle" is updated to be heaviest in the link weight matrix $MTX_{11}$ between the input network $net_{in1}$ and the output network $net_{out}$.

In response to the second supervising data, the input node $N_{in2}$ of the input network $net_{in2}$ corresponding to the input video data represents the time series pattern of the video data that shows the "circle" trajectory, and the output node $N_{out2}$ of the output network $net_{out2}$ corresponding to the output motor data represents the time series pattern of the motor data driving the motor to cause the end of the arm to move along the "circle" trajectory.

With the second supervising data used, the link weight of the input node $N_{in2}$ of the input network $net_{in2}$ representing the time series pattern of the video data that shows the "circle" trajectory with the output node $N_{out2}$ of the output network $net_{out2}$ representing the time series pattern of the motor data driving the motor to cause the end of the arm to move along the "circle" trajectory is updated to become heaviest in the link weight matrix $MTX_{22}$ between the input network $net_{in2}$ and the output network $net_{out2}$.

With the third supervising data used, the link weight of the input node $N_{in1}$ of the input network $net_{in1}$ representing the time series pattern of the audio data "circle" with the input node $N_{in2}$ of the input network $net_{in2}$ representing the time series pattern of the video data that shows the "circle" trajectory is updated to become heaviest in the link weight matrix $MTX_{in12}$ between the input network $net_{in1}$ and the input network $net_{in2}$.

Figure 42:
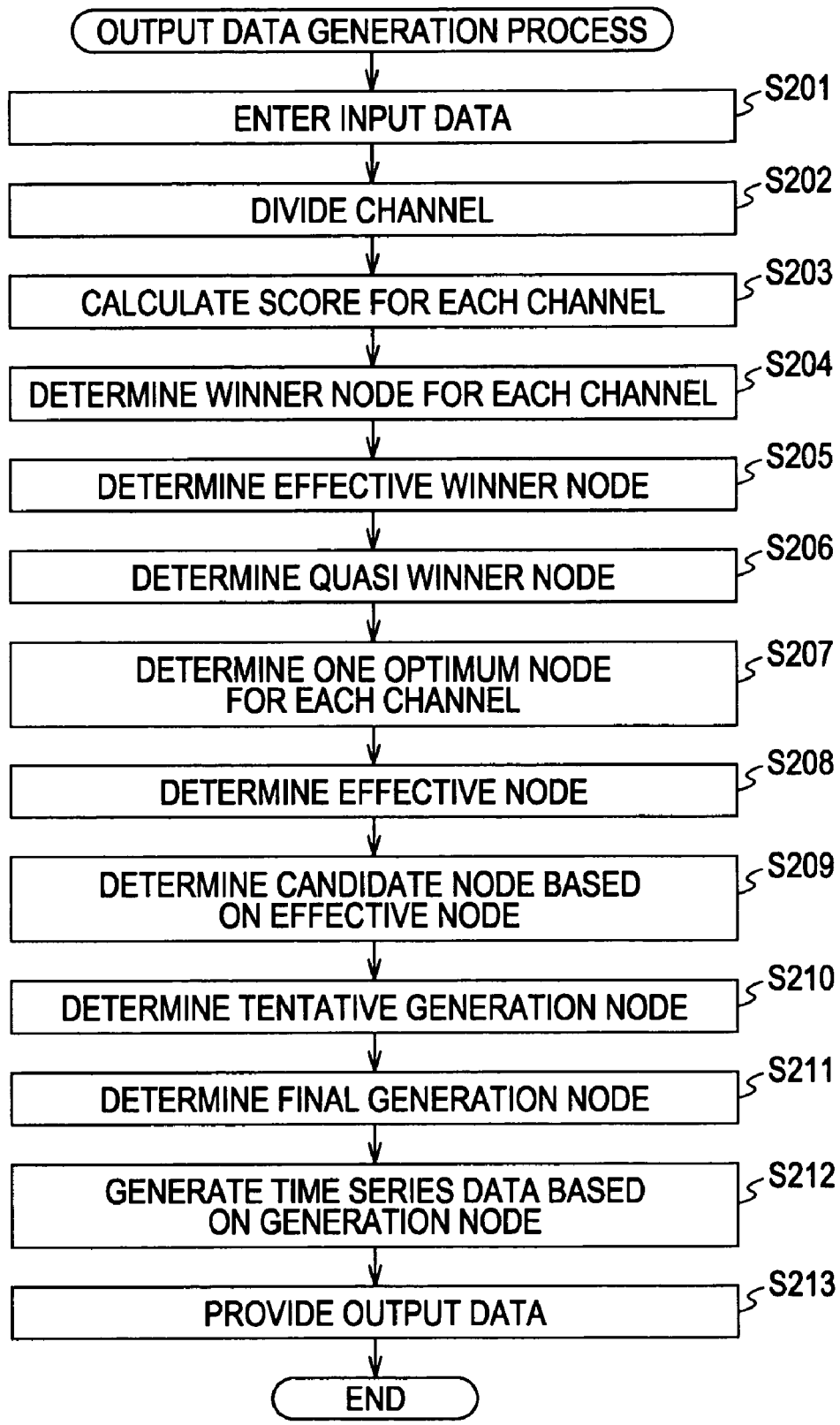
FIG. 42 is a flowchart illustrating a process inferring output data using the input-output relationship model.

If an output inference process of FIG. 42 is performed using thus learned input-output relationship model of FIG. 40B, output data discussed below is provided.

If the input-output relationship model receives the input data containing as the input audio data the audio data "circle" and as the input video data the audio data that shows a stationary object, the input node $N_{in1}$, representing the time series pattern of the audio data "circle", of the input network $net_{in1}$ corresponding to the input audio data is determined to be a winner node in step S204.

If the input node $N_{in1}$ having become the winner node is determined to be an effective winner node in step S205, an input node $N_{in2}$ having the heaviest link weight with the effective winner node $N_{in1}$ from among the input nodes of the input network $net_{in2}$ is determined to be a quasi-winner node in step S206.

If the quasi-winner node $N_{in2}$ is determined to be an optimum node in step S207, and then determined to be an effective node in step S208, an output node $N_{out2}$ having the heaviest link weight with the effective node $N_{in2}$, from among the output nodes of the output network $net_{out2}$ is determined to be a candidate node in step S209.

The candidate node $N_{out2}$ is determined to be a tentative generation node in step S210. If the tentative generation node is determined to be a generation node in step S211, time series data is generated from the generation node $N_{out2}$ in step S212. The time series data is then output in step S213.

In step S213, the time series data belonging to the time series pattern describing the generation node $N_{out2}$, namely, the output motor data driving the motor to move the end of the arm along the "circle" trajectory, is output.

Output data containing the output motor data driving the motor to cause the end of the arm to move along the "circle" trajectory is output in response to the input data containing as the input audio data the audio data "circle" and as the input video data the video data that shows the stationary object.

The input-output relationship model of FIG. 40B has a link between the input network $net_{in1}$ and the input network $net_{in2}$. Fourth supervising data, namely, a set of the input data containing as the input video data the audio data "circle" and the output data containing as the output motor data driving the motor to cause the end of the arm to move along the "circle" trajectory is provided to the input-output relationship model of FIG. 40B. Without the need for learning, the data containing the output motor data driving the motor to cause the end of the arm to move along the "circle" trajectory is output in response to the input data containing, as the input audio data, the audio data "circle".

If the input-output relationship model of FIG. 40B is applied to the robot, the robot can output the data containing the output motor data driving the motor to cause the end of the arm to move along the "circle" trajectory in response to the input data containing, as the input audio data, the audio data "circle" by simply learning the first through third supervising data without the need for learning the fourth supervising data.

The learning using the first supervising data means that the robot is taught to output a word pronunciation "circle" when the robot hears the word pronunciation "circle." The learning using the second supervising data means that the robot is taught to drive the motor to move the end of the arm thereof along the "circle" trajectory when the robot sees a scene of an object moving along the "circle" trajectory. The learning using the third supervising data means that the robot is taught to learn that the word pronunciation "circle" is related to the scene of the object moving along the "circle" trajectory.

The learning using the fourth supervising data means that the robot is taught to drive the motor to move the end of the arm thereof along the "circle" trajectory when the robot hears the word pronunciation "circle."

If the robot with the input-output relationship model of FIG. 40B applied thereto learns the first through third supervising data, the robot can drive the motor to move the end of the arm along the "circle" trajectory without the need for learning the fourth supervising data. More specifically, even if the robot is not taught to move the end of the arm in response to hearing the word pronunciation "circle", the robot can move the arm when the robot hears the word pronunciation "circle."

In other words, in response to a given input, the robot can take action that is not taught.

In the input-output relationship model, one sub input data can be inferred from another sub input data by linking input networks. If the word pronunciation "circle" is input, the robot can infer a scene (image) of an object moving along the "circle" trajectory. If an image of an object moving along the "circle" trajectory is input, the robot infers the word pronunciation "circle."

If the input data does not contain sub input data "a," the robot infers the sub input data "a" from another sub input data "b." The robot handles the input data as if the sub input data "a" is contained in the input data. If the sub input data "a" contained in the input data is contaminated with noise, noise-free sub input data "a" can be inferred from the other sub input data "b."

In accordance with the input-output relationship model of FIG. 40B, if one input data is related to another input data, output data related to the one input data is inferred from the other input data that serves as a medium.

An input-output relationship model with output networks linked to each other is described below.

As in the input-output relationship model with the input networks linked to each other, the robot of FIG. 25A is controlled. The robot is modeled into a forward model using the input-output relationship model with the output networks linked to each other.

As previously discussed with reference to FIG. 26, the input-output relationship model includes the input networks $net_{in1}$ and $net_{in2}$ respectively corresponding to the input audio data and the input video data contained in the input data, and the output networks $net_{out1}$ and $net_{out2}$ respectively corresponding to the output audio data and the output motor data contained in the output data.

As in the input-output relationship model with the input networks linked to each other, it is unknown whether there is a relationship between the sub input data as one channel of the input data and the sub output data as another channel of the output data. In the input-output relationship model, the input network $net_{in1}$ is linked to each of the output networks $net_{out1}$ and $net_{out2}$, and the input network $net_{in2}$ is linked to each of the output networks $net_{out1}$ and $net_{out2}$.

Furthermore, the output network $net_{out1}$ is linked to the output network $net_{out2}$ in the input-output relationship model.

The input-output relationship model in this case is shown in FIG. 43A.

The input-output relationship model of FIG. 43A includes the input networks $net_{in1}$ and $net_{in2}$ and the output networks $net_{out1}$ and $net_{out2}$. The input network $net_{in1}$ is linked to each of the output networks $net_{out1}$ and $net_{out2}$ and the input network $net_{in2}$ is linked to each of the output networks $net_{out1}$ and $net_{out2}$. Furthermore, the output network $net_{out1}$ is linked to the output network $net_{out2}$.

FIGS. 44A-44F illustrate link weight matrices of the input-output relationship model of FIG. 43A.

Since the input network $net_{in1}$ is linked to each of the output networks $net_{out1}$ and $net_{out2}$ and the input network $net_{in2}$ is linked to each of the output networks $net_{out1}$ and $net_{out2}$, the link weight matrices include link weight matrices $MTX_{11}$ (FIG. 44A), $MTX_{12}$ (FIG. 44B), $MTX_{21}$ (FIG. 44D), and $MTX_{22}$ (FIG. 44E) as in the input-output relationship model of FIG. 30A. The link weight matrix $MTX_{11}$ is formed between the input network $net_{in1}$ and the output network $net_{out1}$. The link weight matrix $MTX_{12}$ is formed between the input network $net_{in1}$ and the output network $net_{out2}$. The link weight matrix $MTX_{21}$ is formed between the input network $net_{in2}$ and the output network $net_{out1}$. The link weight matrix $MTX_{22}$ is formed between the input network $net_{in2}$ and the output network $net_{out2}$.

Since the input network $net_{in1}$ is linked to the output network $net_{out2}$ in the input-output relationship model of FIG. 43A, the link weight matrices of the input-output relationship model include a link weight matrix $MTX_{out2}$ (FIG. 44C) formed between the output network $net_{out1}$ and the output network $net_{out2}$. The output nodes of the output network $net_{out1}$ are mapped to the respective rows of the link weight matrix $MTX_{out12}$ and the output nodes of the output network $net_{out2}$ are mapped to the respective columns of the link weight matrix $MTX_{out12}$. In the link weight matrix $MTX_{out12}$, the link weight w between an i-th output node of the output network $net_{out1}$ and a j-th output node of the output network $net_{out2}$ is arranged as an element of an i-th row and i-th column.

As shown in FIG. 44F, a link weight matrix $MTX_{out21}$ (FIG. 44F), as a link weight matrix of the input-output relationship model of FIG. 43A, is formed between the output network $net_{out2}$ and the output network $net_{out1}$. The output nodes of the output network $net_{out2}$ are mapped to the respective rows of the link weight matrix $MTX_{out21}$ and the output nodes of the output network $net_{out1}$ are mapped to the respective columns of the link weight matrix $MTX_{out21}$. A link weight w between an i-th output node of the output network $net_{out2}$ and a j-th output node of the output network $net_{out1}$ is arranged as an element at an i-th row and j-th column of the link weight matrix $MTX_{out21}$.

The link weight matrix $MTX_{out21}$ is the transpose of the link weight matrix $MTX_{out12}$. One matrix is sufficient because the other matrix can be determined from the one matrix.

The learning of the input-output relationship model of FIG. 43A is basically identical to the learning of the input-output relationship model of FIG. 30A as previously discussed with reference to FIG. 32.

In the input-output relationship model of FIG. 30A, a link weight matrix is updated in only a set of the input network and the output network having the nodes thereof linked to each other in the loop of steps S145 through S147 of FIG. 32. In the input-output relationship model of FIG. 43A, furthermore, the link weight matrix $MTX_{out12}$ (link weight matrix $MTX_{out21}$) is updated in a set of the output networks $net_{out1}$ and $net_{out2}$ having the node thereof linked to each other.

As previously discussed with reference to the input-output relationship model of FIG. 30A, in the input-output relationship model of FIG. 43A, there may be a correlation between the input audio data and the output audio data and a correlation between the input video data and the output motor data, and there may be neither correlation between the input audio data and the output motor data nor correlation between the input video data and the output audio data. In such a case, the link weight matrix $MTX_{11}$ between the input network $net_{in1}$ corresponding to the input audio data and the output network $net_{out1}$ corresponding to the output audio data correlated with the input audio data reflects the correlation between the input audio data and the output audio data. As a result, each input node of the input network $net_{in1}$ has a heavier link weight with a particular output node of the output network $net_{out1}$ than with the other output nodes, and each output node of the output network $net_{out1}$ has a heavier link weight with a particular input node of the input network $net_{in1}$ than with the other input nodes.

A large number of units of supervising data may be used to learn the input-output relationship model of FIG. 43A. The supervising data contains a set of input data and output data. The input data contains, as the input audio data, audio data "circle", and the output data contains, as the output audio data, the audio data "circle." One input node $N_{in1}$ (time series pattern model 21) of the input network $net_{in1}$ corresponding to the input audio data represents a time series pattern of the audio data "circle." One output node $N_{out1}$ (time series pattern model 21) of the output network $net_{out1}$ corresponding to the output audio data represents a time series pattern of the audio data "circle."

The link weight matrix $MTX_{11}$ between the input network $net_{in1}$ and the output network $net_{out1}$ reflects the correlation between the input audio data "circle" and the output audio data "circle." As a result, an input node $N_{in1}$ representing a time series pattern of the audio data "circle" in the input network $net_{in1}$ has a heavier link weight with an output node $N_{out1}$ representing a time series pattern of the audio data "circle" than with the other output nodes. An output node $N_{out2}$ of the output network $net_{out2}$ has a heavier link weight with an input node $N_{in1}$ of the input network $net_{in1}$ than with the other input nodes.

The link weight matrix $MTX_{22}$ between the input network $net_{in2}$ corresponding to the input video data and the output network $net_{out2}$ corresponding to the output motor data correlated with the input video data reflects the correlation between the input video data and the output motor data. As a result, each input node of the input network $net_{in2}$ has a heavier link weight with a particular output node of the output network $net_{out2}$ than with other output nodes. Each output node of the output network $net_{out2}$ has a heavier link weight with a particular input node of the input network $net_{in2}$ than with the other input nodes.

A large number of units of supervising data may be used to learn the input-output relationship model of FIG. 43A. The supervising data contains a set of input data and output data. The input data contains, as the input video data, the video data that shows an object moving along a "circle" trajectory, and the output data contains, as the output motor data, motor data (signal) driving a motor to move the end of the arm of the robot along the "circle" trajectory. One input node $N_{in2}$ of the input network $net_{in2}$ corresponding to the input video data represents a time series pattern of the video data that shows the "circle" trajectory. One output node $N_{out2}$ of the output network $net_{out2}$ corresponding to the output motor data represents a time series pattern of the motor data driving the motor to move the end of the arm along the "circle" trajectory.

The link weight matrix $MTX_{22}$ between the input node $N_{in2}$ of the input network $net_{in2}$ and the output network $net_{out2}$ reflects the correlation between the input video data that shows the object moving along the "circle" trajectory and the output motor data driving the motor to move the end of the arm along the "circle" trajectory. As a result, an input node $N_{in2}$ representing the time series pattern of the video data that shows the "circle" trajectory has a heavier link weight with an output node $N_{out2}$ of the output network $net_{out2}$ representing the time series pattern of the motor data driving the motor to move the end of the arm along the "circle" trajectory than with the other output nodes. An output node $N_{out2}$ of the output network $net_{out2}$ has a heavier link weight with an input node $N_{in2}$ of the input network $net_{in2}$ than with the other input nodes.

The link weight matrix $MTX_{12}$ between the input network $net_{in1}$ corresponding to the input audio data and the output network $net_{out2}$ corresponding to the output motor data uncorrelated with the input audio data reflects a small correlation between the input audio data and the output motor data. As a result, each input node of the input network $net_{in1}$ has generally a light link weight with each output node of the output network $net_{out2}$ and each output node of the output network $net_{out2}$ has generally a light link weight with each input node of the input network $net_{in1}$.

Similarly, the link weight matrix $MTX_{21}$ between the input network $net_{in2}$ corresponding to the input video data and the output network $net_{out1}$ corresponding to the output audio data uncorrelated with the input video data reflects a small correlation between the input video data and the output audio data. As a result, each input node of the input network $net_{in2}$ has uniformly a light link weight with each of the output network $net_{out1}$ and each output node of the output network $net_{out1}$ has uniformly a light link weight with each input node of the input network $net_{in2}$.

If there is a correlation between the output audio data and the output motor data in a large number of units of supervising data provided to the input-output relationship model of FIG. 43A, the link weight matrix $MTX_{out12}$ (link weight matrix $MTX_{out21}$) between the output network $net_{out1}$ corresponding to the output audio data and the output network $net_{out2}$ corresponding to the output motor data correlated with the output audio data reflects the correlation between the output audio data and the output motor data. As a result, each output node of the output network $net_{out1}$ has a heavier link weight with a particular output node of the output network $net_{out2}$ than with the other output nodes of the output network $net_{out2}$. Each output node of the output network $net_{out2}$ has a heavier link weight with a particular output node of the output network $net_{out1}$ than with the other output nodes of the output network $net_{out1}$.

A large number of units of output data in the supervising data may be used in the learning of the input-output relationship model of FIG. 43A. For example, the output data contains, as the output audio data, audio data "circle" and, as the output motor data, motor data driving the motor to move the end of the arm along the "circle" trajectory. One output node $N_{out1}$ of the output network $net_{out1}$ corresponding to the output audio data represents a time series pattern of the audio data "circle." One output node $N_{out2}$ of the output network $net_{out2}$ corresponding to the output motor data represents a time series pattern of the motor data driving the motor to move the end of the arm along the "circle" trajectory.

The link weight matrix $MTX_{out12}$ between the output network $net_{out1}$ and the output network $net_{out2}$ reflects the correlation between the output audio data "circle" and the output motor data driving the motor to move the end of the arm along the "circle" trajectory. As a result, the output node $N_{out1}$ of the output network $net_{out1}$ representing a time series pattern of the audio data "circle" has a heavier link weight with the output node $N_{out2}$ of the output network $net_{out2}$ representing the time series pattern of the motor data driving the motor to move the end of the arm along the "circle" trajectory than with the other output nodes of the output network $net_{out2}$. The output node $N_{out2}$ of the output network $net_{out2}$ has a heavier link weight with the output node $N_{out1}$ of the output network $net_{out1}$ than with the other output nodes of the output network $net_{out1}$.

A process of the data processing apparatus of FIG. 21 for inferring the output data responsive to the input data is described below with reference to a flowchart of FIG. 45.

The data processing apparatus uses thus learned input-output relationship model of FIG. 43A. The input-output relationship model herein includes m-channel input networks and n-channel output networks.

Steps S221 through S227, respectively identical to steps S151 through S157 of FIG. 33, are performed. Through steps S221 through S227, the generation node determiner 233 (FIG. 21) determines a tentative generation node and processing proceeds to step S228.

In step S228, the generation node determiner 233 determines an effective winner node from the tentative generation nodes. The method of determining an effective winner node from the tentative generation nodes can be identical to the method of determining a final generation node from the tentative generation nodes described with reference to step S158 of FIG. 33.

When the effective winner node is determined in step S228, processing proceeds to step S229. The generation node determiner 233 determines, to be a quasi-generation node, an output node having the heaviest link weight with the effective winner node, from among the output nodes of the output network linked to but different from the output network having the effective winner node.

If a given effective winner node is an output node of the output network $net_{out1}$ in the input-output relationship model of FIG. 43A, an output node of the output network $net_{out2}$ having the heaviest link weight with the effective winner node is determined to be a quasi-generation node.

In step S229, the generation node determiner 233 determines a quasi-generation node for each of all effective winner nodes, and processing proceeds to step S230.

The effective winner node and the quasi-generation node are collectively referred to as firing nodes.

In step S230, the generation node determiner 233 at most one firing node for each of the output networks to be an optimum node.

As previously discussed, another effective winner node may be present in an output network having an output node that has been determined to be the quasi-generation node. In such a case, the output network contains two firing nodes, namely, the output node serving as the effective winner node and the output node serving as the quasi-generation node. In step S230, the number of firing nodes in one output network is limited to at most one, and at most one firing node is determined to be an optimum node in each output network.

More specifically, in an output network having only output node being a firing node, that firing node is determined to be an optimum node.

An output network may contain a plurality of output nodes being firing nodes. If an effective winner node is present among the plurality of firing nodes, the effective winner node is determined to be an optimum node.

If no effective winner node is present among the plurality of firing nodes, namely, if the plurality of firing nodes are all quasi-generation nodes, the link weights of the quasi-generation nodes with the effective winner node, the link weights having been used in the determination of the quasi-generation node, are compared with each other. A quasi-generation node having the heaviest link weight is determined to be an optimum node.

When at most one firing node is determined for each output network in step S230, processing proceeds to step S231. The time series generator 234 determines whether to determine the output node serving as the optimum node to be a generation node for use in the generation of time series data.

If the optimum node is an effective generation node, the optimum node is determined to be a generation node.

If the optimum node is not an effective generation node, namely, if the optimum node is a quasi-generation node, the generation node determiner 233 determines whether to the optimum node to be a generation node, based on the link weight of the quasi-generation node with the effective generation node, the link weight of the quasi-generation node having been used in the determination of the quasi-generation node from the output node.

More specifically, if the optimum node is a quasi-generation node, the generation node determiner 233 compares the link weights of the quasi-generation nodes with the effective generation node, the link weight having been used when the determination of whether to determine the output node to be the quasi-generation node is performed.

The generation node determiner 233 determines at least one generation node, and supplies a node label representing the generation node to the time series generator 234 (FIG. 21).

Processing proceeds from step S213 to step S232 to step S233. Steps S232 and S233, identical to step S159 and S160 of FIG. 33, are performed, thereby outputting output data.

The input-output relationship model of FIG. 43A is learned using three types of a large number of units of supervising data, including first supervising data, second supervising data, and third supervising data. The first supervising data contains a set of input data and output data. The input data contains, as input audio data, input audio data "circle", and as input video data, any image data, and the output data contains, as output motor data, any motor data. The second supervising data contains a set of input data and output data. The input data contains, as input audio data, any audio data, and as input video data, video data that shows that an object moves along a "circle" trajectory. The output data contains, as output audio data, any audio data and, as output motor data, motor data driving the motor to cause the end of the arm of the robot to move along the "circle" trajectory. The third supervising data contains a set of input data and output data. The input data contains any input data. The output data contains, as output audio data, audio data pronouncing the word "circle", and, as output motor data, motor data driving the motor to move the end of the arm along the "circle" trajectory. In response to the first supervising data, one input node $N_{in1}$ of the input network $net_{in1}$ corresponding to the input audio data describes a time series pattern of the audio data "circle", and one output node $N_{out1}$ of the output network $net_{out1}$ corresponding to the output audio data describes a time series pattern of the audio data "circle".

In response to the first supervising data, the link weight of the input node $N_{in1}$ describing the time series pattern of the audio data "circle" with the output node $N_{out1}$ describing the time series pattern of the audio data "circle" is updated to be heaviest in the link weight matrix $MTX_{11}$ between the input network $net_{in1}$ and the output network $net_{out1}$.

In response to the second supervising data, the input node $N_{in2}$ of the input network $net_{in2}$ corresponding to the input video data describes the time series pattern of the video data that shows the "circle" trajectory, and the output node $N_{out2}$ of the output network $net_{out2}$ corresponding to the output motor data describes the time series pattern of the motor data driving the motor to cause the end of the arm to move along the "circle" trajectory.

With the second supervising data used, the link weight of the input node $N_{in2}$ of the input network $net_{in2}$ describing the time series pattern of the video data that shows the "circle" trajectory with the output node $N_{out2}$ of the output network $net_{out2}$ describing the time series pattern of the motor data driving the motor to cause the end of the arm to move along the "circle" trajectory is updated to become heaviest in the link weight matrix $MTX_{22}$ between the input network $net_{in2}$ and the output network $net_{out2}$.

With the third supervising data used, the link weight of the output node $N_{out1}$ of the output network $net_{out1}$ describing the time series pattern of the audio data "circle" with the input node $N_{out2}$ of the output network $net_{out2}$ describing the time series pattern of the motor data driving the motor to move the end of the arm along the "circle" trajectory is updated to become heaviest in the link weight matrix $MTX_{out12}$ between the output network $net_{out1}$ and the output network $net_{out2}$.

Figure 45:
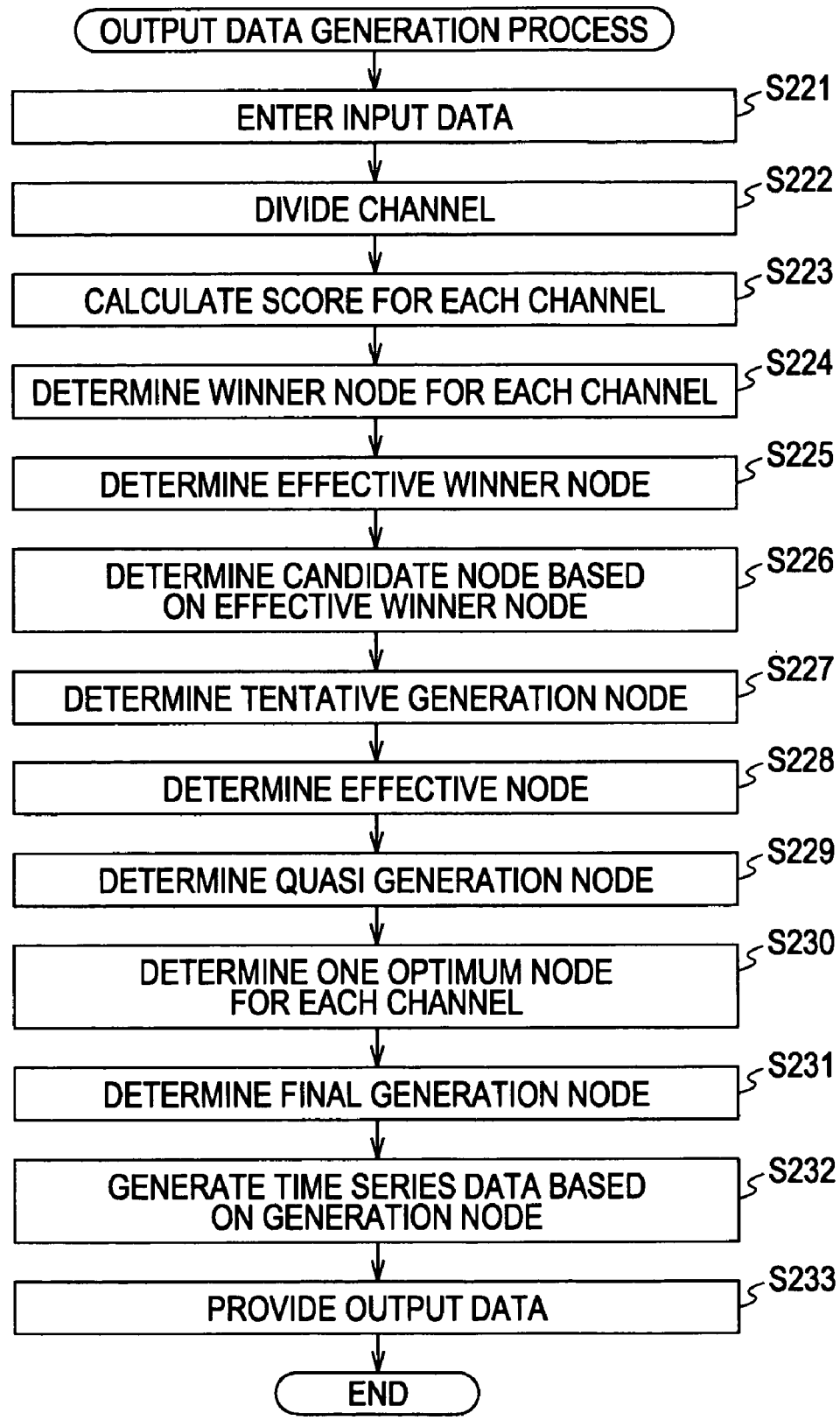
FIG. 45 is a flowchart illustrating a process inferring output data using the input-output relationship model.

If the output inference process of FIG. 45 is performed using the thus learned input-output relationship model of FIG. 43A, output data discussed below is provided.

If the input-output relationship model receives the input data containing as the input audio data the audio data "circle" and as the input video data the audio data that shows a stationary object, the input node $N_{in1}$, describing the time series pattern of the audio data "circle", of the input network $net_{in1}$ corresponding to the input audio data is determined to be a winner node in step S224.

If the input node $N_{in1}$ having become the winner node is determined to be an effective winner node in step S225, an input node $N_{out1}$ having the heaviest link weight with the winner node $N_{in1}$ from among the output nodes of the output network $net_{out2}$ is determined to be a candidate node in step S226.

If the candidate node $N_{out1}$ is determined to be a tentative generation node in step S227 and then determined to be an effective generation node in step S228, an output node $N_{out2}$ having the heaviest link weight with the effective generation node $N_{out1}$, from among the output nodes of the output network $net_{out2}$ is determined to be a quasi-generation node in step S229.

If the quasi-winner node $N_{out2}$ is determined to be an optimum node in step S230, and then determined to be a generation node in step S231, time series data is generated from the generation node $N_{out2}$ in step S232. The time series data is output in step S233.

In step S233, the time series data belonging to the time series pattern described by the generation node $N_{out2}$, namely, the output motor data driving the motor to move the end of the arm along the "circle" trajectory is output.

In other words, the output data containing the output motor data driving the motor to move the end of the arm along the "circle" trajectory is output in response to the input data containing as the input audio data the audio data "circle" and as the input video data the video data that shows that the object is stationary.

The input-output relationship model of FIG. 43A has a link between the input network $net_{out1}$ and the input network $net_{out2}$. Fourth supervising data, namely, a set of the input data containing as the input video data the audio data "circle" and the output data containing as the output motor data driving the motor to cause the end of the arm to move along the "circle" trajectory is provided to the input-output relationship model of FIG. 43A. Without the need for learning, the data containing the output motor data driving the motor to cause the end of the arm to move along the "circle" trajectory is output in response to the input data containing, as the input audio data, the audio data "circle."

If the input-output relationship model of FIG. 43A is applied to the robot, the robot can output the data containing the output motor data driving the motor to cause the end of the arm to move along the "circle" trajectory in response to the input data containing as the input audio data the audio data "circle" by simply learning the first through third supervising data without the need for learning the fourth supervising data.

The learning using the first supervising data means that the robot is taught to output a word pronunciation "circle" when the robot hears the word "circle." The learning using the second supervising data means that the robot is taught to drive the motor to move the end of the arm thereof along the "circle" trajectory when the robot sees a scene of an object moving along the "circle" trajectory. The learning using the third supervising data means that the robot is taught to learn that the word pronunciation "circle" is related to driving the motor to move the end of the arm along the "circle" trajectory.

The learning using the fourth supervising data means that the robot is taught to drive the motor to move the end of the arm thereof along the "circle" trajectory when the robot hears the word pronunciation "circle."

If the robot with the input-output relationship model of FIG. 43A applied thereto learns the first through third supervising data, the robot can drive the motor to move the end of the arm along the "circle" trajectory without the need for learning the fourth supervising data. More specifically, even if the robot is not taught to move the end of the arm in response to hearing the word pronunciation "circle", the robot can move the arm when the robot hears the word pronunciation "circle."

In summary, in response to a given input, the robot can take action that is not taught.

In the input-output relationship model, one sub output data can be inferred from another sub output data by linking output networks. If the word pronunciation "circle" is output, the robot can infer the output motor data driving the motor to move the end of the arm along the "circle" trajectory, and thus can move the arm in accordance with the output motor data. If the output motor data driving the motor to move the end of the arm along the "circle" trajectory is output, the robot can infer the output audio data of the word pronunciation "circle", and output the word pronunciation "circle."

In accordance with the input-output relationship model FIG. 43A, output data responsive to input data is inferred from another output data related to the input data. Sub output data having a complex relationship with sub input data can be inferred.

The learning section 212 of FIG. 21 includes the input-output relationship (link) model including the plurality of input networks and the plurality of output networks. The input nodes of the input network are linked to the output nodes of the output network. Each of the plurality of input networks is updated in a self-organizing manner based on the sub input data of a corresponding channel, the input data containing the sub input data of the same number channels as the number of input networks. Each of the plurality of output networks is updated in a self-organizing manner based on the sub output data of a corresponding channel, the output data containing the sub output data of the same number channels as the number of output networks. The link relationship of the winner node most appropriately matching the sub input data of the channel corresponding to the input network, from among the input nodes of the input network, with each output node of the output network is updated. The link relationship of the winner node most appropriately matching the sub output data of the channel corresponding to the output network, from among the output nodes of the output network, with each input node of the input network is updated. Time series unsupervised learning is easily performed. Furthermore, the relationship between the times series input data and the time series output data is easily learned. Even if an object to be controlled is not accurately modeled using a linear system, a high-accuracy level forward model and a high-accuracy backward model are easily obtained.

In the recognition generator 213 in the data processing apparatus of FIG. 21, for each of the plurality of input networks in the input-output relationship model, the winner node most appropriately matching sub time series data of the corresponding channel is determined out of the time series data containing the sub time series data of the same channels as the number of input networks. An output node having the heaviest link weight with the winner node, from among the output nodes of the output networks, is determined to be a generation node for use in the generation of time series data. The time series data is generated based on the time series pattern of that generation node. The object to be controlled thus can infer the time series data to be output in response to inputting of time series data.

In the recognition generator 213 in the data processing apparatus of FIG. 21, for each of the plurality of output networks in the input-output relationship model, the winner node most appropriately matching sub time series data of the corresponding channel is determined out of the time series data containing the sub time series data of the same channels as the number of output networks. An input node having the heaviest link weight with the winner node, from among the input nodes of the input networks, is determined to be a generation node for use in the generation of time series data. The time series data is generated based on the time series pattern of that generation node. The object to be controlled thus can infer the time series data (input data (control data)) to be input in order to output time series data (output data) as a target value.

The series of above-referenced process steps can be executed using hardware or software. If the series of process steps is executed using software, a computer program forming software is installed on a general-purpose computer.

Figure 46:
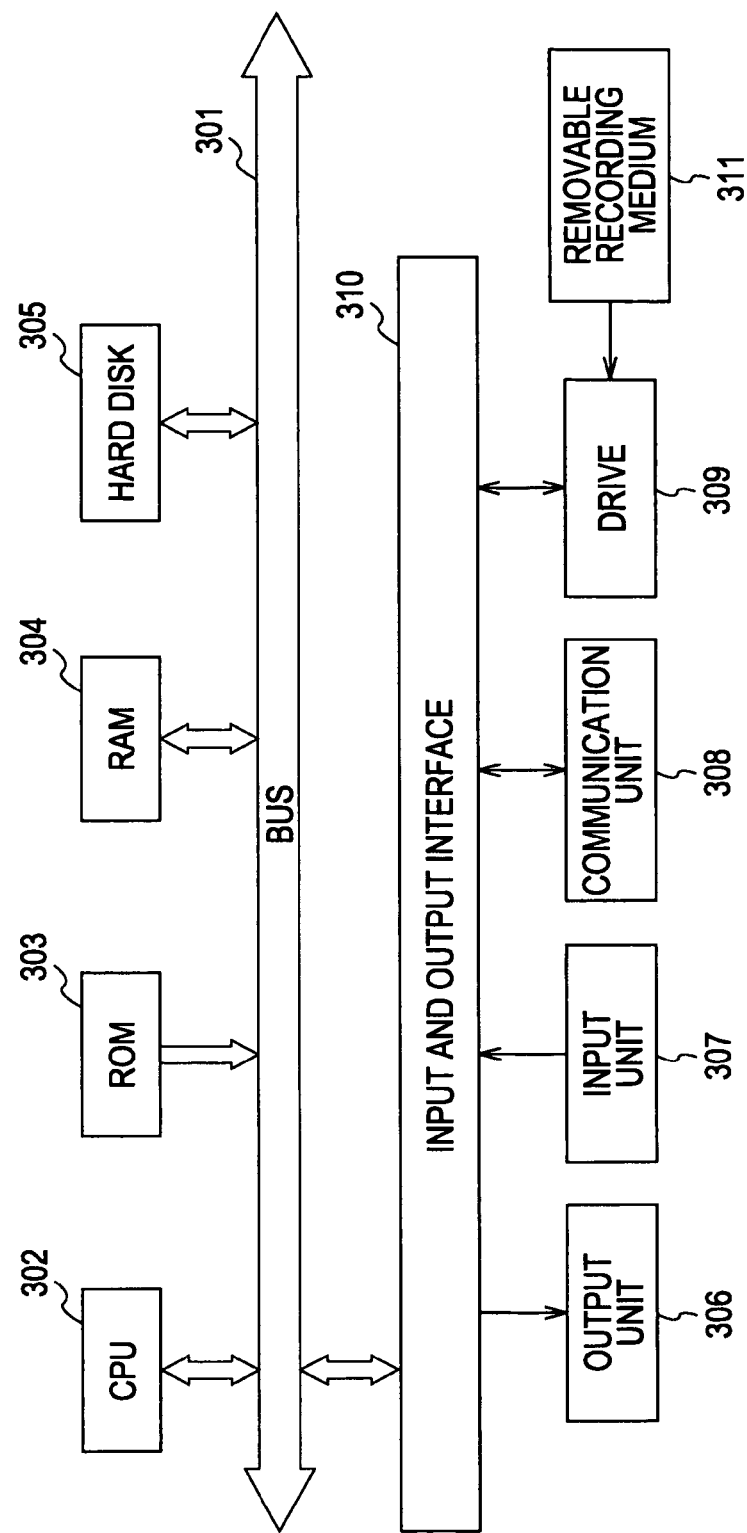
FIG. 46 is a block diagram illustrating a computer in accordance with one embodiment of the present invention.

FIG. 46 illustrates a computer, having the computer program for performing the series of process steps installed thereon, in accordance with one embodiment of the present invention.

The computer program is pre-stored in a hard disk 305 or a read-only memory (ROM) 303, each included in the computer as a recording medium.

The computer program may be temporarily or permanently stored in a removable recording medium 311, such as a flexible disk, a compact-disk read-only memory (CD-ROM), a magneto-optical disk (MO), a digital versatile disk (DVD), a magnetic disk, or a semiconductor memory. The removable disk 311 is supplied in a so-called package medium.

The computer program may be installed from the above-described removable recording medium 311 to the computer. Furthermore, the computer program may be transmitted, to the computer, in a wireless fashion from a download site to the computer via a digital broadcasting satellite, or in a wired fashion via a network, such as local area network (LAN) or the Internet. Such a transmitted computer program is received at a communication unit 308, and then installed on the hard disk 305.

The computer includes a central processing unit (CPU) 302. An input and output interface 310 is linked to the CPU 302 via a bus 301. When a user operates an input unit 307, including a keyboard, a mouse, a microphone, etc., to input a command, the CPU 302 receives the command via the input and output interface 310, and executes the computer program stored in the ROM 303 in response to the command. The CPU 302 loads, to a random-access memory (RAM) 304, one of a program stored in the hard disk 305, a program transmitted via a digital broadcasting satellite or a network, received via the communication unit 308, and then installed onto the hard disk 305, and a computer program read from the removable recording medium 311 loaded in a drive 309, and then installed onto the hard disk 305, and then executes the program. The CPU 302 performs the process in accordance with the previously discussed flowcharts and the previously discussed block diagrams. The CPU 302 outputs, via the input and output interface 310, the process result to an output unit 306, such as a liquid-crystal display (LCD) and a loudspeaker for outputting, to the communication unit 308 for transmission, and to the hard disk 305 for recording.

The process steps discussed in this specification are sequentially performed in the time series order as stated. Alternatively, the steps may be performed in parallel or separately. For example, the steps may be performed in parallel process or object process.

The computer program may be executed by a single computer, or by a plurality of computers in distributed processing. The computer program may be transmitted to a remote computer for execution.

In accordance with embodiments of the present invention, the input-output relationship model includes a plurality of input networks and a plurality of output networks. Alternatively, the input-output relationship model may be composed of one input network and one output network, may be composed one input network and a plurality of output networks, or may be composed of a plurality of input networks and one output network.

The manner of linking the input network to the output network in the input-output relationship model, namely, the manner of selecting nodes to be linked between the input network and the output network is not limited to any particular method.

For example, in the input-output relationship model, one input network of interest may be linked to a single output network only, or may be linked to at least two output networks (including all output networks of the input-output relationship model). One output network of interest may be linked to a single input network only, or may be linked to at least two input networks (including all input networks of the input-output relationship model).

Furthermore, input networks may be linked to each other in addition to the linking of the input network to the output network or output networks may be linked to each other in addition to the linking of the input network to the output network. Alternatively, input networks may be simply linked to each other and output networks may be simply linked to each other.

The method of inferring the output data using the input-output relationship model discussed with reference to FIG. 33, for example, has been discussed for exemplary purposes only, and the present invention is not limited to that method. With reference to FIG. 33, at most one output node is determined to be a generation node in each output network, and sub input data is generated using the single generation node. Optionally, a plurality of output nodes are determined to be generation nodes for each output network, and the sub input data is generated using the plurality of generation nodes.

Data forming sub data (sub input data and sub output data) is not limited to the above-mentioned data.

The sub data may be part of given data, or may contain two different types of data. For example, a high-dimensional cepstrum coefficient serving as a portion of cepstrum may be handled as one unit of sub data, and a low-dimensional cepstrum coefficient serving as another portion of cepstrum may be handled as another unit of sub data. A vector containing, as elements, a cepstrum coefficient and a Mel cepstrum coefficient, serving as two types of data, may be handled as one unit of sub data.

By adopting different modal data units as a plurality of sub data units contained in one of the input data and the output data, the relationship between multi-modal input data and multi-modal output data is learned, and the multi-modal output data related to the input data is thus output in response to the multi-modal input data.

For example, if a user converses with a robot without viewing the robot, namely, if the voice of the user and an image viewed by the user different from the scene expected when the user views the robot are present, no reaction occurs. If the user converses with the robot while viewing the robot at the same time, namely, if the voice of the user and the image viewed by the user who views the robot occur, the robot outputs a voice responsive to the voice of the user. The robot behaves in a manner relevant to the voice in reply to the voice of the user.

It should be understood by those skilled in the art that various modifications, combinations, sub-combinations and alterations may occur depending on design requirements and other factors insofar as they are within the scope of the appended claims or the equivalents thereof.

What is claimed is:

1. A learning apparatus for learning time series data in a link model including a plurality of input time series pattern storage networks and a plurality of output time series pattern storage networks with nodes of the input time series pattern storage networks linked to nodes of the output time series pattern storage networks, each of the plurality of input time series pattern storage networks including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data, the learning apparatus comprising:

learning means for updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner each of the plurality of output time series pattern storage networks based on sub output data of a channel corresponding to the output time series pattern storage network, the output data containing sub output data of channels of the same number as the number of output time series pattern storage networks;

link relationship updating means for updating a link relationship between each node of the output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the sub output data of the channel corresponding to the output time series pattern storage network, from among the nodes of the output time series pattern storage network;

an output module for outputting an indication of the output winner node.

2. A learning method of learning time series data in a link model including a plurality of input time series pattern storage networks and a plurality of output time series pattern storage networks with nodes of the input time series pattern storage networks linked to nodes of the output time series pattern storage networks, each of the plurality of input time series pattern storage networks including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data, the learning method comprising:

a learning step of updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner each of the plurality of output time series pattern storage networks based on sub output data of a channel corresponding to the output time series pattern storage network, the output data containing sub output data of channels of the same number as the number of output time series pattern storage networks;

a link relationship updating step of updating a link relationship between each node of the output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the sub output data of the channel corresponding to the output time series pattern storage network, from among the nodes of the output time series pattern storage network; and outputting an indication of the output winner node.

3. A learning apparatus for learning time series data in a link model including one input time series pattern storage network and a plurality of output time series pattern storage networks with nodes of the one input time series pattern storage network linked to nodes of the output time series pattern storage networks, the one input time series pattern storage network including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data, the learning apparatus comprising:

learning means for updating in a self-organizing manner the one input time series pattern storage network based on the input data, and updating in a self-organizing manner each of the plurality of output time series pattern storage networks based on sub output data of a channel corresponding to the output time series pattern storage network, the output data containing sub output data of channels of the same number as the number of output time series pattern storage networks;

link relationship updating means for updating a link relationship between each node of the output time series pattern storage network and a node, as an input winner node, most appropriately matching the input data, from among the nodes of the one input time series pattern storage network, and updating a link relationship between each node of the one input time series pattern storage network and a node, as an output winner node, most appropriately matching the sub output data of the channel corresponding to the output time series pattern storage network, from among the nodes of the output time series pattern storage network; and an output module for outputting an indication of the output winner node.

4. A learning method of learning time series data in a link model including one input time series pattern storage network and a plurality of output time series pattern storage networks with nodes of the one input time series pattern storage network linked to nodes of the output time series pattern storage networks, the one input time series pattern storage network including a plurality of nodes, each node having a time series pattern model representing a time series pattern of time series data as input data input to a predetermined object to be controlled, and each of the plurality of output time series pattern storage networks including a plurality of nodes, each node having a time series pattern model representing a time series pattern of time series data as output data output by the predetermined object in response to the input data, the learning method comprising:

a learning step of updating in a self-organizing manner the one input time series pattern storage network based on the input data, and updating in a self-organizing manner each of the plurality of output time series pattern storage networks based on sub output data of a channel corresponding to the output time series pattern storage network, the output data containing sub output data of channels of the same number as the number of output time series pattern storage networks;

a link relationship updating step of updating a link relationship between each node of the output time series pattern storage network and a node, as an input winner node, most appropriately matching the input data, from among the nodes of the one input time series pattern storage network, and updating a link relationship between each node of the one input time series pattern storage network and a node, as an output winner node, most appropriately matching the sub output data of the channel corresponding to the output time series pattern storage network, from among the nodes of the output time series pattern storage network; and outputting an indication of the output winner node.

5. A learning apparatus for learning time series data in a link model including a plurality of input time series pattern storage networks and one output time series pattern storage network with nodes of the plurality of input time series pattern storage networks linked to nodes of the one output time series pattern storage network, each of the plurality of input time series pattern storage networks including a plurality of nodes, each node having a time series pattern model representing a time series pattern of time series data as input data input to a predetermined object to be controlled, and the one output time series pattern storage network including a plurality of nodes, each node having a time series pattern model representing a time series pattern of time series data as output data output by the predetermined object in response to the input data, the learning apparatus comprising:

learning means for updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner the one output time series pattern storage network based on the output data;

link relationship updating means for updating a link relationship between each node of the one output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the output data, from among the nodes of the one output time series pattern storage network; and an output module for outputting an indication of the output winner node.

6. A learning method of learning time series data in a link model including a plurality of input time series pattern storage networks and one output time series pattern storage network with nodes of the input time series pattern storage networks linked to nodes of the one output time series pattern storage network, each of the plurality of input time series pattern storage networks including a plurality of nodes, each node having a time series pattern model representing a time series pattern of time series data as input data input to a predetermined object to be controlled, and the one output time series pattern storage network including a plurality of nodes, each node having a time series pattern model representing a time series pattern of time series data as output data output by the predetermined object in response to the input data, the learning method comprising:

a learning step of updating in a self-organizing manner each of the plurality of input time series pattern storage networks based on sub input data of a channel corresponding to the input time series pattern storage network, the input data containing sub input data of channels of the same number as the number of input time series pattern storage networks, and updating in a self-organizing manner the one output time series pattern storage network based on the output data;

a link relationship updating step of updating a link relationship between each node of the one output time series pattern storage network and a node, as an input winner node, most appropriately matching the sub input data of the channel corresponding to the input time series pattern storage network, from among the nodes of the input time series pattern storage network, and updating a link relationship between each node of the input time series pattern storage network and a node, as an output winner node, most appropriately matching the output data, from among the nodes of the one output time series pattern storage; and outputting an indication of the output winner node.

7. A generation apparatus for generating, in response to time series data, another time series data in a link model including a plurality of first time series pattern storage networks and a plurality of second time series pattern storage networks with nodes of the first time series pattern storage networks linked to nodes of the second time series pattern storage networks, each of the plurality of first time series pattern storage networks including a plurality of nodes, each node having a time series pattern model representing a time series pattern of the time series data, and each of the plurality of second time series pattern storage networks including a plurality of nodes, each node having a time series pattern model representing a time series pattern of the other time series data, the generation apparatus comprising:

winner node determining means for determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks;

generation node determining means for determining, as a generation node for generating the other time series data, a node most heavily linked to the winner node, from among the nodes of the second time series pattern storage network;

generating means for generating the other time series data based on the time series pattern model of the generation node; and an output module for outputting the other time series data.

8. A generation method of generating, in response to time series data, another time series data in a link model including a plurality of first time series pattern storage networks and a plurality of second time series pattern storage networks with nodes of the first time series pattern storage networks linked to nodes of the second time series pattern storage networks, each of the plurality of first time series pattern storage networks including a plurality of nodes, each node having a time series pattern model representing a time series pattern of the time series data, and each of the plurality of second time series pattern storage networks including a plurality of nodes, each node having a time series pattern model representing a time series pattern of the other time series data, the generation method comprising:
a winner node determining step of determining, for each of the first time series pattern storage networks, a node, as a winner node, most appropriately matching sub time series data of a channel corresponding to the first time series storage pattern storage network the time series data containing the sub time series data of channels of the same number as the number of the first time series pattern storage networks;
a generation node determining step of determining, as a generation node for generating the other time series data, a node most heavily linked to the winner node, from among the nodes of the second time series pattern storage network;
a generating step of generating the other time series data based on the time series pattern model of the generation node; and
outputting the other time series data.

9. A generation apparatus for generating, in response to time series data, another time series data in a link model including one first time series pattern storage network and a plurality of second time series pattern storage networks with nodes of the one first time series pattern storage network linked to nodes of the second time series pattern storage networks,
the one first time series pattern storage network including a plurality of nodes, each node having a time series pattern model representing a time series pattern of the time series data, and
each of the plurality of second time series pattern storage networks including a plurality of nodes, each node having a time series pattern model representing a time series pattern of the other time series data, the generation apparatus comprising:
winner node determining means for determining, for the one first time series pattern storage network, a node, as a winner node, most appropriately matching the time series data;
generation node determining means for determining, as a generation node for generating the other time series data, a node most heavily linked to the winner node, from among the nodes of the second time series pattern storage network;
generating means for generating the other time series data based on the time series pattern model of the generation node; and
an output module for outputting the other time series data.

10. A generation method of generating, in response to time series data, another time series data in a link model including one first time series pattern storage network and a plurality of second time series pattern storage networks with nodes of the one first time series pattern storage network linked to nodes of the second time series pattern storage networks,
the one first time series pattern storage network including a plurality of nodes, each node having a time series pattern model representing a time series pattern of the time series data, and
each of the plurality of second time series pattern storage networks including a plurality of nodes, each node having a time series pattern model representing a time series pattern of the other time series data, the generation method comprising:
a winner node determining step of determining, for the one first time series pattern storage network, a node, as a winner node, most appropriately matching the time series data;
a generation node determining step of determining, as a generation node for generating the other time series data, a node most heavily linked to the winner node, from among the nodes of the second time series pattern storage network;
a generating step of generating the other time series data based on the time series pattern model of the generation node; and
outputting the other time series data.

11. A generation apparatus for generating, in response to time series data, another time series data in a link model including a plurality of first time series pattern storage networks and one second time series pattern storage network with nodes of the first time series pattern storage networks linked to nodes of the one second time series pattern storage network,
each of the plurality of first time series pattern storage networks including a plurality of nodes, each node having a time series pattern model representing a time series pattern of the time series data, and
the one second time series pattern storage network including a plurality of nodes, each node having a time series pattern model representing a time series pattern of the other time series data, the generation apparatus comprising:
winner node determining means for determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks;
generation node determining means for determining, as a generation node for generating the other time series data, a node most heavily linked to the winner node, from among the nodes of the second time series pattern storage network;
generating means for generating the other time series data based on the time series pattern model of the generation node; and
an output module for outputting the other time series data.

12. A generation method of generating, in response to time series data, another time series data in a link model including a plurality of first time series pattern storage networks and one second time series pattern storage network with nodes of the first time series pattern storage networks linked to nodes of the one second time series pattern storage network,
each of the plurality of first time series pattern storage networks including a plurality of nodes, each node having a time series pattern model representing a time series pattern of the time series data, and
the one second time series pattern storage network including a plurality of nodes, each node having a time series pattern model representing a time series pattern of the other time series data, the generation method comprising:
a winner node determining step of determining, for each of the first time series pattern storage networks, a node, as a winner node, most appropriately matching sub time series data of a channel corresponding to the first time series storage pattern storage network, the time series data containing the sub time series data of channels of the same number as the number of the first time series pattern storage networks;

a generation node determining step of determining, as a generation node for generating the other time series data, a node most heavily linked to the winner node, from among the nodes of the second time series pattern storage network;

a generating step of generating the other time series data based on the time series pattern model of the generation node; and an output step for outputting the other time series data.

\* \* \* \* \*